US011334070B2

(12) United States Patent
Dean et al.

(10) Patent No.: US 11,334,070 B2
(45) Date of Patent: *May 17, 2022

(54) SYSTEMS AND METHODS FOR PREDICTIONS OF STATE OF OBJECTS FOR A MOTORIZED MOBILE SYSTEM

(71) Applicant: Patroness, LLC, Nashville, TN (US)

(72) Inventors: Jered Harvey Dean, Arvada, CO (US); Barry George Dean, Franklin, TN (US); Dan Alan Preston, Bainbridge Island, WA (US)

(73) Assignee: Patroness, LLC, Nashville, TN (US)

( * ) Notice: Subject to any disclaimer, the term of this patent is extended or adjusted under 35 U.S.C. 154(b) by 223 days.

This patent is subject to a terminal disclaimer.

(21) Appl. No.: 16/101,152

(22) Filed: Aug. 10, 2018

(65) Prior Publication Data

US 2019/0049968 A1 Feb. 14, 2019

Related U.S. Application Data

(60) Provisional application No. 62/696,497, filed on Jul. 11, 2018, provisional application No. 62/639,293, (Continued)

(51) Int. Cl.
*G05D 1/00* (2006.01)
*A61G 5/04* (2013.01)
(Continued)

(52) U.S. Cl.
CPC ............. *G05D 1/0088* (2013.01); *A61G 5/04* (2013.01); *B60W 30/0956* (2013.01); *G05D 1/024* (2013.01); *G05D 1/0214* (2013.01); *G05D 1/0255* (2013.01); *G06T 7/292* (2017.01); *G06V 20/58* (2022.01); *A61G 2203/22* (2013.01);
(Continued)

(58) Field of Classification Search
CPC .............................. G05D 1/0088; G06T 7/292
See application file for complete search history.

(56) References Cited

U.S. PATENT DOCUMENTS 5,381,095 A 1/1995 Andrews
5,654,907 A 8/1997 Lange
(Continued)

OTHER PUBLICATIONS

PCT/US18/46308 International Search Report and Written Opinion, 14 pages, dated Oct. 12, 2018.
(Continued)

*Primary Examiner* — Jess Whittington
(74) *Attorney, Agent, or Firm* — Polsinelli PC

(57) ABSTRACT

A processing system for a motorized mobile system includes at least one sensor to measure one or more kinematic states of an object and at least one processor to use at least one state estimation filter and at least one object kinematic model to predict a first kinematic state estimate of the object and output the first predicted kinematic state estimate for use by at least one other process of the motorized mobile system. The processor uses the first predicted kinematic state estimate and the one or more measured kinematic states to determine a second kinematic state estimate of the object and uses the second kinematic state estimate as an input to the state estimation filter to predict another kinematic state estimate of the object.

78 Claims, 56 Drawing Sheets

Related U.S. Application Data filed on Mar. 6, 2018, provisional application No. 62/612,617, filed on Dec. 31, 2017, provisional application No. 62/543,896, filed on Aug. 10, 2017.

(51) Int. Cl.

| | | |
|---|---|---|
| *G05D 1/02* | (2020.01) | |
| *G06V 20/58* | (2022.01) | |
| *G06T 7/292* | (2017.01) | |
| *B60W 30/095* | (2012.01) | |

(52) U.S. Cl.
CPC .... *A61G 2203/72* (2013.01); *A61G 2203/726* (2013.01); *G05D 2201/0204* (2013.01); *G05D 2201/0206* (2013.01); *G05D 2201/0208* (2013.01); *G05D 2201/0212* (2013.01); *G06T 2207/30261* (2013.01)

(56) References Cited

U.S. PATENT DOCUMENTS

| | | | | |
|---|---|---|---|---|
| 9,224,053 | B1* | 12/2015 | Ferguson | G06K 9/209 |
| 2002/0121394 | A1* | 9/2002 | Kamen | A61G 5/061 |
| | | | | 180/41 |
| 2008/0294300 | A1 | 11/2008 | Ashmore et al. | |
| 2009/0292468 | A1 | 11/2009 | Wu | |
| 2010/0312461 | A1 | 12/2010 | Haynie et al. | |
| 2011/0190972 | A1 | 8/2011 | Timmons | |
| 2014/0146167 | A1 | 5/2014 | Friend | |
| 2014/0165159 | A1 | 8/2014 | Baade et al. | |
| 2015/0183431 | A1 | 7/2015 | Nanami | |
| 2015/0346724 | A1 | 12/2015 | Jones et al. | |
| 2017/0225760 | A1* | 8/2017 | Sidki | B63H 25/04 |
| 2018/0158197 | A1* | 6/2018 | Dasgupta | G06K 9/726 |
| 2019/0064823 | A1* | 2/2019 | Jiang | G05D 1/0066 |

OTHER PUBLICATIONS

ANSI/IEEE Std 802.2, "IEEE Standard for Information technology—Telecommunications and information exchange between systems—Local and metropolitan area networks—Specific requirements—Part 2: Logical Link Control", The Institute of Electrical and Electronics Engineers, Inc., New York, NY, USA, ISBN 1-55937-019-X, Dec. 31, 1989, 114 pages.

"Bluetooth Core Specification, v5.0", Bluetooth SIG, Inc., Dec. 6, 2016, 2822 pages, retrievable at https://www.bluetooth.org/en-us/specification/adopted-specifications.

ETSI European Standard EN 302 663 (V1.2.1), "Intelligent Transport Systems (ITS); Access layer specification for Intelligent Transport Systems operating in the 5 GHz frequency band", European Telecommunications Standards Institute, Sophia Antipolis, France, Reference REN/ITS-0040028, Jul. 2013, 24 pages.

ETSI Harmonized European Standard EN 302 571 (V1.2.1), "Intelligent Transport Systems (ITS); Radio communications equipment operating in the 5 855 MHz to 5 925 MHz frequency band; Harmonized EN covering the essential requirements of article 3.2 of the R&TTE Directive", European Telecommunications Standards Institute, Sophia Antipolis, France, Reference REN/ERM-TG37-009, Sep. 2013, 47 pages.

ETSI Technical Specification TS 102 687 (V1.1.1), "Intelligent Transport Systems (ITS); Decentralized Congestion Control Mechanisms for Intelligent Transport Systems operating in the 5 GHz range; Access layer part", European Telecommunications Standards Institute, Sophia Antipolis, France, Reference DTS/ITS-0040014, Jul. 2011, 45 pages.

ETSI Technical Specification TS 102 792 (V1.2.1), "Intelligent Transport Systems (ITS); Mitigation techniques to avoid interference between European CEN Dedicated Short Range Communication (CEN DSRC) equipment and Intelligent Transport Systems (ITS) operating in the 5 GHz frequency range", European Telecommunications Standards Institute, Sophia Antipolis, France, Reference RTS/ITS-00438, Jun. 2015, 23 pages.

IEC Std. 61851-1:2017 "Electric vehicle conductive charging system—Part 1: General requirements", the International Electrotechnical Commission, Geneva, Switzerland, ISBN 978-2-8322-3766-3, Feb. 7, 2017, 292 pages.

IEEE Std. 802.11-2016, "IEEE Standard for Information technology—Telecommunications and information exchange between systems Local and metropolitan area networks—Specific requirements—Part 11: Wireless LAN Medium Access Control (MAC) and Physical Layer (PHY) Specifications", The Institute of Electrical and Electronics Engineers, Inc., New York, NY, USA, ISBN 978-1-5044-3645-8 STDPD22369, Dec. 14, 2016, 3534 pages.

IEEE Std. 802.15.1-2005, "Wireless medium access control (MAC) and physical layer (PHY) specifications for wireless personal area networks (WPANs)", The Institute of Electrical and Electronics Engineers, Inc., New York, NY, USA, ISBN 0-7381-4707-9 SH95323, Jun. 14, 2005, 600 pages.

IEEE Std. 802.15.4-2015, "IEEE Standard for Low-Rate Wireless Networks", The Institute of Electrical and Electronics Engineers, Inc., New York, NY, USA, ISBN 978-1-5044-0846-2 STDPD20893, Apr. 22, 2016, 708 pages.

IEEE Std. 802.15.4q-2016, "IEEE Standard for Low-Rate Wireless Networks Amendment 2: Ultra-Low Power Physical Layer", The Institute of Electrical and Electronics Engineers, Inc., New York, NY, USA, ISBN 978-1-5044-0782-3 STD20852, Apr. 29, 2016, 52 pages.

IEEE Std. 802.15.4t-2017, "IEEE Standard for Low-Rate Wireless Networks Amendment 4: Higher Rate (2 Mb/s) Physical (PHY) Layer", The Institute of Electrical and Electronics Engineers, Inc., New York, NY, USA, ISBN 978-0-1-5044-3933-6 STDPD22524, Apr. 14, 2017, 25 pages.

IEEE Std. 802.16-2012, "IEEE Standard for Air Interface for Broadband Wireless Access Systems", The Institute of Electrical and Electronics Engineers, Inc., New York, NY, USA, ISBN 978-0-7381-7291-0 STD97266, Aug. 17, 2012, 2544 pages.

IEEE Std. 802-2014, "IEEE Standard for Local and Metropolitan Area Networks: Overview and Architecture", The Institute of Electrical and Electronics Engineers, Inc., New York, NY, USA, ISBN 978-0-7381-9219-2 STD98723, Jun. 30, 2014, 74 pages.

IEEE Std. 1003.1-2008, "IEEE Standard for Information Technology—Portable Operating System Interface (POSIX)", The Institute of Electrical and Electronics Engineers, Inc., New York, NY, USA, ISBN 978-0-7381-5798-6 STD95820, Dec. 1, 2008, 3874 pages.

IEEE Std. 1609.0-2013, "IEEE Guide for Wireless Access in Vehicular Environments (WAVE)—Architecture", The Institute of Electrical and Electronics Engineers, Inc., New York, NY, USA, ISBN 978-0-7381-8756-3 STD98459, Mar. 5, 2014, 78 pages.

IEEE Std. 1609.2-2016, "IEEE Standard for Wireless Access in Vehicular Environments—Security Services for Applications and Management Messages", The Institute of Electrical and Electronics Engineers, Inc., New York, NY, USA, ISBN 978-1-5044-0767-0 STD20841, Mar. 1, 2016, 884 pages.

IEEE Std. 1609.4-2016, "IEEE Standard for Wireless Access in Vehicular Environments (WAVE)—Multi-Channel Operation", The Institute of Electrical and Electronics Engineers, Inc., New York, NY, USA, ISBN 978-1-5044-0761-8 STD20838, Mar. 21, 2016, 205 pages.

IEEE Std. 1609.11-2010, "IEEE Standard for Wireless Access in Vehicular Environments (WAVE)—Over-the-Air Electronic Payment Data Exchange Protocol for Intelligent Transportation Systems (ITS)", The Institute of Electrical and Electronics Engineers, Inc., New York, NY, USA, ISBN 978-0-7381-6501-1 STD97080, Jan. 9, 2011, 62 pages.

IEEE Std. 1609.12-2016, "IEEE Standard for Wireless Access in Vehicular Environments (WAVE)—Identifier Allocations", The Institute of Electrical and Electronics Engineers, Inc., New York, NY, USA, ISBN 978-1-5044-0765-6 STD20840, Mar. 11, 2016, 39 pages.

IEEE Std. 11073-20601-2014, "IEEE Health informatics—Personal health device communication—Part 20601: Application profile—Optimized Exchange Protocol", The Institute of Electrical and

(56) References Cited

OTHER PUBLICATIONS

Electronics Engineers, Inc., New York, NY, USA, ISBN 978-0-7381-9314-4 STD98793, Oct. 10, 2014, 253 pages.

ISO/IEC 7498-1:1994, "Information technology—Open Systems Interconnection—Basic Reference Model: The Basic Model", Geneva, Switzerland, Reference No. ISO/IEC 7498-1:1994(E), Nov. 15, 1994, 68 pages.

ISO/IEC Std. 15408-1:2009, 3rd Edition: "Information technology—Security techniques—Evaluation criteria for IT security—Part 1: Introduction and general model", the International Organization for Standardization and the International Electrotechnical Commission Joint Technical Committee, Geneva, Switzerland, Reference No. ISO/IEC 15408-1:2009(E), Dec. 15, 2009, 74 pages.

ISO/IEC Std. 15408-2:2008, 3rd Edition: "Information technology—Security techniques—Evaluation criteria for IT security—Part 2: Security functional components", the International Organization for Standardization and the International Electrotechnical Commission Joint Technical Committee, Geneva, Switzerland, Reference No. ISO/IEC 15408-2:2008(E), Aug. 15, 2008, 240 pages.

ISO/IEC Std. 15408-3:2008, 3rd Edition: "Information technology—Security techniques—Evaluation criteria for IT security—Part 3: Security assurance components", the International Organization for Standardization and the International Electrotechnical Commission Joint Technical Committee, Geneva, Switzerland, Reference No. ISO/IEC 15408-3:2008(E), Aug. 15, 2008, 188 pages.

ISO/IEC Std. 18092:2013, "Information technology—Telecommunications and information exchange between systems—Near Field Communication—Interface and Protocol (NFCIP-1)", the International Organization for Standardization and the International Electrotechnical Commission Joint Technical Committee, Geneva, Switzerland, Reference No. ISO/IEC 18092:2013(E), Mar. 15, 2013, 52 pages.

ISO/IEC Std. 18092:2013 Technical Corrigendum 1, "Information technology—Telecommunications and Information exchange between systems—Near Field Communication—Interface and Protocol (NFCIP-1)", the International Organization for Standardization and the International Electrotechnical Commission Joint Technical Committee, Geneva, Switzerland, Reference No. SO/IEC 18092:2013/Cor.1:2015(E), Jul. 15, 2015, 2 pages.

ITU-T Recommendation X.691 (2015), "Information technology—ASN.1 encoding rules: Specification of Packed Encoding Rules (PER)", International Telecommunication Union, Geneva, Switzerland, Aug. 2015, 74 pages.

SAE Std. J1772_201710, "SAE Electric Vehicle and Plug in Hybrid Electric Vehicle Conductive Charge Coupler", SAE International, Warrendale, Pennsylvania, USA, Oct. 13, 2017, 116 pages.

International Searching Authority, International Preliminary Report on Patentability, issued for International Application No. PCT/US2018/046308, dated Oct. 16, 2019, 57 pages.

\* cited by examiner

USER METRIC DASHBOARD
Bone Density Training Monitor:
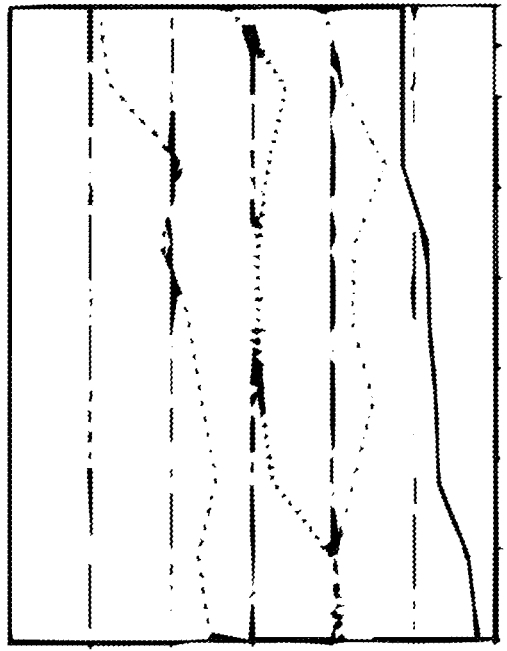
4402
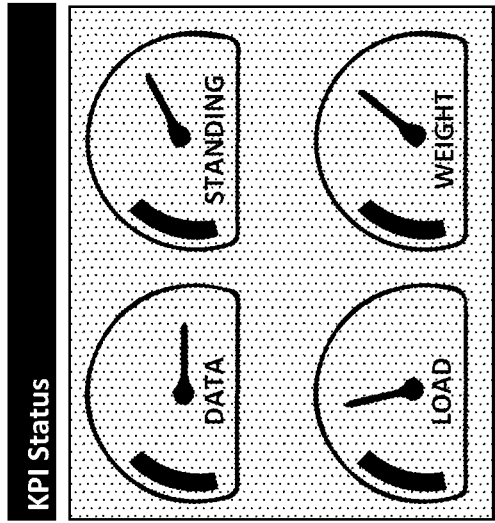
4404
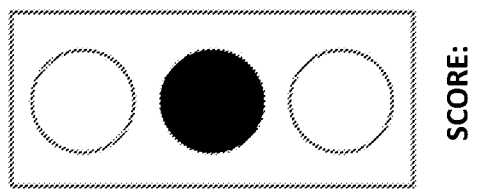
SCORE: 7 of 10
4406
FIG. 44

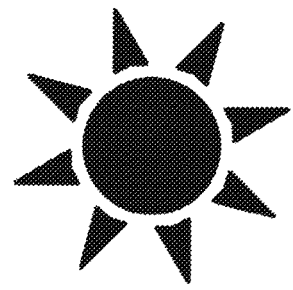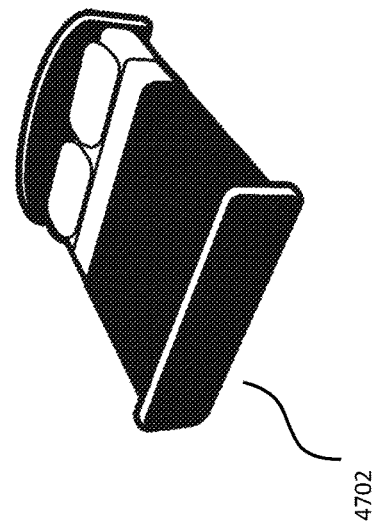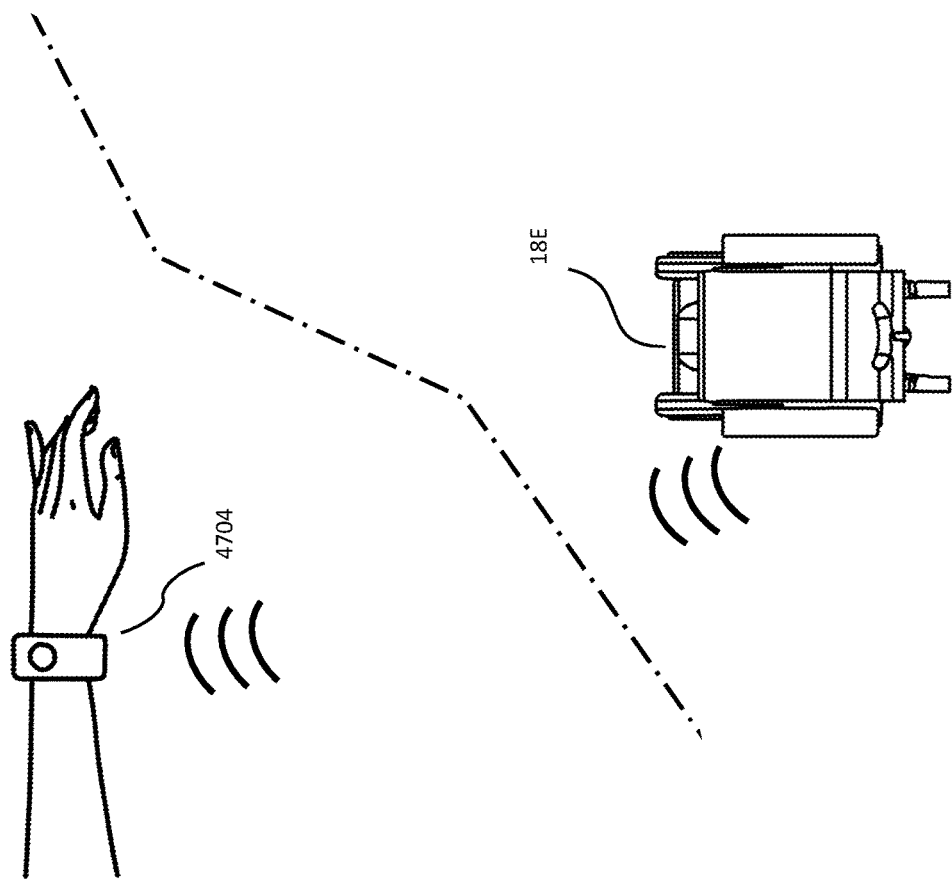
FIG. 47

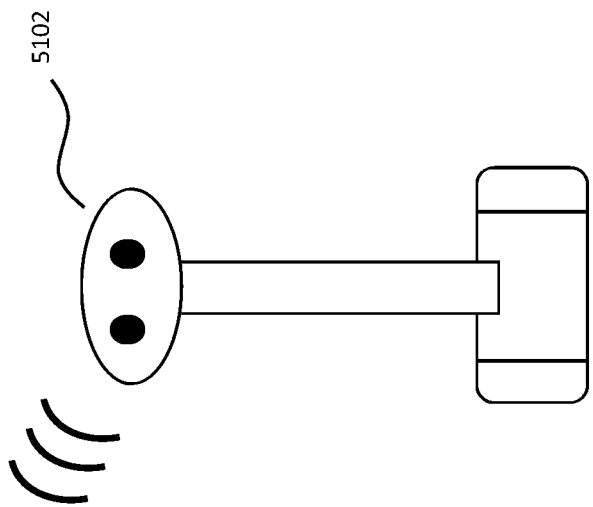
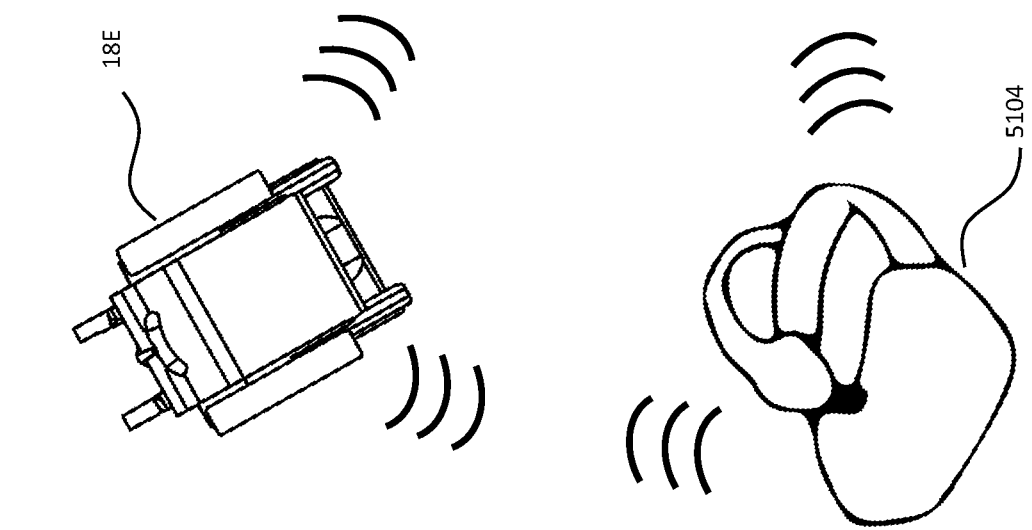
FIG. 51

SYSTEMS AND METHODS FOR PREDICTIONS OF STATE OF OBJECTS FOR A MOTORIZED MOBILE SYSTEM

RELATED APPLICATIONS

The present application claims priority to U.S. Patent App. No. 62/543,896, entitled Systems and Methods for Motorized Mobile Systems, filed Aug. 10, 2017, U.S. Patent App. No. 62/612,617, entitled Systems and Methods for Enhanced Autonomous Operations of a Motorized Mobile System, filed Dec. 31, 2017, U.S. Patent App. No. 62/639,293, entitled Systems and Methods for Enhanced Autonomous Operations of a Motorized Mobile System, filed Mar. 6, 2018, and U.S. Patent App. No. 62/696,497, entitled Systems and Methods for Enhanced Autonomous Operations of a Motorized Mobile System, filed Jul. 11, 2018, which are incorporated herein by reference in their entirety. The present application is related to U.S. patent application Ser. No. 15/880,663, entitled Secure Systems Architecture for Integrated Motorized Mobile Systems, filed Jan. 26, 2018, U.S. patent application Ser. No. 15/880,686, entitled Federated Sensor Array for Use with a Motorized Mobile System and Method of Use, filed Jan. 26, 2018, and U.S. patent application Ser. No. 15/880,699, entitled System and Methods for Sensor Integration in Support of Situational Awareness for a Motorized Mobile System, filed Jan. 26, 2018, all of which are incorporated herein by reference in their entirety.

INVENTORS

| Jered H. Dean | U.S. Citizen | U.S. Resident | Arvada, CO |
| Barry G. Dean | U.S. Citizen | U.S. Resident | Franklin, TN |
| Dan A. Preston | U.S. Citizen | U.S. Resident | Bainbridge Island, WA |

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

FIELD

This disclosure relates generally to control systems and sensor systems for motorized and non-motorized (manual) mobile systems.

BACKGROUND

Drive-by-wire (DbW), steer-by-wire, or x-by-wire technology is the use of electrical or electro-mechanical systems for performing vehicle functions traditionally achieved by mechanical linkages. This technology replaces the traditional mechanical control systems with electronic control systems using electromechanical actuators and human-machine interfaces. The technology is similar to the fly-by-wire systems used in the aviation industry. Use of these "by-wire" systems began with manned aircraft, migrated to drones, as well as marine and rail operations, and are now being used in autonomous or self-driving vehicle applications. These once expensive technologies are emerging in the market as commodity products, including products with sensors, processors, integrated mobile devices, and various communication mediums, including bandwidth increases for soon to be $5^{th}$ generation (5G) wireless devices on 5G networks.

This application and co-pending applications will create and achieve safe, secure independence and a richer experience for all motorized mobile system (MMS) users and non-motorized (manual) mobile system (NMMS) users. As an example of the need for improved MMSs, consider that today, with the advances in robotics and systems of systems integration, as well as medical advances that allow device integration with the human nervous system, there is a widening split between MMS and NMMS users with varying physiological functionality. Some mobile chair users may have significant remaining upper body mobility and cognitive function. An example of this would be a person who does not have the use of their legs and who uses a manual mobile chair for mobility but is otherwise able to navigate day-to-day life with minimal to no assistance. Such an individual may be able to adapt to an artificial limb, such as a leg, or an exoskeleton and reasonably be able to go about their day to day life with few restrictions. However, another example would be a user with certain health issues that greatly impacts the user's mobility and/or cognition. It is unlikely that these users will benefit from the same artificial leg or exoskeleton technologies due to their physiological condition. These users may use a motorized mobile system, such as a mobile chair.

Many mobile chair users report they are frequently frustrated by the general public's poor understanding of their abilities and needs. In general, the mobile chair is an extension of a user's body. People who use them have different disabilities and varying abilities. Some can use their arms and hands, while others can get out of their mobile chairs and walk for short distances. "Disability" is a general, medical term used for a functional limitation that interferes with a person's ability to walk, hear, learn, or utilize other physiological and/or cognitive functions of the body.

Conditions like cerebral palsy can be a sub-set of either physiological or cognitive disabilities since there are a number of sub-types classified based on specific ailments they present, resulting in varying degrees of ability. For example, those with stiff muscles have what is medically defined as spastic cerebral palsy, those with poor coordination have ataxic cerebral palsy, and those with writhing movements have athetoid cerebral palsy, each type requiring individual mobility plans.

Following are a few definitions used in this disclosure.

People with disabilities: This term represents a universe of potential conditions, including physical, cognitive, and/or sensory conditions.

Mobility disability: This term represents a condition for a person who uses a mobile chair or other MMS to assist in mobility.

User: This term refers to an individual who uses an MMS or an NMMS. A "user" of a mobile chair is referred to herein as a "mobile chair user". A "user" of a manual chair is referred to herein as a "manual chair user."

Operator: This term refers to an individual who operates an MMS or an NMMS, including manual, local, and remote operation, as may be applicable to an MMS or an NMMS.

Caregiver: This term represents any individual that assists an MMS user or an NMMS user. Family, friends, aides, and nurses may all be included in this category. The term "Attendant" is used synonymously with the term caregiver.

Technician: This term includes one or more of those individuals who setup, service, modify, or otherwise work technically on an MMS or an NMMS. These individuals may be formally licensed or may include operators and caregivers who are comfortable working with the system.

A mobile chair is essentially a chair with wheels used when walking is difficult or impossible due to illness, injury, or disability. Mobile chairs come in a wide variety to meet the specific needs of their users, including:

Manual self-propelled mobile chairs.
Manual attendant-propelled mobile chairs.
Powered mobile chairs (power-chairs).
Mobility scooters.
Single-arm drive mobile chairs.
Reclining mobile chairs.
Standing mobile chairs.
Combinations of the above.

Mobile Chairs include specialized seating adaptions and/or individualized controls and may be specific to particular activities. The most widely recognized distinction in mobile chairs is powered and unpowered. Unpowered mobile chairs are propelled manually by the user or attendant while powered mobile chairs are propelled using electric motors.

Motorized mobile chairs are useful for those unable to propel a manual mobile chair or who may need to use a mobile chair for distances or over terrain which would be fatiguing or impossible in a manual mobile chair. They may also be used not just by people with 'traditional' mobility impairments, but also by people with cardiovascular and fatigue-based conditions. A Motorized Mobile System (MMS) is a non-automobile motorized device which provides powered mobility to one or more users, including such systems as powered mobile chairs, mobility scooters, electronic conveyance vehicles, riding lawn mowers, grocery carts, all-terrain vehicles (ATVs), golf carts, and other recreational and/or medical mobility systems, but excludes automobiles (passenger cars, trucks, passenger buses, and other passenger or property transporting motorized vehicles intended for licensed operation on state and national highways). For the sake of clarity, a mobile chair MMS is described herein as an exemplary embodiment; however, it should be clear that the same or similar systems and methods may be applied to other MMS embodiments. Additionally, one or more of the elements of the systems and methods disclosed may be applied to non-motorized (manual) mobile system embodiments.

A mobile chair MMS is generally four-wheeled or six-wheeled and non-folding. Four general styles of mobile chair MMS drive systems exist: front, center, rear, and all-wheel drive. Powered wheels are typically somewhat larger than the trailing/castering wheels, while castering wheels on a motorized chair are typically larger than the casters on a manual chair. Center wheel drive mobile chair MMSs may have casters at both front and rear for a six-wheel layout and are often favored for their tight turning radii. Front wheel drive mobile chair MMSs are often used because of their superior curb-climbing capabilities. Power-chair chassis may also mount a specific curb-climber, a powered device to lift the front wheels over a curb of 10 cm or less.

Mobile chair MMSs are most commonly controlled by arm-rest mounted joysticks which may have additional controls to allow the user to tailor sensitivity or access multiple control modes, including modes for controlling the seating system. For users who are unable to use a hand controller, various alternatives are available, such as sip-and-puff controllers, worked by blowing into a sensor. In some cases, a controller may be mounted for use by an aide walking behind the chair rather than by the user. Capabilities include turning one drive-wheel forward while the other goes backward, thus turning the mobile chair within its own length.

The seating system on a mobile chair MMS can vary in design, including a basic sling seat and backrest, optional padding, comfortable cushions, backrest options, and headrests. Many companies produce aftermarket seat, back, leg, and head rest options which can be fitted onto mobile chair MMSs. Some seat, back, leg, and head rests are produced to aid with increased need for stability in the trunk or for those at increased risk of pressure sores from sitting. Leg rests may be integrated into the seating design and may include manual and/or powered adjustment for those users who want or need to vary their leg position. Mobile chair MMSs may also have a tilt-in-space, or reclining facility, which is particularly useful for users who are unable to maintain an upright seating position indefinitely. This function can also help with comfort by shifting pressure to different areas over time, or with positioning in a mobile chair when a user needs to get out of the chair or be hoisted.

Most mobile chairs are crash tested to ISO standards 7176 and 10542. These standards mean that a mobile chair can be used facing forward in a vehicle if the vehicle has been fitted with an approved tie down or docking system for securing the mobile chair and a method of securing the occupant to the mobile chair.

Rehabilitation engineering is the systematic application of engineering sciences to design, develop, adapt, test, evaluate, apply, and distribute technological solutions to problems confronted by individuals with disabilities. Current practitioners of rehabilitation engineering are often forced to work with limited information and make long term decisions about the technologies to be used by an individual on the basis of a single evaluation; a snapshot in time. Under current best-case conditions, rehabilitation engineering practitioners work closely in a long-term relationship with their clients to follow-up and readjust assistive technology systems on a regular basis. However, even in these situations, they are often working with limited information and only at periodic intervals.

What is needed is an evolution of existing motorized mobile systems (MMSs) to consider the users' abilities, needs, and health, with the goal of a safe, secure, and social independence. To accomplish this, systems and methods are disclosed herein comprising: integrated software and hardware systems, sensors for situational awareness, sensors for user monitoring, communications between users and caregivers, users and other users, and users and the "cloud", and human machine interfaces (HMIs) designed for users with a variety of physiological and cognitive conditions. The systems and methods disclosed herein are based on new underlying technologies, architectures, and network topologies that support the evolution of the MMS.

SUMMARY

Four co-pending-applications disclose various aspects of improved MMSs. All four are disclosed as related above and each incorporates by reference herein in the entirety of the other applications in full.

The application entitled "Secure Systems Architecture for Integrated Motorized Mobile Systems," relates to systems and methods for implementing a control system onboard an MMS capable of securely communicating with and utilizing external systems. This may include integrating external devices and user health monitoring sensors with an off the shelf (OTS) or custom MMS. Integration of a smart device, such as a smart phone or tablet, with an OTS or custom MMS is another example. Today, most smart devices contain a host of applications and sensors, including one or more of image capturing devices, rate and acceleration sensors, gyroscopes, global positioning system (GPS) receivers, biometric sensors, iris scanners, fingerprint scanners, and facial recognition software. Other sensors are possible. A secure architecture for an MMS controller is disclosed in support of device integration and data security with a focus on extensibility.

The application entitled "Federated Sensor Array for Use with a Motorized Mobile System and Method of Use" discloses the integration of non-contact sensors and control logic into an MMS controller. The federated sensors have overlapping sensing fields, generally operate independently, and report certain data relevant to navigation and stability which is then used by the MMS controller. Motor, seat, and auxiliary controllers may be hosted in the MMS controller along with the federated sensor logic. The integration of these systems and applications into an MMS lays the foundation for situational awareness (SA).

Situational awareness is the ability to be cognizant of oneself in a given space. It is an organized knowledge of objects and state kinematics in relation to oneself in a given space or scenario. Situational awareness also involves understanding the relationship of these objects when there is a change of position or kinematic state. The goal is to integrate this data into the MMS and use it to support a richer, safer, and more independent experience for the user.

The application entitled "System and Methods for Sensor Integration in Support of Situational Awareness for a Motorized Mobile System" further discloses the integration of new sensor technologies in support of a deeper and richer situational awareness for the user. These new systems use the data generated about the user, the environment, targets in the environment, and the user's relationship to them. This information may be generated from one or more sources and include data from non-contact sensors, like radar, optical, laser, and ultrasonic sensors. These non-contact sensors can generate data about the environment, including range measurements, bearing measurements, target classification, and target kinematics. The new sensors provide a much richer set of data about the environment.

The federated system uses a single type of sensor that generates a single report (i.e. a communication with or identifying data sensed by the sensor) with what is called a single mode variance, where each sensor has distinct capabilities and one or more fixed errors inherent to the sensor. Ultra-sonic sensors have better range determination than cross range position determination, for instance. In an example, using data from a different type of sensor, a good cross range report can be generated, but with poor down range determination. In this evolving system, the best of two (or more) separate reports may be combined. This is referred to as a dual mode variance.

The application entitled "System and Methods for Enhanced Autonomous Operations of a Motorized Mobile System" discloses the implementation of advanced filtering techniques and sensor fusion in support of situational awareness and autonomy. Adding more sensors to a federation of sensors increases expense, weight, and power consumption. Integration and use of sensor fusion (e.g. using different types of sensors in one system) and advanced filtering techniques improves the information the MMS controller uses to track the user and environment, while reducing complexity and cost when compared to a federated approach. Decision logic consisting of data association techniques, track management, handling out of sequence measurements, and sensor frame management are all building blocks for this leap in system capability.

In this enhanced system, raw data is received and "filtered", or as is known in the art fused, with other data related to the MMS user and their activities while navigating in the environment. The other data may include certain biometric data, user inputs, and user activities. Filtering and state estimation are some of the most pervasive tools of engineering. In some embodiments, a model may be used to form a prediction of a state into the future, followed by an observation of the state or actual measurement of the prediction. A comparison of the predicted state and the measured state is then made. The model may be adjusted based on the comparison of the predicted state and measured state.

In this enhanced system, the MMS is fully aware of its environment and can travel safely wherever the user wishes to go, within reason. Moreover, the MMS may learn to anticipate the needs of the user. The result is a user experience that is safe, secure, and independent, based on the user's abilities and current condition.

Other systems may be integrated to improve user experience. As a non-limiting example, augmented reality (AR) may be included. Augmented reality is a live direct or indirect view of a physical, real-world environment where the elements are augmented (or supplemented) by computer-generated sensory input. The input can be sound, smell, or graphics. It is related to a more general concept called computer-mediated reality, in which a view of reality is modified, possibly even diminished rather than augmented, by a computer. As a result, the technology functions by enhancing one's current perception of reality. Virtual Reality (VR) is another technology that may be integrated to improve user experience. By contrast, VR replaces the real world with a simulated one. Augmentation is conventionally in real time and in semantic context with environmental elements, such as sports scores on TV during a match. However, VR refers to computer technologies that use VR headsets, sometimes in combination with physical spaces or multi-projected environments, to generate realistic images, sounds, and other sensations that simulate a user's physical presence in a virtual or imaginary environment.

In one aspect, a processing system for a motorized mobile system that provides powered mobility to one or more users comprises at least one sensor to measure one or more kinematic states of an object proximate to the motorized mobile system and at least one processor to use at least one object kinematic model as at least one state estimator. The at least one processor predicts a first kinematic state estimate of the object at a first time based on a prior knowledge of state for the object. The at least one processor uses the first kinematic state estimate of the object at the first time and a measured kinematic state observed by the sensor at a second time to determine a second kinematic state estimate of the object at the second time, wherein the first time is less than the second time. The at least one processor outputs the first kinematic state estimate at the first time from the object kinematic model for use by at least one other process of the motorized mobile system, wherein the at least one other process causes one or more actions to be taken by the motorized mobile system based on the first kinematic state estimate of the object at the first time. The at least one processor uses the second kinematic state estimate at the second time as an input to the object kinematic model to predict another kinematic state estimate of the object.

In another aspect, a processing method for a motorized mobile system that provides powered mobility to one or more users comprises measuring one or more kinematic states of an object proximate to the motorized mobile system and using at least one object kinematic model as at least one state estimator on at least one processor. The method predicts a first kinematic state estimate of the object at a first time based on a prior knowledge of state for the object. The method uses the first kinematic state estimate of the object at the first time and a measured kinematic state observed by the sensor at a second time to determine a second kinematic state estimate of the object at the second time, wherein the first time is less than the second time. The method outputs the first kinematic state estimate at the first time from the object kinematic model for use by at least one other process of the motorized mobile system, wherein the at least one other process causes one or more actions to be taken by the motorized mobile system based on the first kinematic state estimate of the object at the first time. The method uses the second kinematic state estimate at the second time as an input to the object kinematic model to predict another kinematic state estimate of the object.

Applicant(s) herein expressly incorporate(s) by reference all of the following materials identified in each paragraph below. The incorporated materials are not necessarily "prior art".

802.11-2016: "IEEE Standard for Information technology—Telecommunications and information exchange between systems Local and metropolitan area networks—Specific requirements—Part 11: Wireless LAN Medium Access Control (MAC) and Physical Layer (PHY) Specifications".

1609.0-2013: "IEEE Guide for Wireless Access in Vehicular Environments (WAVE)—Architecture".

1609.2-2016: "IEEE Standard for Wireless Access in Vehicular Environments—Security Services for Applications and Management Messages".

1609.4-2016: "IEEE Standard for Wireless Access in Vehicular Environments (WAVE)—Multi-Channel Operation".

1609.11-2010: "IEEE Standard for Wireless Access in Vehicular Environments (WAVE)—Over-the-Air Electronic Payment Data Exchange Protocol for Intelligent Transportation Systems (ITS)".

1609.12-2016: "IEEE Standard for Wireless Access in Vehicular Environments (WAVE)—Identifier Allocations".

ETSI EN 302663 (V1.2.1): "Intelligent Transport Systems (ITS); Access layer specification for Intelligent Transport Systems operating in the 5 GHz frequency band."

ETSI EN 302571 (V1.2.1): "Intelligent Transport Systems (ITS); Radio communications equipment operating in the 5855 MHz to 5925 MHz frequency band; Harmonized EN covering the essential requirements of article 3.2 of the R&TTE Directive".

ETSI TS 102792 (V1.2.1): "Intelligent Transport Systems (ITS); Mitigation techniques to avoid interference between European CEN Dedicated Short Range Communication (CEN DSRC) equipment and Intelligent Transport Systems (ITS) operating in the 5 GHz frequency range".

IEEE 802-2014: "IEEE Standard for Local and Metropolitan Area Networks: Overview and Architecture".

ETSI TS 102687 (V1.1.1): "Intelligent Transport Systems (ITS); Decentralized Congestion Control Mechanisms for Intelligent Transport Systems operating in the 5 GHz range; Access layer part".

IEEE 802.15.1-2005: "Wireless medium access control (MAC) and physical layer (PHY) specifications for wireless personal area networks (WPANs)".

IEEE 802.15.4-2015: "IEEE Standard for Low-Rate Wireless Networks".

ISO/IEC 18092:2013: "Information technology—Telecommunications and information exchange between systems—Near Field Communication—Interface and Protocol (NFCIP-1)".

IEEE 802.16-2012: "IEEE Standard for Air Interface for Broadband Wireless Access Systems".

ISO/IEEE 11073-20601-2014: "IEEE Health informatics—Personal health device communication—Part 20601: Application profile—Optimized Exchange Protocol".

Bluetooth SIG: "Bluetooth Core Specification", v5.0.

SAE J1772_201710: "SAE Electric Vehicle and Plug in Hybrid Electric Vehicle Conductive Charge Coupler".

IEC 61851-1:2017 IEC 61851: "Electric vehicle conductive charging system—Part 1: General requirements".

If it is believed that any of the above-incorporated material constitutes "essential material" within the meaning of 37 CFR 1.57(d)(1)-(3), applicant(s) reserve the right to amend the specification to expressly recite the essential material that is incorporated by reference as allowed by the applicable rules.

Aspects and applications presented here are described below in the drawings and detailed description. Unless specifically noted, it is intended that the words and phrases in the specification and the claims be given their plain and ordinary meaning to those of ordinary skill in the applicable arts. The inventors are aware that they can be their own lexicographers if desired. The inventors expressly elect, as their own lexicographers, to use only the plain and ordinary meaning of terms in the specification and claims unless they clearly state otherwise and expressly set forth the "special" definition of that term. Absent such clear statements of intent to apply a "special" definition, it is the inventors' intent and desire that the plain and ordinary meaning to the terms be applied to the interpretation of the specification and claims.

Further, the inventors are informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f) to define the systems, methods, processes, and/or apparatuses disclosed herein. To the contrary, if the provisions of 35 U.S.C. § 112(f) are sought to be invoked to define the embodiments, the claims will specifically and expressly state the exact phrases "means for" or "step for" and will also recite the word "function" (i.e., will state "means for performing the function of . . . "), without also reciting in such phrases any structure, material, or act in support of the function. Thus, even when the claims recite a "means for performing the function of . . . " or "step for performing the function of . . . ", if the claims also recite any structure, material, or acts in support of that means or step then it is the clear intention of the inventors not to invoke the provisions of 35 U.S.C. § 112(f). Moreover, even if the provisions of 35 U.S.C. § 112(f) are invoked to define the claimed embodiments, it is intended that the embodiments not be limited only to the specific structures, materials, or acts that are described in the preferred embodiments, but in addition, include any and all structures, materials, or acts that perform the claimed function as described in alternative embodiments or forms, or that are well known present or later-developed equivalent structures, materials, or acts for performing the claimed function.

BRIEF DESCRIPTION OF THE DRAWINGS

A more complete understanding of the systems, methods, processes, and/or apparatuses disclosed herein may be derived by referring to the detailed description when considered in connection with the following illustrative figures. In the figures, like-reference numbers refer to like-elements or acts throughout the figures.

FIG. 44 depicts an embodiment of a user health dashboard.

FIG. 47 depicts an example of routine deviation alert capabilities of an S-MMS controller.

FIG. 51 depicts pairing an S-MMS, virtual reality system, and a remote machine or robot.

Elements and acts in the figures are illustrated for simplicity and have not necessarily been rendered according to any particular sequence or embodiment.

DETAILED DESCRIPTION

In the following description, and for the purposes of explanation, numerous specific details, process durations, and/or specific formula values are set forth in order to provide a thorough understanding of the various aspects of exemplary embodiments. However, it will be understood by those skilled in the relevant arts that the apparatus, systems, and methods herein may be practiced without all of these specific details, process durations, and/or specific formula values. Other embodiments may be utilized and structural and functional changes may be made without departing from the scope of the apparatus, systems, and methods herein. It should be noted that there are different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments in which the systems, methods, processes, and/or apparatuses disclosed herein may be practiced. It is to be understood that other embodiments may be utilized and structural and functional changes may be made without departing from the scope.

Figure 1:
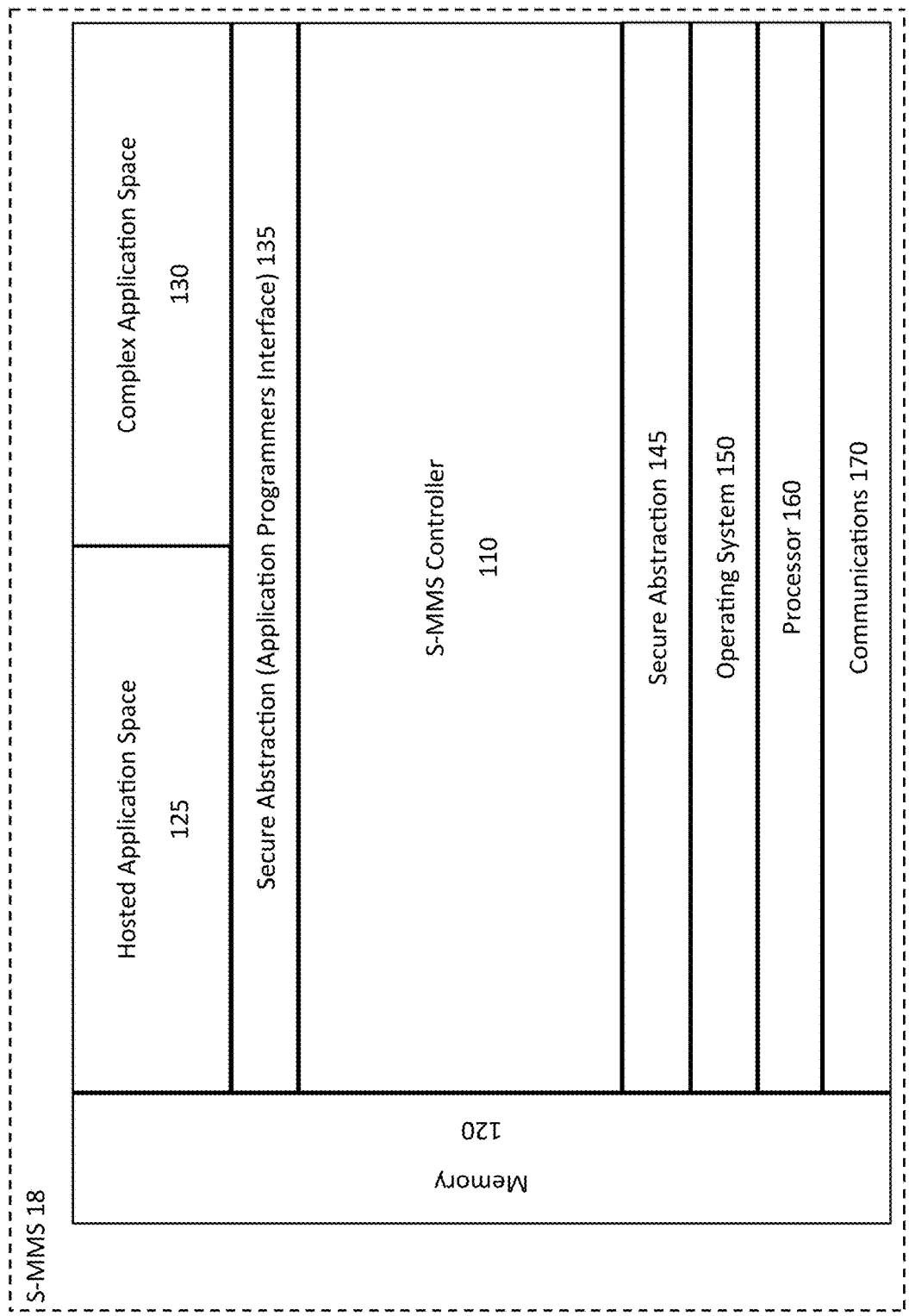
FIG. 1 depicts a control system architecture with hardware and software components for an S-MMS.
Figure 56:
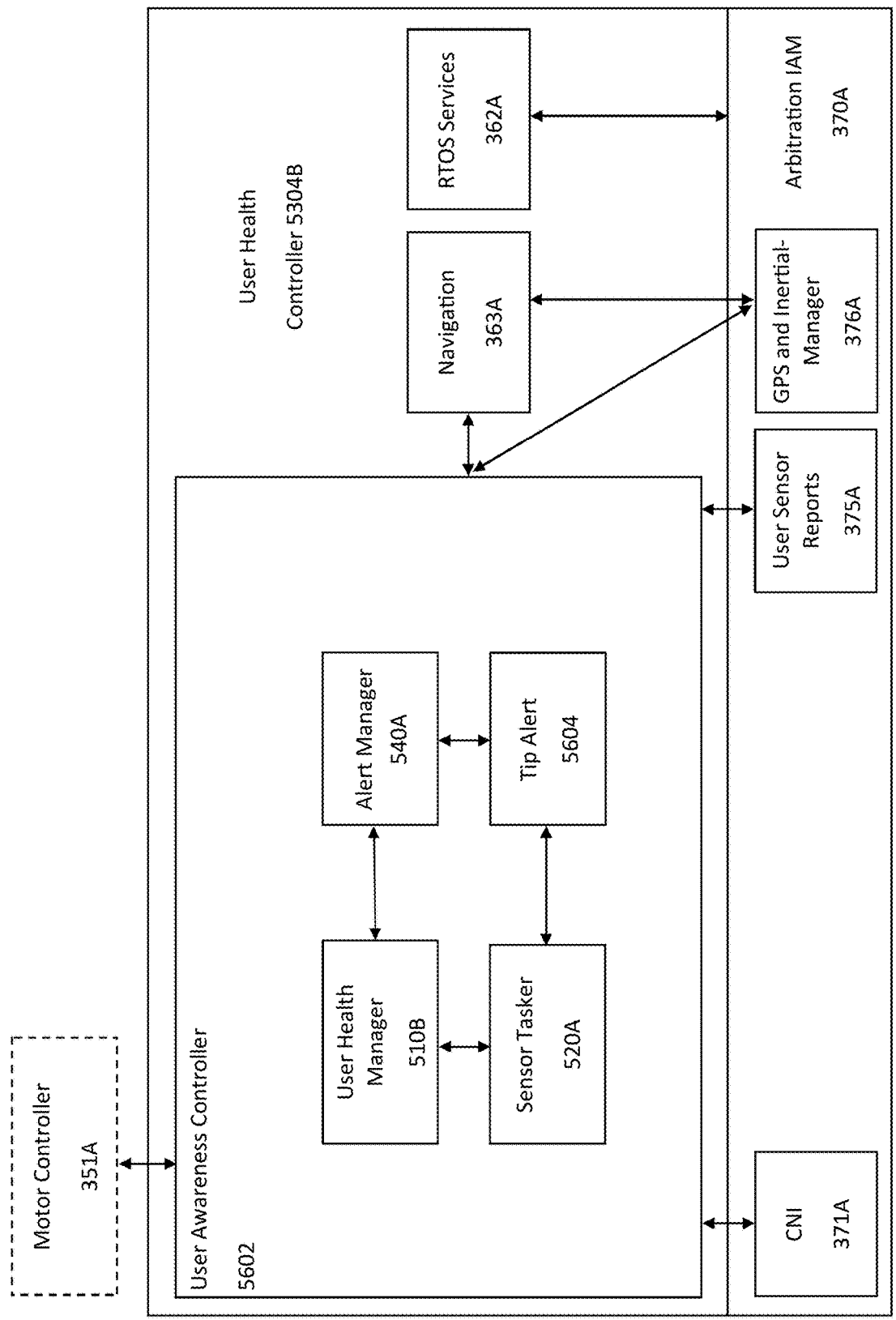
FIG. 56 depicts an embodiment of a control system architecture for a user health controller hosting an integrated user awareness controller (UAC).

Systems and methods are disclosed for use of predictive techniques on a Smart Motorized Mobile System (S-MMS) and on manual systems, such as manual mobile chairs. Referring generally to FIGS. 1-56 systems, methods, and apparatuses for providing safety and independence for S-MMS users and manual chair users are illustrated. The systems and methods disclosed support non-automobile motorized mobile systems, such as powered mobile chairs, mobility scooters, electronic conveyance vehicles, riding lawn mowers, grocery carts, ATVs, golf carts, off-road vehicles, and other recreational and/or medical mobility systems, but excludes automobiles. The systems and methods disclosed also support stand-alone systems for use, for example, for manual mobile chairs. For the purposes of this disclosure, automobiles are defined as passenger cars, trucks, passenger buses, and other passenger or property transporting motorized vehicles intended for licensed operation on state and national highways. A non-limiting, illustrative example of a motorized mobile chair is used throughout the disclosure. In various embodiments, a placement or location of at least one sensor may be determined based at least in part upon unique S-MMS dynamic characteristics, user seating position, wheel or track location associated with the S-MMS, or other characteristics relevant to the disclosed systems and methods.

Some embodiments of the systems disclosed may be referred to as separate generations based on level of capability. While these generations are discussed as separate embodiments, it should be clear that any one or more aspects of any one or more generations may be combined to form other systems not explicitly disclosed herein (or in the related co-pending applications). The generations are as follows: Generation 0 (Gen 0), Generation I (Gen I), Generation II (Gen II), and Generation III (Gen III).

The motorized mobile systems in existence today may be referred to herein as Generation 0. Generation 0 is an MMS with a user interface and a control system. Generation 0 is hosted in a controller with a Human Machine Interface (HMI) typically consisting of one or more of a brain machine interface, a joystick, a touchscreen, a voice command interface, an audio indicator, a tactile surface array, a sip and puff type array, or similar interface. The HMI receives input indicating "move forward", the command is generated, and control instructions are sent to a motor controller, which responds with a preconfigured response. The control instructions may include a calculation, a logical comparison, a change in state, an adjustment of an operating parameter (including enabling or disabling the operating parameter), a limitation of a feature or capability, and/or an enablement of a feature or capability. The state of the art for a Generation 0 system is to provide extremely simple control instructions and open loop limits on the MMS. Open loop systems lack the ability for self-correcting actions. An example of an open loop limit currently in use on MMSs is to cut the maximum MMS speed to a predetermined set point if the user raises the seat position above a certain threshold. The motor controller responds directly to the user input regardless of the environment proximate to the MMS. A new user may have a learning curve to master before they can confidently maneuver close to people, objects, or in confined environments.

A Smart Motorized Mobile System (S-MMS) of the present disclosure is an evolution of MMS technology, and includes embodiments of a new controller and control architecture, some of which include secure methods for collecting and transmitting data across one or more networks.

The present application and one or more related applications disclose improved generations of S-MMS and stand-alone systems architectures, including Generations I-III architectures. Generation I is an embodiment for a group of sensors reporting to a controller for the S-MMS. Generation II embodiments further include consideration for scanning and/or image sensors operating in overlapping regions. Using one sensor with good down range error, and a second sensor with good cross range error, a Generation II system embodiment can coordinate reports in real-time, associate them, and take the best measurements in an ability to make the situational awareness picture more accurate. This use of more than one sensor is typically referred to as dual mode variance.

Generation II S-MMSs and stand-alone systems may take advantage of their ability to exchange data with other like equipped systems about their environment. In addition to other like equipped systems, the S-MMS and stand-alone systems may be configured to receive data from traffic through Dedicated Short-Range Communications (DSRC) across an IEEE 802.11p link. This data may help the user to better navigate next to a road way, or along paths that are shared by automobiles and other MMSs. For an S-MMS user, the ability to announce one's presence and the ability to control traffic could be lifesaving.

Generation II systems are based on historical data or on observations of state at a finite time, in this case time $T_1$. In one example, an event is measured at time $T_1$, the event is processed at time $T_2$, data for the processed event is transmitted at time $T_3$, the data for the processed event is related to other data at time $T_4$, and any other actions that need to be carried out are done at time $T_5$. This can be done very quickly, e.g. from tenths of a second to even seconds. Regardless of delay, it is all historic.

Generation III is an embodiment for a multi-generation controller architecture and logic. In some embodiments, a Generation III system may host one or more of the previous generations or combinations thereof. Generation III systems go beyond dual mode variance to true sensor fusion.

The S-MMS controller may be one or more processors (hardware), application-specific integrated circuits, or field-programmable gate arrays that host the disclosed architecture. Control signals may be via wired or wireless communications, and comprised of digital and/or analog signals. An S-MMS controller as disclosed herein also may be used as a stand-alone system controller.

Control System Embodiment

FIG. 1 depicts an embodiment of an S-MMS 18 control system composed of hardware and software components. An S-MMS controller 110 lies between two secure abstraction layers 135 and 145. Abstraction layers are used as a way of hiding the implementation details of a particular set of functionalities, allowing the separation of concerns to facilitate interoperability and platform independence. The upper abstraction layer 135 abstracts through an Application Programmers Interface (API) to a hosted application space 125 and a complex application space 130. The API is a set of subroutine definitions, protocols, and tools for building applications. An API allows for communication between the various components. The complex application space 130 may include hosted control logic for an S-MMS 18. Below the S-MMS controller 110 and its secure abstraction 145 is a breakout of the operating system 150, one or more processors 160 (which are hardware), and a communications layer 170, which may include a hardware communications interface. Memory 120, which is hardware, cross cuts all of the layers in the depicted embodiment and may include volatile and non-volatile non-transitory computer storage media for storing information. The S-MMS controller 110 is software that executes on one or more processors 160 on the S-MMS 18 and is stored in memory 120.

Figure 2:
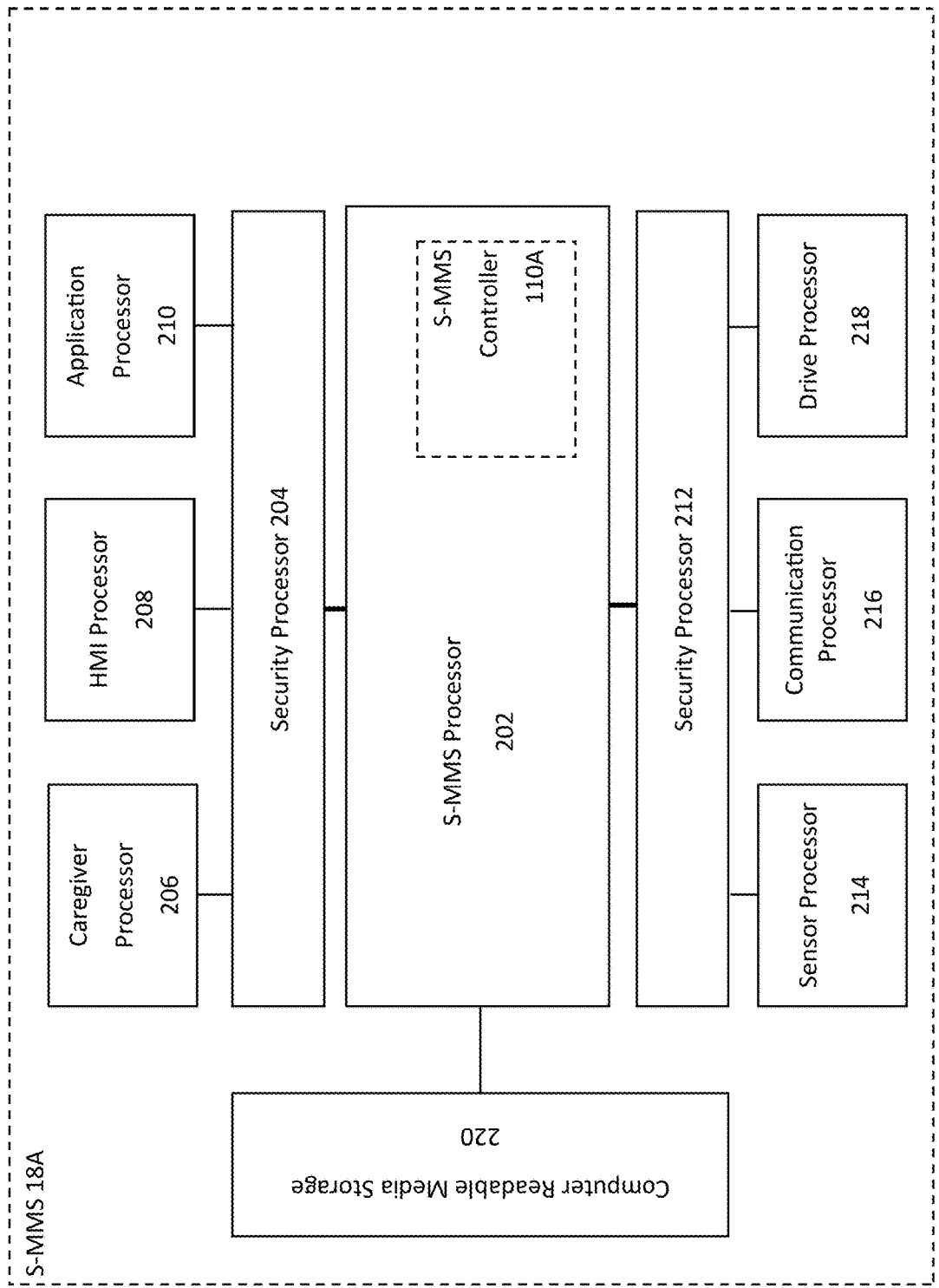
FIG. 2 depicts an embodiment of an S-MMS hardware architecture.

With a focus now on the one or more hardware processors that the S-MMS controller 110 is executed on and interacts with, FIG. 2 depicts a hardware embodiment of an S-MMS 18A architecture. The depicted electrical architecture comprises an S-MMS processor 202 between two security processors 204 and 212, each of which is hardware. The S-MMS processor 202 may be paired with a lock-step processor (not depicted) for critical life, health, and safety applications, in some embodiments. A lock-step processor is a second processor, identical to the S-MMS processor 202, that monitors and verifies the operation of the S-MMS processor. The security processors 204 and 212 may host (i.e. execute) modules and other software, such as the previously disclosed secure abstraction APIs 135 and 145. Additionally or alternatively, the security processors may host services, such as watch-dog and data source authentication services which are used to protect one or more processors of the S-MMS 18A from specific software or hardware failures that may cause the them to stop responding. The S-MMS controller 110A is hosted on an S-MMS processor 202. The processors may comprise one or more of a processor, multiple processors, an application-specific integrated circuit, or a field-programmable gate array.

The S-MMS controller 110A utilizes computer readable media (CRM) storage 220, which includes the memory 120, for data storage and retrieval during operation. Executable program instructions for the S-MMS controller 110A also may be stored in the memory 120. The memory 120 is one or more of a volatile and non-volatile non-transitory computer storage medium for storing information and may be located onboard the S-MMS 18A, may be remote storage available on a smart device or server, or some combination of the foregoing. One or more secure, encrypted memory partitions are used to store electronic protected health information (ePHI) and other secure health data. Health data may comprise user data for at least one of medical data, raw sensor data, conclusions data, patient measurements, weight, temperature, heart rate, pulse, respiratory rate, blood pressure, blood glucose level, wetness, sight, hearing, reaction time, pain status, emotional state, orientation, location, event, state, and action. Additionally, health data may include any protected health information (PHI) that is covered under Health Insurance Portability and Accountability Act of 1996 (HIPAA) security regulations. The data stored on the secure memory is made available to one or more pre-authorized systems, wherein the pre-authorized system comprises a device or service associated with an individual user. This may include a mobile motorized system, a smart device, a computer, a data terminal, or a device or service associated with an approved third party.

The S-MMS 18A hardware system may comprise multiple additional processors beyond the core S-MMS processor 202. In the case of a power wheelchair S-MMS, these additional hardware processors may include one or more caregiver processors 206, one or more HMI processors 208, one or more application processors 210, one or more sensor processors 214, one or more communication processors 216, and one or more drive processors 218, each of which is hardware. Each processor executes software and may produce one or more control signals wherein a control signal is a wired or wireless signal, and wherein a control signal comprises one or more of a digital or an analog signal, and generally comprises or indicates data, instructions, and/or a state. In an example, one or more control signals may be a digital signal transmitted via a bus (e.g. Controller Area Network (CAN bus)) or interface (e.g. Serial Peripheral Interface (SPI)) designed to allow microcontrollers and devices to communicate with each other in one or more applications. A brief description of each of the additional processors for the depicted embodiment is provided below.

A caregiver processor 206 may be physically attached to the S-MMS or may be part of a remote device. In one embodiment, a caregiver processor 206 is a duplicate HMI and associated processor for the S-MMS that allows a caregiver to physically drive or otherwise maneuver or control the S-MMS or its components.

An HMI processor 208 may accept one or more user inputs from one or more HMI devices, such as a joystick or touch screen, and convert them into one or more control signals with data and/or instructions which are transmitted in response to the one or more user inputs at the HMI. Control instructions may comprise one or more of a calculation, a value, a logical comparison, a state, a change in state, an instruction, a request, data, a sensor reading or record, an adjustment of an operating parameter, a limitation of a feature or capability, or an enablement of a feature or capability.

An application processor 210 may include one or more processors embedded in ancillary products, such as a seat controller, lighting controller, or $3^{rd}$ party device. Typically, these processors receive one or more control signals that causes them to respond with a preconfigured response, wherein the preconfigured response may include moving, measuring, changing a state, transmitting data, or taking operational control of the associated hardware (e.g. raising, lowering, or angling a seat or increasing or decreasing a light brightness or turning a light on or off). An application processor 210 may additionally or alternatively supply data about the S-MMS or use data generated from one or more sensors.

A sensor processor 214 receives data generated from one or more sensors or sensor transducers used by the S-MMS or otherwise associated with one or more characteristics of the mobile system or a user of the mobile system. The received data may be stored in a memory and/or transmitted. Multiple sensors may use a single sensor processor 214 or multiple processors. Additionally or alternatively, individual sensors may have their own (e.g. dedicated) processors, which may be on-board the sensor.

A communication processor 216 is used to establish one or more connections with one or more devices and transmits communications to, and receives communications from, one or more devices through associated devices of the S-MMS (e.g. one or more transceivers). Devices may communicate with the processor via wired or wireless means. These devices may be located on the S-MMS 18A or may be remote to the S-MMS 18A. A communication processor 216 may be part of a communication system for a mobile system for secure transmission and/or secure reception of data. In some embodiments, the S-MMS processor 202 may have an integrated communication processor, or the S-MMS processor performs the functions of the communication processor.

In an exemplary embodiment, a communication processor 216 on the S-MMS 18A is configured to establish secure connections between the S-MMS 18A and one or more other wireless devices over which data is transmitted and received by the communication processor and the one or more wireless devices. Responsive to a secure connection being established by the communication processor 216 with a wireless device, the communication processor retrieves from a secure memory 220 one or more of stored first data or stored second data; wherein first data is data generated from one or more sensors associated with one or more characteristics of the mobile system (e.g. sensors on or used by the S-MMS 18A for measurement of distances, angles, or planes at which the S-MMS is operating, drive speed or direction, angular momentum, or other operational characteristics of the S-MMS itself) and second data is data generated from one or more sensors associated with a user of the mobile system (e.g. user presence in the seat, heart rate, seat moisture, or other characteristics of the user of the S-MMS). One or more of the first data and second data is then communicated to the wireless device via the secure connection for storage in a secure second memory of the wireless device. The wireless device and the communication processor 216 may communicate using one or more of cellular, RFID, 802.11 (as defined in the IEEE 802.11 standard incorporated herein by reference), Wi-Fi, 802.15 (as defined in the IEEE 802.15 standard incorporated herein by reference), Bluetooth, Bluetooth Low Energy (BLE) (as defined in the Bluetooth Core Specification incorporated herein by reference), 802.16 (as defined in the IEEE 802.16 standard incorporated herein by reference), WiMAX, near field communication, and 18092 (as defined in the IEE 18092 standard incorporated herein by reference). Additionally or alternatively, the communication processor 216 may communicate using one or more dedicated short range communication (DSRC) protocol including WAVE and/or European ITS (as defined in the IEEE 1609, ETSI EN 302, and ETSI TS 102 standards incorporated herein by reference).

A drive processor 218 receives one or more control signals, for example from the S-MMS controller 110A, that cause the drive processor to respond with a preconfigured response to the steering system and/or drive motor(s) of the S-MMS, wherein the preconfigured response includes one or more of taking operational control of the steering system or drive motor(s), steering the S-MMS, or starting and/or stopping one or more drive motors to move the S-MMS in one or more directions. A drive processor 218 may additionally or alternatively supply data generated from one or more sensors associated with one or more characteristics of the mobile system to the S-MMS controller 110A (e.g. steering system sensors, drive motor sensors, distance/range sensors, etc.).

In some embodiments, one or more sensors may be mounted to different physical locations on an S-MMS 18A. In some embodiments, the sensing area/view/field of one or more sensors may overlap the sensing area/view/field of one or more other sensors or a contiguous sensing field may exist between sensors to obtain a complete 360-degree sensing area view around the S-MMS 18A, which is referred to herein as a federation of sensors. In some embodiments, the one or more sensors are non-cooperating independent sensors that generate a detection response to objects with some confidence (e.g. generate a control signal that indicates one or more objects were detected and a distance to the one or more objects or other measurement data relative to the one or more objects). In such an embodiment, the kinematic states of detection that can be determined include, for example, position and time of detection. In some embodiments, control logic may be deployed in an S-MMS controller 110A to create an integrated system of systems within the S-MMS 18A.

Situational Awareness Controller

Situational awareness (SA) is the perception of environmental elements, objects, conditions, and events with respect to the observer, in terms of time and space. Situational awareness involves being aware of what is happening in the vicinity of the user to understand how information, events, and one's own actions will impact objectives, both immediately and in the near future. More importantly, situational awareness involves the comprehension of information's meaning, and the projection of an object's status after some variable has changed or occurred, such as time, or some other variable has changed or occurred, such as a predetermined event. Situational awareness is also the field of study concerned with understanding the environment critical to a decision-making process in a complex dynamic system. Dynamic situations may include ordinary, but nevertheless complex, tasks such as maneuvering an S-MMS in an environment safely.

A federation of sensors may be oriented proximate to an S-MMS 18 in such a way to ensure 360-degree sensor coverage. These sensors may report to an S-MMS controller 110 that is tasked with receiving information from one or more sensors, interpreting information from one or more sensors, and taking action based on information provided by the one or more sensors. The S-MMS controller 110 may attempt to assign meaning to the information and create a projection of one or more statuses or states of the S-MMS 18, including after some variable has changed or occurred. When one or more sensors report data identifying an object, the S-MMS controller 110 may respond based on those reports, either automatically or with user input.

Figure 3:
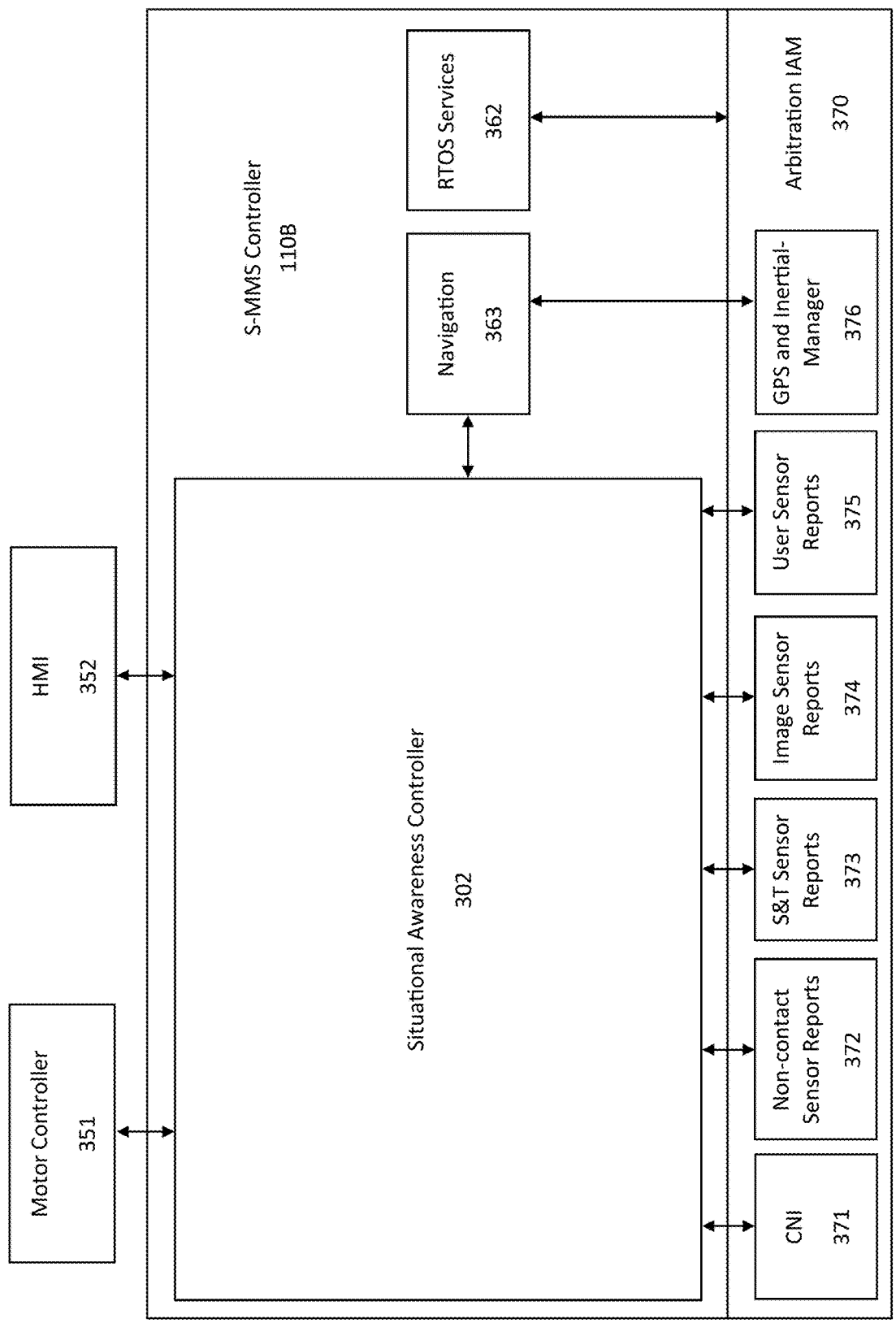
FIG. 3 depicts an embodiment of a control system architecture for an S-MMS hosting an integrated situational awareness controller.

FIG. 3 depicts an embodiment in which the S-MMS controller 110B is deployed on an S-MMS. The depicted embodiment comprises a situational awareness controller 302 within the S-MMS controller 110B. The S-MMS situational awareness controller 302 communicates with a motor controller 351 and a Human Machine Interface (HMI) 352. In some embodiments, one or more of the motor controller 351 and HMI 352 may be integrated into the S-MMS controller 110B. The depicted S-MMS controller 110B further comprises real-time operating system (RTOS) services 362 and navigation 363.

In a fully operational S-MMS controller 110B designed for autonomous and/or semi-autonomous operation, FIG. 3 depicts RTOS Services 362. In an embodiment, RTOS Services 362 include prognostics and health management functions (PHM). PHM may include monitoring communications with components and external hardware systems (e.g. via CNI 371 and/or use of one or more communication processors 216) through heartbeat messages, memory management and memory isolation, and systems tests. Systems tests include a startup built in self-test to ensure system wide reliability, management of repair cycles and system redundancy.

There are a number of other tests which may be executed by PHM of RTOS Services 362. First is a power-on self-initiated built in test (SBIT). The SBIT performs a comprehensive system test and logs the test report to memory 120, these reports can be transmitted through a secure wireless connection to a remote data base as disclosed below. A second test is called a periodic built in test (PBIT). The PBIT is designed to assure that one or more components or operations of the S-MMS controller 110B has not become unsafe since the SBIT. Safety-critical devices normally define a "safety interval", a period of time too short for an injury to occur. The PBIT of the most critical functions normally may be completed at least once per start-up interval. The PBIT, in some embodiments, operates as a subset of the SBIT with similar logging and reporting functions. The last test group is an initiated built in test (IBIT). In some embodiments, the IBIT is available to the user locally as a selection via the HMI 352. However, these tests are normally reserved for technicians during annual or scheduled maintenance. In some embodiments, the S-MMS 18 is serviced through the network, and technicians can access the S-MMS controller 110B remotely for testing, maintenance, and repair via a wireless or wired connection to either a remote service (e.g. via the internet) or via a Bluetooth connection from a paired smart device.

An arbitration Information Assurity Manager (IAM) 370 manages sensor reports from one or more sensors on or used by the S-MMS 18 and may include communication, navigation, and identification (CNI) 371 processing capabilities. Communications received from a sensor are termed sensor reports. In some embodiments, the arbitration IAM 370 resides on a security or arbitration processor 212 (FIG. 2). Additionally or alternatively, functions of the CNI 371 may be performed by a dedicated communication processor 216 (FIG. 2) and/or the S-MMS processor 202. Sensor reports received and managed by the arbitration IAM 370 may include non-contact sensor reports 372, search and track (S&T) sensor reports 373, image sensor reports 374, and user sensor reports 375. Sensor reports (372-375) may include data stored in one or more of long-term or short-term system memory 120 or read from an input port on an S-MMS 18A processor (e.g. processors 212, 216 or 214). A report (371-376) may include measurement data and additional data beyond measurements, including sensor status, measurement time, confidence levels, or other information.

Non-contact sensors are devices used to take a measurement, often a distance, without coming in contact with the detected object. There are many types of non-contact sensors, including optical (e.g. LIDAR), acoustic (e.g. RADAR or ultrasonic), and magnetic (e.g. hall effect sensor). Microphones may additionally be included as a non-contact sensor. Search and track sensors may include image and non-contact sensor types, but are sensors that often have larger fields of view and may scan within these fields of view. Image sensors detect and convey information that constitutes an image or series of images/video, wherein the image(s)/video may contain light or electromagnetic radiation information on an area. These sensor reports interface to the specific sensor types in the system to identify measurements, detections, number, efficiency, health, degraded performance, states, statuses, and/or other data of each sensor in the sensing system.

The depicted arbitration IAM 370 further comprises a global positioning system (GPS) and inertial manager 376. In the depicted embodiment, the situational awareness controller 302 communicates with the CNI 371, sensor reports 372, 373, 374, and 375 and navigation 363. Navigation 363 communicates with the GPS and inertial manager 376 in the arbitration IAM 370. The depicted embodiment of the situational awareness controller 302 includes logic to manage the sensors, including one or more of on and off, sweep rate, sensor volume, regional interrogation, and/or other operations.

The CNI 371 manages communications through system links and off-board links to enable vehicle to device, intra-vehicle, and inter-vehicle communication and coordination, including cooperative navigation among vehicles and using other devices and identification of devices and vehicles. In some embodiments, the CNI 371 identifies other data sources and retrieves data from other data sources, including for threats detected and kinematic states of sensors, vehicles, and devices. The CNI 371 is also responsible for GPS corrected system-wide time and processor time sync across the system in conjunction with the operating system. For example, the CNI 371 may receive an accurate time via the GPS and inertial manager 376 and transmit that accurate time to all hardware processors along with an instruction to sync their internal clocks to that accurate time. This time coordination function is important in some embodiments since errors in time coordination can introduce as much error in system performance as a bad sensor reading in those embodiments.

The CNI 371, in some embodiments, may be configured to receive data from one or more different sources, including other like-equipped S-MMSs, vehicles and traffic devices, among others, through a Dedicated Short-Range Transceiver (DSRC), for instance, across an IEEE 802.11p link, which may be formatted in an IEEE 1609 format. This data may help the user to better navigate next to a roadway or along paths that are shared by automobiles. Some embodiments may allow for traffic lights, speed signs, and traffic routing to be dynamically altered. For an S-MMS user, the ability to announce one's presence and thereby enable a traffic control device to effect a change in traffic, such as by changing a stop light to red, could be lifesaving.

The arbitration IAM 370 may be used to maintain sensor health, detect sensor failures, monitor sensor zones of coverage (sensor zones), and notify the situational awareness controller 302 or other component of the S-MMS controller 110B of sensor system degradation or other states. The arbitration IAM 370 may also manage the transition of sensors from online and offline states (including plug and play future options).

The user sensor reports 375, in some embodiments, are configured to receive data from one or more sensors used to monitor user condition, user position, and/or user status. This data may allow for assistive behaviors to be triggered and/or tuned by the situational awareness controller 302 to the human in the loop of the S-MMS 18.

The GPS and inertial manager 376 receives one or more reports from an attitude and heading reference system (AHRS) such as an inertial measurement unit (IMU). An IMU consists of one or more sensors on three axes that provide attitude information of the S-MMS 18 to the GPS and inertial manager 376, including yaw, pitch, and roll of the S-MMS and deviations to each. As an example, an x-axis may typically be lateral across the S-MMS 18 coaxial with the axles of the front wheels of the S-MMS, extending 90-degrees left and 90-degrees right, a y-axis may extend forward and rearward of the S-MMS, and a z-axis may extend vertically through the S-MMS, 90-degrees to the x and y axes. An IMU typically comprises acceleration and rate determining sensors on each axis. In the case of x, y, and z measurements, the IMU is referred to as a 6-Degree of Freedom (DOF) sensor. Some IMUs also have a small hall device on each axis to measure the magnetic line of flux of the earth's magnetic poles, similar to a compass, that allows for the calculation of true, earth referenced orientation. These IMU embodiments are referred to as a 9-DOF sensor and are more accurate than a 6-DOF sensor. However, some systems may interpolate the z-axis by detecting gravity on either the x or y axes, which may be less accurate. One or more IMU is fixed to the S-MMS 18 in some embodiments and provides reports via the GPS and inertial manager 376.

The GPS and inertial manager 376 also receives GPS signals from a GPS receiver. The GPS receiver may be mounted to the S-MMS 18, be part of a smart device paired or otherwise linked to the S-MMS, or be another receiver that transmits signals to the S-MMS or a smart device linked to the S-MMS.

Navigation 363, in the depicted embodiment, is an inertial reference system, including an inertial navigation system (INS), for navigating using dead reckoning (DR). Dead reckoning is the process of calculating the S-MMS 18 current position by using a previously determined position, or fix, and advancing that position based upon known or estimated speeds and steering over elapsed time and heading. In one embodiment, navigation 363 uses received GPS location data (e.g. via GPS and inertial manager 376) to update the INS DR fix. Speed, heading, and elapsed time data are then provided by the INS function of navigation 363 to the situational awareness controller 302. S-MMS speed (e.g. velocity and/or acceleration) may be received directly from one or more motor controllers 351. Additionally or alternatively, speed and heading may be received or calculated by navigation 363 using one or more GPS and inertial manager 376 reports. Elapsed time is provided by RTOS services 362. The navigation 363 INS allows the S-MMS 18 to navigate inside a building without GPS or otherwise (e.g. outside of GPS coverage) to a similar degree of accuracy as navigating outside with continuous GPS data or otherwise. Speed, heading, and elapsed time for navigation 363, in some other embodiments, is calculated onboard the processors of internal and/or external sensors, including one or more GPS receivers and one or more solid state inertial measurement units (IMUs). In some embodiments, the S-MMS processor 202 calculates speed, heading, and elapsed time and generates steering and drive signals, including optionally based on one or more non-contact sensor reports and/or GPS and inertial manager reports.

Figure 4:
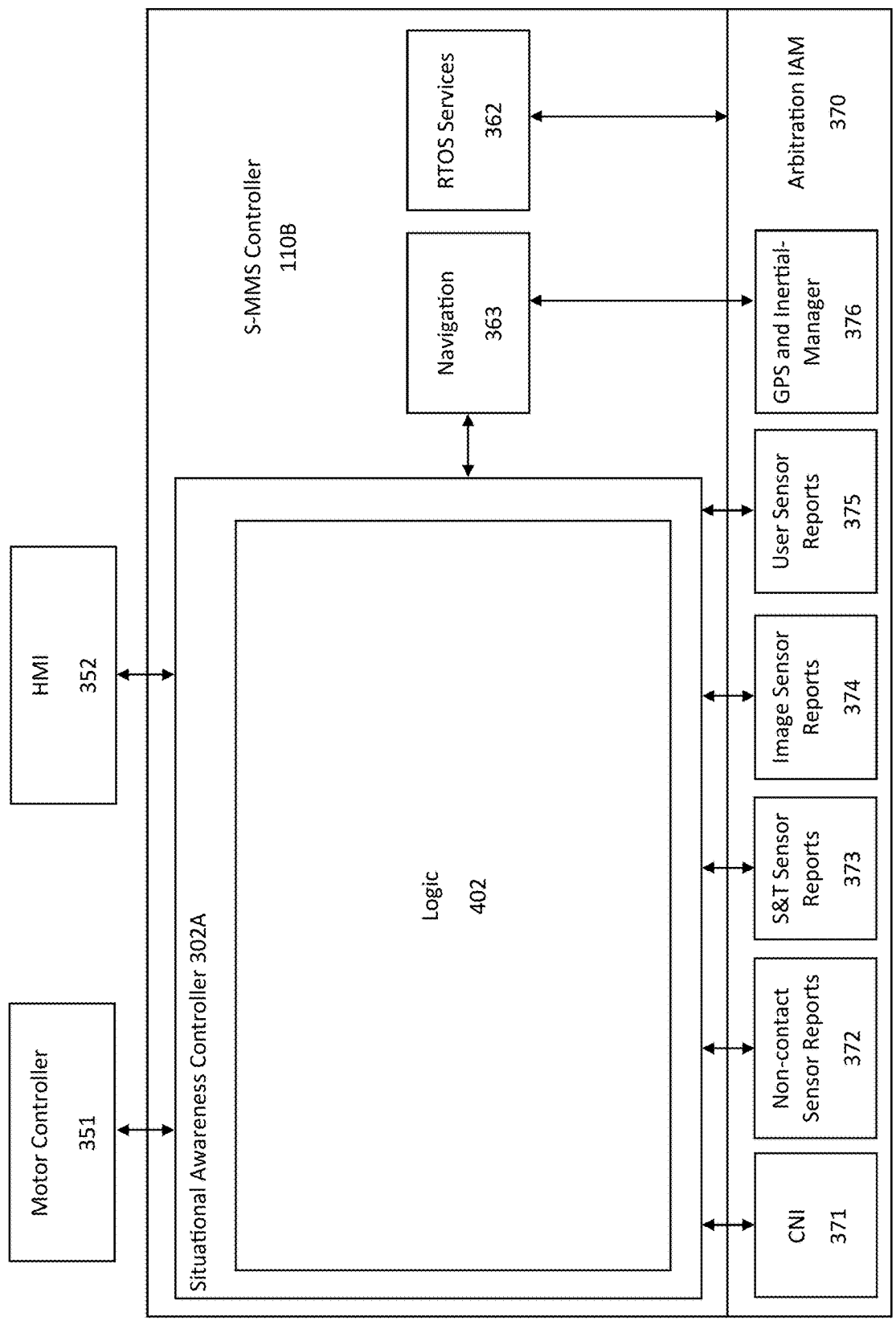
FIG. 4 depicts an embodiment of a control system architecture for an S-MMS with a situational awareness controller.

FIG. 4 illustrates an embodiment of a system in which logic 402 for one or more architectures, including one or more generations referenced above, is deployed on the control system architecture depicted in FIG. 3. The logic 402 may take full advantage of the entire suite of sensors available in the depicted control system embodiment and/or other sensors not depicted. The logic 402 processes reports and other data from sensors, including non-contact sensors 372, search and track sensors 373, and image sensors 374. These sensors often have larger fields of view and may scan within these fields of view. One or more of these sensors may be smart sensors, where smart sensors may be able to characterize reports, i.e. generate both quantitative and qualitative attributes to sensor reports and coordinate sensor reports in time. These capabilities may be used to support data association techniques that can eventually be used in predictive systems.

The complexity and capability of the situational awareness controller 302 may dictate the types of applications it will support. In one example, the logic 402 supports simple applications, like tip detection, drop-off detection, and/or function override for safety. In another example, the logic 402 supports user assistance systems that will result in a workload reduction for both the user and/or caregiver. In another example, the logic 402 supports increased user independence due to increased confidence in system actions.

Figure 5:
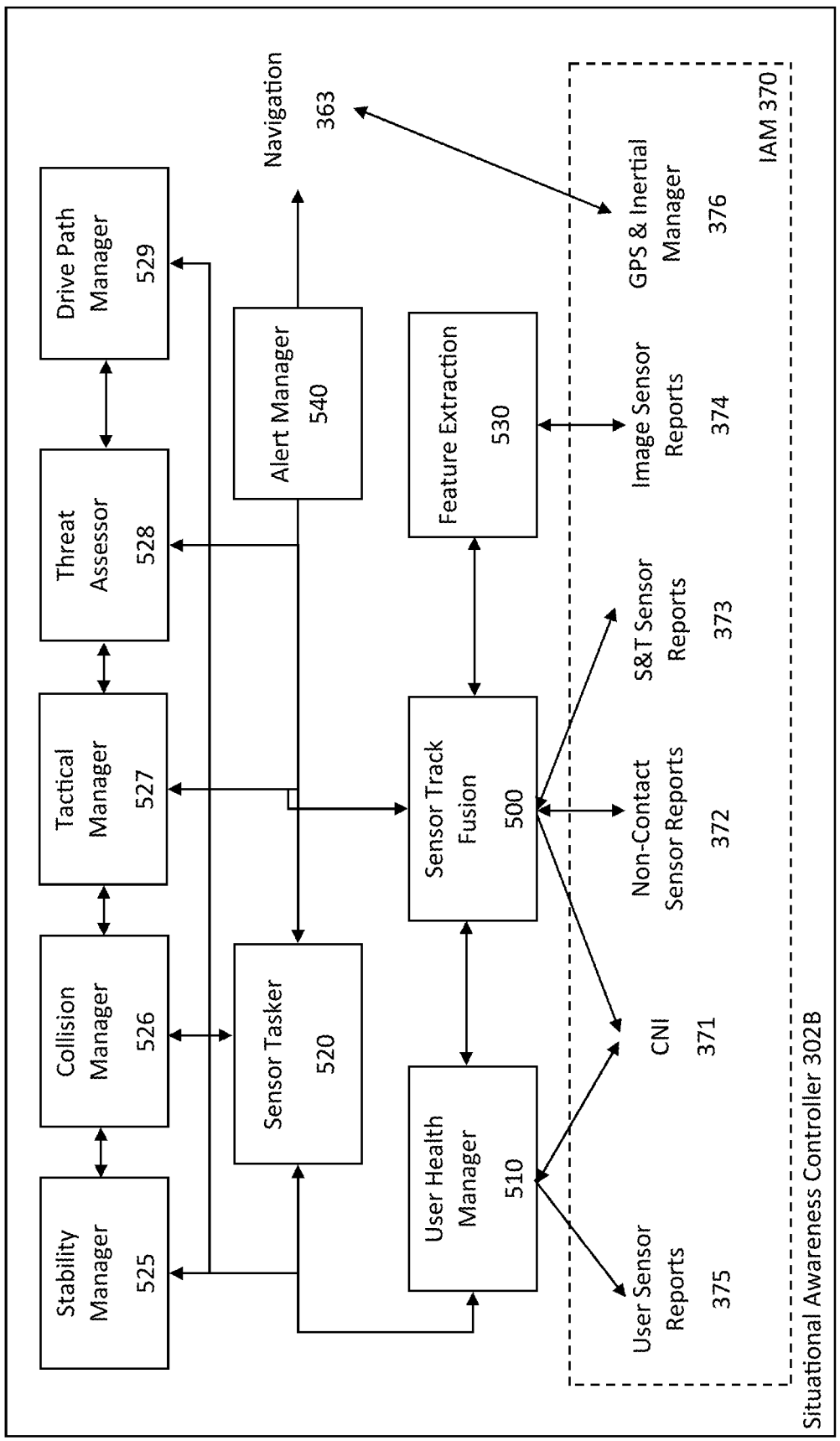
FIG. 5 depicts an embodiment of a situational awareness controller.

FIG. 5 depicts an embodiment of a situational awareness controller 302B that may be deployed as logic 402 in the architecture described by FIG. 4. The embodiment comprises a sensor track fusion 500, a user health manager 510, a sensor tasker 520, a stability manager 525, a collision manager 526, a tactical manager 527, a threat assessor 528, a drive path manager 529, a feature extraction 530, and an alert manager 540. These processes interact with the CNI 371, non-contact sensor reports 372, S&T sensor reports 373, image sensor reports 374, user sensor reports 375, and GPS & inertial manager 376. In an example, the sensor reports may be managed by the IAM 370.

In addition to the functions described above, navigation 363 calculates S-MMS position and kinematic states. The position and kinematic state data is used by sensor track fusion 500 to remove any vibrations or roll/pitching actions that affect the sensor coordinate frames in which the reports are sent. Additionally, the position and kinematic state data may be used by the stability manager 525, collision manager 526, threat assessor 528, and drive path manager 529, among others, for one or more calculation. Navigation 363 can also track the S-MMS position when it is outside of GPS coverage using a combination of dead reckoning and position orienting signals, such as indoor wireless beacons and position orienting signals from other vehicles, like-equipped S-MMSs and/or smart devices received wirelessly via CNI 371.

Sensor fusion is the combining of data from two or more sensors for the purpose of improving data quality and/or performance. These processes are focused on the creation of tracks and associating current sensor readings in ways that increase the confidence in the parameters (e.g. such as range and bearing) of those tracks.

A track is a data record established and maintained by the SAC 302B representing an object, condition, or feature the SAC (e.g. sensor track fusion (STF) 500 of the SAC) is attempting to monitor and to which the SAC has assigned an identification (track ID). State refers to the kinematic state of an object, including position, distance, heading, trend, altitude, velocity, and/or acceleration relative to a baseline (e.g. the state of the S-MMS 18 in an embodiment). A target is any object being tracked by the S-MMS controller 110B, including living and non-living things and topographic or other surface features of the ground. In one example, the state of the object is the distance to the object from a sensor making the measurement.

Sensor track fusion (STF) 500 is responsible for processing, filtering, and reporting detections of one or more areas around an S-MMS 18 (e.g. between 0 and 360 degrees from a point or location on the S-MMS 18, 360 degrees around an S-MMS 18, and/or one or more overlapping areas from or around the S-MMS 18). This is accomplished by processing reports from the available sensors 371-375 and/or feature extraction 530. Next, recursive filtering (e.g. in one embodiment a Kalman filter) is used to estimate the state of one or more tracks based on the processed reports (e.g. 371-375, 530) in combination with one or more kinematic models (e.g. algorithms or mathematic equations) of possible track motion, for example, to determine if a track is in motion or stationary relative to the S-MMS 18. A kinematic model is one or more algorithms or mathematical equations that describe or calculate one or more characteristics of a current or future position, orientation, or dynamic state of an object, including position, distance, heading, trend, altitude, velocity, range, bearing, location, velocity, and/or acceleration. A kinematic model or other model may be used by (e.g. executed by) a filter. A filter is computer-implemented instructions that process one or more inputs and produce one or more outputs based on the one or more inputs. A recursive filter is a type of filter that uses one or more of its outputs as one or more inputs to the filter.

The STF 500 generates an estimate of state for a track (e.g. estimate of the distance to an object), for example by using a kinematic model. The STF 500 compares the estimate of state (e.g. estimate of distance) to the measured or observed state (e.g. measure distance) of each previously identified track maintained by the tactical manager 527 of the SAC 302B. If the STF 500 determines there is a high-quality match between a previously measured track state and a track state estimate via data association and track management, the state of that matching track is updated in the tactical manager 527. If not, a new track is generated by the STF 500 and communicated to the tactical manager 527 (i.e. the STF assigns a new ID to an object for a new track and communicates the new track ID and associated state and other data for the object for which the track was generated to the tactical manager). Upon track generation, a priority may be established based on time to impact by the threat assessor 528, and additional sensor data may be requested by transmitting a tasking request to the sensor tasker 520.

A user health manager (UHM) 510 is responsible for assessing user state by storing, processing, filtering, and reporting changes in user behavior and/or health that may be relevant to the situational awareness controller 302B of the S-MMS and/or a user and/or caregiver of the S-MMS 18. Data from user sensor reports 375, CNI 371, and/or HMI inputs 352 (FIG. 4) are used by the UHM 510 to monitor individual and combined health metrics. The UHM 510 then determines the appropriate timeline for any S-MMS controller 110B control signals, alerts, or operating parameter adjustments to processes of the SAC 302B. The UHM 510 may access a user profile and log user data to secure memory linked to the user profile. This memory may be onboard the S-MMS (e.g. 120 FIG. 1) or remote.

A sensor tasker (ST) 520 responds to sensor information requests received from sensor track fusion 500, user health manager 510, and sensor information prioritizations from the threat assessor 528. These priorities are used by the sensor tasker 520 to change sensor update rates or other settings for possible unsafe conditions (e.g. such as collisions or tipping danger) and to manage sensor front-end resources to maintain the highest quality tracks on the closest or highest priority detections. A track is a threat to the S-MMS 18 that has been identified by the SAC 302B and given a unique identifier for use in future calculations and processes. The sensor tasker 520 may act as a filter and utilize the S-MMS system kinematic and identity information (e.g. from navigation 363) for decision making based on predefined decision boundaries to control the amount of sensor data provided to the SAC 302B at a given instant. Additionally or alternatively, the sensor tasker 520 may cause one or more sensor to turn on or off, go into a sleep mode, or wake up from a sleep mode based on user inputs to the HMI 352 in an embodiment.

A stability manager 525 determines the stability of the S-MMS 18 and whether the upcoming ground is likely to cause instability (e.g. tipping) based on one or more inputs from navigation 363, sensor track fusion 500, and/or threat assessor 528. In an embodiment, stability manager 525 may also use one or more inputs from UHM 510. The stability of the S-MMS 18 is calculated based on orientation readings (e.g. pitch and/or roll) received from navigation 363 (e.g. from one or more inertial measurement units fixed to the S-MMS) in combination with a mathematical tipping model for the S-MMS 18 stored in memory 120 and executed by the stability manager 525. The stability manager 525 also determines the suitability of upcoming terrain based on one or more factors, such as user weight, weight distribution, topographic profile, and/or surface composition as measured by one or more sensors 371-375 in relation to current S-MMS 18 operation characteristics, such as orientation and S-MMS kinematics (e.g. rate of travel, direction of travel, and S-MMS configuration settings). In an example, an S-MMS 18 may have known limits for pitch and roll where tilting beyond the known limits causes the S-MMS to tip. Based on the current orientation (e.g. pitch and/or roll) of the S-MMS, the stability manager 525 may use readings of the ground slope around the S-MMS to estimate the future pitch/roll of the S-MMS if it travels further forward. If the pitch/roll is below a threshold, the action is allowable. If not, then the action is not allowable. A list of stability conditions and their location relative to the S-MMS 18 are provided to the tactical manager 527 for integration into the master threat assessment map. The appropriate timeline for any necessary steering actions and any future coupled steering maneuvers to minimize instability accidents may be computed by the stability manager 525. System cutoffs, emergency braking, and/or motor controller disengagement functions may be performed by the stability manager 525. The stability manager 525 may further include crash event data recording and logging for use in S-MMS controller 110B diagnostics, in some embodiments.

A collision manager 526, in an embodiment, computes a Time to Impact (TTI) function based on one or more inputs from sensor fusion 500, UHM 510, threat assessor 528 and navigation 363. The TTI function uses received sensor data associated with one or more objects located around the S-MMS 18 in combination with the current state of the S-MMS 18 (e.g. heading, velocity, and/or acceleration) to estimate the threat of collision with those objects. The collision manager 526 then determines the appropriate timeline for any necessary steering actions and any future coupled steering maneuvers to minimize collision accidents. Any system cutoffs, emergency braking, and/or motor controller disengagement functions may be performed by the collision manager 526. The collision manager 526 may further include crash event data recording and logging for use in S-MMS system diagnostics, in some embodiments.

A tactical manager 527 uses inputs from one or more of a stability manager 525, collision manager 526, drive path manager 529, navigation 363, threat assessor 528, and/or sensor track fusion 500 to maintain a master, 360-degree map of known objects and conditions in relation to the S-MMS 18. The tactical manager 527 combines the outputs of the stability manager 525 (e.g. a map of the ground surrounding the S-MMS) and collision manager 526 into a single, integrated map of known tracks. Each track may be assigned a threat level by the threat assessor 528. The current direction and speed of travel (e.g. from navigation 363) and/or desired future direction and speed of travel (e.g. from drive path manager 529 or HMI 352 inputs) can then be overlaid on the threat assessment map maintained by the tactical manager 527.

A threat assessor 528 function evaluates the multiple tracks and/or objects detected by the STF 500 and prioritizes them. In an example, the threat assessor 528 receives one or more of estimated time to impact, proximity, and/or a threat levels for one or more tracks from a stability manager 525, collision manager 526, and/or tactical manager 527. Based on the received data from one or more process of the SAC 302B, the threat assessor 528 prioritizes the one or more tracks based on a rules engine. The rules engine executes one or more predefined rules (e.g. from memory 120) as part of threat assessor 528. In one example, the rules engine uses a statistical assessment of the threat posed by each track based on the estimated time to impact or proximity of each track provided by the collision manager 526 in combination with the safe speed determined in the direction of travel provided by the stability manager 525. If an identified track presents a statistical risk above a predefined threshold, the threat assessor 528 will prioritize that track above other tracks with lower calculated risk numbers. The prioritized list of tracks from the threat assessor 528 is sent to the sensor tasker 520 which may take additional readings or otherwise focus sensor resources on the highest threat tracks. Additionally, the prioritized list of tracks from the threat assessor 528 may be sent to the tactical manager 527 so that areas with a high concentration of high threat tracks may be flagged as keep-out zones for use by the drive path manager 529.

A drive path manager (DM) 529 is responsible for route determination, interpretation of external map data (e.g. received from external sources such as a remote server or smart device via CNI 371) for future advanced routing functions, and generation of steering actions for autonomous by wire speed sensitive steering support. External map data, when received, must be oriented to match the S-MMS 18 reference frame by the DM 529 so that it can be used with the threat assessment map maintained by the tactical manager 527. The DM 529 combines one or more inputs from the tactical manager 527, threat assessor 528, and/or navigation 363 in order to determine where the S-MMS 18 should drive. The DM 529 contains a complex 6-DOF S-MMS 18 model that may be used in predictive applications to support stop and go functions, in some embodiments.

Feature extraction 530 performs angle resolution, object detection, edge detection, and bore sight correction for image sensor reports 374 received by the SAC 302B of the S-MMS controller 110B. Angle resolution is the process of determining the location and error of the orientation of a feature (e.g. object, edge, surface, or plane) around the S-MMS 18. Bore sight correction is the process of correcting downrange measurements for sensor misalignment. Feature extraction 530 receives raw data of one or more image sensors via the image sensor reports 374, uses pixel masks received from the sensor tasker 520 in an embodiment, produces a detection report by applying one or more pixel masks to one or more image sensor reports, and assigns a unique identifier (identity) and kinematic data to each track identified in a detection report for sensor track fusion 500 consumption. Pixel masks are used to filter out or obscure areas of an image that are not of current concern to the SAC 302B process in order to decrease compute time and resources required for the process. In some embodiments, feature extraction 530 may be used in a similar way by the user health manager 510 to measure user health metrics assessed from one or more images. In one embodiment, one or more functions of feature extraction 530 may be executed on one or more sensor processors (e.g. 214 FIG. 2) and the results reported directly to STF 500.

The alert manager 540 receives and processes data from the collision manager 526, the stability manager 525, the UHM 510, and/or one or more other processes of the SAC 302B. In an example, received data includes notification of one or more of a predicted collision, instability, or user health issue. The alert manager 540 processes the received data and creates one or more alerts for crash mitigation or condition avoidance. An alert causes the S-MMS controller 110B to take an action or send one or more signal or control instruction where the signal or control instruction may cause one or more application processor 210 (FIG. 2), sensor processor 214, HMI processor 208, or communication processor 216 to take a predetermined action. The action may include transmitting one or more signal (e.g. via cellular or WiFi to a remote server for processing), turning on or turning off an indicator, making a sound (e.g. via one or more speaker), or activating/deactivating a device such as an actuator for haptic feedback in an example. Alert timing may be based on expected user reaction times or user health considerations.

In an embodiment, an audio alerting function or 3D audio is implemented where the necessary speakers are integrated as part of the HMI and controlled by the HMI processor 208 (FIG. 2). Other embodiments may alternatively or additionally include visual, haptic, or biofeedback mechanisms to provide a corresponding feedback. When an obstacle or dangerous condition is detected, one or more sounds are produced from the direction of the threat by one or more speakers installed on or around an S-MMS 18.

In an embodiment, the alert manager 540 responds to inputs from stability manager 525, collision manager 526, drive path manager 529, and/or STF 500 to alert the user to possible dangers, enabling a warning, caution, or advisory to actually come from the direction of the problem. For example, the alert manager 540 of the SAC 302B sets an alert which causes the S-MMS controller 110B to generate one or more signals to one or more speakers on or around the S-MMS 18 causing the one or more speakers to produce one or more sounds that are either generic or particular to the particular speakers (e.g. one sound for a right lateral speaker to notify the user of an alert on the right lateral side of the S-MMS, another sound for a left lateral speaker to notify the user of an alert on the left lateral side of the S-MMS 18, another sound for a forward speaker to notify the user of an alert in front of the S-MMS, and another sound for a rear speaker to notify the user of an alert behind the S-MMS).

The alert manager 540 may include a speech engine to generate speech alerts in an embodiment. The speech engine may use one or more of the speakers previously disclosed to alert the user to conditions recognized by other processes of the SAC 302B in natural language speech. These spoken alerts may be prerecorded messages (e.g. retrieved from memory 120) or they may be computer generated by a speech engine running on the S-MMS controller 110B. Additional or alternatively, the alert manager 540 may use a speech engine (e.g. one or more machine learning engines) of the S-MMS controller 110B to interpret speech inputs and interact conversationally with an S-MMS user in some embodiments.

The alert manager 540 may additionally receive data from one or more S-MMS controller 110B process (e.g. navigation 363 and RTOS services 362) including notification of results of one or more built-in-tests or an error condition notification. The alert manager 540 may also alert the user to degraded systems that require maintenance to keep systems operational. One example of this is integration of LED lights on each sensor or associated with each sensor processor 214 (FIG. 2). In this example, an arbitration IAM 370 or sensor tasker 520 monitors the status of the sensors (e.g. by receiving a status signal from each sensor) and provides data to the alert manager 540 which processes the data and causes the S-MMS controller 110B to transmit a signal to each sensor LED when that sensor fails causing the LED to turn on and notify users and technicians of a failed sensor. In one example, the sensor status signal is either an on state (positive voltage signal) or an off state (no voltage). The alert manager 540 may receive multiple types of status signals from the sensors and/or other devices of the S-MMS 18 and transmit one or more signals to one or more status indicators (e.g. single or multi colored LED or other visual, audio, or signal indicator) to cause to indicator to alert the user, technician, or other person as to the status of the sensor or other device. These "Clean Lights" or other indicators may also be clustered in a central display as part of the HMI 352.

A Sensor Embodiment

The sensors used with the disclosed S-MMS controller 110B may operate with large fields of view (FOV). These FOVs typically may be in the 30 to 180-degree range, in some embodiments. Larger FOVs reduce the number of sensors needed to achieve situational awareness of a given S-MMS. In some embodiments, two or more sensors operate in overlapping zones of coverage. This overlap allows sensor reports (e.g. 372-374 FIG. 3) for a single target, condition, or object to be generated by more than one sensor and/or sensors of different types.

Figure 6:
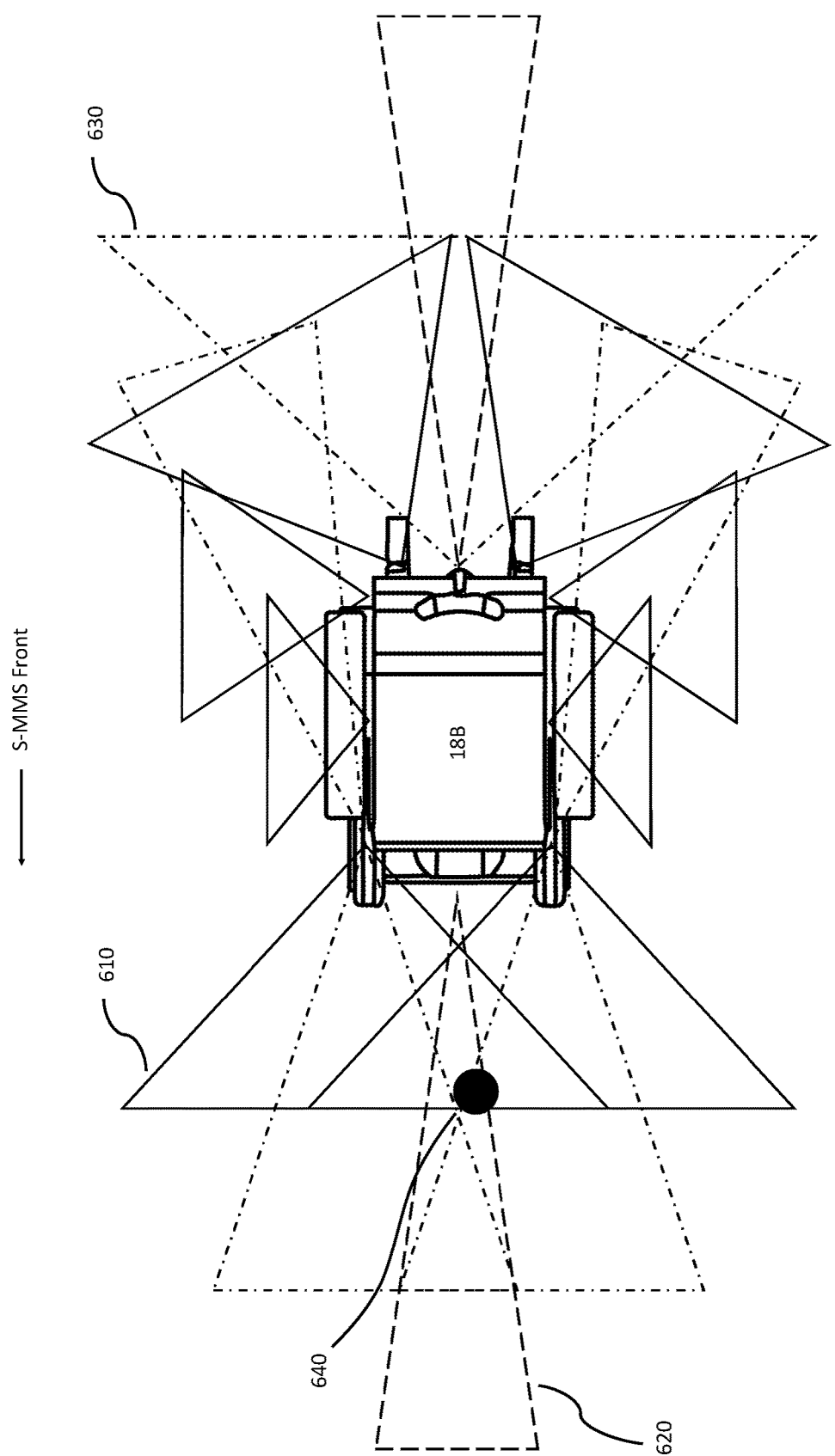
FIG. 6 depicts an embodiment of a sensor system.

FIG. 6 depicts a front-wheel drive S-MMS 18B equipped with an embodiment of sensor arrays to cover three main types of sensor coverage zones, including zones 610 (zones with solid lines), zones 620 (zones with dashed lines), and zones 630 (zones with dash-dot lines). The depicted sensor coverage zones 610, 620, 630 are covered using three main sensor arrays, including five forward sensors, five rearward sensors, and six side sensors (three for each side) generally aimed to cover the range of motion of the S-MMS 18B and toward the blind spots of a user. The sensors may be arranged to take readings on the area proximate to the S-MMS 18. Additionally or alternatively, the sensors may be arranged to take readings on the terrain (e.g. ground) proximate to the S-MMS 18. The depicted sensor arrays are composed of a mix of (a) short-range sensors such as short-range LIDAR, SONAR, and RADAR sensors for zones 610 with solid lines, (b) long-range sensors such as long-range LIDAR and RADAR sensors for zones 620 with dashed lines, and (c) image capturing sensors (including still images and/or video, referred to generally as imagers) such as cameras for zones 630 with dash-dot lines. In an embodiment, one or more of the image capturing sensors may be a stereo vision camera, structured light camera, or a time-of-flight camera. Generally, short-range sensors have wider fields of view (FOV), while long-range sensors have narrower fields of view. The sensor array of FIG. 6 may be characterized as an overlapping, large FOV (with both narrow and wide FOVs), sensor array. The sensor placement, number of sensors used, and types of reports expected in the depicted embodiment are used as a non-limiting example. It should be clear that more or fewer sensors of varying types may be used.

One or more single sensor units may have the ability to act in both short and long-range modes. One or more single sensor units may have the ability to measure objects and measure or map the terrain proximate to the S-MMS 18. One or more sensors and sensor types may be selected for a desired S-MMS 18 architecture and user. As an example, if the user is a quadriplegic and spends most of their time indoors in a relatively slow-moving S-MMS, the sensor arrays may be comprised of all short-range sensors, with multiple overlapping FOVs, where the time to impact on a close-in maneuvering object is much more critical than a vehicle on the horizon. Alternatively or additionally, the sensor array would be adjusted if fitted to alternative drive configurations such as a center or rear-wheel drive S-MMS.

Working with Overlapping Sensor Arrays

When working with an overlapping, large FOV, sensor array, Multiple Object Tracking (MOT), or Multiple Target Tracking (MTT), techniques may be used. For example, a sensor track fusion function 500 (FIG. 5) of the SAC 302B is responsible for locating multiple objects, maintaining their identities, and calculating their individual trajectories given sensor input data (e.g. sensor reports 372-374). Objects to track can be, for example, pedestrians on the street, vehicles in the road, sport players on the court, obstacles or features of the ground, surface conditions of upcoming terrain, visual indicators, such as an image or symbol, or animals. Further, multiple "objects" could also be viewed as different parts of a single object. This is the situational awareness map or tactical awareness map (e.g. a map and/or an identification of the ground, conditions, surfaces, and/or objects surrounding the S-MMS) maintained by the tactical manager 527.

Figure 7:
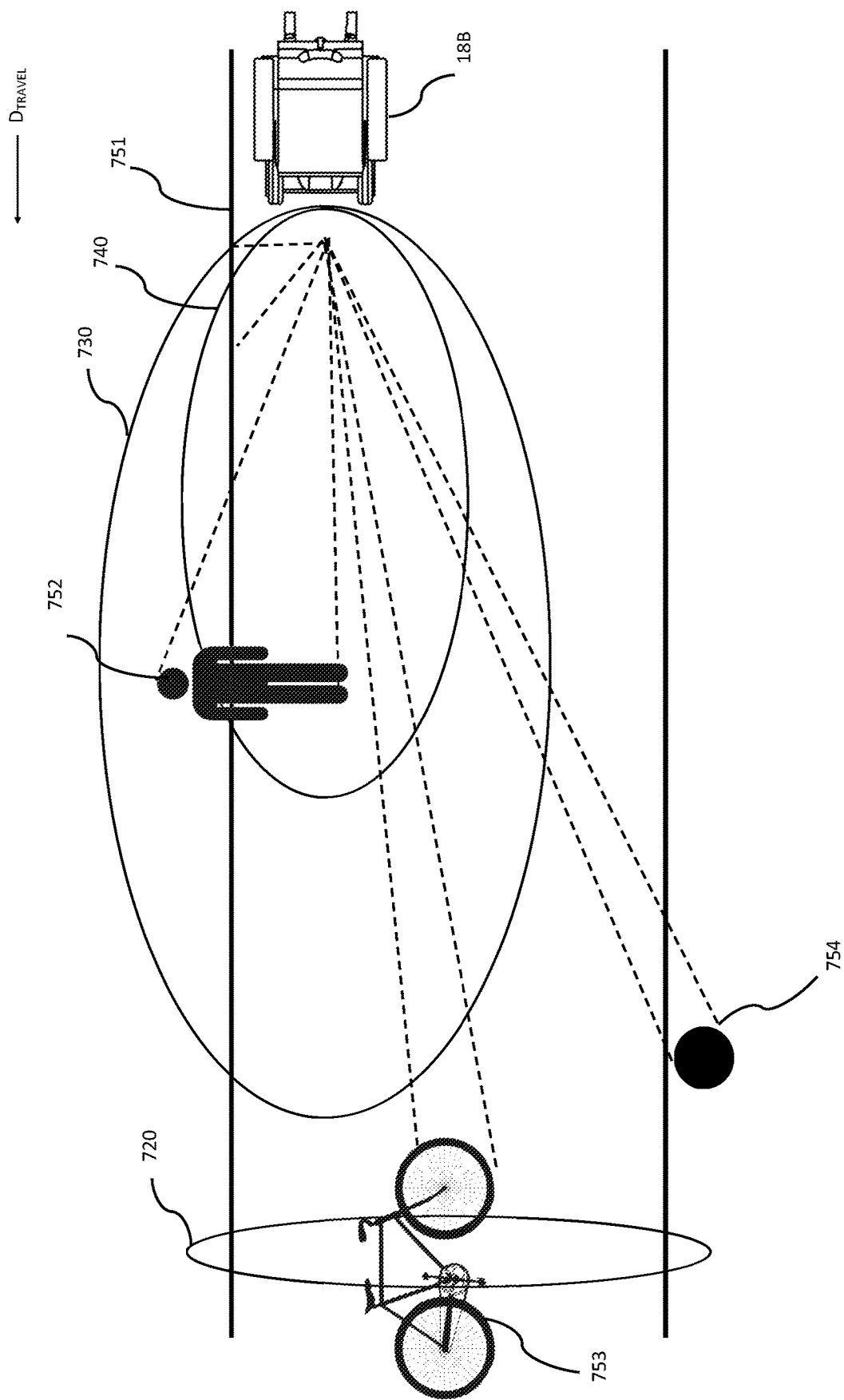
FIG. 7 depicts an example embodiment of 360-degree situational awareness.

FIG. 7 depicts an example of 360-degree situational awareness. Multiple objects (i.e. targets) may be present at any given time, arranged around the S-MMS 18B at varying distances. The position of the objects on the situational awareness map relative to the S-MMS 18B may be tracked using cartesian, polar, or spherical coordinates or otherwise. These objects may include features such as a curb or drop 751 in the ground that could cause S-MMS instability, moving objects such as a person 752 or bicycle 753, and stationary objects such as a lamp post 754. The SAC 302B (FIG. 5) of the S-MMS controller 110B may become aware of objects in the distance (e.g. 720) based on one or more received sensor report (e.g. 371-374), yet not be able to confidently identify the objects (e.g. target 753) until they are closer in range or more information can be gathered by one or more sensor. For instance, the SAC 302B may not be able to confidently differentiate a bicycle target 753 from a motorcycle target when it is a long distance 720 away. Objects in midrange 730 may be more easily recognizable based on received sensor reports, and object identity may be qualified and quantified by the SAC. "Quantify" refers to the determination of aspects such as range, bearing, location, velocity, and acceleration, i.e. the kinematic state of an object. In close proximity 740, the SAC 302B may generate threat/collision data/information. "Close" may be assessed in terms of time to impact, distance, and/or general threat.

In practice, the zones depicted in FIG. 7 extend 360-degrees around the S-MMS 18B. Each side may have varying degrees of need for the size and placement of the sensor coverage zones dependent on several factors, including S-MMS dynamics, which in turn may dictate the number and type of sensors required, in some embodiments. The depicted zones are for example purposes only and may vary between embodiments depending on sensor types, number of sensors, sensor ranges, characterization data, historical data, and other related systems, devices, and information/data.

An additional consideration when using an overlapping, large FOV, sensor array (as depicted in FIG. 6) is cross-talk or interference between multiple sensors. In some embodiments, one or more sensors have a processor (e.g. sensor processor 214), a transmitter, and a receiver. In one example of these embodiments, one or more sensors also have a modulator or other encoder that modulates or otherwise encodes one or more portions of the carrier wave/carrier of the sensor signal (or the entire carrier wave/carrier of the sensor signal) and optionally includes a demodulator or other decoder to demodulate or otherwise decode one or more portions of the carrier wave/carrier of the sensor signal (or the entire carrier wave/carrier of the sensor signal) received by the receiver of the sensor. The modulator or other encoder may be part of the transmitter or separate from the transmitter, and the demodulator or other decoder may be part of the receiver or separate from the receiver. The sensor processor optionally controls the modulator or other encoder and demodulator or other decoder by transmitting control signals to those devices to take some action, e.g. to modulate a signal to be transmitted or demodulate a received signal. The sensor processor optionally controls the transmitter and receiver by transmitting control signals to the transmitter and receiver to take some action, e.g. to transmit a signal or forward a received signal to another component.

In one example, the transmitter of the sensor transmits one or more sensor signals that include one or more modulated or otherwise encoded portions of the carrier wave/carrier of the sensor signal (or the entire carrier wave/carrier of the sensor signal), and the receiver of the sensor receives one or more sensor signals that include one or more modulated or otherwise encoded portions of a carrier wave/carrier of the sensor signal (or the entire carrier wave/carrier of the sensor signal). The one or more sensors may include, for example, ultrasonic sensors that emit radiation in the form of sound frequencies, radar sensors that emit radiation in the form of radio frequencies, LIDAR sensors that emit radiation in the form of light, and sensors that measure distance by determining time of flight of a transmitted sensor signal and a received sensor signal reflected back from an object, surface, place, etc.

In another example, one or more portions of the carrier wave/carrier of a sensor signal or the entire carrier wave/carrier of the sensor signal is modulated using amplitude modulation or frequency modulation to encode one or more items of data in the carrier wave/carrier of the sensor signal. In amplitude modulation, the amplitude of a carrier wave/carrier for a signal is modulated to encode the signal with data. In frequency modulation, the frequency of a carrier wave/carrier for a signal is modulated to encode the signal with data. This modulation does not impact the operation of the sensor. Instead, the modulated signal may be recognized by the transmitting sensor or a subsequent receiver. In other embodiments, a carrier wave/carrier signal may be encoded in other ways to include one or more items of data.

In another example, one or more sensors use modulation to encode their sensor signals with all or some portion of the medium access control (MAC) address of the sensor that is transmitting the sensor signal. MAC addresses (as defined in the IEEE 802 standard incorporated herein by reference) are globally unique and contain 48-bits of address space that contain a possible $2^{48}$ addresses. In this example, each of the one or more sensors has a modulator that modulates the carrier wave/carrier of the sensor signal it is transmitting so that the sensor signal carries or contains the MAC address of the transmitting sensor. In other examples, a different device identification is used in place of the MAC address. For example, the S-MMS controller 110B may assign a unique device identification to each sensor and other device associated with the S-MMS 18 and use that unique device identification in place of the MAC address as discussed herein.

Figure 8:
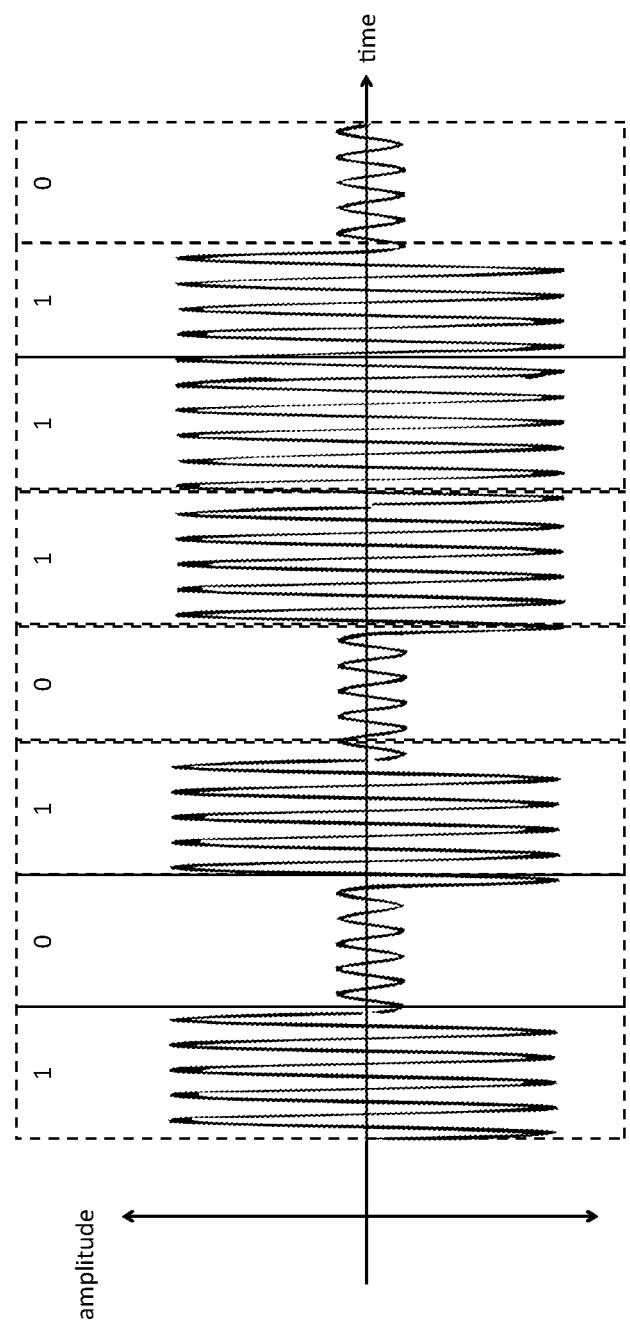
FIG. 8 depicts an amplitude modulated signal.

In an exemplary embodiment, one or more sensors (e.g. one or more sensors for zone 610 FIG. 6), each receives a control signal from the S-MMS processor 202 (initiated by the S-MMS controller 110B via the arbitration IAM 370 in some embodiments). The control signal directs the sensor to transmit a sensor signal. The sensor's processor 214 receives and processes the control signal from the S-MMS processor 202, and, in response, the sensor's processor causes a transmitter of the sensor to transmit one or more amplitude modulated pulses for a sensor signal as depicted in FIG. 8, wherein the modulations of the sensor signal amplitude indicate all or part of the MAC address of the sensor. In one example, the transmitter of the sensor has a modulator that amplitude modulates the sensor signal being transmitted. In another example, the modulator of the sensor is separate from the sensor's transmitter, and the modulator modulates the sensor signal prior to the modulated sensor signal being transmitted by the transmitter. FIG. 8 depicts a signal transmitting one octet (e.g. 8-digits) of a MAC address. However, the remaining portions of the MAC address may be similarly transmitted in other examples.

The sensor then waits for receipt of a back reflected sensor signal (e.g., a sensor signal transmitted from the sensor that is reflected back from an object, surface, plane, etc. to the sensor) via one or more receivers of the sensor. The receiver of the sensor receives a back reflected sensor signal. In an embodiment, the sensor receiver and sensor transmitter may be the same transceiver. The sensor demodulator demodulates the back reflected sensor signal received by the sensor receiver (e.g. by amplitude demodulation). The demodulator may be part of the sensor receiver or separate from the sensor receiver.

The sensor processor 214 receives the demodulated received back reflected sensor signal (or the data from the signal) and determines if the MAC address from the demodulated received back reflected sensor signal matches the MAC address of the sensor (which, for example, may be stored in memory of the sensor). If the sensor processor 214 determines the MAC address from the demodulated received back reflected sensor signal matches the MAC address of the sensor (e.g. as identified in the modulated carrier wave), then the sensor processor accepts the demodulated received back reflected sensor signal and takes one or more actions, such as calculating a time of flight of the back reflected sensor signal (e.g. a time between when the sensor transmitted the sensor signal and the back reflected sensor signal was received by the sensor) using one or more onboard algorithms. If the sensor processor 214 determines the MAC address from the demodulated received back reflected sensor signal does not match the sensor MAC address or if the back reflected sensor signal does not have a MAC address or was not modulated/demodulated as expected by the sensor processor, the sensor processor determines the received back reflected sensor signal did not come from that sensor or has an error, the sensor processor rejects that received back reflected sensor signal, and the sensor processor continues to wait for a back reflected sensor signal that carries or contains a MAC address that matches the MAC address of the sensor. The above processes are performed for multiple sensors in the same fashion to transmit modulated sensor signals, receive back reflected sensor signals, and determine if the received back reflected sensor signals have a MAC address that matches the MAC address of the sensor that sent the signal. In one example, the MAC address is generated and identified by amplitude modulating at least a portion of the signal identified as having the MAC address, and back reflected signals are demodulated by amplitude demodulation.

Other portions of the signal may be modulated to contain other data and demodulated to identify that other data (e.g. a sensor status, kinematic state, velocity, position, direction of travel, and/or model identifier). For example, a sensor signal can be predefined with a format to have one or more data fields for one or more data items, including N bits for a MAC address (or alternate unique device identification), O bits for sensor status, P bits for sensor kinematic state, Q bits for velocity, R bits for position, S bits for direction of travel, and/or T bits for model identifier, where each of N-T are an integer greater than zero that may be the same or different. The sensor signal alternately may be predefined with stop bits in place of or in addition to a defined data field size. One or more of the data fields may be optional. The modulator or other encoder is configured to modulate or otherwise encode the carrier wave/carrier of the sensor signal to encode the sensor signal with data for each data field for the predefined format of the sensor signal, and the demodulator or other decoder is configured to demodulate or otherwise decode the carrier wave/carrier of the sensor signal to decode each data field for the predefined format of the sensor signal. The sensor processor transits one or more control signals to the modulator or other encoder to instruct the modulator or other encoder to modulate or otherwise encode the sensor signal for the one or more data fields and optionally with the data to be modulated or otherwise encoded. The sensor processor optionally transits one or more control signals to the demodulator or other decoder to instruct the demodulator or other decoder to demodulate or otherwise decode a received signal (e.g. a received back reflected sensor signal) for the one or more data fields and optionally to obtain the data in the one or more data fields. The demodulator or other decoder transmits the decoded signal or data from the decoded signal to the sensor processor and/or the S-MMS controller 110B for processing and further action (e.g. for storage or use in a navigation operation as discussed herein).

In an alternative embodiment, multiple sensors transmit unique, modulated sensor signals (e.g. as depicted in FIG. 8). Each sensor then receives and accepts one or more back reflected sensor signals regardless of the MAC address received. In this embodiment, the sensors do not determine if a back reflected sensor signal contains a MAC address that matches the MAC address of that sensor. Instead, each sensor transmits a sensor report (e.g. 372-373 FIG. 3) with its sensor reading to the S-MMS controller 110B.

The sensor report optionally contains the MAC address of the sensor transmitting the sensor report. Alternately, the S-MMS controller 110B optionally may access memory 220 for a list of MAC addresses of sensors and/or other devices of the S-MMS 18 and/or related systems (e.g. another S-MMS or recognized device).

The sensor report optionally contains the MAC address (and time of receipt in an embodiment) of a received back reflected signal. In this option, the sensor demodulates a received back reflected sensor signal to identify the MAC address in the received back reflected sensor signal. Alternately, the sensor includes the raw (unmodulated) received back reflected sensor signal in or with the sensor report, and the MMS controller 110B demodulates the portion or entirety of the received back reflected sensor signal to identify the MAC address of the received back reflected sensor signal.

An arbitration IAM 370 and/or a rules engine of the S-MMS controller 110B compares the received back reflected signal MAC address(es) to one or more MAC addresses of sensors and/or other devices of the S-MMS 18 and/or related systems. The MAC addresses of sensors and/or other devices of the S-MMS 18 and/or related systems may be stored, for example, in the memory 220, or included in the sensor reports as described above. The arbitration IAM 370 and/or S-MMS controller 110B then rejects any received sensor reports that have a received back reflected signal MAC address that does not match a MAC address for a sensor or other device of the S-MMS 18 or related system and/or takes another action on received sensor reports that have a received back reflected signal MAC address that does match a MAC address for a sensor or other device of the S-MMS or related system. For example, the S-MMS controller 110B may store data from a sensor report in the memory 220, compare the data from a sensor report to other data, process the data from a sensor report for a navigation operation or other operation, or take another action when a received back reflected signal MAC address matches a MAC address for a sensor or other device of the S-MMS 18 or related system.

In other examples of the above embodiment, a device identification is used in place of the MAC address. For example, the S-MMS controller 110B may assign a unique device identification to each sensor and other device associated with the S-MMS 18 and use that unique device identification in place of the MAC address as discussed herein.

In one example, a sensor that receives a back reflected sensor signal demodulates (e.g. via amplitude demodulation) the received signal to identify the MAC address in the back reflected sensor signal and transmits the MAC address of the back reflected sensor signal in the demodulated form to the S-MMS controller 110B. In another example, the S-MMS controller 110B or a dedicated demodulator receives sensor reports with the raw (unmodulated) back reflected sensor signal and demodulates (e.g. via amplitude demodulation) the back reflected sensor signal to identify the MAC address of the back reflected sensor signal. In the latter example of a dedicated demodulator, the dedicated demodulator transmits any demodulated signals and/or data (e.g. the MAC address of the back reflected sensor signal) to the MMS controller 110B for processing as described herein.

Amplitude modulation as described above (in which MAC addresses are transmitted by sensors in sensor signals, and those MAC addresses are generated and identified by amplitude modulating at least a portion of the signal identified as having the MAC address) may, in some embodiments, allow each individual sensor on a given S-MMS 18 (e.g. with an overlapping, large field-of-view, sensor array) to transmit concurrently without causing interference between different sensors. Additionally or alternatively, amplitude modulation may be preferable if two S-MMS systems were meeting and both transmitting on the same frequencies. Alternately, one or more sensors and the S-MMS controller 110B and other devices of or related to the S-MMS 18 may use frequency modulation in place of the amplitude modulation described above.

In other embodiments, the S-MMS controller 110B associates the MAC address or device identification from a received sensor signal (e.g. a received back reflected sensor signal) to a particular track (e.g. the track ID assigned by sensor track fusion 500 FIG. 5) and optionally takes some action based on the received MAC address and the associated track ID (e.g. storing and associating the MAC address to the track ID in memory or performing a navigation operation based on the track ID), the S-MMS controller associates the MAC address from a received signal to a particular target (e.g. the track ID assigned by sensor track fusion) and stores the data from the received signal with the track ID and/or the MAC address in memory, and/or the S-MMS controller takes some action based on the MAC address and/or the track ID.

This is helpful under a couple of scenarios. First, as described above, the sensor processor 214 may simply ignore a received signal as noise if the sensor processor receives an unknown MAC address, cannot demodulate or otherwise decode a received signal, or otherwise cannot determine the MAC address of a received signal (e.g. when a received signal is not a sensor signal from the S-MMS 18 or is not a signal from another device associated with the S-MMS). However, in another example, a sensor from an off-board system detected by the S-MMS 18 also modulates its transmitted sensor signals such that additional information is embedded beyond the MAC address. In an embodiment, the additional information includes kinematic state, velocity, position and/or direction of travel of the transmitting device. The signals containing this data may be demodulated (using any of the options discussed above), and the data from the signals is used by one or more sensor processor 214 and/or the S-MMS controller 110B on the S-MMS 18 to enhance the situational awareness map of the SAC 302B. If the detected device is crossing the path of the S-MMS 18 and is clearly not a threat, the SAC 302B may treat the data differently than if the detected device is inbound to the S-MMS 18 with an unknown intent.

In another embodiment, the S-MMS 18 is surrounded with off-board sensors the S-MMS is able to identify uniquely. One or more sensor processors 214 and/or the S-MMS controller 110B are capable of recognizing sensor transmissions received from one or more other sensors (e.g. another S-MMS) based on all or part of their transmitted MAC addresses or other unique device identifiers. The sensor processor 214 and/or S-MMS controller 110B may establish the kinematic states of the other sensor(s). With this known state, the S-MMS controller 110B may cause one or more sensors of its S-MMS 18 to go into a low power or low observable mode, where all of the data needed to track a remote device (e.g. another S-MMS) is sent to the S-MMS from one or more remote, modulated transmissions of one or more remote (off-board) devices.

User Profile and Cloud Integration

In some embodiments, the UHM 510 (FIG. 5) is a rules engine focused on the user. A unique user profile (e.g. stored in and retrieved from memory 120) may provide a baseline of user settings and expected capabilities to the UHM rules engine. In addition, the unique user profile may have one or more historical record of user data that can be used by the UHM for setting thresholds and expected acceptable ranges for the S-MMS controller 110B and/or other controllers on the S-MMS 18 (e.g. motor controller 351, HMI 352, etc.). The baseline of user profile, settings, historical record data, and other required data may be retrieved from S-MMS memory 120 and/or remote memory (e.g. on a remote server or paired smart device). Additionally or alternatively, the user profile may comprise one or more of user reaction time, user preferences, speed limitations of the motorized mobile system, drive limitations of the motorized mobile system, steering limitations of the motorized mobile system, seat position data, sensor calibration data, and/or human machine interface calibration data.

Figure 9:
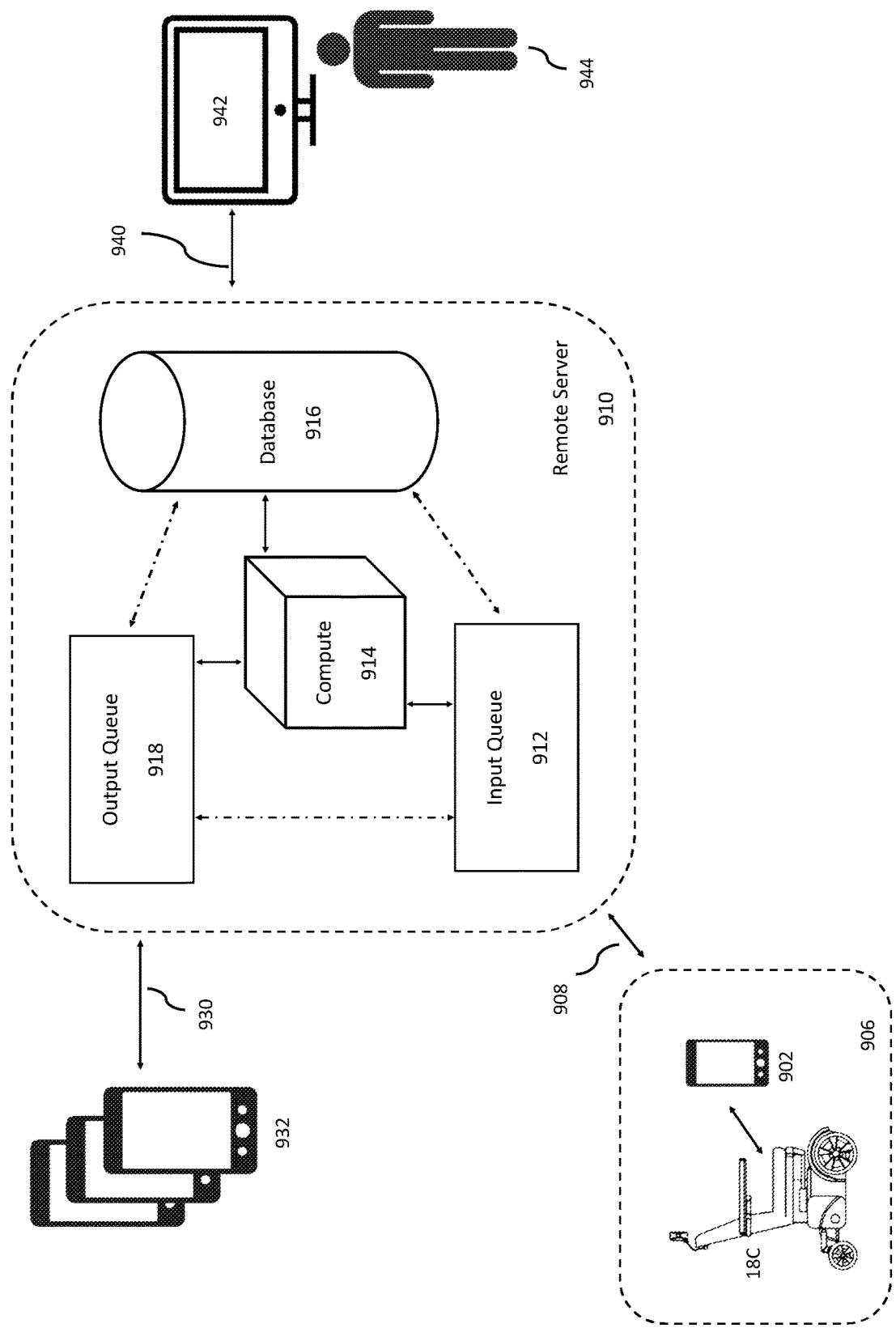
FIG. 9 depicts an embodiment of an S-MMS system securely connected to a remote server.

FIG. 9 depicts an embodiment of an S-MMS system 906 securely connected 908 to a remote server 910. In the depicted embodiment, a wireless processor (a hardware processor to control wireless signal transmission and reception) either onboard the S-MMS 18C or associated with the S-MMS as a paired or connected wireless smart device 902 is operably wirelessly connected to a second wireless processor, such as a remote server 910 with the second wireless processor (e.g. via a secure wireless connection), wherein the second wireless processor is configured to operate on a public packet network and the packet network comprises a data transmission network using packet switching. The connection 908 to the public packet network from the S-MMS system 906 allows access to one or more servers 910 or other remote services configured to receive data retrieved from a secure memory on the S-MMS 18C and/or the secure memory on the associated smart device 902 of the S-MMS system 906. The received data may then be stored in a secure memory on the remote server 910 wherein the secured, stored data on the remote server is accessible to pre-authorized systems or pre-authorized persons.

In an embodiment, an S-MMS controller 110 retrieves a key (e.g. a code or security credential) from secure memory on a paired device 902 over a wireless connection. This key may be processed by one or more processors of the S-MMS 18C, stored on a secure memory on the S-MMS, and transmitted to a remote server 910. The remote server 910 has an input queue service 912, a compute engine 914, and an output queue service 918 executed by one or more processor(s) of the remote server. The key, provided by the paired device 902, is processed by the compute engine 914 to authenticate the key, and therefore the S-MMS 18C, and identify the authenticated S-MMS 18C with a unique, authorized user account corresponding to the key and/or the user of the S-MMS. When the compute engine 914 authenticates the key, the authenticating compute engine may authorize the input queue 912 to receive further messages and data transmitted from the S-MMS system 906, authorize the compute engine 914 to utilize the data transmitted from the S-MMS system to the remote server 910, and/or authorize the database 916 to accept data transmitted from the S-MMS system to the remote server and associate that data with the unique user account corresponding to the key and/or the user of the S-MMS 18C and store that data with the unique user account, such as with a unique user account identification or in a storage location or container for the unique user account. Additionally or alternatively, the compute engine 914 may authorize the output queue 918 to send data to the S-MMS system 906 for use by the S-MMS controller 110B on the S-MMS 18C and/or a paired device 902. In an embodiment, the paired smart device 902 may be replaced by an alternative device configured to transmit or receive wireless signals, such as a radio frequency (RF) tag or BLE beacon.

In an embodiment, a pre-authorized system that can access data stored on the remote server 910 is a web interface 942 accessed through an internet connected device, wherein a pre-authorized user 944 logs in to the web interface using security credentials to connect with the remote server and may view a history of events or other data stored on the remote server and associated with a particular S-MMS user or the S-MMS of that user. In another embodiment, the web interface 942 may be used to communicate with the S-MMS user or modify or add data to the S-MMS users' unique data file stored on the remote server 910. Data transmitted to the web interface 942 from the remote server 910 may be delivered via a secure connection, such as a secure sockets layer (SSL) connection.

In one embodiment, the remote server 910 may be configured to accept, process, store, and complete specific actions based on messages from an S-MMS system 906. FIG. 9 depicts a remote server 910 configured to receive incoming messages from an S-MMS system 906 via a secure connection 908. Messages may be sent from the S-MMS system 906 when a particular event takes place (e.g. on an S-MMS 18C tipping event), at state events (e.g. at startup of a device of the S-MMS system), and/or at pre-scheduled times (e.g. at midnight each night). These incoming messages are received by an input queue 912 hosted on the remote server 910. Messages from the input queue may then be sent to one or more of a compute engine 914, a database or data storage system 916, and an output queue 918. The compute engine 914 may compare data included in incoming messages from the input queue 912 to predefined rules or otherwise process the messages or data in the messages. Additionally or alternatively, the compute engine 914 may work as a filter to associate individual messages with unique user accounts prior to storing data in a database 916. The compute engine 914 may also, based on the content of a received message, push alerts or action requests to an output queue 918. The push alerts or action requests may include, for example, an identification or identifier of a particular S-MMS or S-MMS user (e.g. name, ID number, phone number, device identification, or other data identifying an S-MMS or S-MMS user), data for a particular S-MMS or S-MMS user, an identification or identifier of a particular operator or caretaker (e.g. name, ID number, phone number, email address, or other data identifying an operator or caretaker), an alert for a particular S-MMS or S-MMS user, and/or an action to be taken for a particular S-MMS or S-MMS user. The output queue 918 may be a subscription/publication service that, when activated, sends alerts to internet connected devices 932, such as an S-MMS users' caregiver's smart device. Alerts may be sent as text messages, voice messages, voice calls, or video over a cellular and/or Internet Protocol (IP) network 930, including the internet. Additionally or alternatively, outbound messages may be sent via the cellular and/or Internet Protocol (IP) network 930. In some embodiments, the services 912-918 on the remote server 910 may be executed on one or many individual server instances that work together to complete tasks as a single unit on one or more hardware processors. Additionally or alternatively, multiple other remote server architectures are possible to accomplish the intended functionality. As a non-limiting example, dashed-dot lines have been included to show alternative connections that may be enabled in some embodiments. Additionally, the compute engine 914 may include more advanced machine learning logic, such as a neural network, in some embodiments. Diagnostics and other basic server components have been left off of the diagram for the purpose of clarity.

Figure 10:
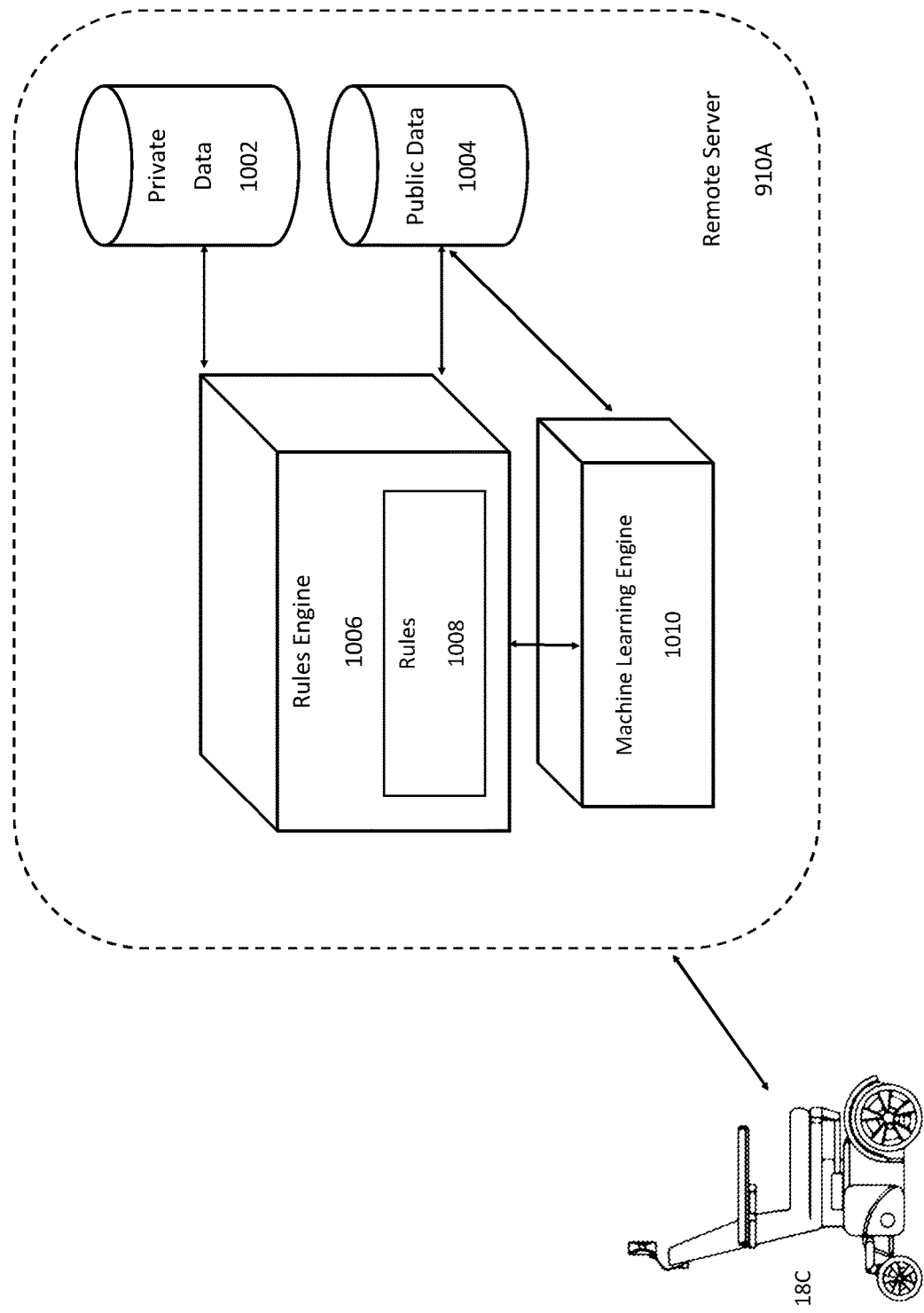
FIG. 10 depicts one or more S-MMSs connected to a remote server.

In some embodiments, data associated with one or more S-MMS 18C sensors or memory may be shared directly with remote services and servers 910 (FIG. 9). Additionally or alternatively, the data may be shared with a paired smart device 902 as previously disclosed. FIG. 10 depicts an embodiment of an S-MMS 18C wirelessly connected with a remote server 910A. The remote server 910A may be configured to accept information related to the user from the S-MMS 18C over a public packet network such as the internet. Additionally or alternatively, the information related to the user may be separated by a rules engine 1006 so that any personally identifiable information is stored as private data 1002 and non-identifiable information is added to or merged with public data 1004. In an embodiment, received data may be further anonymized using published best practices for data anonymization by scrubbing data based on predefined rules 1008 or programming of the computer engine 914 that modifies or mixes information prior to being placed in public data 1004. In an alternative embodiment, data may be sorted and/or anonymized onboard the S-MMS controller 110B prior to being transmitted to the remote server 910A. In some embodiments, public data relevant to the user can be overlaid on, or included in, existing databases, adding significantly to the resolution of the health data available for a given purpose (e.g. a research study). In this embodiment, the S-MMS 18C may connect directly to a service over a public packet network or public data 1004 from a remote server 910A may be fed to a service or location for use by a third party.

Filtering Introduction

The disclosed S-MMS controller 110B may use Sensor Track Fusion (STF) 500 as part of the situational awareness controller 302B. Sensor track fusion, as previously disclosed, is responsible for the processing, filtering, and reporting of target detection. Sensor track fusion provides a much better situational awareness map (as maintained by the tactical manager 527) of the environment 360-degrees around the S-MMS 18 than a system without STF. Use of STF is enabled by use of one or more recursive filters and results in better safety, freedom, and independence for the user.

With a focus now on predictive systems and methods, consideration is made of safety systems. In a typical vehicle airbag deployment, a vehicle is involved in an accident and only then does the airbag go off. In this example, it takes a sensor to sense the impact, send it to the air bag controller where the controller sets the charge based on the forces detected. If improved performance is desired (e.g. where improved performance in this example is to drive a tighter time budget), the airbag system would need faster processors, more memory, faster communications, and/or better and faster sensors.

Regardless of how much money is used to solve this problem, sensor reports will be historical in nature, and faster in this environment is just more expensive. The reason for this is that these sensor reports are based on observations of state at some point in time. In the airbag system case, at a first time T1, an event occurs and is measured; at a second time T2, the measured event is communicated and processed either locally or in a central processor and a report with data is generated; at time T3, the report data is passed to an application and related to other data; at time T4, the report data and other data is relayed to process logic for decisions; finally at time T5, one or more actions identified by the process logic decisions are carried out. Even though the steps of this process can be done very quickly and possibly effectively, the process is all historic in nature.

In the 1960's, the Apollo program became a challenge for NASA. For the first-time, consideration needed to be made for moving targets in time and space in order to navigate safely. For NASA, this meant making sure astronauts arrived at their target destination. The primary challenge was that everything was in motion; the earth was spinning, the earth was moving about the sun, and the moon was a moving target. Using classical systems and techniques would no longer work. Enter Dr. Kalman and his theories on estimation of measurements and recursive filtering. For many, it is hard to understand that decisions can be made based on an estimation of a future state with some confidence and that the decision made on that estimation will be correct.

Dr. Kalman introduced an era of predictive systems where received data, like sensor reports, is combined with other data, such as data about people or devices and their environment. This combined data enables a processing system to form decisions with confidence ahead of events. This approach allows the S-MMS controller 110B to predict one or more states an amount of time ahead of actual measurements such that when a predicted estimate of state is generated, the system acts at time $T_0$ or $T_k$ from $T_{k-1}$. Essentially, the estimate of state at time step k has been taken into account before the $k^{th}$ measurement has been considered. The difference between the state transition step and the predicted step is uncertainty. Uncertainty, for the purpose of this disclosure, may be a parameter, associated with the result of a measurement or calculation output, that characterizes the dispersion of values that could reasonably be attributed to the measurement or calculation output. In lay terms, the prediction of state is at some probability of accuracy surrounded by some uncertainty. At some point, the predictions are within the estimates, and actions may be taken, essentially at time $T_0$.

Disclosed are predictive systems wherein an object detection system on the S-MMS controller 110B uses one or more sensor reports (e.g. 371-376 FIG. 3) from one or more sensors (e.g. as depicted in FIG. 6) to determine the kinematic state(s) of one or more objects detected near the S-MMS 18. The S-MMS controller 110B uses an object kinematic model (e.g. from memory 120) as a state estimator to predict one or more kinematic states of one or more objects, including the detected object.

A fusion engine is a process of the S-MMS controller 110B which associates one or more sensor reports (e.g. data) with one or more tracks and executes one or more recursive filter instances. A fusion engine (e.g. sensor track fusion 500 of the SAC 302B FIG. 5) is configured to use a kinematic state of the object at time $T_{k-1}$ with the object kinematic model (e.g. from memory) to predict a predicted kinematic state at time $T_k$, wherein time $T_{k-1}$ is less than time $T_k$. The fusion engine uses the predicted kinematic state at time $T_k$ for an output (e.g. a predicted state estimate for the object) where the output is used by the S-MMS controller 110B for one or more other processes of the S-MMS controller, such as one or more navigation operations or generating one or more alerts, including collision avoidance and/or stability management.

In one example, the fusion engine (e.g. STF 500 of the SAC 302B) uses a prior measured kinematic state or stored values as an input to an object kinematic model to predict a kinematic state estimate of an object at time $T_k$, wherein time $T_{k-1}$ is less than (before) time $T_k$. The object detection system on the S-MMS controller 110B uses one or more sensors (e.g. as depicted in FIG. 6) to make a measurement of the object's kinematic state at time $T_k$. The fusion engine compares the predicted kinematic state estimate from time $T_{k-1}$ and the measured kinematic state at time $T_k$, calculates an updated kinematic state estimate of the object at time $T_k$ using the predicted kinematic state estimate from time $T_{k-1}$ and the measured kinematic state at time $T_k$, resets the clock at time $T_k$ such that k=k−1, and calculates a filter likelihood, which is a value representing (e.g. that is a function of) the difference between the predicted kinematic state estimate from time $T_{k-1}$ and the measured kinematic state of the object when observed at time $T_k$. The predicted kinematic state estimate at time $T_{k-1}$ may be used as an output of STF 500 by the S-MMS controller 110B for one or more other processes of the S-MMS controller, such as one or more navigation operations or generating one or more alerts, including collision avoidance and/or stability management. The updated kinematic state estimate may be used as an output of STF 500 and/or an input to the kinematic model state estimator (e.g. a current kinematic state of the object or prior knowledge of state) at the next iteration of the fusion engine.

Probability Theory

Measurements made by sensors typically involve some amount of imperfection or uncertainty. These imperfections or uncertainties emerge as discreet error associated with the measurements. Not all error is distributed evenly across a certain band; some error is offset error, some error is random noise, and some error is simply white noise that cannot be quantified. It is the sum of these errors that should be considered as S-MMS controller 110B processes are developed. It is important to identify and list as much error as possible in terms of a 1-sigma error map for each sensor, report, or data stream to the S-MMS controller 110B. A 1-sigma error map generally represents a sensor's capability, as measured, including known error detected and logged experimentally. This gives a solid basis for making predictions (e.g. with a recursive filter) and a quantifiable confidence in those predictions.

Figure 11:
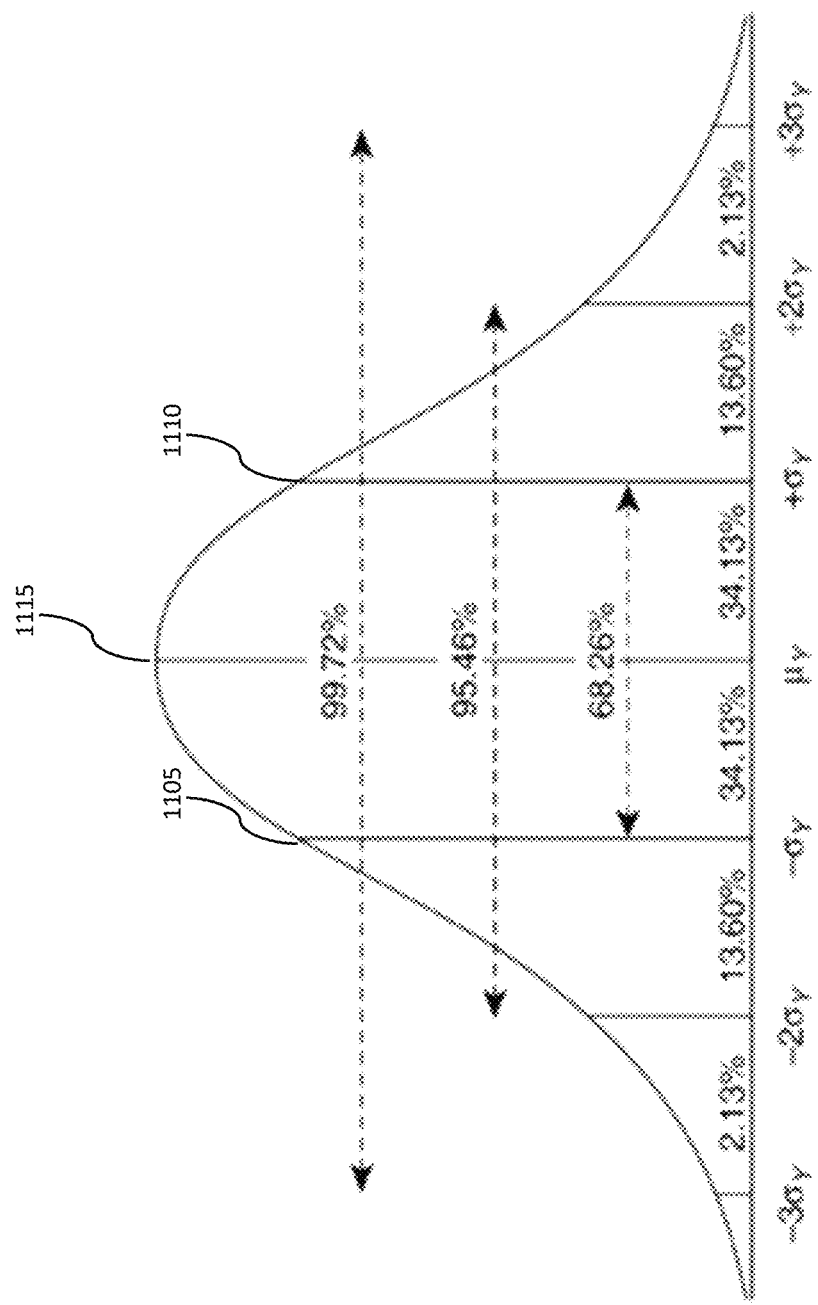
FIG. 11 depicts a Gaussian probability distribution.

Probability theory commonly assumes that data can be represented in a probability distribution. There are many defined probability distributions. In the case of a sensor, and for the sake of discussion, we may assume a Gaussian, or normal, probability distribution and that certain sensor reports can be plotted under a "bell" curve of the normal probability distribution, as illustrated in FIG. 11. As an example, if a specific sensor was pointed at a stationary target and a number of measurements were taken, the received sensor measurements (and subsequent sensor reports) may be used to create a characteristic normal distribution (i.e. sensor uncertainty) for that specific sensor or sensor type using basic statistical theory. Data populations range from 1-sigma, or a 68% confidence interval, to 6-sigma which corresponds to a 99.999% confidence interval. FIG. 11 depicts a distribution such that 68% of the population lies within a predetermined measure or expected amount. This 68% zone is shown by the areas between lines 1105 and 1110. In this example, it can be presumed that all error behaves as predicted and is distributed according to a Gaussian distribution, where 1115 represents the mean of the population. Other probability distributions may be utilized consistent with this disclosure. However, a single type of distribution (i.e. normal distribution) is used for the sake of clarity and consistency throughout.

Predictive systems use data fusion or information fusion techniques based on probability theory. In probability and statistics, variance is one measure of uncertainty and is the expectation of the squared deviation of a variable from its mean. Variance is the square of the standard deviation of a population. Covariance is another measure of uncertainty and is how two sources, each with a unique, individual variance values, will vary jointly together. The present disclosure expands such concepts and reduces uncertainty using multiple sources of data, understanding the expectations of the individual sensor readings, and filtering them together, i.e. observing how two sensors vary together against multiple readings. Sensor covariance is how two sensor reports, each with a unique sensor uncertainty, vary together. Filter covariance is the uncertainty of the prediction of a target's state which has more than one parameter (e.g. distance, velocity, acceleration etc.).

Sensor fusion is the combining of data from two or more sensors for the purpose of improving data quality and/or performance. This is also termed as multi-sensor fusion. In cases where multi-sensor fusion (e.g. sensor track fusion 500 FIG. 5) uses sensor covariance tracking, the starting sensor covariance estimate used by a fusion engine may be set at a number much higher than the test population represents. In actuality, additional data sources and their respective errors allow for much better or lower estimates of uncertainty as disclosed below.

Estimation and Filtering

The discussion below is a non-limiting general discussion of state estimation and recursive filtering (also referred to simply as filtering below). In the following discussion, state is used to refer to the kinematic state of a target, including position, distance, heading, trend, altitude, velocity, and/or acceleration relative to a defined frame of reference (e.g. the position on/location of the S-MMS 18, such as the center of the S-MMS or the center, front, or other location of one or more sensors of the S-MMS). A target, for this discussion, may be anything being tracked by the S-MMS controller 110B, including living and non-living things and topographic or other surface features of the ground.

As background, the general form of the mathematical description of a continuous-time, deterministic linear system can be described by equations 1 and 2.

$$\dot{x} = Ax + Bu \qquad \text{Eq. 1}$$

$$y = Cx \qquad \text{Eq. 2}$$

Where x is the state vector, $\dot{x}$ is the future state vector, u is the control vector, and y is the output or measurement vector. In an example, $\dot{x}$ may be the matrix [$\dot{r}$, $\dot{v}$, $\dot{a}$] where $\dot{r}$, $\dot{v}$, and $\dot{a}$ represent future position, velocity, and acceleration respectively of a track as specified in Cartesian, polar, or spherical coordinates. In an example, x may be the matrix [r, v, a] where r, v, and a represent the current position, velocity, and acceleration respectively of a track. A, B, and C are matrices called the system matrix, the input matrix, and the output matrix respectively. Using equation 1, a future state of a system ($\dot{x}$) can be estimated from the current state of the system (x) and the inputs to the system (u). Equation 2 is the actual measurement (y) of state (x) with the output matrix (C) representing a noiseless connection between the state and measurement. The targets being tracked in this disclosure behave in ways that are rarely deterministic and, in some instances, may not be linear. Therefore, equations 3 and 4 extend the basic concept to a continuous-time, non-linear system.

$$\dot{x} = f(x, u, w) \qquad \text{Eq. 3}$$

$$y = h(x, v) \qquad \text{Eq. 4}$$

where $\dot{x}$ and y are arbitrary vector-valued functions $f$ and $h$ respectively. In addition to the state vector (x) and control vectors (u) of equations 1 and 2, two additional vectors are added to handle the uncertainties of a real system. Process noise is denoted with a w, and measurement noise is denoted with a v. Process noise (w) is noise due to sensor and control system attributes. Measurement noise (v) may include sensor uncertainty and/or multi-sensor covariance depending on the measurement system used. Dual mode variance may be used in an embodiment to decrease the magnitude of the measurement noise. Both process and measurement noise are assumed to be random, zero-mean, and uncorrelated. Equations 1 through 4 may further be discretized (transformed from continuous-time to discrete-time) for implementation on a controller (i.e. digital electronics which are by nature discrete-time) in which case the system matrix (A) of Eq. 1) is often denoted with an F or Φ, the input matrix is often denoted with a G, and the output matrix may be denoted with an H.

FIGS. 12-16 depict a basic filter process executed by STF 500 of the S-MMS controller 110B. An embodiment of the STF 500 may include one or more filters. Further, one or more filters other than the filter described in FIGS. 12-16 may be used, including other recursive filters. In addition, extensions and variants of the filter described in FIGS. 12-16 may be used.

The filter of FIGS. 12-16 has three main variable matrices. The notation $Y_n$ represents a measurement of state at time n. The notation $\hat{X}_{n|m}$ represents an estimation of state X at time n given observations up to and including at time m≤n. The notation $P_{n|m}$ represents the estimation of state error at time n given observations up to and including at time m≤n and may be referred to as an uncertainty estimate of state (as the uncertainty or error in the state estimate) or simply uncertainty estimate herein. $P_{n|m}$ may alternatively be called the filter covariance or covariance estimate in some examples in which the uncertainty estimate is a covariance matrix (i.e. a matrix whose element in the i, j position is the covariance between the i-th and j-th elements of the estimate of state). Since the covariance of the i-th element of the state estimate with itself is simply that element's variance, each covariance matrix element on the principal diagonal is the variance of one of the elements of the estimate of state (e.g. position, velocity, acceleration, etc.). The recursive filter of FIGS. 12-16 is run (executed) by the STF 500, and the filter uses a set of equations (i.e. a mathematical description of the dynamic system) which attempts to estimate the state of a target using an object kinematic model. As a non-limiting example, the object kinematic model for a linear, discrete-time system, referencing equations 1 thru 4, may be derived as follows:

$$\hat{X}_{n|m} = \Phi_{n|m} x_m + G_{n|m} u_m + w_m \qquad \text{Eq. 5}$$

$$Y_n = H_n x_n + v_n \qquad \text{Eq. 6}$$

The process noise $w_m$ and measurement noise $v_n$ are random, zero-mean, uncorrelated, and have known covariance matrices $Q_n$ and $R_n$, respectively. Equations 7 thru 11 define the properties of the noise for a linear, discrete-time system as an example:

$$w_n \sim (0, Q_n) \qquad \text{Eq. 7}$$

$$v_n \sim (0, R_n) \qquad \text{Eq. 8}$$

$$E[w_n w_j^T] = Q_n \delta_{n-j} \qquad \text{Eq. 9}$$

$$E[v_n v_j^T] = R_n \delta_{n-j} \qquad \text{Eq. 10}$$

$$E[v_n w_j^T] = 0 \qquad \text{Eq. 11}$$

where E denotes the expected value, n and j are integer index values, and $\delta_{n-j}$ is the Kronecker delta function. A superscript T is used throughout to denote the transpose of a matrix. The linear, dynamic system described by equations 5 through 11 is used throughout the following disclosure for clarity.

The filter of FIGS. 12-16 generally is conceptualized as two phases, which are the predict phase and the update phase. The predict phase uses the state and uncertainty estimates from a previous time step m (or one or more initial values) to predict a state and uncertainty estimate at a future time step n. The uncertainty estimates may be one or more covariance values or covariance matrices. The predicted state estimate $\hat{X}_{n|m}$ does not include measured/observed data from the future time step n. In the update phase, the predicted state and predicted uncertainty estimates, $\hat{X}_{n|m}$ and $P_{n|m}$, and the measured/observed data $Y_n$ are used to calculate updated state and updated uncertainty estimates, $\hat{X}_{n|n}$ and $P_{n|n}$.

The predicted state estimate generally has the notation $\hat{X}_{k|k-1}$, which denotes the estimate of state X at time step k, from the time step k−1, before the k-th measurement (represented as $Y_k$) has been taken into account by the filter. The updated state estimate in which the k-th measurement $Y_k$ has been taken into account by the filter generally has the notation $\hat{X}_{k|k}$. The predicted uncertainty estimate generally has the notation $P_{k|k-1}$, which denotes the estimate of uncertainty at time step k, from the time step k−1, before the k-th measurement $Y_k$ has been taken into account by the filter. The updated uncertainty estimate in which the k-th measurement $Y_k$ has been taken into account by the filter generally has the notation $P_{k|k}$.

Figure 12:
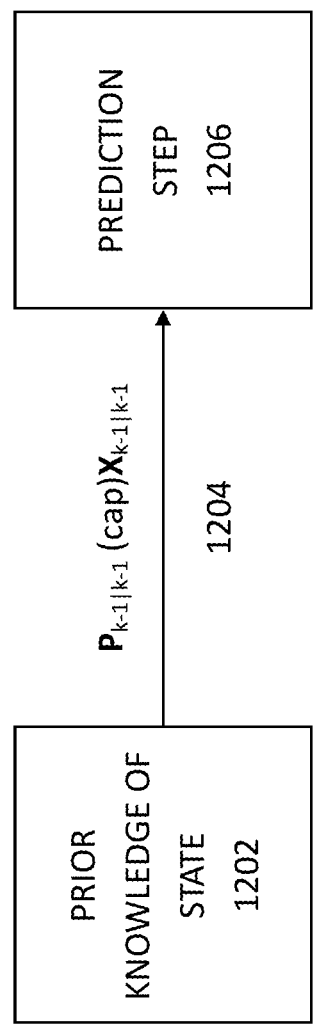
FIG. 12 depicts a prior knowledge of state at the onset of a recursive process.

The filter of FIGS. 12-16 generally includes five main steps of the filter operation. FIG. 12 depicts a filter starting point or initiation at the onset of the filter process. In one example, a prior knowledge of state estimate and a prior knowledge of uncertainty estimate of state (alternately, simply prior knowledge of state and prior knowledge of uncertainty, respectively) 1202 are retrieved by the filter from memory 120 for initiation of the filter. In an embodiment, one or more values (for example in one or more files) may be retrieved by the filter from memory 120 with the prior knowledge of state and prior knowledge of uncertainty estimates 1202. In another embodiment, the prior knowledge of state and prior knowledge of uncertainty estimates are one or more filter setup values retrieved by the filter from memory 120. Further, the prior knowledge of state estimate and prior knowledge of uncertainty estimate or other filter setup values can be used from one or more sources other than memory 120. In one example, the prior knowledge of state estimate and prior knowledge of uncertainty estimate are filter setup values that are known and measured characteristics of the user and/or sensors (e.g. as depicted in FIG. 6) in the S-MMS 18 system (e.g. one or more averaged measured sensor values).

The prior knowledge of state is generally represented as $\hat{X}_{k-1|k-1}$, meaning the predicted state estimate at time k−1 from time k−1. In this representation, k−1 means at time zero. The prior knowledge of state in one example is based on one or more prior measurements or other applicable knowledge.

The prior knowledge of uncertainty may be based on an analysis of past sensor performance. While a given sensor report, when mapped within a normal distribution, may appear to be accurate on the range and cross range measurements, it is more likely that the measurement is not perfectly accurate. For this reason, a 1-sigma expectation in terms of sensor report error is used by the filter to model measurement noise (Eq. 6) at startup. The prior knowledge of uncertainty estimate filter setup value may be, for example, based on taking thousands of measurements over time against a consistent target, calculating the average of the sensor measurements, and using the deviation of the measurements from the average to determine a standard distribution. In the case of an arbitrary radar sensor, for example, filter setup values are used for prior knowledge of uncertainty and may be ±5-degrees in cross range measurements and ±5-meters in down range measurements as a starting expectation. In an embodiment, the filter setup values for prior knowledge of uncertainty are individual variance values for each element of the state estimate. In one example, the filter setup values for prior knowledge of uncertainty are combined into a covariance matrix used as the prior knowledge of uncertainty. This prior knowledge of uncertainty is generally represented as $P_{k-1|k-1}$, meaning the uncertainty at time k−1 from time k−1. In this representation, k−1 means at time zero Both the prior knowledge of state $\hat{X}_{k-1|k-1}$ and the prior knowledge of uncertainty $P_{k-1|k-1}$ values 1204 are passed to a prediction step 1206.

Figure 13:
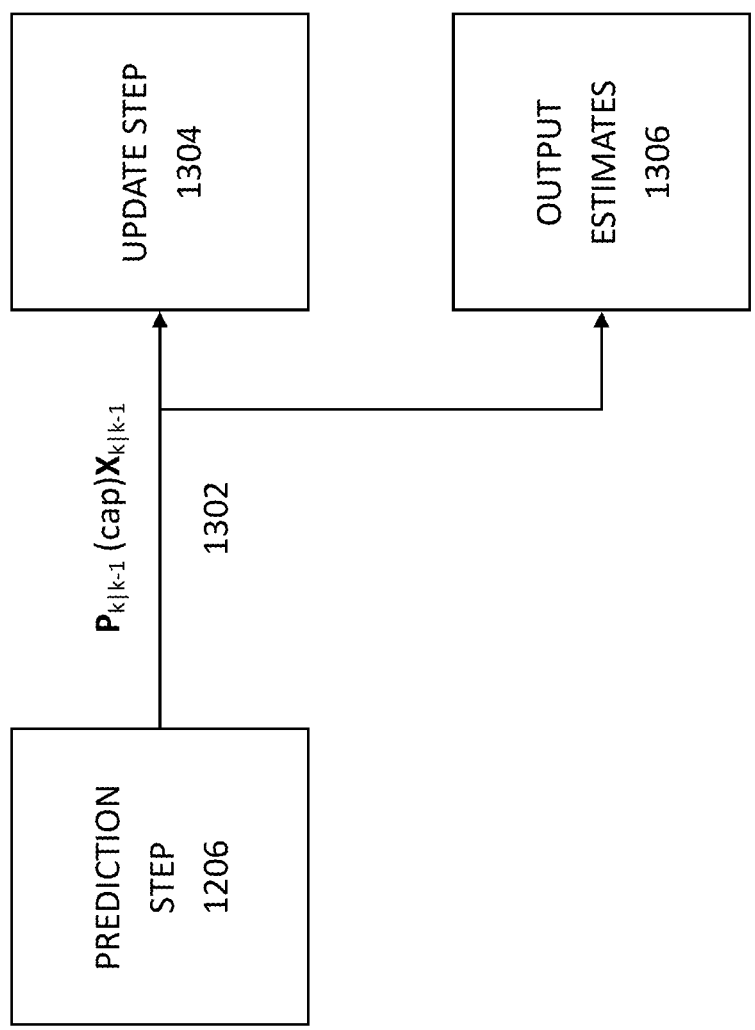
FIG. 13 depicts a prediction step along with its output estimate of a recursive process.

FIG. 13 depicts the prediction step 1206 along with its output estimates 1302. The prediction step 1206 uses an object kinematic model (i.e. a mathematical model such as equations 5 thru 11) that represents an aspect for which the S-MMS controller 110B (e.g. the STF 500) is making one or more estimates about a target. As a non-limiting example, the model could be a maneuver model of a target in the S-MMS' environment and in which the target is moving at a constant velocity in front of the S-MMS 18. The object kinematic model is used by the S-MMS controller 110B (e.g. the STF 500) to calculate a prediction of the future state and uncertainty estimates of the target based on the past state and uncertainty estimate values (e.g. values 1204 FIG. 12 in the case of a prediction after an initial setup) where the predicted state estimate and predicted uncertainty estimate (collectively referred to as output estimates 1302) are calculated using equations 12 and 13 in an example.

$$\hat{X}_{k|k-1} = \Phi_{k|k-1}\hat{X}_{k-1|k-1} + G_{k|k-1}u_{k-1} \qquad \text{Eq. 12}$$

$$P_{k|k-1} = \Phi_{k|k-1}P_{k-1|k-1}\Phi_{k|k-1}^T + Q_{k-1} \qquad \text{Eq. 13}$$

In an example of a constant velocity target object kinematic model, the current target location, current target trajectory, and current target velocity (e.g. prior knowledge of state $\hat{X}_{k-1|k-1}$) are known by the S-MMS controller 110B along with the prior knowledge of uncertainty estimate ($P_{k-1|k-1}$) (e.g. from memory 120 or from a previous filter cycle of STF 500). Using that data, the STF 500 can predict a location where the target will be at time k (a time in the future) from time k−1 and calculate the uncertainty of that predicted location. This prediction includes calculating both a state estimate and an uncertainty estimate for time k, from time step k−1, before the $k^{th}$ measurement is taken into account by the filter.

As mentioned above, the predicted uncertainty estimate at this step typically is represented as $P_{k|k-1}$, and the predicted state estimate at this step is represented as $\hat{X}_{k|k-1}$. As discussed above, the predictions are a function of the object kinematic model chosen.

The predicted state estimate and predicted uncertainty estimate 1302 are then output to an update step 1304 (see FIG. 15) and an output estimates step 1306. The STF 500 outputs the predicted state estimate $\hat{X}_{k|k-1}$ for time k and the predicted uncertainty estimate $P_{k|k-1}$ for time k 1302 from the filter at the output estimates step 1306 for use by one or more other processes of the S-MMS controller 110B, such as in one or more SAC 302B processes, one or more navigation operations, and/or generating one or more alerts, as discussed herein. The one or more other processes of the S-MMS controller 110B cause one or more actions to be taken by the S-MMS 18 based on the predicted state estimate and/or the predicted uncertainty estimate.

Figure 14:
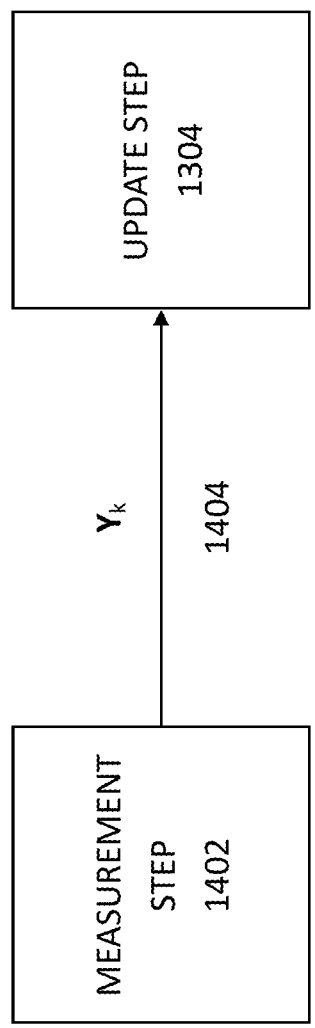
FIG. 14 depicts a measurement step of a recursive process.

FIG. 14 depicts an observation of state, or measurement step, 1402 where the STF 500 of the S-MMS controller 110B receives one or more measurements from one or more sensors (e.g. via sensor reports 371-376 FIG. 3) available to the S-MMS 18. The one or more sensor measurements are represented as a measurement Y generated at time k ($Y_k$) 1404. The measurement is fed by the STF 500 to the update step 1304 (see FIG. 15).

Figure 15:
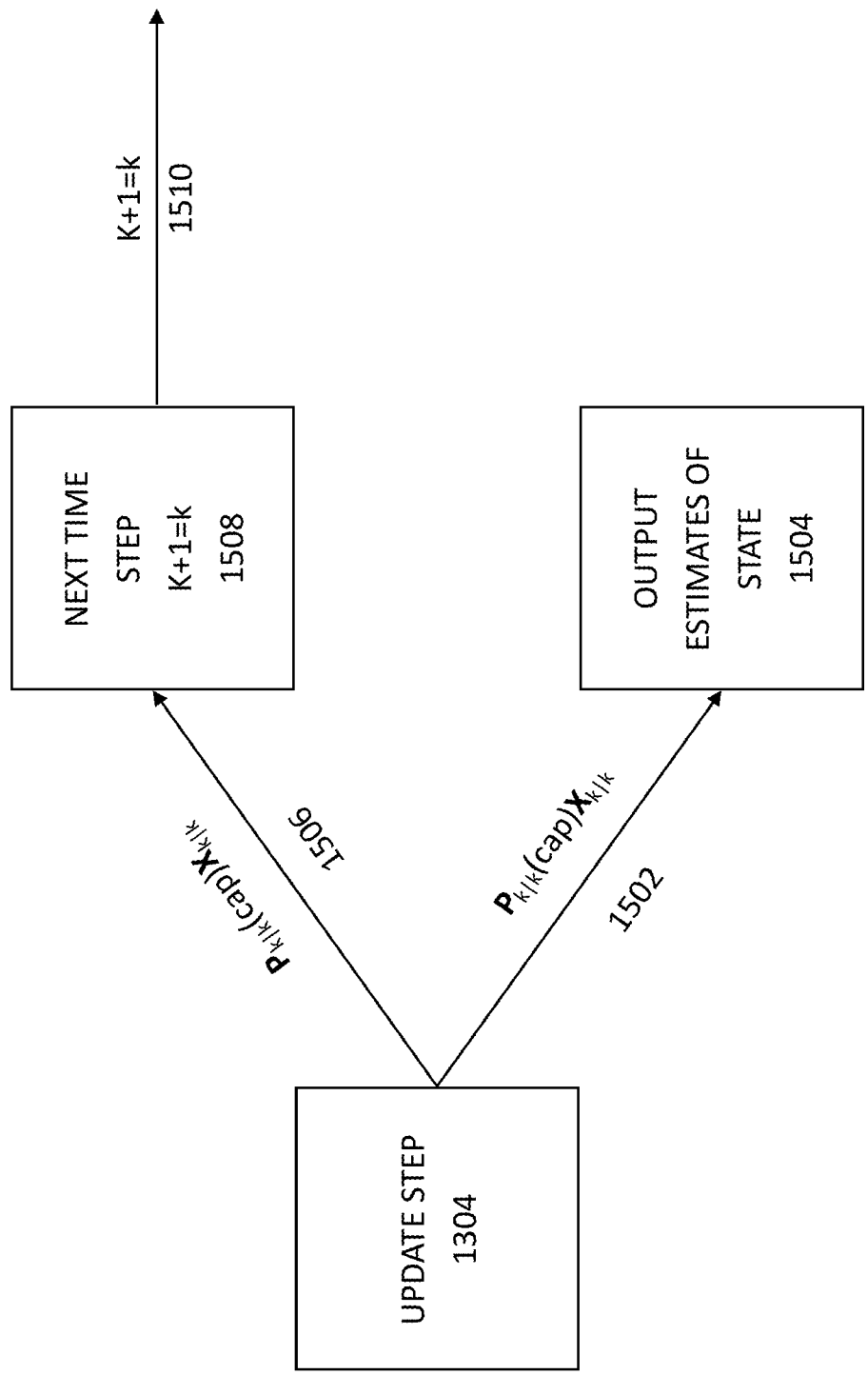
FIG. 15 depicts an update step of a recursive process.

FIG. 15 depicts an operation of the update step 1304 (which is also known as the state transition step). In the update step 1304, the measurement (observed state) at time k ($Y_k$) is taken into account along with the prior predicted state estimate and prior predicted uncertainty estimate by the S-MMS controller 110B (e.g. the STF 500). In one example, the STF 500 of the S-MMS controller 110B averages the measured state at time k ($Y_k$) with the predicted state estimate to result in the updated state estimate $\hat{X}_{k|k}$. In one example, the average is a weighted average, with more weight being given to one or more prior predicted state estimates with higher certainty. In addition, in this example, the S-MMS controller 110B calculates the difference between the measured state for time k ($Y_k$) and the predicted state estimate ($\hat{X}_{k|k-1}$) to determine the updated uncertainty estimate $P_{k|k}$.

In another example, the predicted state and uncertainty estimates may be updated based on a Kalman gain for the S-MMS. An example of an update step calculation for a discrete-time filter based on Kalman gain ($K_k$) is as follows:

$$\hat{X}_{k|k} = \hat{X}_{k|k-1} + K_k(Y_k - H_k\hat{X}_{k|k-1}) \quad \text{Eq. 14}$$

$$P_{k|k} = (1 - K_k H_k) P_{k|k-1} \quad \text{Eq. 15}$$

where $\hat{X}_{k|k-1}$ is the predicted state estimate prior to measurement $Y_k$, $P_{k|k-1}$ is the predicted uncertainty estimate prior to measurement $Y_k$, $H_k$ is the system output matrix (reference Eqs. 4 and 6), and I is the identity matrix. The updated uncertainty estimate ($P_{k|k}$) may be an updated filter covariance in some instances and referred to as such.

The Kalman gain is the relative weight given to one or more measurements and current predicted state and uncertainty estimates. With a high gain, the filter places more weight on the most recent measurement(s). With a low gain, the filter places more weight on the model predictions. The Kalman gain may be calculated in an example as follows:

$$K_k = P_{k|k-1} H_k^T (H_k P_{k|k-1} H_k^T + R_k)^{-1} \quad \text{Eq. 16}$$

where $P_{k|k-1}$ is the uncertainty estimate prior to measurement $Y_k$, $H_k$ is the system output matrix (reference Eq. 6), and $R_k$ is the measurement uncertainty matrix.

For well characterized, linear systems (i.e. systems that can be defined by a known equation that is linear), the Kalman gain $K_k$ can be calculated offline before the system operates and saved in memory because it is a function only of the S-MMS system parameters (e.g. sensors, sensor systems, and/or other components of the S-MMS). This does not hold true for nonlinear systems, in alternate embodiments, because the gain and uncertainty calculations are dependent on measurements in addition to system parameters. In this instance, the Kalman gain for the S-MMS is calculated with each iteration of the filter.

As indicated above, the result of the update step 1304 is the updated state estimate $\hat{X}_{k|k}$ and the updated uncertainty estimate $\hat{P}_{k|k}$ for time k. The updated state estimate $\hat{X}_{k|k}$ for time k and the updated uncertainty estimate $\hat{P}_{k|k}$ for time k 1502 are output from the filter by the STF 500 at the update step 1304 to the output estimates of state 1504 for use by other processes of the S-MMS controller 110B, such as in one or more SAC 302B processes, one or more navigation operations, and/or generating one or more alerts, as discussed herein.

The filter measurement residuals for time k also are optionally determined at the update step 1304 and output from the filter by the STF 500 at the update step to the output estimates of state 1504 in this example for use by one or more processes of the STF 500, such as an estimator, model selector, or interaction mixer. A filter measurement residual is a function of the calculated difference between the predicted state estimate and the measured state. Filter measurement residuals for the filter of the present example can be calculated using equation 17.

$$\text{Filter Residuals} = Y_k - H_k \hat{X}_{k|k-1} \quad \text{Eq. 17}$$

The output of equation 17 is a matrix with multiple values. Note the filter residuals are used in equation 14, in combination with the Kalman gain, to calculate the updated state estimate $\hat{X}_{k|k}$. For ease of calculation, a single filter residual value (i.e. from the matrix) may be used. In an embodiment, the first term of the filter residuals matrix which represents the position (r) residual is used as the filter residual by one or more processes of the S-MMS controller 110B.

The updated state estimate $\hat{X}_{k|k}$ and the updated uncertainty estimate $\overline{P}_{k|k}$ for time k are used as the prior knowledge of state for the next estimate phase at time step k+1. The STF 500 also outputs the updated uncertainty estimate $P_{k|k}$ and the updated state estimate $\hat{X}_{k|k}$ of the target at time k 1506 from the update step 1304 of the filter to a next time step 1508.

The next time step 1508 updates the time step to k=k+1 1510. The next time step 1508 updates the time period of the prior updated uncertainty estimate $P_{k|k}$ and updated state estimate $\hat{X}_{k|k}$ of the target to be time step k−1. This results in a prior knowledge uncertainty estimate $P_{k-1|k-1}$ and a prior knowledge state estimate $\hat{X}_{k-1|k-1}$ that are used as inputs of prior knowledge 1204 for the next prediction step 1206 (see FIG. 12).

The above described process is an embodiment of a recursive filter. Recursive filtering allows the prediction an amount of time ahead of measurements such that when a predicted estimate of state is generated (e.g. step 1306), the STF 500 of the S-MMS controller 110B acts at time $T_0$ or time $T_k$ from time $T_{k-1}$. Essentially the predicted estimate of state is made at time step k−1 before the $k^{th}$ measurement has been taken into account, and the difference between the output of the prediction step 1206 and the state transition step (update step 1304) is uncertainty. In lay terms, the predicted state estimate is a value of some probability of accuracy surrounded by some uncertainty.

Typically, the prediction step and update step alternate, with the prediction advancing the state until the next measurement is taken and the update incorporating the measurement. However, in some instances, one or more update steps may be skipped. In other instances, one or more prediction steps may be skipped. For example, if a measurement is not available, for example if a sensor is not operational, the update step may be skipped and multiple prediction steps may be performed. Similarly, if multiple measurements are available at the same time, multiple update steps may be performed.

Figure 16:
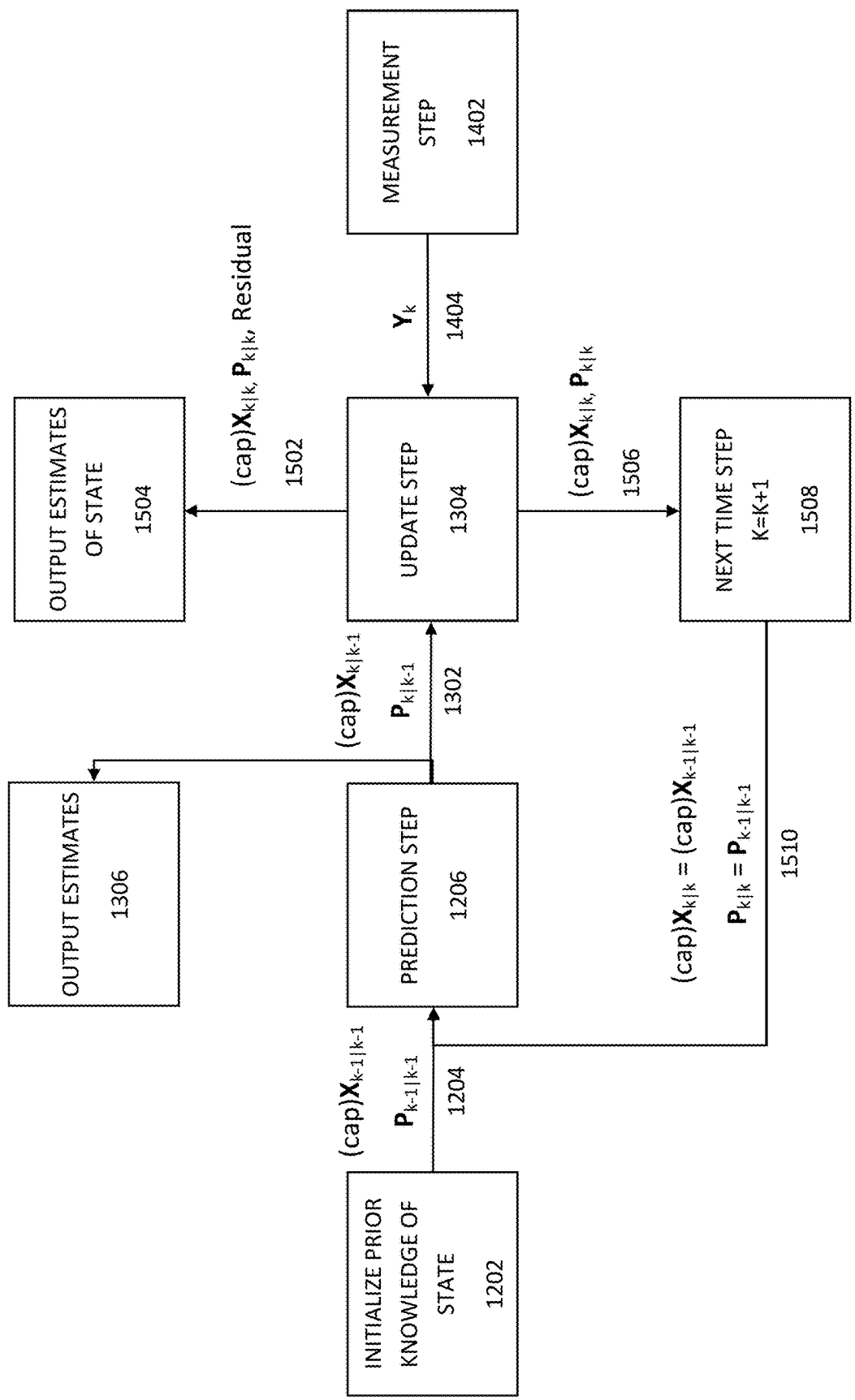
FIG. 16 depicts a full filtering loop for a recursive process.

FIG. 16 further illustrates the recursive filtering process of FIGS. 12-15 executed by the STF 500 of the S-MMS controller 110B. In the depicted embodiment, the filter is initialized by the STF 500 with prior knowledge of state and uncertainty values $\hat{X}_{k-1|k-1}$ and $P_{k-1|k-1}$ 1204 that are retrieved from memory, as in step 1202. The prior knowledge of state and uncertainty values $\hat{X}_{k-1|k-1}$ and $P_{k-1|k-1}$ 1204 are used to predict the state estimate and the uncertainty estimate at the prediction step 1206 to result in a predicted state estimate $\hat{X}_{k|k-1}$ and a predicted uncertainty estimate $P_{k|k-1}$, for example as described above.

The predicted state estimate $\hat{X}_{k|k-1}$ and predicted uncertainty estimate $P_{k|k-1}$ 1302 are output from the prediction step 1206 and input to the update step 1304. In addition, the prediction step 1206 outputs the predicted state estimate $\hat{X}_{k|k-1}$ and predicted uncertainty estimate $P_{k|k-1}$ 1302 to the output estimates step 1306 for output/transmission and use by other processes of the S-MMS controller 110B, such as by one or more SAC 302B process, a navigation operation, or an alert operation. A measurement $Y_k$ 1404 is taken at the measurement step 1402 at time k and also input to the update step 1304.

The update step 1304 takes the measurement $Y_k$ 1404 for time k into account to update the predicted state estimate $\hat{X}_{k|k-1}$ and the predicted uncertainty estimate $P_{k|k-1}$ for time k. The update step 1304 updates the predicted state estimate $\hat{X}_{k|k-1}$ using the measurement $Y_k$ 1404 for time k to result in an updated state estimate $\hat{X}_{k|k}$ for time k and updates the predicted uncertainty estimate $P_{k|k-1}$ using the measurement $Y_k$ for time k to result in an updated uncertainty estimate $P_{k|k}$ for time k. In one example, the update step 1304 averages the predicted state estimate $\hat{X}_{k|k-1}$ and the measurement 1404 to result in an updated state estimate $\hat{X}_{k|k}$ and calculates the difference between the measured state for time k ($Y_k$) and the predicted state estimate ($\hat{X}_{k|k-1}$) to result in an updated uncertainty estimate $P_{k|k}$. However, other methods may be used by the STF 500 of the S-MMS controller 110B to take the measurement 1404 into account to update the predicted state estimate $\hat{X}_{k|k-1}$ and the predicted uncertainty estimate $P_{k|k-1}$ in the update step 1304, such as a weighted average or factoring the Kalman gain with the predicted state estimate and predicted uncertainty estimate (for example, as shown in Equations 14 and 15).

The update step 1304 outputs/transmits the updated state estimate $\hat{X}_{k|k}$ 1502 to the output estimates of state 1504, for example, for use by other processes of the S-MMS controller 110B, such as one or more SAC 302B process, a navigation operation, or an alert operation. The update step 1304 also transmits the updated state estimate $\hat{X}_{k|k}$ and the updated uncertainty estimate $P_{k|k}$ 1506 to the next time step 1508. Filter measurement residuals (e.g. as calculated by Eq. 17) for time k also are optionally output from the filter by the STF 500 at the update step 1304 to the output estimates of state 1504 in this example for use by one or more process of the STF 500, such as an estimator, model selector, or interaction mixer.

The next time step 1508 advances the time to be k=k+1. In one aspect, the next time step 1508 uses the updated state estimate $\hat{X}_{k|k}$ and the updated uncertainty estimate $P_{k|k}$ as inputs for prior knowledge of state $\hat{X}_{k-1|k-1}$ and prior knowledge of uncertainty estimate $P_{k-1|k-1}$ 1510 to the next prediction step 1206. In this aspect, the next time step 1508 outputs or transmits the advanced time step k=k+1 to the next prediction step 1206. In this aspect, the next time step 1508 also outputs or transmits the updated state estimate $\hat{X}_{k|k}$ and the updated uncertainty estimate $P_{k|k}$ for use as the prior knowledge of state and prior knowledge of uncertainty estimate 1204 for the next prediction step 1206. The loop then continues.

In another aspect, the next time step 1508 updates the times for the updated state estimate $\hat{X}_{k|k}$ and the updated uncertainty estimate $P_{k|k}$ so they are used as prior knowledge of state estimate $\hat{X}_{k-1|k-1}$ and prior knowledge of uncertainty estimate $P_{k-1|k-1}$ 1510 for the advanced time step k=k+1. That is, the next time step 1508 updates the updated state estimate $\hat{X}_{k|k}$ to be the prior knowledge state estimate $\hat{X}_{k-1|k-1}$ for input to the next step and updates the updated uncertainty estimate $P_{k|k}$ to be the prior knowledge uncertainty estimate $P_{k-1|k-1}$ for input to the next step. The next time step 1508 outputs or transmits the new, advanced time step k=k+1, the prior knowledge state estimate $\hat{X}_{k-1|k-1}$, and the prior knowledge uncertainty estimate $P_{k-1|k-1}$ 1510 for use as the prior knowledge of state and uncertainty estimate 1204 for the next prediction step 1206. The loop then continues.

Estimation and filtering, as previously disclosed (e.g. FIG. 16), is implemented as part of STF 500 of the SAC 302B of the S-MMS controller 110B. In an embodiment, estimation and filtering (e.g. FIG. 16) may be additionally be implemented as part of the stability manager 525 of the SAC 302B.

Data Association

Figure 17:
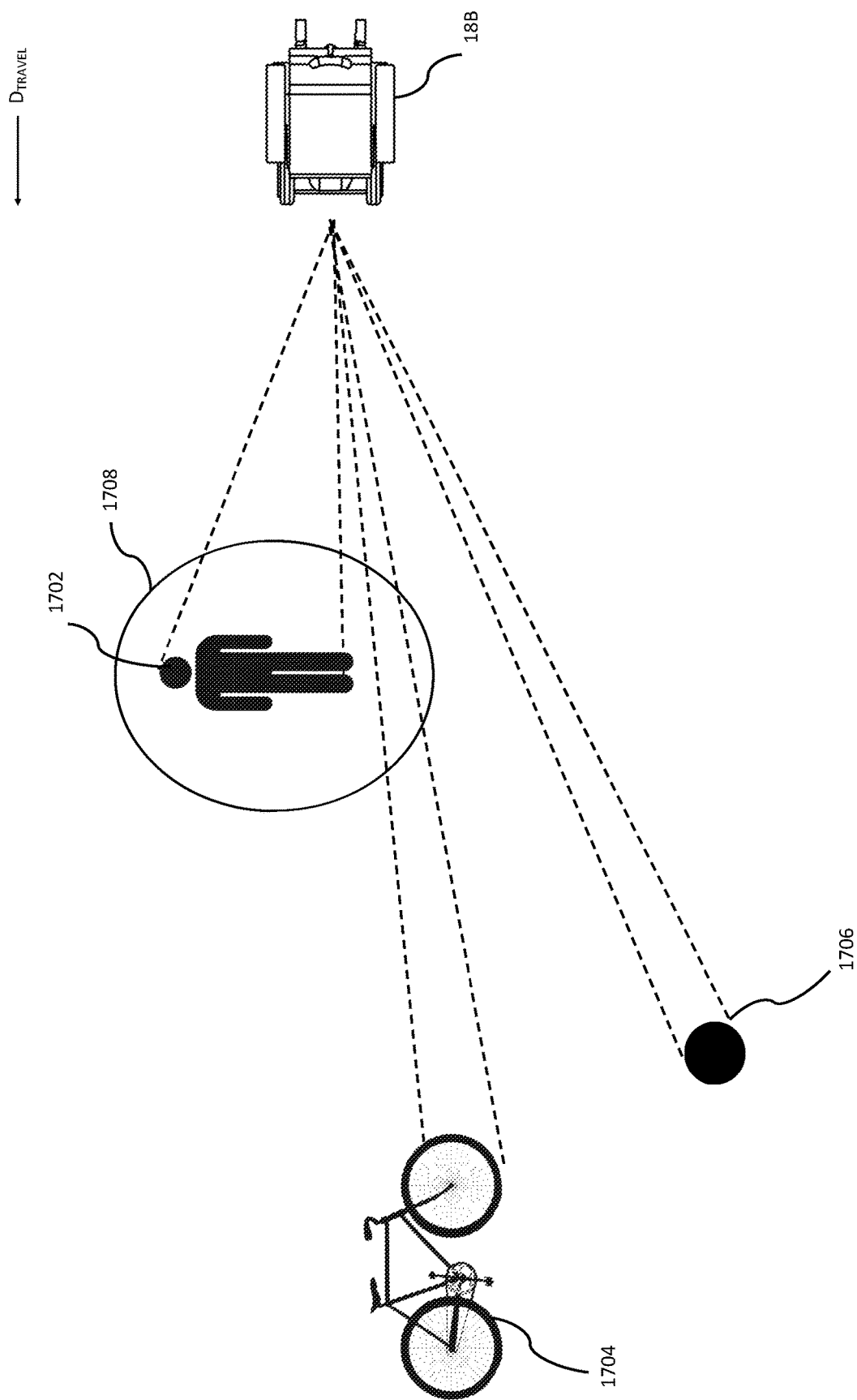
FIG. 17 depicts an S-MMS traveling near a person, a bicycle, and a stationary object.

FIG. 17 depicts an example of how raw sensor reports (371-376 FIG. 3) and data from memory 120 are used by sensor track fusion 500 of the S-MMS controller 110B to establish a track. Sensor track fusion 500 may establish a track, for example, by determining if received sensor reports and/or data are clutter, associating data from received sensor reports with an existing track (e.g. associate the data to an existing track ID for the object), or starting a new track (e.g. assign a new track ID to the object and associate the data to that new track ID for that object). If a received sensor report is associated with an existing track, sensor track fusion 500 determines the track with which the data from the sensor report best aligns and associates the data to the track ID for that track so the data from the sensor report can be used by the tactical manager 527, threat assessor 528, and other SAC 302B processes for one or more operations related to that track (e.g. navigation).

In the example of FIG. 17, an S-MMS 18B is traveling near a person 1702, a bicycle 1704, and a stationary object 1706. As a non-limiting example, the person 1702 walking near the S-MMS 18B is a target that sensor track fusion 500 of the SAC 302B on the S-MMS controller 110B is attempting to track. In this example, the person 1702 is an existing or new target that is being tracked (e.g. either sensor track fusion 500 of the S-MMS controller 110B has already assigned a track ID to the object or sensor track fusion assigns a new track ID to the object).

Sensor track fusion 500 defines a validation region 1708 for each track and identifies all sensor measurements that fall within that region. For the two-dimensional example of FIG. 17, sensor track fusion 500 defines the validation region for a track around the location of the predicted state estimate (e.g. $X_{k|k-1}$ per FIG. 13) for the track. Using the previous track state, sensor track fusion 500 computes the predicted state estimate using a filter as previously discussed.

The predicted state estimate in this example is the center of the validation region 1708. The predicted state estimate can represent, for example, the distance to an object. The size of the validation region 1708 is based on the predicted uncertainty estimate determined in the prediction step (e.g. $P_{k|k-1}$) or the last updated uncertainty estimate (e.g. $P_{k|k}$ from the previous filter cycle). For example, the size of the validation region 1708 can be the predicted uncertainty estimate, which in this example represents the amount of potential uncertainty (error) in the predicted state estimate, which in this example is a distance to an object. The predicted state estimate can be designated as the center of the validation region with the size of the validation region designated as surrounding the center of the validation region (e.g. in a radius from the center resulting in a circular area, two different axis or distances from the center resulting in an oval area or a rectangular region, half of the validation region on sides of the center of the region, or otherwise, based on the calculated uncertainty value or values (e.g. the predicted uncertainty estimate)). In another example, the STF defines a validation region for the object, wherein the predicted state estimate of the object is a center of the validation region, a size of the validation region is equal to the predicted uncertainty estimate of state around, about, or from the center of the validation region, and the size of the validation region is designated as extending from the center of the validation region. For example, if the validation region is a square, oval, or rectangle, the center of the square, oval, or rectangle is placed at the location of the center of the validation region as designated by the predicted state estimate.

Therefore, for example, the predicted state estimate and predicted uncertainty estimate identify a predicted distance to an object with an area around that predicted distance in which the object may actually be identified with an observed measurement based on uncertainty/error that may exist with an actual distance measurement of a particular sensor. If an observed measurement (e.g. from a sensor) falls within this validation region, then it is considered as a candidate for association to a track by sensor track fusion 500 (e.g. by associating measurement data from the sensor for an object or other data for the object to the track). If an observed measurement (e.g. from a sensor) falls outside of this validation region, it is rejected by sensor track fusion 500 in one example. Rejected data may be used to initiate new tracks (e.g. by associating measurement data from the sensor for an object or other data for the object to a new track) and/or may be rejected completely by STF 500 as noise. In this example, the outputs of the update step (i.e. $X_{k|k}$, $P_{k|k}$) are used by the STF 500 to validate the model being used by the filter as disclosed below in model selection.

In an embodiment, data association may be accomplished by sensor track fusion 500 by various means, including Global Nearest Neighbor (GNN) and Nearest Neighbor Standard Filter. Probabilistic Data Association (PDAF) and Joint Probabilistic Data Association (JPDAF) plus methods for minimizing complex non-linear problems by implementing Sub-Optimal routines, like a Clean JPDA, may be applied in some embodiments.

Track Management

Figure 18:
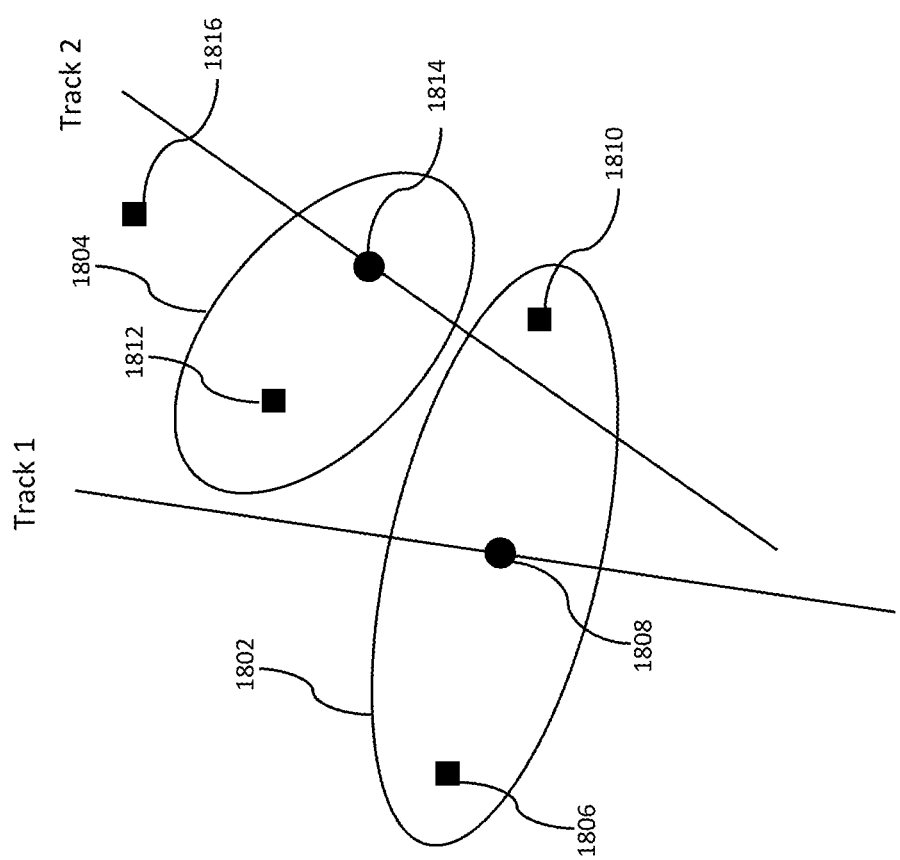
FIG. 18 depicts data association in multiple target reports.

Sensor track fusion 500 is tasked with track management for the SAC 302B. Track management includes track initiation, track number assignment, and track deletion. FIG. 18 depicts an example of possible sensor reports received by sensor track fusion 500 for two possible targets. Assume that target 1 is located in the first region 1802 and target 2 is located in the second region 1804. What is needed is an approach to track management that will use sensor reports 1806, 1808, and 1810 to create a Track 1 associated with target 1. Similarly, sensor reports 1812 and 1814 will be used to create Track 2 associated with target 2. Adding to the complexity, some sensor reports (e.g. 1816) may need to be rejected as unrelated to any track and/or target.

In an embodiment, STF 500 executes a joint probabilistic data association filter (JPDAF) for track management and data association of multiple targets. Additionally or alternatively, STF 500 employs a nearest-neighbor JPDAF. Both probabilistic data association filters are Bayesian approaches that compute the probability that each measurement in a track's validation region (e.g. 1704 FIG. 17) is the correct measurement and the probability that none of the validated measurements is the correct measurement. In this way, raw sensor reports are associated with a track ID or rejected as noise by STF 500 based on the calculations of a probabilistic data association filter and one or more predefined rules or thresholds retrieved from memory 120. In one example, the non-parametric version of the filter is used since it does not require prior knowledge of the spatial density of clutter (i.e. the distribution of tracks around the S-MMS 18).

Out of Sequence Measurements

It is possible that when measurements (e.g. sensor reports 371-376 FIG. 3) are received by a filter from multiple sensors, that the measurements do not arrive in the proper time sequence. Out of sequence measurements (OOSM) are most likely received because:

the communication bus priority and speed are low, or,
if the sensor process time, which is the time from obtaining the raw data for a measurement to the time the sensor data is transmitted from the sensor in a sensor report, is subtracted from the sensor measurement time, lower frequency sensors will appear out of sequence.

It may be necessary for the STF 500 to subtract the sensor process time and/or sensor report transmission time (the amount of time from transmission of the sensor report from the sensor to reception of the sensor report by the STF) from the time a sensor report is received by the STF in order for the STF to get the actual time of the measurement by the sensor. These values may be known in some cases, and the value may be transmitted as part of the sensor report (e.g. 371-376 FIG. 3) or may be retrieved from memory 120 as part of a configuration file so that the actual time of measurement can be calculated by the STF 500 of the S-MMS controller 110B and/or arbitration IAM 370.

Different techniques can be used to handle OOSMs. One technique is to store the sensor measurements in a buffer (e.g. on memory 120) and process the stored measurements in the proper sequence. A problem with this technique is that the current track data (e.g. of STF 500) can get old and is not updated until the sensor measurement for the OOSM is processed, making the control system respond on the basis of the slowest sensor. Another technique is to dump (not use and optionally delete) an OOSM. A problem with this approach is that the data from the sensor report is not processed. Another technique is to run one or more filters by the STF 500 of the S-MMS controller 110B as if there are no OOSMs, which will keep the track data current. Then, if an OOSM is received by the STF 500, the STF can set the filter time step to the OOSM's time and reprocess the filter tracks from that time forward using the OOSM and any measurements after the OOSM. A problem with this technique is that a lot of data must be stored in memory 120 so that the filter can be restarted from the OOSM time, and the approach takes a lot of S-MMS controller 110B process time.

Another technique is for the STF 500 to run the filter normally with all current data measurements and store only the track uncertainty estimates at each measurement time in memory 120, which in this example are covariance matrices. Then, when an OOSM is received by the STF 500, the STF sets the time step for the filter back to the OOSM measurement time, sets the values for the track's predicted state estimate and uncertainty estimate back to the state estimate and uncertainty estimate corresponding to the OOSM measurement time, verifies the OOSM data's association to a track, and then performs the update step of the filter with the OOSM measurement. Next, the STF 500 recursively executes the filter starting with the track's predicted state estimate and predicted uncertainty estimate at the OOSM's measurement time to the current time. This process allows the STF 500 to provide updates on the track to the other SAC 302B processes based on one or more OOSMs with a lower computational cost and increase confidence in the actions of the S-MMS controller 110B.

Model Selection

Another non-limiting exemplary embodiment recursive filter technology includes a target detection model of targets in motion and maneuvering. Data is important to multi-sensor fusion and information fusion. Even late (e.g. OOSM) and unexpected (e.g. outside expected variance) readings are meaningful. Bad data can indicate something is wrong to the STF 500 of the S-MMS controller 110B. Therefore, the S-MMS controller 110B processes all data available to it (e.g. sensor reports and/or data from memory) in this example. Predictive systems that use one or more filters to generate probable outcomes with some degree of certainty for multiple possible scenarios, used by one or more process of the SAC 302B, including the STF 500, allow for a semi or fully autonomous S-MMSs 18 to better consume all available data (e.g. sensor reports and/or data from memory).

An S-MMS controller 110B making an estimate of a target state (e.g. distance, bearing, position, velocity, and/or acceleration) uses a filter. A filter is computer-implemented instructions that process one or more inputs and produce one or more outputs based on the one or more inputs. A recursive filter is a type of filter that uses one or more of its outputs as one or more inputs to the filter. In one embodiment, the Kalman Filter is used. A Kalman filter is one type of recursive filter. However, other filter types can be employed and selected based on the desired outcomes and/or system constraints. In an embodiment, a Kalman Filter operates as an estimator on an S-MMS controller 110B (e.g. by the STF 500), implementing a particular model where a model is a set of algorithms, based on one or more assumptions, used to estimate a possible future state as previously described. An estimator estimates one or more states and/or one or more uncertainties of the state estimates.

One or more algorithms may be used by a given model at the prediction step 1206 (FIG. 12) of a filter. The algorithms of a model are retrieved from memory 120 and executed on the S-MMS controller 110B (e.g. by the STF 500) to calculate one or more values, such as one or more state and uncertainty estimates. Additionally or alternatively, one or more algorithms may be executed on a remote compute engine 914 (FIG. 9), rules engine 1006 (FIG. 10), or machine learning engine 1010 in some embodiments to calculate one or more values, such as one or more state and uncertainty estimates, and the algorithms may be retrieved from memory on a remote server 910 or another related memory.

A model may utilize data received from one or more sensors (e.g. sensor reports 371-375 FIG. 3), data stored locally in memory 120, and/or data from a remote server 910. A model may comprise algorithms that use one or more pieces of data to estimate, or propagate, the location of a target at some point in the future in the case of maneuvering models. A model also may comprise algorithms that use one or more pieces of data to estimate the stability of an S-MMS 18 at some point in the future. Other models are possible in support of S-MMS controller 110B operations.

Selecting the appropriate model for use by a filter so that it matches the behavior of a target is a dynamic process. Systems and methods predicated on predictive systems are disclosed wherein a model, composed of one or more algorithms, is used by a recursive filter (reference FIG. 12-16). These systems and methods use filtering techniques and decision processes, integrated within a mathematical framework, for modeling and decision-making. The outcomes of the decision-making framework may be based on a combination of random events and/or events under the control of an internal decision maker.

One example of this is a Markov chain. A Markov chain can be used by the S-MMS controller 110B (e.g. by the STF 500) to vote for a model that best represents the situation it is trying to make decisions around (e.g. that most closely matches target behavior). Voting in this sense means to execute a set of rules that evaluate the model the STF 500 (e.g. of the S-MMS controller 110B) is using and the sensor reports such that when the STF determines received sensor reports no longer fit a given model, the STF can associate the received sensor reports with an alternative model that does support those sensor reports. The voting scheme, in one example, is based on assigning a numeric value between zero and one to a given model with one being a high confidence value and zero being a no-confidence value in an embodiment.

As a non-limiting example, the bicycle 1704 traveling near the S-MMS 18B in FIG. 17 is a target that sensor track fusion 500 of the SAC 302B on S-MMS controller 110B is attempting to track. In a simple scenario, anticipated possible maneuvers of the bicycle 1704 may include:

1) continuing at a constant velocity,
2) accelerating towards the S-MMS, or
3) moving left or right.

Each of the above states (e.g. 1-3) preferably uses a unique model (e.g. mathematical computation and/or algorithm) in order to accurately estimate the future kinematic state of the bicycle 1704 (e.g. target or track). Assuming a 2-dimensional model, the maneuvering components will be either a down range change or a cross range change. A down range change is when a target is speeding up or slowing down towards or away from the S-MMS 18B in $D_{TRAVEL}$ (see FIG. 17). A cross-range change means the target is turning or altering direction perpendicular to $D_{TRAVEL}$.

In one aspect, the STF 500 of the S-MMS controller 110B chooses the model the filter uses to estimate the future state of the bicycle 1704 from multiple possible/available models. The chosen model should accurately match the real maneuvering/movement of the target so the SAC 302B has an accurate awareness of the target and other surroundings (i.e. an accurate situational awareness map). Since the movement of the target is not known ahead of time, an accurate model cannot be selected ahead of time in this example, and errors in state estimation may occur. Adding process noise to model the target maneuvers or using a maneuver detector to adapt the filter are both techniques that can be used. However, detection delays and large estimation errors during maneuvers can be a problem with these approaches, particularly for S-MMSs 18 which often maneuver in extremely close proximity to targets. One example of this approach is the Multiple Hypothesis Tracking (MHT) theory. However, using the MHT approach is similar to taking a Monte Carlo simulation approach, which is basically incrementing possibilities of where the target is, or might be maneuvering to, by propagating (estimating) every possible outcome. This has been found to be computationally very expensive and performs poorly when high precision is needed. Therefore, other methods can be considered for application on S-MMSs 18.

An Interacting Multiple Model (IMM) estimator provides superior tracking performance compared to a single filter. The IMM is based on running several, select models in parallel to estimate the maneuvering target's states. Unlike some maneuver detection systems where only one filter typically is used at a time, the IMM uses multiple filters concurrently. In an IMM, each model is calculated by a unique filter instance. In one three-model example, one filter instance models a constant velocity target (1), another filter instance models an acceleration in the longitudinal axis (2), while another filter instance models an acceleration in the lateral axis (3). Switching between these models during each sample period is determined probabilistically based, in part, on the output estimates of state (1504) from each filter instance.

In an embodiment, a filter likelihood value (e.g. output from the output estimates of state 1504 step FIG. 15) is compared to a model confidence interval predicted at time $T_{k-1}$ (e.g. from output estimates 1306) for a given object kinematic model. A model confidence interval (sometimes referred to as a validation region) is an interval of plausible values of an unknown population parameter (e.g. filter likelihood in this example), computed from the statistics of observed data, which defines a range of expected values for the parameter. If the filter likelihood value at time $T_k$ is within the model confidence interval (as predicted at time $T_{k-1}$), then model probability may be increased. If the filter likelihood value is outside the model confidence interval, then model probability may be decreased. The model probability is a value indicating a probability that the current model is the correct model for estimating a state of an object. Thus, the model probability is a value indicating a level of confidence that the measured object's kinematic state when observed at time $T_k$ (e.g. by a sensor) is within a range of expected values for that type of state (e.g. where the state is distance, speed, etc.) when predicted at time $T_{k-1}$. The range of expected values may be based on, for example, one or more prior measurements, uncertainty values for a sensor, and/or one or more values stored in memory.

The overall state estimate output from an IMM may be a weighted combination of the estimates from the three individual filters or two of the three individual filters based on the likelihood that a given model is the correct maneuvering target model (e.g. the model probability). Alternatively, the overall state estimate output may simply be the estimate output of a single filter based on the probability that a given model is the correct maneuvering target model. Of course, two or more models may be used in other examples, and the overall state estimate may be the estimate of a single filter or a weighted combination of estimates from two or more filters.

IMM Estimator

An Interacting Multiple Model (IMM) estimator runs several, select models in parallel to estimate a maneuvering target's state. The IMM estimator process consists of three main steps:

1. Initialize each separate recursive filter instance with prior knowledge of state (1204 FIG. 16) that represents the best current estimate of state.
2. Run the separate recursive filter instances for each model in parallel which creates multiple predictions of state for some time in the future.
3. Use the multiple predictions of state created in step 2 to select or calculate a single estimate of state, to be used by one or more process of the S-MMS controller 110B, based on the likelihood that each prediction of state matches the actual behavior of a target.

Figure 19:
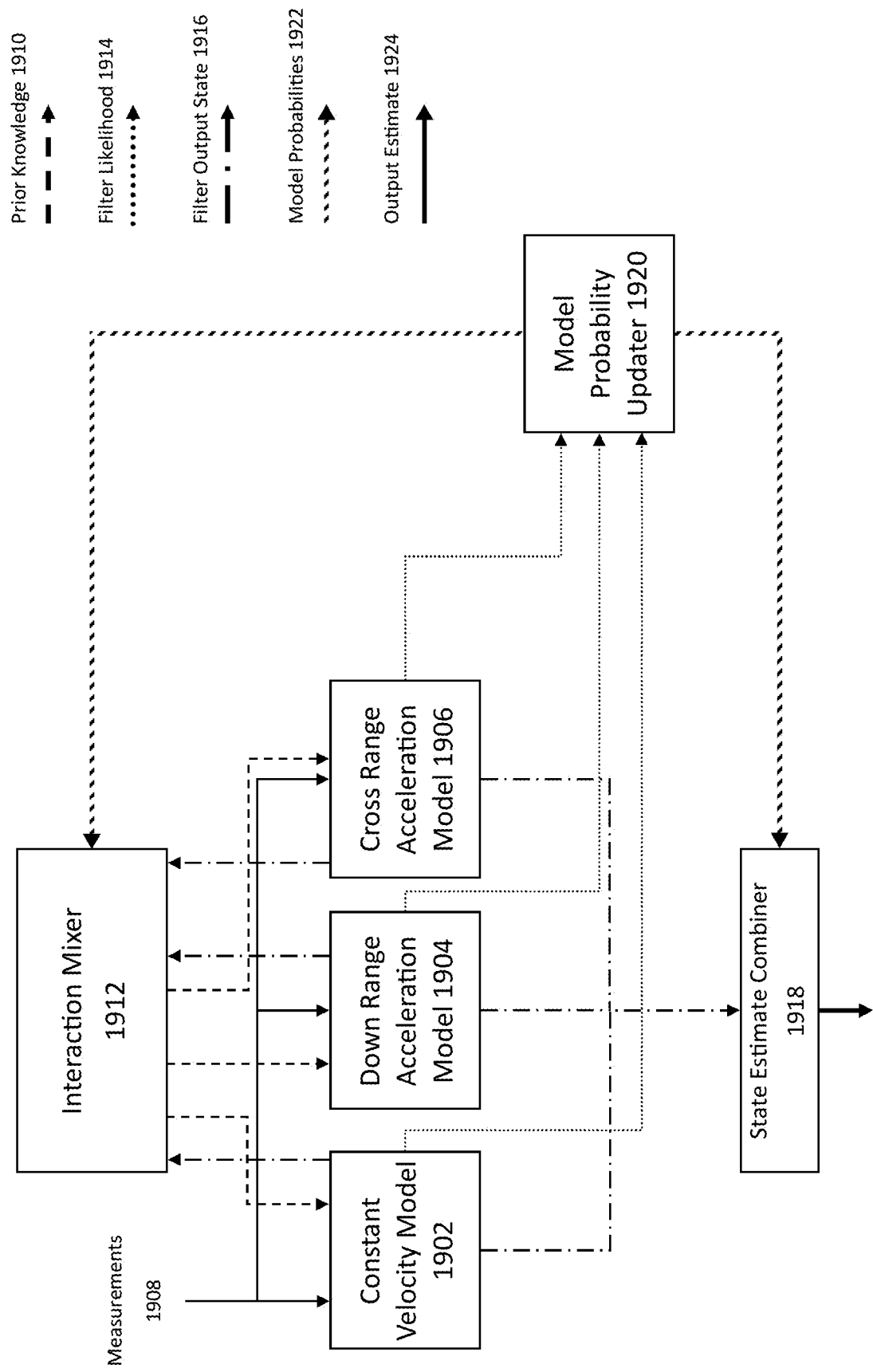
FIG. 19 depicts a block diagram of a 3-model Interacting Multiple Model (IMM) estimator embodiment.
Figure 20:
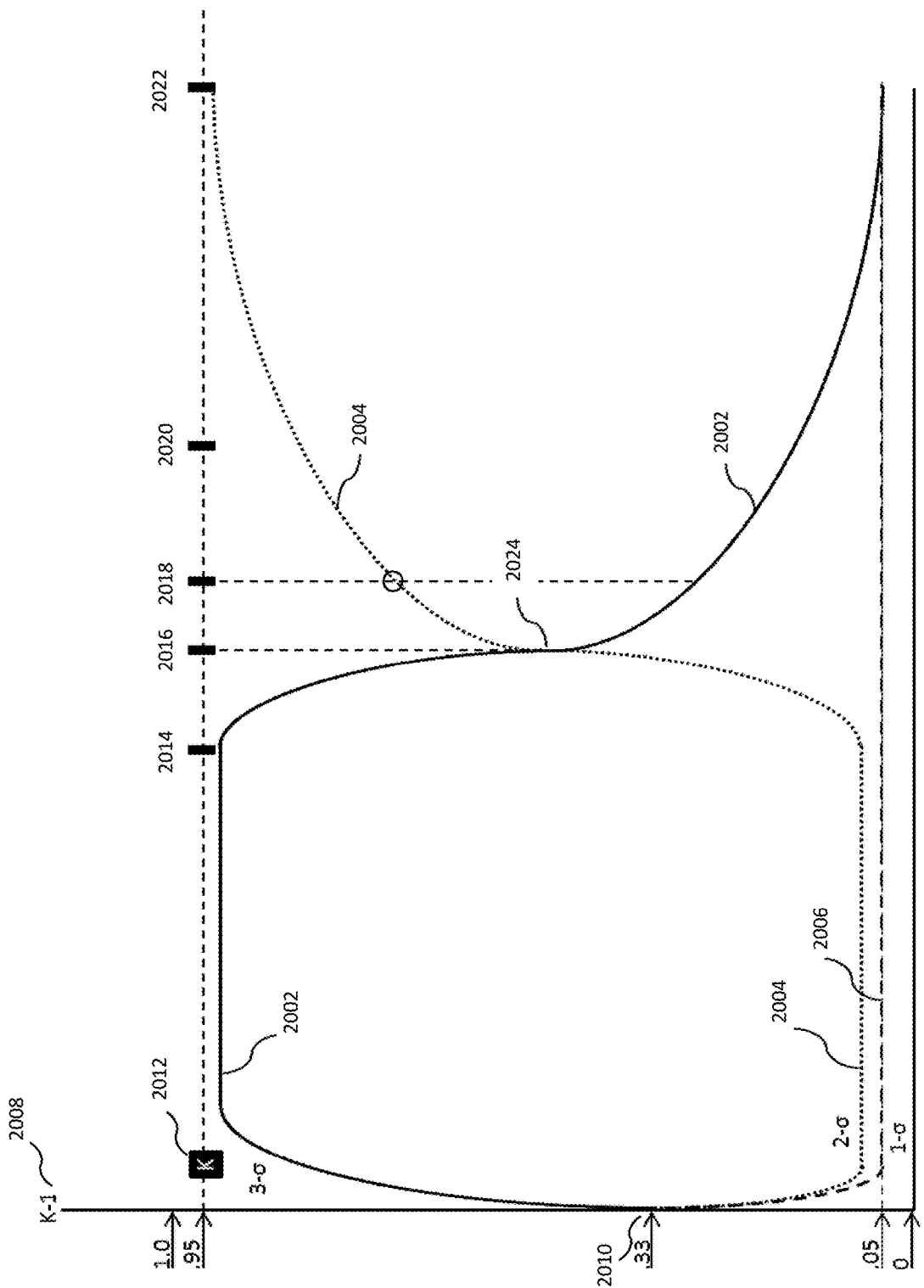
FIG. 20 depicts an IMM running 3 models, with 1 of the 3 models running at the highest model probability.

An IMM estimator with three models is depicted in FIGS. 19 and 20. The IMM estimator, as described, may be part of and executed by sensor track fusion 500 of the SAC 302B on the S-MMS controller 110B. Each model of the IMM estimator is used by a separate recursive filter instance as previously disclosed (FIG. 16) that runs the one or more state estimation algorithms from the model. Alternative embodiments may use more or less and different models as appropriate for a given application.

FIG. 19 depicts a block diagram of a 3-model IMM estimator embodiment executed by the STF 500. In the examples of FIGS. 19 and 20 below, the STF 500 performs the actions. In an example embodiment, the IMM estimator executed by the STF 500 is configured to use two or more object kinematic models as state estimation algorithms for determining two or more possible kinematic states of a detected object. The models in the example of FIG. 19 include a constant velocity model 1902, a down range acceleration model 1904, and a cross range acceleration model 1906. Though, more models, fewer models, or other models may be used. Each model 1902, 1904, and 1906 represents a possible maneuver or trend that a target of the SAC 302B might be expected to perform. The models 1902, 1904, and 1906 may be predetermined models (e.g. stored in memory 120 at design time or otherwise). Each model accepts measurements 1908 from one or more sensor reports (e.g. 371-376 FIG. 3), uses one or more mathematical equations, one or more sets of algorithms, and/or data from memory 120, and uses prior knowledge of state 1910 from interaction mixer 1912 to estimate a target's future state.

In the case of the constant velocity model 1902, a recursive filter (e.g. FIG. 16) is executed by the STF 500 with one or more dynamic algorithms that assume the target in front of the S-MMS 18B is traveling in the same direction and at the same speed as the S-MMS 18B, keeping the distance and direction between the two constant. In parallel, the down range acceleration model 1904 is a model calculating a down range maneuver, in this case a change in velocity down range of the target or stated simply, a target in front of the S-MMS 18B that is no longer at a constant velocity; it is speeding up or slowing down. The cross-range acceleration model 1906 similarly is used by a filter instance of the STF 500 to estimate another set of maneuvers, in this case cross-range maneuvers, such as turning left or right.

Each of the 3-model processes (e.g. 1902, 1904, and 1906) operate independently and output a filter likelihood 1914 and a filter output state 1916 (e.g. predicted state estimate $\hat{X}_{k|k-1}$ and predicted uncertainty estimate $P_{k|k-1}$ from the output estimates 1306 FIG. 16). The filter likelihood 1914 includes one or more values representing the difference between filter predictions and measured/observed data ($Y_k$), including but not limited to the updated uncertainty estimates ($P_{k|k}$), a difference between estimated and updated uncertainty estimates, and/or filter residuals (e.g. as calculated by Eq. 17). The filter likelihood 1914 is an output estimate 1504 from the update step 1304 FIG. 16 in one example. Additionally or alternatively, the filter likelihood 1914 may be a value determined by a logical comparison of measured/observed data ($Y_k$) to one or more uncertainty estimates (e.g. $P_{k|k-1}$) indicating that a reading is received outside of the uncertainty estimate for a given filter or a calculated value indicating a probability that an estimate of state from a given filter is correct. The filter likelihood 1914 is sent to the model probability updater 1920.

In many implementations, a larger filter likelihood 1914 value does not correspond to higher confidence in the filter output state 1916. For example, if filter residuals (e.g. as calculated by Eq. 17) or filter uncertainty estimates ($P_{k|k}$) are used as filter likelihood 1914 values, then smaller numeric values correlate with a higher confidence in the model.

The filter output state 1916 in the given example is the predicted kinematic state estimate of a track at a future time (e.g. predicted state estimate $\hat{X}_{k|k-1}$ from FIG. 13). In an embodiment, the filter output state 1916 may additionally include a predicted uncertainty (e.g. predicted uncertainty estimate $P_{k|k-1}$ from FIG. 13). The expectations of a cross-range maneuver will have uncertainty terms (e.g. variance values in the covariance matrix) that are typically low values for travel in the same direction. But, the uncertainty in the cross range can be much larger. This discrepancy in uncertainty expectations is a function of the anticipation of a right or left maneuver and the model algorithms themselves. Conversely, the down range maneuver anticipates a potential change in distance to the target. This results in an uncertainty that is larger in the down range component than in the cross-range component.

The interaction mixer 1912 initializes each separate recursive filter instance with prior knowledge of state 1910 (e.g. prior knowledge of state 1204 FIG. 16) that represents the best current estimate of state of the multiple models. The interaction mixer 1912 accepts model probabilities 1922 from the model probability updater 1920 and filter output states 1916 from each model and outputs prior knowledge of state 1910 (sometimes referred to as mixed states) to each of the filter processes of the IMM estimator (e.g. for each model 1902, 1904, 1906), each of which calculates uncertainty estimates for that individual model. The prior knowledge of state 1910 output from the interaction mixer 1912, in an embodiment, may additionally include a confidence interval that each model is expected to meet (e.g. 1-sigma, 2-sigma, 3-sigma or 80%, 90%, 95% or other confidence intervals).

The model probabilities 1922 may be a probability weighting that each model is the correct model. In an embodiment of a three-model IMM estimator as depicted, the model probabilities 1922 may simply be a ratio of 0.6:0.3:0.1 (which correlates to 60%:30%:10%) where each number of the ratio represents the probability that a particular model is the correct model at a specific point in time (i.e. iteration of the IMM estimator). The model probability is defined in one example from zero to one, with one being a higher probability level and zero being a lower probability level. The interaction mixing process is further disclosed below. In an embodiment, the initial (e.g. startup) model probabilities 1922 are set equally at 33.33-percent (0.3333) or alternately two model probabilities at 33.33-percent and one model probability at 33.34-percent. This is a design time choice and could be chosen to be any other distribution, as long as the sum of the three probabilities add up to 100-percent or at least approximately 100-percent (e.g. 1.0).

A state estimate combiner 1918 receives filter output states 1916 from each model and uses model probabilities 1922 received from the model probability updater 1920 to determine which models' outputs (e.g. filter output states 1916) to output as an output estimate 1924. In an embodiment, the state estimate combiner 1918 selects only one of the three filter output states 1916 received to be output as the output estimate 1924 by selecting the model with the best model probability value for which to output state for the output estimate. In this example, the best model probability value is the highest model probability value.

In an embodiment, the state estimate combiner 1918 uses the received model probabilities 1922 to combine the filter output states 1916 into a single output estimate 1924. In an example, the filter output states are combined into the single output estimate 1924 by calculating the sum of the product of the model probability and the filter output state (e.g. predicted state estimate and/or predicted uncertainty estimate, respectively) for each model using equations 18 and 19:

$$\hat{X}_{k|k-1} = \Sigma u_m \hat{X}_{k|k-1_m} \qquad \text{Eq. 18}$$

$$P_{k|k-1} = \Sigma u_m P_{k|k-1_m} + s_k \qquad \text{Eq. 19}$$

Where $u_m$ is the model probability value (between zero and one) of model m (from model probabilities 1922), $\hat{X}_{k|k-1_m}$ is the predicted state estimate of model m (from filter output state 1916), $P_{k|k-1_m}$ is the predicted uncertainty estimate (from filter output state 1916), and $s_k$ is a spread of means term which is used to account for propagation of errors in the state estimate calculation of Eq. 18. The output estimate 1924 is used by a track management data association process (e.g. a JPDA) as previously disclosed.

Model Probability Updating

A model probability updater 1920 determines one or more model probabilities 1922 based on filter likelihood values 1914 calculated by each model and/or filter likelihood values read from memory 120. In an embodiment, the model probability updater 1920 uses a voting scheme to determine a confidence level in each model (1902, 1904, 1906) based on filter likelihood values 1914 received from each model's recursive filter process. As an example, if the target is maneuvering right or left of the original track, the model probability value for the cross-range acceleration model 1906 may be increased (e.g. from 0.2 to 0.6) and the model probability value for the other models (1902 and 1904) may be decreased by the model probability updater 1920 accordingly.

The updated model probabilities 1922 are sent to the state estimate combiner 1918 and interaction mixer 1912. The updated model probabilities 1922, in this example, cause the output estimate 1924 of the IMM estimator to more closely match the output of the cross-range acceleration model 1906, and therefore more closely match the target behavior. Regardless of the models employed, the goal in this step is keeping the measured values (i.e. measurements 1908) within expected values (e.g. output estimate 1924). The output of the model probability updater 1920 is transmitted back to the interaction mixer 1912 and to the state estimate combiner 1918.

FIG. 20 depicts the interactions of the three models' model probability values (i.e. of model probabilities 1922) in the 3-model IMM from FIG. 19 where the y-axis is the model probability value and the x-axis is time. The model probability is defined as the probability that a given model accurately predicts the behavior of a target being tracked. The model probability may be specified as a number from zero to one, where zero is a low probability and one is a high probability, or in another manner. The model probability is calculated by the model probability updater 1920 (FIG. 19). The time axis is represented in two ways, the time scale (T) and the k scale; both represent discrete time in increments of identical units (e.g. 1-second for T or 1-filter cycle for k). At the very beginning (origin), time equals zero, which is a start of the recursive filter processes and the IMM estimator. When T=0, k=(−1), which is represented as k−1.

Three lines are depicted in FIG. 20, representing a model probability of a constant velocity model 2002, a model probability of a down range acceleration model 2004, and a model probability of a cross range acceleration model 2006. The models may correspond to the models 1902, 1904, and 1906 of FIG. 19 in one example. The IMM estimator begins operating at time k−1 2008 with a starting model probability 2010 of 0.33 for each of the three models. This is typically a design time setting retrieved from memory 120. Several recursive steps (e.g. filter cycles as depicted in FIG. 16) are run in this example for the IMM estimator (e.g. of STF 500 of the SAC 302B) to ascertain which model best fits the one or more received sensor reports (e.g. 371-376 FIG. 3).

In some embodiments, the design time model probability setting may be biased toward a certain model. In such an embodiment, one of the models would start at a higher model probability value, for example 0.80 (higher probability) for model probability 2002, and each of the other two models would start at a lower model probability value, for example 0.1 each for model probabilities 2004, 2006. In an alternate embodiment, instead of using three probabilities that are each weighted the same at the beginning, the IMM estimator may use two models or more than three models, such as two models weighted at 0.5 or otherwise, or four models weighted at 0.25 or otherwise, etc. (e.g. equal or other values or characteristics representing 100 percent).

At time k−1 2008, the IMM estimator uses prior knowledge of state (e.g. as loaded from memory 120) and makes a prediction of state estimate and uncertainty estimate at time k 2012 or T+1 for each model (e.g. 1902, 1904, 1906). The IMM estimator outputs a prediction of state estimate and uncertainty estimate (e.g. output estimate 1924) as to where the target will be at the next time increment, in this case at k, based on starting model probabilities (e.g. 1922) retrieved from memory.

An observation is made where one or more measurements are obtained as sensor reports. Sensor reports are used by the update step 1304 (FIG. 13) of the filter processes (e.g. of models 1902, 1904, and 1906 FIG. 19), in combination with the predicted state estimates and predicted uncertainty estimates for each filter, to determine updated state and uncertainty estimates and calculate filter likelihood values 1914, which are output at the output estimates of state 1504 step of each filter. The model probability updater 1920 then uses the received filter likelihood values 1914 to update the model probabilities 1922. Next, time is incremented, and the process is recursively repeated, but with updated state and uncertainty estimates used as prior knowledge of state.

At each time step, the filter likelihood 1914 for each model is compared to a model confidence interval. If the received filter likelihood value for a model is within the model confidence interval, then the model is likely correct, and the model probability updater 1920 may increase the model probability of the model. Alternatively, if the received filter likelihood value for a model is outside of the model confidence interval, the model probability updater 1920 may decrease the model probability of the model. In this way, the model probability updater (of STF 500) can adjust each model's model probability which is sent to the state estimate combiner 1918 and, by doing so, influence the final output estimate 1924 of the IMM estimator.

Referring again to FIG. 20, between times 2012 and 2014, one or more received sensor reports confirm that a constant velocity model has a high filter likelihood 1914 and therefore a high model probability as determined by the model probability updater 1920. Similarly, the predictions of the down range acceleration and cross range acceleration models output filter likelihood values that cause a low model probability that they are the correct models. A voting scheme of the model probability updater 1920, based on received filter likelihood values, uses the received filter likelihood values to increase and/or decrease the model probabilities for each model (y-axis value) appropriately at each time step. However, beginning during the time period 2014-2022, many measurements appear outside of expectations for the constant velocity model. Said another way, the difference between the predicted and measured state of the track begins to increase for the constant velocity model and decrease for the down range acceleration model, resulting in changes to the received filter likelihood values for each model.

At time 2016, the model probability of the constant velocity model 2002 and the model probability of the down range acceleration model 2004, as calculated by the model probability updater 1920, are equal at 0.5 2024. The state estimate combiner 1918 requires a better than equal probability to shift models. Therefore, at time 2018 when the model probability of the down range acceleration model 2004 is greater than the model probability of the constant velocity model 2002, STF 500 switches the models to the down-range maneuver model. The down-range filter takes over and is used as the basis of the output estimate 1924 for SAC 302B processes and S-MMS controller 110B actions (e.g. by STF 500).

Over the next number of measurements, up to time 2022, the change to a down-range maneuver model is continually validated as the target of interest continues to accelerate away from the S-MMS 18. At a certain threshold, STF 500 may drop the target as a concern and delete the track. In some embodiments, the threshold may be based on distance from, time to impact of, or a calculated threat priority value with reference to the S-MMS 18. The same functions occur when a target turns and the model probability of a cross range acceleration model 2006 is affected by a cross-range maneuver.

Figure 21:
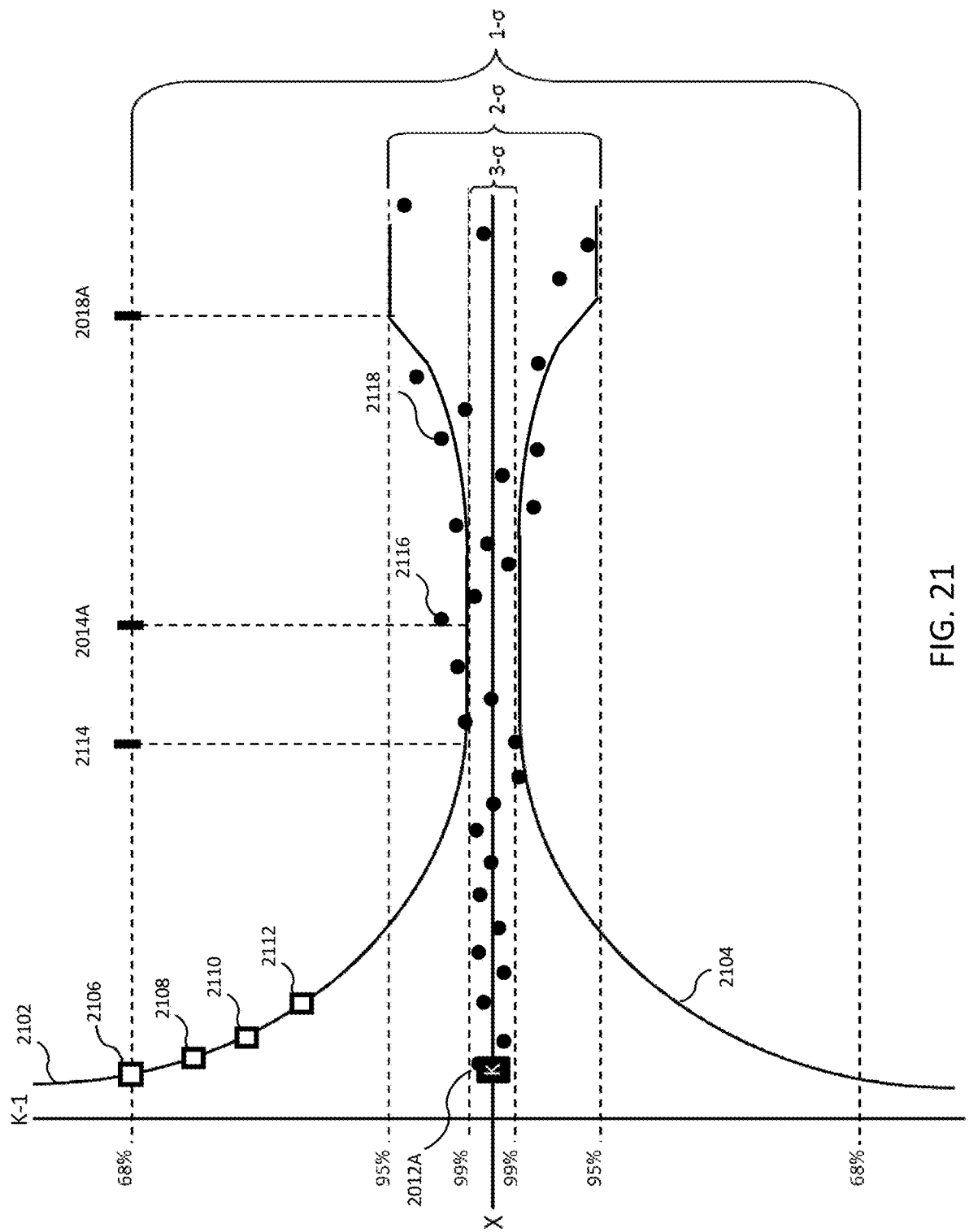
FIG. 21 depicts a changing model confidence interval for a model of an IMM.

FIG. 21 illustrates the decision process that the model probability updater 1920 uses to determine a model probability for a given model of the IMM estimator. It depicts changes in a model confidence interval (e.g. of the IMM estimator) over time, which is determined based on received filter likelihood values, for a specific model of an IMM estimator running on the S-MMS controller 110B (e.g. the STF 500). In an embodiment, this decision process may alternatively be completed as part of the interaction mixer 1912. A model confidence interval is a statistical interval estimate, computed from observed data, that is believed to contain the true value of an unknown population parameter (in this case the filter likelihood 1914). A confidence interval is typically defined by two or more confidence levels (e.g. a first level and a second level, which may be expressed as a positive confidence level and a negative confidence level, a high confidence level and a low confidence level, or otherwise) that quantify the interval. In the example of FIG. 21, the y-axis is the model confidence level, and the x-axis is time.

The model confidence level can be expressed in terms of statistical confidence levels or in terms of uncertainty levels. When expressed in terms of statistical confidence levels, the model confidence levels range from no confidence (0% confidence) to 1-sigma (e.g. 68% confidence) to 2-sigma (e.g. 95% confidence) to 3-sigma (e.g. 99% confidence) that received filter likelihood values fall within expectations (i.e. the model confidence interval). "Sigma" stands for standard deviation. So, a 1-sigma model confidence level means the received value is expected to fall within the model confidence interval defined by the mean plus one standard deviation and the mean minus one standard deviation. Therefore, the model confidence level can also be expressed in terms of model uncertainty level (e.g. 5 meters) calculated from population parameters such that the model confidence interval can equivalently be described in terms of a numeric range (e.g. 0 meters+/−5 meters) for a given population. In an embodiment, the model probability updater 1920 uses a model confidence level to determine a model probability. Other model confidence levels may be used, such as percentages or other values that are not specifically set at a particular sigma (e.g. 0-100%, 0-1, or otherwise).

In an example, FIG. 21 depicts filter likelihood values as points and a model confidence interval for a model (e.g. the constant velocity model 1902 FIG. 19) of an IMM estimator over time. In the example, filter likelihood 1914 values are reported to the model probability updater 1920 as the first term of the filter residuals matrix (e.g. calculated using Eq. 17) for the model, where the first term represents the position (r) residual. Therefore, a data point depicted directly on the X-axis (Y=0) represents a received filter likelihood value of zero where one or more sensor reports exactly match a prediction of a filter running the chosen model. The zero filter likelihood value in this example is equivalent to a model uncertainty level of zero, or a perfect model statistical confidence level (i.e. greater than 3-sigma or 99% confidence level). That is, a model uncertainty level of zero means there is no uncertainty and, therefore, complete or almost complete certainty.

The time axis is represented in two ways, the time scale (T) and the k scale; both represent discrete time in increments of identical units (e.g. 1-second or 1-filter cycle). At the very beginning (origin), time equals zero, which is a start of the recursive process. When T=0, the k=(-1), which is represented as k-1. The lines 2102 and 2104 depict the bounds of the model confidence interval. The model confidence interval is defined by a first model confidence level over time (which are positive or high values in this example) and a second model confidence level over time (which are negative or low values in this example), where the range between the first and second model confidence level is the confidence interval. FIG. 21 depicts an increasing model confidence level trend over time.

Each filter runs a select model and has one or more filter setup values stored in memory 120. Filter setup values are used for one or more calculations of the filter. Within the filter set up values, there are values for starting model confidence levels (e.g. model uncertainty levels or statistical confidence levels) stored in memory 120. The starting model confidence levels in one example are determined from a measure of potential error in a measurement or test to be made by a device (e.g. plus-or-minus 5 meters). The starting model confidence levels may be uncertainties with respect to the hardware (e.g. sensors) or anything that can be measured and tested by one or more models of the SAC 302B. In an embodiment, starting model confidence levels are stored as sigma values (1, 2, or 3 sigma values). These stored values represent starting expectations of uncertainty for measurements that are used by each model at time k-1.

Each state transition in the filter process (1304 FIG. 16) of a given model allows the S-MMS controller 110B to adjust the next model confidence level by a predetermined value (step size) so that it better matches the received data (e.g. sensor reports 371-376 FIG. 3). Adjusting a model confidence level results in adjusting both the upper and lower model confidence levels in one example, since both the upper and lower model confidence levels are adjusted by the same increment in this example. In one example, the lower model confidence level is a negative value (e.g. -2-sigma) corresponding to the upper model confidence level, which is a positive value (e.g. +2-sigma). In this example, determining the model confidence level results in both the upper and lower model confidence levels since the lower model confidence level is a negative value corresponding to the positive value of the higher model confidence level. In another example, a starting model confidence interval is a specified interval, either the high or low model confidence level is determined, and the opposing model confidence level is determined based on the determined model confidence level and the starting model confidence interval taken into account (e.g. the determined high or low confidence model level minus or plus, respectively, the starting model confidence interval). Alternately, both model confidence levels may be determined separately.

One or more model confidence levels are determined by a rules engine based on measurements received and compared against model (e.g. filter) predictions and is provided to the filter as prior knowledge 1910. In the example depicted in FIG. 21, each value of model confidence level (e.g. rectangles 2106, 2108, 2110, 2112) along the upper model confidence interval limit line 2102 is reduced by model confidence level increments (the interval is reduced, leading to increased confidence/confidence levels) as depicted as additional filter cycles are completed. In a single model system, this is called adaptive filtering. The filter likelihood values should fall within the model confidence interval (e.g. model confidence interval limit lines 2102, 2104).

In the depicted example, at the time corresponding to time 2114, the filter likelihood values are now all within the model confidence interval. This means the model confidence level stabilizes until such time as one or more filter likelihood values fall outside the stabilized model confidence interval (e.g. depicted by model confidence interval limit lines 2102, 2104). The IMM estimator may accept some percentage of outliers (filter likelihood values outside of the model confidence interval), filter likelihood value 2116 as an example. The number of acceptable outliers is a value set at design time in filter operational or setup parameters stored in memory 120.

FIGS. 20 and 21, when viewed together, depict a more complete view of the 3-model IMM operating in terms of changing model probabilities (e.g. y-axis of FIG. 20), model confidence levels (e.g. y-axis of FIG. 21), filter likelihood values (e.g. points of FIG. 21), and initial filter setup values as part of the SAC 302B on the S-MMS controller 110B. Between times corresponding to model confidence level 2106 and time 2114, received sensor reports match estimates of state predicted by a specific model of the IMM estimator. This results in small residual values output from the filter process for that model as filter likelihood values.

At each time step (or filter increment) the filter likelihood value (e.g. the points in FIG. 21) are compared to the expected model confidence interval (e.g. bounded by model confidence interval limit lines 2102 and 2104 FIG. 21). If the received filter likelihood values fall within the model confidence interval, then one or more model confidence levels (i.e. that defines the model confidence interval) may be increased (e.g. from 2-sigma to 3-sigma). Alternatively, if the received filter likelihood values fall outside of the model confidence interval, then one or more model confidence levels may be decreased (e.g. from 2-sigma to 1-sigma). The change in model confidence level may be calculated based on filter likelihood values directly or determined using a Markov chain voting scheme where filter likelihood values outside the model confidence interval may cause a predefined change in one or more model confidence levels.

The model confidence level may be any value which represents the confidence in the given model. In an embodiment, the model confidence interval is symmetric about the X axis, and the model confidence level can be defined as an absolute value and be used with a positive and negative modifier to define the symmetric model confidence interval. In an embodiment, the first and second model confidence levels may not have the same absolute value, and the model confidence interval may not be symmetric about the X axis, and/or the confidence interval limit lines may not have the same shape.

As an example, referring to FIG. 21 during the time period 2012A to 2014A, the model confidence interval (i.e. the area between the first and second model confidence levels), is decreasing as multiple filter likelihood values are received, which fall inside the model confidence interval. Between times 2014A and 2018A, multiple filter likelihood values (e.g. 2116, 2118) are received, which fall outside of the model confidence interval (i.e. outliers). As the number of actual outliers received exceeds a predefined number of acceptable outliers (an outlier threshold) retrieved from memory 120, these actual outliers cause the model probability updater 1920 to decrease the first and/or second model confidence levels by a predetermined value until the filter likelihood values again fall within the model confidence interval.

This dynamic shift in values allows the IMM estimator to process what would have been otherwise unexpected measurements. If all filter likelihood values that did not conform to the expectations of one or more SAC 302B models were simply to be discarded as outliers, the S-MMS controller 110B would be making decisions on partial information. As the model confidence interval is widened by the IMM estimator, the model probability decreases and ultimately causes a model switching event at the time corresponding to filter likelihood value 2018 (ref. FIG. 20) in the depicted example.

In a further explanation of FIG. 21, assume that after several filter cycles, the model confidence interval at time 2018A is much larger (e.g. a model confidence level of plus or minus 2-sigma) than the previously discussed, stable threshold (e.g. a model confidence level of plus or minus 3-sigma at time 2014A). In an example, where filter likelihood values are received as the first element of the filter residuals matrix, the old model confidence interval at time 2014A allowed a ±5-meter filter residual, where 5-meters is the model uncertainty level that corresponds with a 3-sigma model statistical confidence level. But, at time 2018A, the received filter likelihood value (e.g. 2118) is in the range of ±8-meters. Therefore, the model confidence level is reduced to 2-sigma, which allows the received filter likelihood values to fall within the model confidence interval.

In this example, the IMM estimator is doing its job, making estimates of state for the model and determining the model confidence level. In the closed loop control system of the IMM estimator, the model confidence level values allow the STF 500 of the S-MMS controller 110B to make better informed decisions based on one or more rules and determine the model probability based on model confidence level. In an example, the model probability is determined by equation 20:

$$u_m = \frac{\Lambda_m}{\Sigma \Lambda_m} \quad \text{Eq. 20}$$

where $u_m$ is the model probability for model m and $\Lambda_m$ is the model confidence level for model m.

In an embodiment, one or more model confidence levels (or confidence intervals) may be used by the S-MMS controller 110B to enable, increase, disable, decrease, or modify the behavior, operation, or functionality of the S-MMS 18 or S-MMS controller 110B. For example, the S-MMS controller 110B may disable, reduce, or modify one or more operations or functionality of the S-MMS 18 when a filter likelihood value is outside of a confidence interval of one or more of the models. The S-MMS controller 110B may enable, increase, or modify one or more operations or functionality of the S-MMS 18 when a filter likelihood value is within a confidence interval of one or more of the models.

In a non-limiting example, if a certain maneuver of an S-MMS 18 requires a high model confidence level, e.g. maneuvering through a crowd of people with less than 6-meters of room to maneuver, then traveling through the crowd would be allowed by the S-MMS controller 110 at time 2014A (FIG. 21). However, at time 2018A with a lower model confidence level (e.g. an acceptable filter residuals value of +/−8-meters), maneuvering in the crowd may not be allowed by the S-MMS controller, as the confidence of one or more tracks may not support safe navigation of the crowded sidewalk. At the same time, the same system with the same model confidence level at time 2018A would support navigation in an empty parking lot.

The S-MMS controller 110 may limit maneuvering directions of travel, speeds, and/or use of features of an S-MMS 18 based on the model confidence level(s) of one or more filter processes or IMM estimators of the SAC 302. Additionally or alternatively, the S-MMS controller 110B may allow navigation of the crowd at time 2018A but with intervention by the SAC 302B so that user input to the HMI 352 may be modified or overwritten by the S-MMS controller 110B prior to being sent to a motor controller 351 (FIG. 3). In some embodiments, the S-MMS controller 110B may autonomously maneuver by sending one or more control signals to a motor controller 351 based on outputs of the SAC 302B without input from the user via an HMI 352.

In another scenario of FIG. 21, at time 2018A something may have failed, or the target behavior is random, which is unlikely. In this example, it is assumed that there is a sensor health issue and, at time 2018A, the main ranging sensor has come loose in its mount. Prior to the sensor coming loose, the expectation of filter likelihood values was consistent (e.g. maximum filter residuals of +/−5-meters). The filter likelihood values seem now to be randomly larger and reasonably spaced in terms of error. But, the increased filter likelihood values have spread approximately equally to all three filters. This causes the model confidence level for each of the three models to decrease equally.

In this example, the calculated model probabilities for each model may remain constant, but the model confidence levels will decrease to encompass all of the received filter likelihood values. In this embodiment, the disclosed approach to an IMM estimator provides a means for shifting or adapting a model to cover measurements that were generated by a damaged sensor.

As previously disclosed, the decreased model confidence level in the operating model(s) may cause the S-MMS controller 110B of the S-MMS 18 to limit certain functions and/or change behaviors based on one or more rules established and stored in memory 120. Additionally or alternatively, the S-MMS controller 110B may send one or more messages or alerts via the HMI 352, to a connected smart device (e.g. 902 FIG. 9), or via a remote server (e.g. 910) to another person or service to alert them to a possible error condition.

Interaction Mixing

There are a number of working parts/blocks that make up the model decision process of the IMM estimator depicted in FIGS. 19-21. The interaction mixer 1912 (FIG. 19) is responsible for the IMM reinitialization process and calculates the prior knowledge of state 1910 (see also 1204 FIG. 16) values which are sent to each of the individual models (e.g. 1902, 1904, 1906) as an input to the prediction step of the filter (1206 FIG. 16) process of each model. The interaction mixing process occurs prior to the update step (1304 FIG. 16) of the filter instances.

An embodiment of an interaction mixer 1912 using a Markov chain voting scheme decision process is disclosed below. The interaction mixer uses filter output states 1916 and current knowledge of the one or more filters (in the form of model probabilities 1922) from the model probability updater 1920. These inputs are used for calculating the Markovian switching coefficients and are necessary to limit or manage the computational requirements placed on the S-MMS controller 110B.

The Markovian switching coefficients can be described for r models, where r is an integer greater than zero (e.g. models $M^i$, $M^j$, ... $M^r$). Each model has model switching probabilities which are the model probability (1922 FIG. 19) values at which the model will be used or not used, including switching from being used to not being used and switching from not being used to being used. To simplify the discussion, a 2-model system for i and j is discussed. The event that model j ($M^j$) is in effect during a sampling period ending at time $t_k$, is denoted by $M_k^j$. The dynamics and measurement for a linear system are given by:

$$x_k = \Phi_{k|k-1}^j x_{k-1} + G_{k|k-1}^j u_{k-1} + w_{k-1}^j \qquad \text{Eq. 21}$$

and $$z_k = H_k^j x_k + v_k^j \qquad \text{Eq. 22}$$

where $x_k$ is the system state at time $t_k$, $z_k$ is the measurement vector at time $t_k$, $\Phi_{k|k-1}^j$ is the state-transition matrix from time $t_{k-1}$ to time $t_k$ for $M_k^j$, $G_{k|k-1}^j$ is the noise input matrix, and $H_k^j$ is the observation matrix for $M_k^j$. The process noise vector $w_{k-1}^j$ and the measurement noise vector $u_k^j$ are mutually uncorrelated zero-mean (random) Gaussian processes with covariance matrices $Q_{k-1}^j$ and $R_k^j$ respectively.

The initial conditions for the system state under each model j are Gaussian random variables with mean $\bar{x}_0^j$ and covariance $P_0^j$. These prior statistics are assumed known, as also is:

$$u_0^j = Pr\{M_0^j\}, \qquad \text{Eq. 23}$$

which is the initial probability of model j at time $t_0$. As stated earlier, the prior statistics are set at design time in memory 120 or, in an alternate embodiment, reset at runtime by a function of the S-MMS controller 110B by updating the runtime filter variables as discussed below. Model switching is governed by a finite-state Markov chain according to the probability $\pi_{ij} = Pr\{M^j(k)|M^i(k-1)\}$ of switching from $M_{k-1}^i$ to $M_k^j$. The model switching probabilities (i.e. probability matrix), $\pi_{ij}$, are assumed known and an example for a two-model implementation is:

$$\pi_{ij} = \begin{bmatrix} .95 & .05 \\ .05 & .95 \end{bmatrix} \qquad \text{Eq. 24}$$

where $\pi_{1,1} = 0.95$ is the probability that the IMM will use model 1 given model 1 is the current model, $\pi_{1,2} = 0.05$ is the probability that the IMM will switch to model 1 given model 2 is the current model, etc.

For a 2 model IMM estimator, the inputs to the IMM estimator are:

$\hat{x}^1(k-1|k-1)$, the state estimate of the first model,
$\hat{x}^2(k-1|k-1)$, the state estimate of the second model,
$P^1(k-1|k-1)$, the predicted covariance of the first model,
$P^2(k-1|k-1)$, the predicted covariance of the second model, and
$\mu^{i|j}(k-1|k-1)$, model probability update on which model is likely running.

The above are all from the sampling period ending at time $t_{k-1}$, where $\hat{x}^1(k-1|k-1)$ is the state-estimate from filter 1 at time $t_{k-1}$ using measurements from time $t_{k-1}$, $P^1(k-1|k-1)$ is the corresponding state covariance matrix, $\hat{x}^2(k-1|k-1)$ is the state-estimate from filter 2 at time $t_{k-1}$ using measurements from time $t_{k-1}$, $P^2(k-1|k-1)$ is the corresponding state covariance matrix. Each of the filters use a different mixture of $\hat{x}^1(k-1|k-1)$ and $\hat{x}^2(k-1|k-1)$ for their inputs (i.e. prior knowledge 1910 of FIG. 19).

Scalar Biasing

An IMM starts with a standard, fixed set of models, design time variables, and run time variables (retrieved from memory 120) based on a standard set of expected results. For ease of notation and unless expressed otherwise, the discussions in this disclosure presume a variable includes a data value. Thus, the design time variables and the runtime variables include one or more data values unless expressed otherwise. In an embodiment, the probability matrix (see Eq. 3 above) for a two model IMM of STF 500, on the S-MMS controller 110B, includes two models and two probabilities for each model. The model switching probabilities (probability matrix) are initially equal at 50:50 based on design time variables retrieved by the S-MMS controller 110B from memory 120. Upon running the models, simultaneously, one of the models clearly rises to the surface as most probable (e.g. as voted by the model probability updater 1920 of FIG. 19). This rise is caused from certain data (e.g. one or more sensor reports) and expectations against predictions as previously disclosed.

Instead of operating the IMM for some number of cycles, making predictions of state and predictions of probability, to test which model best fits the current situation, the STF 500 can greatly shorten startup time by adding a learning step to the IMM startup process. In an embodiment, one or more signals may be received wirelessly via CNI 371 from one or more sensors, a remote server, or a connected device or from a wired connection (e.g. HMI). Each received signal contains one or more identifiers and one or more numerical values. In an example, one or more of the signals may be received wirelessly from a paired wireless device over a wireless connection, a wearable device, a radio frequency tag identification device, a Bluetooth Low Energy beacon transmitting device, or a connected Bluetooth smart device. The one or more signals may also be received from a computer or remote server via WiFi or cellular (e.g. 5G).

In an example, an identifier may comprise a code or alphanumeric string to identify a particular user, a user ID, a particular device, a particular location, a particular user state, a particular time, a particular process, a particular file, or a particular state of the environment. In an example, a numeric value may be a value input by a user, technician, or caregiver. In another example, a numeric value may be measurements, values from a user values file, an uncertainty value, or a value calculated by a processor on the transmitting device. Based on the identifier of the signal, the STF 500 of the S-MMS controller 110B uses the one or more numerical values to update one or more model switching probabilities of the model probability matrix, stored in memory 120, of an IMM estimator. In an example, the one or more numerical values are used by the STF 500 of the S-MMS controller 110B to calculate and store the one or more updated switching probabilities of the probability matrix. In another example, the one or more numerical values received are used directly as the updated model switching probabilities. The updated model probability matrix is then used by STF 500 at startup of an IMM estimator. This updated probability matrix causes more or less aggressive behavior of the SAC 302B, for example by one or more models run by STF 500.

As a non-limiting example, if a caregiver of an S-MMS 18 user were running an application on a smart device connected to the S-MMS (e.g. 902 or 932 FIG. 9) and the caregiver assesses the S-MMS user as in a certain state, an ability score may be entered via the user interface of the application based on previous experiences over time. This score may simply be one or more scalar values rating the abilities of the user at that time from 1-10, e.g. with 1 being the lowest and worst value and 10 being the highest and best value, in some embodiments. A scalar value is a real number with a magnitude, but not a direction (e.g. an integer or a fraction greater than zero). The score may then be transmitted by the smart device (e.g. via Bluetooth for example), received via CNI 371, and processed by the STF 500 of the S-MMS controller 110B to cause the STF or other process of the S-MMS controller to modify one or more model switching probabilities of the probability matrix of one or more IMM processes of the S-MMS controller.

For example, the STF 500 may decrease one or more of the model switching probabilities of the probability matrix if the STF receives a signal indicating the user is in a lower and worse state and increase one or more of the model switching probabilities of the probability matrix if the STF receives a signal indicating the user is in a higher and better state.

Additionally or alternatively, one or more signals may be received from one or more sensors of the S-MMS (e.g. sensor reports 372-375 FIG. 3) where a received signal is compared to a predefined threshold (e.g. from memory 120) and the result of that comparison is one or more numerical values. The STF 500 may increase or decrease one or more of the model switching probabilities of the probability matrix base on one or more numerical values from one or more sensors on the S-MMS (e.g. increase/decrease one or more of the model switching probabilities of the probability matrix based on the amount of light in the user's environment, a selected number of targets within a selected distance from or around the S-MMS, operational characteristics of one or more sensors, and otherwise). The STF 500 may otherwise increase one or more of the model switching probabilities of the probability matrix if the STF receives one or more signals indicating uncertainty for a characteristic of a model (e.g. uncertainty for a measurement) will be better (e.g. closer to 3-sigma than to 1-sigma) and decrease one or more of the model switching probabilities of the probability matrix if the STF receives one or more signals indicating uncertainty for a characteristic of a model (e.g. uncertainty for a measurement) will be worse (e.g. closer to 1-sigma than to 3-sigma).

Scalar scoring, by a user or caregiver at S-MMS controller 110B startup, can skew or bias the starting set of assumptions (i.e. values) used for the model switching probabilities to a different model. In an embodiment, memory 120 of the S-MMS 18 includes a user values file with calculated or entered information on user abilities, including values for reaction rate, user weight, performance, mental state, physical state, and stamina. This file may be associated with a unique user profile of that particular user and stored in a secure local memory (e.g. 120) and/or remote memory (910 FIG. 9). As an example, a subset of values from this file (e.g. Mental State=% and Physical state=%) may be used by one or more IMM algorithms running on the S-MMS controller 110B. These values might be considered subjective assessments. But, they can also be derived via sensor measurement (e.g. by UHM 510 based on one or more sensor reports) or a simple query to the user (e.g. a question such as 'how do you feel today?' posed to the user via HMI 352 or a connected smart device 902). These values, when entered at or prior to startup, may bias filter operations and therefore bias STF 500 behavior.

One or more values or other data entered by the user and received by the IMM estimator (executed by STF 500) are used by the IMM estimator at startup or pre-startup to bias the model selection by the IMM estimator (i.e. cause the IMM estimator to select one model instead of another model based on the user entered values, such as a more aggressive model or a less aggressive model) and/or set or initialize one or more probabilities of the probability matrix. A more aggressive model causes the STF 500 to take a more aggressive action based on one or more states and/or uncertainties determined during model operation (e.g. faster speed, faster or tighter turns, etc.). A less aggressive model causes the STF 500 to take a less aggressive action based on one or more states and/or uncertainties determined during model operation (e.g. slower speed, slower or larger turns, etc.). A more aggressive model may assume, for example, less aggressive states or data of targets/objects or the environment on which the model is based and/or more aggressive states or data of the S-MMS or the user on which the model is based, and/or other operating data that enables a more aggressive action to be taken by the STF (e.g. all new tracks are stationary objects until calculated otherwise over multiple filter cycles, so the S-MMS may operate at a faster speed). A less aggressive model may assume, for example, more aggressive initial states or data of targets/objects or the environment on which the model is based and/or less aggressive states or data of the S-MMS or the user on which the model is based, and/or other operating data that results in a less aggressive action to be taken by the STF (e.g. all tracks are moving towards the S-MMS initially, so the S-MMS may operate at a slower speed).

In one example, the IMM estimator may select a more aggressive model for startup or model initialization when one or more numbers entered by the user are more aggressive for a characteristic of the S-MMS 18B or the user or are less aggressive for a characteristic of the environment, and the IMM estimator may select a less aggressive model for startup or model initialization when one or more numbers entered by the user are less aggressive for a characteristic of the S-MMS or the user or are more aggressive for a characteristic of the environment. For example, the characteristic can be cognitive state or level of the user (e.g. causing the IMM estimator to select a more aggressive model for a higher cognitive state and a less aggressive model for a lower cognitive state), a level of tiredness or lack of tiredness of the user (e.g. causing the IMM estimator to select a more aggressive model for a lack of tiredness and a less aggressive model for a greater level of tiredness), an eyesight level of the user (e.g. causing the IMM estimator to select a more aggressive model for a better/greater eyesight level and a less aggressive model for a worse/lower eyesight level), a light level of the environment (e.g. causing the IMM estimator to select a more aggressive model for a higher or brighter light level and a less aggressive model for a lower or darker light level), a grade or level of the surface on which the S-MMS 18B is traveling (e.g. causing the IMM estimator to select a more aggressive model for a small grade or more level surface and a less aggressive model for a larger grade or less level surface), a turning capability of the S-MMS (e.g. causing the IMM estimator to select a more aggressive model for a better or tighter turning capability and a less aggressive model for a worse or wider turning capability), a standard speed of the S-MMS (e.g. causing the IMM estimator to select a more aggressive model for slower speed and a less aggressive model for a faster speed), another operational characteristic of the S-MMS, another user characteristic, another environment characteristic, etc.

As an example, the starting model probability (stored in memory 120 at design time) for a given IMM instance is 0.33 for each of the models in a 3-model system. If the user is feeling good, they may choose high numbers of one or more scalar values, such as for physical state and stamina via an HMI 352. The IMM estimator receives one or more values entered by the user and selects one model from among several models at startup or before startup based on the user entered values. For example, the IMM estimator selects a more aggressive model to start with when the one or more numbers entered by the user are more aggressive (e.g. indicating the user is in a higher/better state for operating the S-MMS), allowing navigation of tighter or more challenging environments with minimal S-MMS controller 110B (STF) intervention. Conversely, the IMM estimator selects a less aggressive model to start with when the one or more numbers entered by the user are less aggressive (e.g. indicating the user is in a lower/worse state for operating the S-MMS), where navigation of tighter or more challenging environments will be more difficult or require more S-MMS controller 110B (STF 500) intervention.

As a non-limiting example, biasing the model selection in FIG. 19 to treat all new tracks as accelerating (e.g. using either model 1904 or 1906) will cause the STF 500 of the S-MMS controller 110B to behave much more cautiously than treating all new tracks as constant velocity 1902. Therefore, in this way, even though STF 500 is using models based on vectors, users and caregivers may cause the STF to modify a filter operation based on scalar values they enter. In an embodiment, scalar values may resemble something that looks like a heat map with hot spots and cool spots. The unique aspect of this is enabling the STF 500 (e.g. via the IMM estimator) to set the model switching probabilities of the probability matrix and/or select a certain model based on data of the user, the user's challenges, the S-MMS 18B, and/or the environment. Thus, this method allows simple and meaningful interaction between a complex fusion engine operation of the SAC 302 (e.g. STF 500) and users of an S-MMS 18B.

In an embodiment, an application on a connected smart device (902 or 932 FIG. 9) sends a message wirelessly to a communication processor 216 on the S-MMS 18. The message in this example contains one or more scaler values. Though, other data may be used in other examples. The CNI 371 reports the message to the S-MMS controller 110B where it is used by one or more IMM embodiments of the SAC 302B (e.g. executed by STF 500). Based on the one or more scalar values in the message, one or more IMM estimators of the STF 500 select a degraded or alternative model for startup, and the IMM estimators will start each future boot cycle in that degraded or alternative model until one or more alternative scalar values is received and processed by the one or more IMM estimators. In other examples, data other than scaler values (e.g. words, symbols, non-scaler values, etc.) may be sent in a message and acted upon by one or more IMM estimators of the STF 500 to select and start in an alternative model or to set and start with different model switching probabilities of the probability matrix.

An added benefit of the use of scalar values to bias the IMM estimator is that it allows a faster, more accurate boot (startup) cycle, which is beneficial for S-MMS controller 110B applications. Further to the above approach, in another example, a care giver or technician knows their patient very well, understands their limitations, understands their challenges, and likely in a few minutes can assess the individual and rapidly configure the S-MMS controller 110 to operate in a mode commensurate with the capabilities of a user by transmitting the one or more values for use by an IMM estimator as described above.

With scalar biasing of the IMM estimator, IMM settings (e.g. the initial model probability values) are pre-configured to allow the STF 500 of the S-MMS controller 110B to operate at a much higher level (e.g. more closely fitting user needs) than would be otherwise be possible, particularly when the S-MMS controller 110 is cold started on a regular basis (e.g. multiple times per day).

Filter Setup and Configuration

Embodiments below disclose dynamically structured operations of an IMM estimator. One or more filter variables are used by one or more fusion engine processes of the SAC 302B (e.g. STF 500), on the S-MMS controller 110B, to make calculations and make decisions. Values for the filter variables are predetermined and stored in the memory 120 as filter setup values in one aspect. For ease of notation and unless expressed otherwise, the discussions in this disclosure presume a variable includes a data value. Thus, filter variables include one or more data values unless expressed otherwise.

Tables 1-5 below represent the filter setup values of one or more fusion engines (e.g. STF 500 of the SAC 302B) executing one or more IMM estimator instances based on data received for an embodiment with three sensors. The exemplary values of Tables 1-5 may be kept in one or more .h (ANSI C), .py (Python), or .m (Matlab) header files or other files, are used to configure the SAC 302 at design time, and are referred to as design time variables. Some of the data in these files cannot be altered after the initial build, while other data can. As an example, the number of sensors, sensor locations, etc. (e.g. Tables 1 and 2) cannot generally be updated on-the-fly during runtime. However, other data elements (e.g. Table 3-5) can be identified, copied, and stored in memory separately and used to modify one or more models on-the-fly, dynamically. These elements (e.g. Table 3-5) are referred to as run-time variables. Memory may be local 120 or remote 910 and may be a secure memory associated with an individual user as previously disclosed. The exemplary tables are as follows:

TABLE 1 includes sensor parameters in one example.

TABLE 2 includes filter noise values for a target in one example.

TABLE 3 includes filter operational values in one example.

TABLE 4 includes uncertainty initializing covariance terms in one example.

TABLE 5 includes user values in one example.

Typical variables that can be set at design time (referred to as design time variables) include (Tables 1-2):

TABLE 1

Sensor parameters: define the number of sensors on the S-MMS, their mounting locations on the S-MMS, the capabilities of each sensor, and the expected error/uncertainty of each sensor.

1. num_sensors = 3;
2. sensor_zaxis = zeros(1,num_sensors); % Z position of sensor(meters) with respect to center of S-MMS
3. sensor_xaxis = zeros(1,num_sensors);% X position of sensor(meters) with respect to center of S-MMS
4. sensor_xaxis = [0, 0, 0];
5. sensor_yaxis = zeros(1,num_sensors); % Y position of sensor(meters) with respect to center of S-MMS
6. sensor_yaxis = [0, 0, 0];
7. sensor_boresight = zeros(1,num_sensors); % Angle of sensor centerline(°) with respect to S-MMS X axis
8. sensor_boresight = [0, 0, 0];
9. sensor_boresight_corr = zeros(1,num_sensors);% Boresight correction wrt sensor centerline(degrees)
10. range_max(1) = 150;
11. range_min(1) = 10;
12. range_max(2) = 150;
13. range_min(2) = 10;
14. range_max(3) = 150;
15. range_min(3) = 20;
16. angle_max(1) = 20;
17. angle_max(2) = 40;
18. angle_max(3) = 20;
19. total_sensor_tracks(1) = 5; possible simultaneous, individual tracks from sensor
20. total_sensor_tracks(2) = 5;
21. total_sensor_tracks(3) = 5;
22. angle_sigma_sensor_deg(1) = 2.0; degree error in the bearing measured
23. angle_sigma_sensor_deg(2) = .25;
24. angle_sigma_sensor_deg(3) = 2.0;
25. r_sigma_sensor(1) = .01;% range error as a percent of the range measured
26. r_sigma_sensor(2) = .10;
27. r_sigma_sensor(3) = .01;

TABLE 2

Filter noise values: the initial values for the filter noise input matrices.

28. if filters == 1; if there is only one model then use these noise values in
the matrix
29. q(1,1) = .5;
30. q(2,1) = .5;
31. elseif filters == 2; if there are two models running then use these noise values in the matrix
32. q(1,1) = .01;
33. q(1,2) = .5;
34. q(2,1) = .01;
35. q(2,2) = .5;
36. elseif filters == 3; If there are three models running then use these noise values in the matrix
37. q(1,1) = .01;
38. q(1,2) = .5;
39. q(1,3) = .01;
40. q(2,1) = .01;
41. q(2,2) = .01;
42. q(2,3) = .5;

Values that may be used at runtime to modify the operation of the filters (often referred to as runtime variables in some examples) may include (Tables 3-5):

TABLE 3

Filter operational parameters: values which define key parameters such as units' conversion, number of models run, the maximum number of new tracks or rejections allowable, and one or more thresholds for a track.

43. deg2rad = pi/180;
44. rad2deg = 180/pi;
45. pass_criteria = 12;
46. filters = 3
47. sensor_measurements = 2;2 dim pos
48. rejectmax(1) = 3;
49. rejectmax(2) = 2;
50. rejectmax(3) = 3;
51. newtrack(1) = 2;
52. newtrack(2) = 2;
53. newtrack(3) = 2;
54. states = 6;2 DIM OUTPUT, POS/VEL/ACCEL
55. sensor_track_length = 14;
56. sensor_raw_number = 15;
57. tent_track_length = 8;
58. firm_tracks = 0;
59. for i = 1:num_sensors
60. firm_tracks = firm_tracks + total_sensor_tracks(i);

TABLE 4

Uncertainty initializing covariance terms: values which define the initial covariance parameters for filters. Reference FIG. 21 as an example of an uncertainty initializing covariance value which would be stored in this table.

61. posx_sigma_init_sensor(1) = 2.0;
62. posy_sigma_init_sensor(1) = 5.0;
63. Rx(1) = posx_sigma_init_sensor(1) * posx_sigma_init_sensor(1);
64. Ry(1) = posy_sigma_init_sensor(1) * posy_sigma_init_sensor(1);
65. velx_sigma_init_sensor(1) = 4.0;
66. vely_sigma_init_sensor(1) = 4.0;
67. Rvx(1) = velx_sigma_init_sensor(1) * velx_sigma_init_sensor(1);
68. Rvy(1) = vely_sigma_init_sensor(1) * vely_sigma_init_sensor(1);
69. accx_sigma_init_sensor(1) = 1.0;
70. accy_sigma_init_sensor(1) = 1.0;
71. Rax(1) = accx_sigma_init_sensor(1) * accx_sigma_init_sensor(1);
72. Ray(1) = accy_sigma_init_sensor(1) * accy_sigma_init_sensor(1);
73. posx_sigma_init_sensor(2) = 5.0;
74. posy_sigma_init_sensor(2) = 1.5;
75. Rx(2) = posx_sigma_init_sensor(2) * posx_sigma_init_sensor(2);
76. Ry(2) = posy_sigma_init_sensor(2) * posy_sigma_init_sensor(2);
77. velx_sigma_init_sensor(2) = 2.0;
78. vely_sigma_init_sensor(2) = 2.0;
79. Rvx(2) = velx_sigma_init_sensor(2) * velx_sigma_init_sensor(2);
80. Rvy(2) = vely_sigma_init_sensor(2) * vely_sigma_init_sensor(2);
81. accx_sigma_init_sensor(2) = 1.0;
82. accy_sigma_init_sensor(2) = 1.0;
83. Rax(2) = accx_sigma_init_sensor(2) * accx_sigma_init_sensor(2);
84. Ray(2) = accy_sigma_init_sensor(2) * accy_sigma_init_sensor(2);
85. posx_sigma_init_sensor(3) = 2.0;
86. posy_sigma_init_sensor(3) = 5.0;
87. Rx(3) = posx_sigma_init_sensor(3) * posx_sigma_init_sensor(3);
88. Ry(3) = posy_sigma_init_sensor(3) * posy_sigma_init_sensor(3);
89. velx_sigma_init_sensor(3) = 4.0;
90. vely_sigma_init_sensor(3) = 4.0;
91. Rvx(3) = velx_sigma_init_sensor(3) * velx_sigma_init_sensor(3);
92. Rvy(3) = vely_sigma_init_sensor(3) * vely_sigma_init_sensor(3);
93. accx_sigma_init_sensor(3) = 1.0;
94. accy_sigma_init_sensor(3) = 1.0;
95. Rax(3) = accx_sigma_init_sensor(3) * accx_sigma_init_sensor(3);
96. Ray(3) = accy_sigma_init_sensor(3) * accy_sigma_init_sensor(3);

TABLE 5

User parameters: one or more health informatics and/or user physiological measurements, such as reaction time, used to monitor user health and status.

u1. Reaction rate = .6;
u2. Respiration rate = 15

TABLE 5-continued

User parameters: one or more health informatics and/or user physiological measurements, such as reaction time, used to monitor user health and status.

u3. Heart Rate = 72
u4. Temperature = 98.6
u5. Glucose=
u6. Blood Pressure=
u7. Arterial Blood Gas=
u8. Weight=
u9. Performance=
u10. Oxygen Level = Scale of 100
u11. Hydration=
u12. Galvanic Skin Resistance=
u13. Mental State = %
u14. physical state = %
u15. Stamina = %
u16. Physical rating Profile = (e.g. PLUHES)

Dynamically Structured IMM

Estimation and filtering technologies used by one or more elements of the SAC 302B of the S-MMS controller 110B (e.g. by STF 500) are disclosed below with example models. A first example model is a target detection model of targets in motion and maneuvering near an S-MMS 18. A second example model is directed toward users, how the users interact with their controls (e.g. HMI 352 and connected smart devices), the S-MMS controller 110B, and the targets detected by the SAC 302B.

Individual users have reaction times and other user health metrics that are repeatable and dependable enough to support a particular model, and if degraded, can be anticipated by one or more subsequent models (e.g. a second model and a third model) used by a filter. As was previously disclosed, data is important to multi-sensor fusion and information fusion. Even late and unexpected readings are meaningful. Therefore, it is preferable in one example for the S-MMS controller 110B to consume all data available to it from sensor reports (e.g. 371-376 FIG. 3).

A control system may struggle incorporating the changing parameters of a user. If a user cannot get through a crowd safely without assistance at a given time, it does not necessarily mean the user also cannot navigate through a parking lot that contains few people and few vehicles at that time. The levels of skill and assistance needed from the S-MMS controller 110B are just different in the two scenarios. The S-MMS controller 110B must adjust its behavior appropriately in different environments and situations to provide the user the most independence possible at any given time, and a robust approach to accomplishing this is needed.

A fusion engine (e.g. STF 500 of the SAC 302B) may be used by the S-MMS controller 110B to support safe, independence for the user. An important part of a fusion engine is the estimator. There are several types of estimators, including an interacting multiple model (IMM) algorithm. IMM estimators are designed to employ a fixed set of models that are included in the IMM estimator (e.g. stored in memory 120) at design time of the IMM estimator. The performance of an IMM estimator depends on the model set used and the parameters of the IMM estimator (e.g. starting model probabilities, voting schemes, and rules) set at design time of the IMM estimator. The ability to change IMM estimator models and/or parameters based on one or more inputs to, or calculations of, the S-MMS controller 110B (e.g. STF 500) could significantly improve performance of an S-MMS 18.

As previously disclosed (FIG. 19-21), an IMM estimator is predicated on using more than one model simultaneously to estimate one or more aspects of state. In the case of moving targets, each estimation filter uses a different model for a different possible event. In an example, one filter might model a constant velocity target maneuver model, another filter models an acceleration in the cross axis, while another filter models an acceleration in the downrange axis, as depicted in FIG. 19. Switching between these models during each sample period is determined probabilistically, as depicted in FIGS. 20 and 21. Unlike maneuver detection systems where only one filter model is used at a time, the IMM estimator uses all of its filters. The overall state estimate output may be an output from one of the models or a weighted combination of the estimates from multiple individual models. The weighting, determined by the state estimate combiner 1918, is based on the likelihood that a model is the correct maneuvering target model (e.g. model probabilities 1922 in combination with filter output states 1916).

The underlying algorithms of a typical IMM estimator yield good performance along with a reduced computational load. The need to modify a model based on learned or observed behavior identified by one or more processes of a controller (e.g. S-MMS controller 110B or a rules engine or machine learning engine on a remote server 910A) or one or more user inputs (e.g. via HMI 352 or a connected smart device 902) may be beneficial to the operation of the S-MMS 18B. Adaptive model updates instead of, or in addition to, model switching is a new approach to a multiple model process. The challenge is that changing one or more estimator design time variables, runtime variables, or models in a traditional IMM estimator may cause system faults. Additionally, it is difficult to extend the traditional IMM estimator to other and new scenarios (for example a target behavior that is unexpected in the models loaded in memory 120 at design time). An example of an unexpected target behavior could be an aerial target, like a drone, where there is not a model that accurately predicts the data received from one or more sensor reports. A solution to these problems is dynamic model set adaptation based on observed information (e.g. one or more sensor reports 371-376 FIG. 3, calculations based on data from memory 120, and/or user inputs).

The S-MMS controller 110B as previously disclosed integrates the user in the control system loop. User skill levels and needs for assistance vary, both from user-to-user and for a given user over time. In order to better integrate users in a semi or fully-autonomous system, a novel approach to an IMM estimator is disclosed and termed a Dynamically Structured IMM (DSIMM). An exemplary embodiment of the DSIMM estimator is presented and applied to target tracking (e.g. by STF 500 of the SAC 302B) around an S-MMS 18. Additional and alternative embodiments of a DSIMM estimator may be used by one or more other processes of the S-MMS controller 110B for purposes other than target tracking consistent with this disclosure.

Referring back to FIG. 20, a model probability is depicted with 3 models available at time k−1. The model probability for model 1 is represented by line 2002, and model probabilities for models 2 and 3 are represented by lines 2004 and 2006, respectively. At time k−1 2008, the 3 models have evenly distributed model probabilities of 33%. After the first few sensor measurements, a very high confidence emerges at time 2014, where model 1 2002 has a 95% probability that it matches measured states. At time 2016, the probability that the particular model 2002 is the correct model decreases. At time 2018, the probability that the second model 2004 is the correct model increases, and it is more probable that the second model 2004 more accurately represents the estimate of state for the system for which the model is operating. At that point, the second model 2004 is selected as the new model for the system for which the model is operating These models have expectations described by simple rules and interactions with other models, which in turn influence their behavior. By modelling systems from the 'ground up'—interaction-by-interaction—self-organization can often be observed in such models. Patterns, structures, and behaviors emerge that were not explicitly programmed into the models but arise through the interactions over time.

Figure 22:
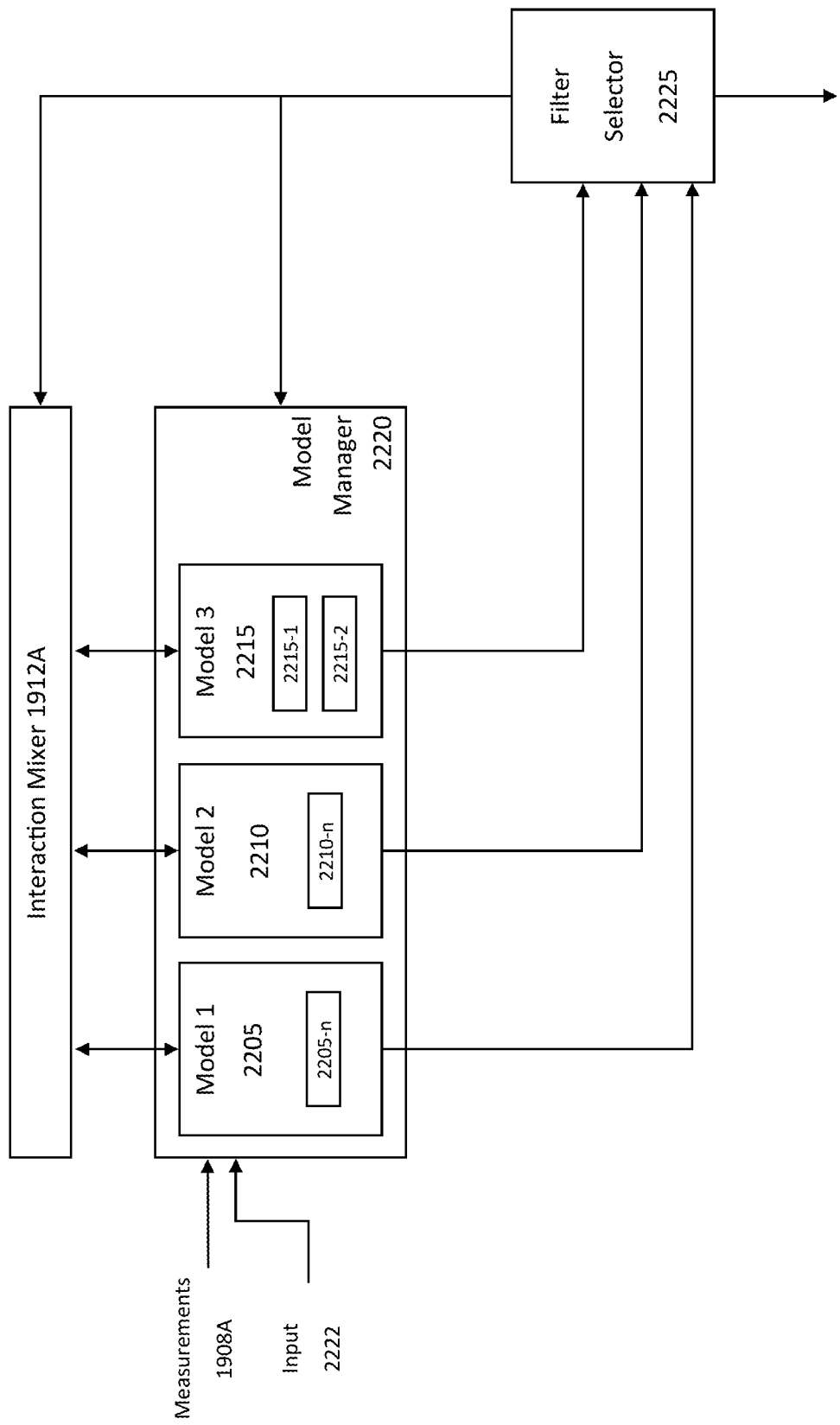
FIG. 22 depicts an embodiment of a 3-model DSIMM estimator.

The DSIMM consists of n independent filters operating in parallel, where n is an integer greater than zero. FIG. 22 depicts three models 2205, 2210 and 2215 in a DSIMM estimator embodiment (e.g. as executed by STF 500 or another SAC 302B process). Each model (2205, 2210, and 2215) of the DSIMM is run by an independent filter consisting of one or more sub-filters (2205-$n$, 2210-$n$, 2215-1, 2215-2) operating interactively and simultaneously (where n represents a selected number of sub-filters greater than zero). A sub-filter (e.g. 2215-1) is a filter instance executing the master model (e.g. 2215) algorithm(s) but using data for an alternative set of design and/or runtime variables retrieved from memory 120. A model manager 2220 manages dynamic loading of model and filter parameters from memory 120, interactions with measurements 1908A, inputs 2222 (i.e. one or more control signals from S-MMS controller 110B), the interaction mixer 1912A, and the filter selector 2225. The models, via the model manager 2220, interact with an interaction mixer 1912A and a filter selector 2225. The filter selector 2225 combines the model probability updater 1920 and state estimate combiner 1918 functions described with reference to FIG. 19 into one element for diagram simplification.

At every time index, only the output of one of the independent sub-filters of each model is used. The DSIMM model manager 2220 chooses the one output of each model to be the optimum output based on one or more rules based on one or more of measurements 1908A, inputs 2222, or outputs of the filter selector 2225 or interaction mixer 1912A received by the DSIMM model manager. The ability to run multiple sub-filters, or variants, of a given model allows the DSIMM to dynamically change one or more estimator design time variables and/or runtime variables. The design time and runtime variables may include, but are not limited to, one or more filter setup values, previously disclosed in Tables 1-5, of one or more filters or sub-filters. These values may be stored in memory 120 as filter setup values in an embodiment. Measurements 1908A are received by the model manager 2220 from one or more sensor reports 371-376 (FIG. 3) and provided to one or more filters (e.g. 2205) or sub-filters (e.g. 2205-$n$). Inputs 2222 are received by the model manager 2220, including:

- outputs from one or more calculations of the S-MMS controller 110B (e.g. one or more error codes determined from diagnostics calculations of RTOS Services 362 indicating degraded system performance, one or more values calculated by the UHM 510 of the SAC 302B indicating user health status, etc.),
- a user input, such as a scalar value received via HMI 352 or via CNI 371 from a paired smart device (e.g. 902 FIG. 9), or
- one or more values or codes received via CNI 371 from a remote device or service (e.g. remote server 910 as described below for prescribing and learning).

Inputs 2222, in an embodiment, are used by the model manager 2220 to select a sub-filter for each model based on one or more defined rules stored in memory 120. Outputs of the filter selector 2225 and/or the interaction mixer 1912A include prior knowledge of state 1910 and model probabilities (e.g. 1922 FIG. 19) that are used by the model manager 2220 to select a sub-filter for each model (2205, 2210, and 2215). In an embodiment, one or more DSIMM implementations of STF 500 may determine a state which causes the S-MMS controller 110B to send, or modify, one or more control signals which cause one or more motor controllers 351 and/or an HMI 352 to take one or more actions based on the received one or more control signals.

Operations of the S-MMS controller 110B are dynamic in multiple ways. With respect to one or more filters, models, or DSIMM implementations of the STF 500. Dynamic operations may include:

- Changing the initial (e.g. startup) or runtime weighting or model probabilities (e.g. 1922 FIG. 19) in an IMM or DSIMM implementation based on one or more scalar inputs retrieved from memory 120, calculated by the STF 500, and/or input by a user or caregiver.
- Runtime modifications to one or more runtime variables (e.g. one or more elements of Tables 3-5) based on one or more calculations of the S-MMS controller 110B. In an example, runtime variables may be modified based on calculations of the RTOS services 362 built in tests, calculations of the IAM 370 or sensor tasker 520 indicating sensor status or behavior, calculations of the UHM 510 indicating user status, or calculations of the threat assessor 528 of the SAC 302B.
- Runtime modifications to one or more runtime variables (e.g. elements of Tables 3-5) based on one or more inputs (e.g. sensor reports 371-376 FIG. 3) of the S-MMS controller 110B and/or data retrieved from local memory (e.g. 120) or remote memory (e.g. 910).
- Modification of one or more runtime or design time variables (e.g. one or more elements of Tables 1-5) for one or more models of an IMM or DSIMM estimator of the STF 500 based on user, caregiver, technician, or SAC 302B actions.
- Creation of one or more model derivatives (also referred to herein as sub-filters), by the STF 500 of the SAC 302B for use by a DSIMM estimator running on the STF 500 based on one or more calculations of the S-MMS controller 110B, a value retrieved from memory 120, one or more sensor reports, or based on user, caregiver, or technician actions or inputs.
- Creation of a copy, either identical or modified, of one or more filter setup values (e.g. Tables 1-5) for use by one or more model derivatives (also referred to herein as sub-filters).

Regarding the discussion of FIG. 21 above, an interaction mixer 1912 (FIG. 19) adaptively adjusted the covariance terms to consume data being received. A DSIMM estimator offers a similar opportunity to bias one or more model probabilities or model parameters in one or more DSIMM implementations of the STF 500 toward a model variant with parameters that better represents known or observed conditions of the user of the S-MMS 18 and/or the environment around the S-MMS after design time.

Tables 1-3 are hardware specific. Table 1 defines the sensors, the sensor locations, and the number of sensors in table items 1-9. Items 10-27 of Table 1 are updateable via a software update locally or over the air from a server (e.g. 910 FIG. 9) or a connected device (e.g. 902). Table 2 shows items 28-42; these are hard set at design time. The addition of a new model would require a design time change to these values. As an example, a fourth model would set the Markovian switching probability matrix (e.g. EQ. 24) as a 4 by 4 square matrix rather than a the 3×3 (e.g. three model) configuration of Table 2. For this reason, in an embodiment, a maximum number of primary models may be set for any DSIMM embodiment of one or more processes of the SAC 302B in Table 2. Table 3 shows additional hard-set values at design time. These represent the system as designed and delivered. But, as stated above, a technician may update one or more values at runtime via a wired or wireless connection to the S-MMS controller 110B (e.g. via CNI 317). The example above was replacing a particular sensor with an updated sensor may allow a user or technician to reset some of the initial values that load at startup.

Table 4 shows the uncertainty initializing covariance terms for an IMM or DSIMM embodiment on the S-MMS controller 110B. These values determine how quickly one or more filter instances settle in to a high-confidence solution after system startup. Additionally, these values determine how stable the filter is, as starting a filter instance with lower confidence (e.g. 1-sigma versus 3-sigma) slows convergence but also helps to guarantee that received sensor reports do not fall outside of confidence interval expectations. These values are set at design time in memory 120, but may be modified prior to runtime (e.g. at system startup) or at runtime if using a DSIMM estimator as disclosed.

Table 5 shows user parameters. User parameter values are setup specific to a user and their capabilities and are treated as ePHI in some embodiments. Some of items u1-u13 of Table 5 may be set by a user, caregiver, or technician, while others will be set or calculated based on one or more sensor reports (i.e. measured values) regarding the user. In an example, reaction time (u1) is a measured value based on the user's reaction to stimulus, be it audio, visual, or haptic. The user is tested, a caregiver enters a value, and in the case of u1, it might be determined the users' reaction rate is 0.6 seconds at that moment in time. This number is used to inference a rules engine or one or more calculation in one or more decision processes of the S-MMS controller 110B.

Reaction rate may be consumed by a rules engine on the S-MMS controller 110B which determines operational considerations for S-MMS 18 behavior, such as maximum allowable velocity or allowable proximity to objects in the surroundings, for example. The lower the user reaction rate, the higher functioning a user would be. On the other hand, the larger the user reaction rate number, the more restrictive the controls would be set by the IMM or DSIMM estimator. Back to the higher-level discussion, it is anticipated that in addition to setup, the caregiver is allowed to modify the values of user parameters (e.g. of Table 5) dynamically, which is "on the fly". Additionally or alternatively, one or more values may be set dynamically or automatically based on one or more calculations of the UHM 510 of the SAC 302B which assess the user state.

Figure 23:
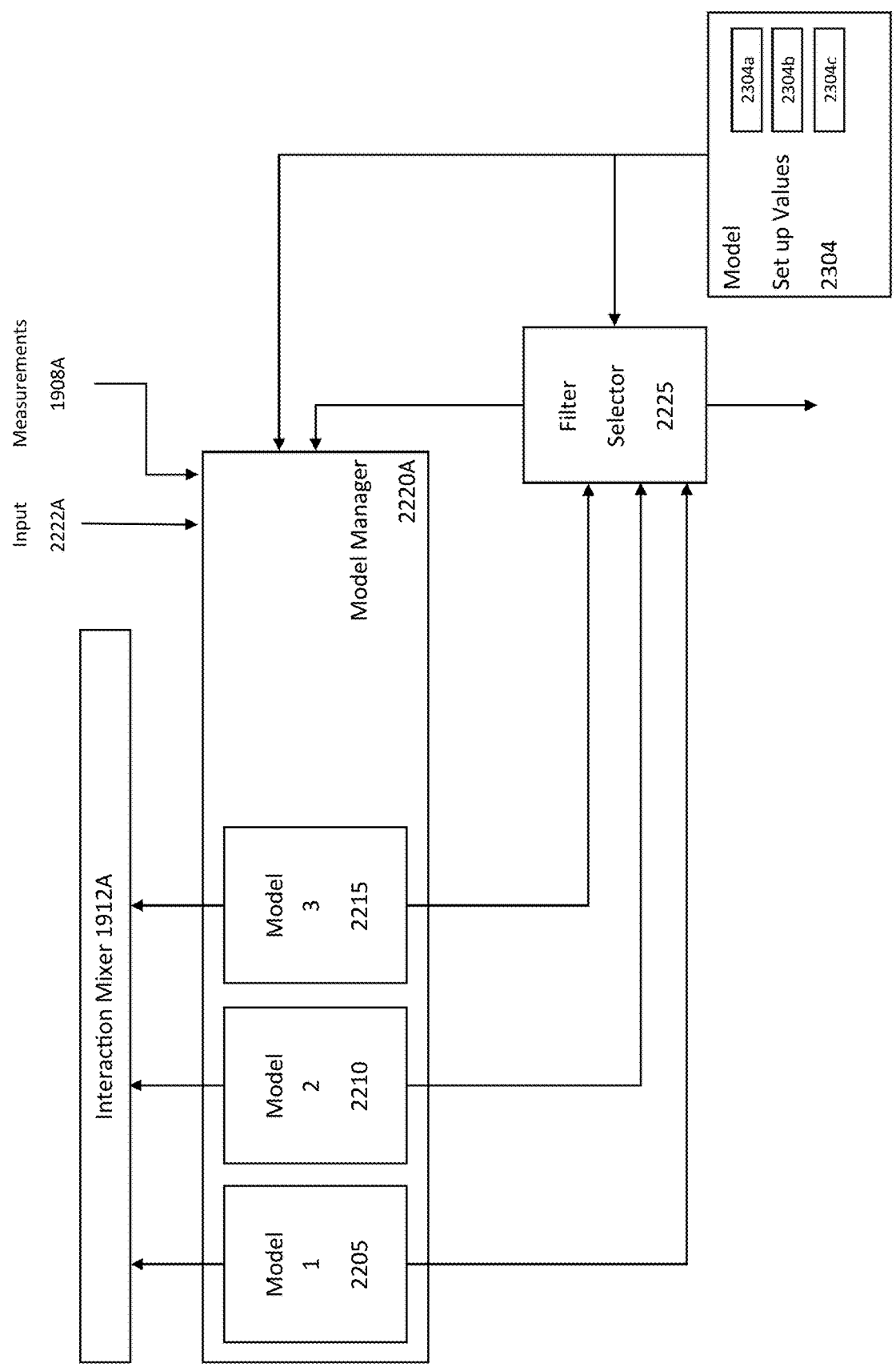
FIG. 23 depicts a DSIMM estimator embodiment with model setup values.

FIG. 23 depicts the DSIMM estimator from FIG. 22 but with model setup values 2304 depicted. In an embodiment, model setup values (e.g. of Tables 1-5) 2304 exist as one file loaded in memory 120. The model setup values 2304 include certain variables like variables 2304a, 2304b and 2304c which are loaded at runtime by the S-MMS controller 110B and are used by one or more of the model manager 2220A and the filter selector 2225. Variables 2304a and 2304b represent hardware or operational variables that can be dynamically updated, while 2304c represents user variables that are loaded at runtime. These model setup values of the S-MMS controller 110B are listed in Tables 1-5 as would be stored in memory 120 and may be modified.

In an embodiment, a user health manager 510 (FIG. 5) of the SAC 302B collects user data from one or more sensors and logs the data, or one or more parameters calculated from the data, as u2-u12 (Table 5) at runtime. It is anticipated that some sensors will be built into the S-MMS 18 and provide data (e.g. sensor reports 375) and some data may be collected wirelessly via CNI 371. In an embodiment, the wireless connection may be a Bluetooth connection, and received data may be stored and transmitted in compliance with HIPPA requirements for ePHI. One example is user weight, which is anticipated in the system of sensors built in the S-MMS 18. Other data may be received via CNI 371 from an external app on a user cell phone (e.g. device 902 FIG. 9). In other embodiments, one or more inputs or pieces of user data may be received from the HMI 352. This data may include subjective assessments made by a user, caregiver, or technician (e.g. u13 through u16). In an example, u13 is a response from a caregiver requesting the mental state of the user, for example if the user was in a bad mood. These values may also affect one or more models of the DSIMM estimator. Additionally or alternatively, these values may cause a rules engines of the S-MMS controller 110B to limit, restrict entirely, or grant access to certain operational parameters or functions. The model manager 2220A is used to update certain values based either on logic or operationally determined needs, including creating one or more sub-filters of a model (e.g. 2205-2215) or modifying one or more model setup values 2304a-c.

In an embodiment, a care giver has an application on their web-connected device (e.g. 932 or 944 FIG. 9), or uses an application on the mobile device connected to the S-MMS (e.g. device 902) to configure one or more settings of a DSIMM estimator of the S-MMS controller 110B. The application has a screen for configuration changes to the S-MMS with the option of making changes temporary or saving new values as a default setup. Back to the starting probabilities, the care giver decides the starting model will be a down the street move to another building, selects an appropriate model as a starting model via the application, and saves the selected model as a temporary preference via the application. The application then converts this temporary preference to one or more setup values and transmits the one or more setup values and optionally one or more instructions in one or more signals to the S-MMS controller 110B via CNI 371. The S-MMS controller 110B receives the one or more signals with the one or more setup values and any associated instructions transmitted with the setup values. The model manager 2220 of the DSIMM reads the one or more setup values and any associated instructions from the received signal(s) and creates one or more temporary sub-models in response thereto, which are executed by the STF 500. Alternately, the setup values can be saved by model manager 2220 or another process of the STF 500 as new or default values depending on the contents of the received signal(s). Further discussion will be disclosed below covering additional detail and how the system can learn from experience or be taught.

Adding a New Base Model or Sensor

Figure 24:
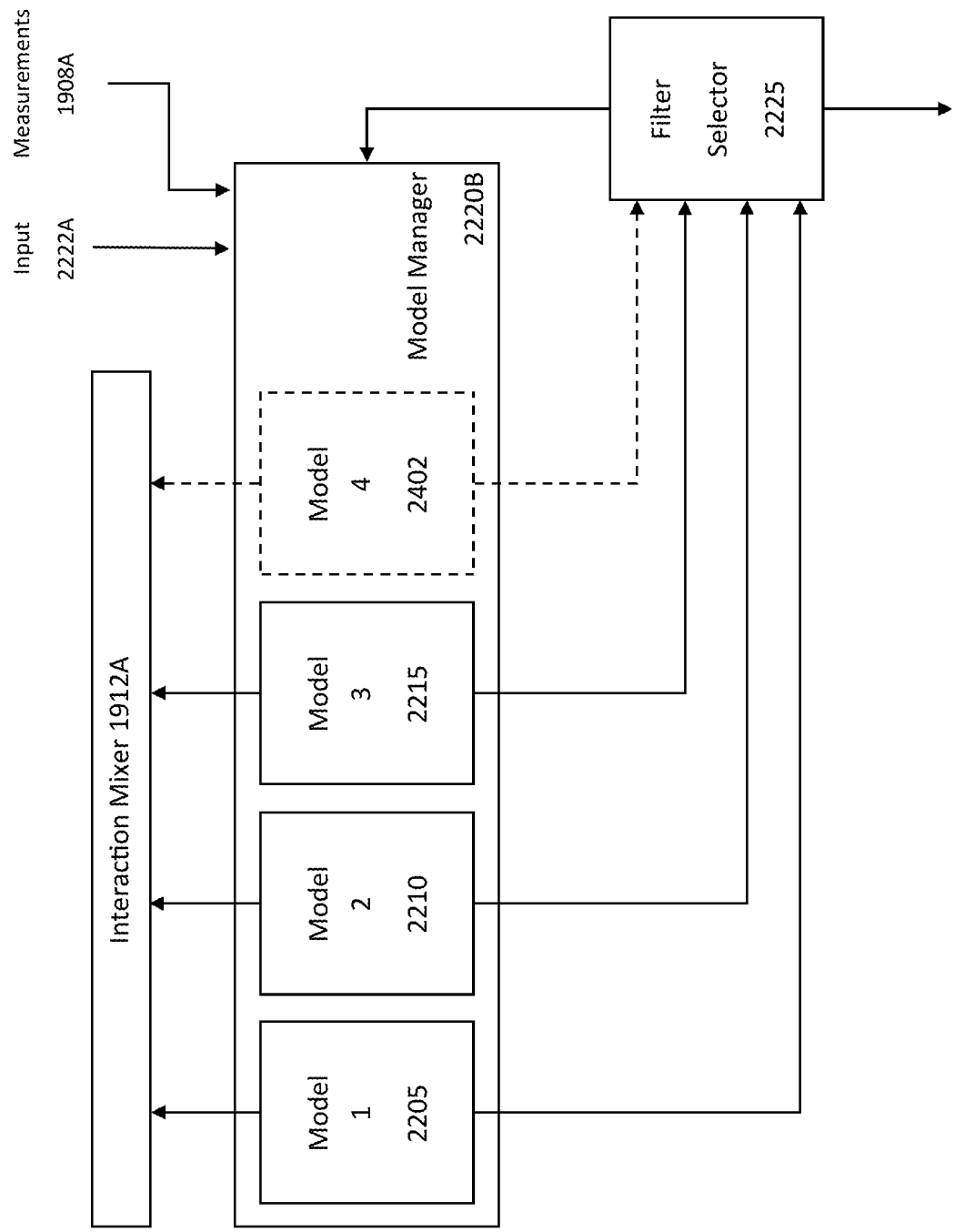
FIG. 24 depicts a DSIMM estimator with a fourth model.

Referring to FIG. 24, three base models (2205, 2210, 2215) are loaded in memory 120 at design time when the designer decided the three-model approach was sufficient for S-MMS controller 110B intended functions. The user now wants to upgrade to another application that may benefit from a new, fourth model. Additionally or alternatively, the fourth model is desirable when changing to a new sensor type or adding an additional sensor.

Adding an additional model, or a sensor in some cases, requires updates to hardware specific setup variables in memory 120. As an example, Tables 1-3 are hardware specific. Table 1 defines the sensors, the sensor locations, and the number of sensors in table items 1-9. Items 10-27 of Table 1 are updateable via a software update locally or over the air from a server (e.g. 910 FIG. 9) or a connected device (e.g. 902). Table 2 shows items 28-42 that are set at design time. The addition of a new model may require a change to one or more of these values which would then be loaded by the S-MMS controller. Changes to items 28-42 of Table 2 may be best accomplished by installation of a software update or other update of the design time variables and restarting the system. As an example, a fourth model would set the Markovian switching probability matrix (e.g. EQ. 24) as a 4 by 4 square matrix rather than a the 3×3 (e.g. three model) configuration of Table 2. This is not done on-the-fly at runtime because it requires an update to the variables of the DSIMM estimator running on the S-MMS controller 110B.

FIG. 24 depicts the DSIMM estimator from FIG. 22 now with a new model 2402. Models 1 thru 3 represent a constant velocity model 2205, a down range maneuver model 2210, and a cross-range maneuver model 2215 as previously disclosed. If model 2402 is a variant of any one of the base models (2205-2215), the sensors would all be the same, the values in one or more setup aspects of the S-MMS controller 110B, such as filter operational parameters and initializing covariance terms, might change (e.g. Tables 3-4). In the event that there was a change in hardware, such as adding a new sensor as an upgrade with better performance, other setup aspects of the S-MMS controller 110B may change (e.g. Tables 1-2). In either case, the setup aspects of the S-MMS controller 110B are listed in Tables 1-5 as would be stored in memory 120 and may be modified.

Prescribing & Learning

As previously disclosed, the functions of the SAC 302B are predicated on parameters that can be measured and documented (e.g. via sensor reports 371-375 received and/or items retrieved from memory 120, such as sensor uncertainty values). Additionally, the specific model(s) and runtime variables used by one or more filters of the SAC 302B (e.g. by STF 500) impact the actions of the S-MMS controller 110B. The ability to set and reset certain configuration values used by one or more IMM and/or DSIMM implementations based on care giver or technician observations and to input the values was previously disclosed. However, there are situations where one or more models or runtime variables of a model or DSIMM implementation of the SAC 302B may need to be modified such that S-MMS controller 110B behavior(s) better fit the needs or current state of a specific user. Additionally or alternatively, new or alternative sub-filters or runtime variables may be required to configure an S-MMS controller 110B to function correctly with one or more ancillary systems, such as alternative motor controllers 351, HMI 352 configurations, or custom assistive devices added to the S-MMS 18.

Figure 25:
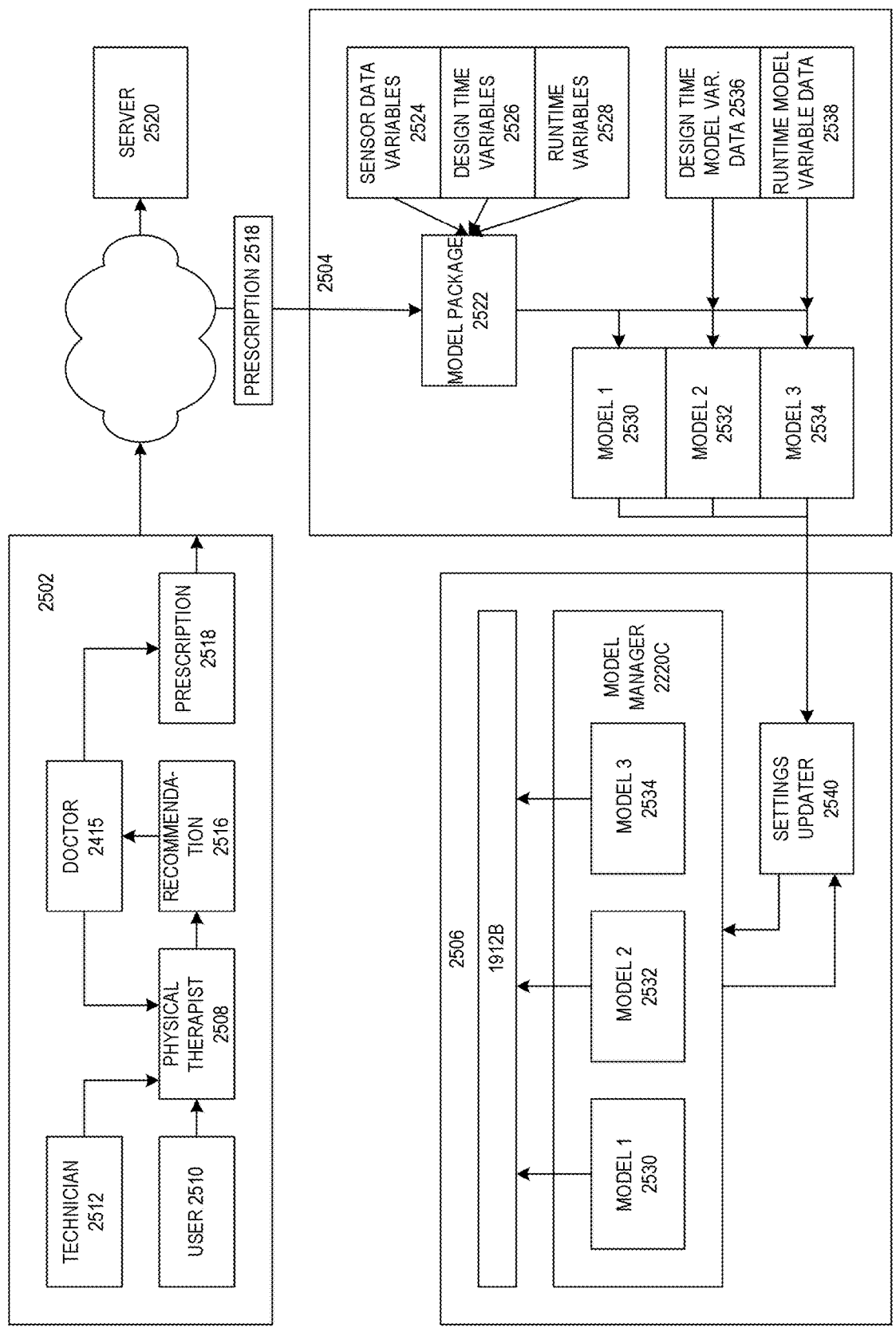
FIG. 25 depicts an S-MMS controller configuration process.

FIG. 25 depicts a system overview of an S-MMS controller 110B model configuration process for a power wheelchair broken down into three operational groups. The operational groups are the prescription process 2502, the configuration setup process 2504, and S-MMS controller operations 2506. The S-MMS controller operations 2506 includes, for example, code executed by the STF 500 or other processes of the S-MMS controller 110B, including one or more SAC 302B processes.

In a non-limiting example of the prescription process 2502, a physical therapist 2508 works with an S-MMS user 2510, a technician 2512, and/or the user's doctor 2514. The physical therapist 2508 generates a recommendation 2516 for new features or behaviors of the user's S-MMS controller 110B. A non-limiting example of new features or behaviors includes adding a new model, such as a dancing model or a wheelchair sport model, to one or more DSIMM instances of the SAC 302B on the S-MMS controller 110B, as executed by the STF 500 for example. In another example, the new features or behaviors may involve adjusting one or more runtime variables of the SAC 302B or filter setup values of STF 500 which increase or decrease the amount of anticipated user assistance the S-MMS controller 110B may provide the user.

The recommendation 2516 is sent to the user's doctor 2514 to approve. Once approved by the doctor 2514, the recommendation 2516 is considered an S-MMS controller prescription 2518 and may be stored electronically on a remote server 2520 (alternatively device 902 FIG. 9), sent directly to the original technician 2512, or sent to an alternative technician at an S-MMS integration center for setup and configuration of the S-MMS controller 110B per the configuration setup process 2504.

The configuration setup process 2504 involves multiple steps to create actionable code and/or data files for consumption by the S-MMS controller 110B on the user's S-MMS based on the received prescription 2518. In an embodiment, the configuration setup process 2504 may be automated or assisted using a software application. In another embodiment, the configuration setup process 2504 is primarily manual, completed by one or more technicians.

In an example of a configuration process 2504 primarily completed by one or more technicians, a prescription 2518 is received by a technician at a processing center implementing the configuration process 2504. The prescription 2518 is a description of the desired functionality and is converted to a model package 2521 as part of the configuration setup process 2504. A model package 2521 is one or more computer readable files or instructions that cause the desired functionality described in the prescription 2518. A model package 2521 may include one or more .h (ANSI C), .py (Python), or .m (Matlab) files or other files, used to configure the SAC 302, including sensor data variables and/or 2522 runtime variables 2524. Additionally or alternatively, a model package may include one or more computer instructions that perform operations based on one or more variables and their values (i.e. code) in .h (ANSI C), .py (Python), or .m (Matlab) files or other files.

The prescription 2518 may be user independent or may be customized to a user. In an embodiment, a user independent prescription 2518 is received and is modified by a technician to match the relevant onboard sensors of a particular user's S-MMS. In an example, onboard sensors may include weight, skin resistance, heart rate, blood pressure, temperature, $O_2$ levels etc.; optional sensors may include blood sugar, an interface to an embedded heart monitoring system, a CAD pump for the delivery of medication, etc. Additionally or alternatively, sensors may include one or more devices to detect or measure one or more of user orientation, location, position, distance, time, force, mass, weight, pressure, image, video, light, resistance, voltage, current, power, medical data, raw sensor data, conclusions data, patient measurements, chemical, moisture, electro-dermal, bioelectric impedance, galvanic skin resistance, pulse, respiratory rate, wetness, sight, hearing, reaction time, pain status, emotional state, event, state, and action.

A technician writes or otherwise generates the model package 2521 required to implement the desired functionality of the prescription 2518. The model package 2521, for example, is computer-implemented instructions (e.g. code) that is executed by the STF 500 (by a hardware processor), and the computer-implemented instructions may have associated values (e.g. in separate files) or other data for one or more variables. In an example, the model package 2521 includes computer-implemented instructions for executing one or more models for deployment in an IMM.

In order to generate a model package 2521 for a particular S-MMS, the technician must know basic information about the target S-MMS configuration. In an example, representative sensor data variable values 2522 that are consistent with those used by the S-MMS controller 110B of the S-MMS may be retrieved from memory by the technician and/or simulated by the technician and used to test and/or develop the model package 2521. These sensor data variable values are used as a place holder until actual readings are obtained from actual sensor reports (e.g. 371-375 FIG. 3) on the user's S-MMS. The sensor data variables from the S-MMS 2522 optionally are used only by the technician for development and testing of the model package 2521 and are not required to be part of the final model package.

One or more design time variables 2523 and/or runtime variables 2524 files are included in the model package 2521 based on functions or other information described in the prescription 2518. Design time variables 2523 are variables in a computer program that are set during the design of one or more models and do not change at runtime. Design time variables 2523 may include sensor types, sensor numbers, sensor locations, etc. An identification of the design time variables 2523 to be included in the model package 2521 may be provided to the technician, may be retrieved from a remote server 2520 or directly from S-MMS memory 120, or may be determined by the technician based on information in the prescription, such as the model number or configuration of the S-MMS. Runtime variables 2524 are variables in a computer program that dynamically change. Runtime variables 2524 may include variables used in a program to store temporary data inputs (e.g. sensor reports) or variables used to store data outputs (e.g. the results of one or more software calculations). An identification of the runtime variables 2524 to be included in the model package 2521 may be provided to the technician, may be retrieved from a remote server 2520 or directly from S-MMS memory 120, or may be determined by the technician based on information in the prescription, such as the model number or configuration of the S-MMS.

The technician determines the type and number of models (e.g. for which code is generated) required to implement the prescription 2518 based on functions of the S-MMS. In the example of FIG. 25, the model package 2521 includes one or more files of code containing computer-implemented instructions for executing three models 2526, 2527, and 2528.

The configuration setup process 2504 continues as the technician determines values for the design time variables data 2529 and the runtime variables data 2530. The design time variables 2523 should match with the model type and number determined by the technician. The design time model variables data 2529 are for the three models 2526, 2527, and 2528 and are the filter setup values for each of the models. The runtime model variables data 2530 is typically initialized with placeholder values (which may be null values) which will be overwritten by the S-MMS controller 110B once the model package 2521 is deployed on the target S-MMS. The design time model variables data 2529 includes one or more data values for each model included in the model package 2521.

The technician combines the developed code (e.g. to run model 1 2526, model 2 2527, and model 3 2528) with the corresponding design time model variables data 2529 and runtime model variable data 2530 into the model package 2521. In an example, the model package 2521 includes the model code (computer-implemented instructions for executing the three models 2526, 2527, and 2528), design time variables data, runtime variables data, and the original prescription. In other embodiments, there may be more models or less models depending on the operations expected of the user, all of which are dependent on how the user is allowed or expected to operate as described in the prescription 2518.

The model package 2521 is transmitted by the technician to the user's S-MMS 18, via a wired or wireless connection, and stored in the S-MMS memory 120 on the user's S-MMS the user's S-MMS controller 110B for use by the S-MMS controller operations 2506. For example, the one or more models (computer-implemented instructions for executing the three models 2526, 2527, and 2528), runtime model variables data, design time model variables data, and other prescription data may be saved by the S-MMS controller 110B in memory 120 as corresponding to or belonging to the prescription 2518.

The S-MMS controller operations 2506 includes a settings updater 2534 which retrieves the model package 2521 stored in S-MMS memory 120 by the technician and configures the S-MMS controller 110B to use the contents of the model package 2521. In an embodiment, the settings updater 2534 is part of a model probability updater 1920 (FIG. 19) or filter selector 2225 (FIG. 22). In an exemplary embodiment depicted in FIG. 25, the settings updater 2534 causes the model manager 2220C of a DSIMM instance to use the contents of the model package 2521 received from the configuration setup process 2504 (which in this case are model 1 2526, model 2 2527, and model 3 2528).

In order to use the model package 2521, the model manager 2220C of the DSIMM instance loads the models from the model package (which in this case are model 1 2526, model 2 2527, and model 3 2528) and execute the code for the models while using the runtime model variables data 2529 and design time model variables data 2530 for the models. In this example, after loading the models, the DSIMM instance of the S-MMS controller operations 2506 now includes the computer-implemented instructions for the three models (model 1 2526, model 2 2527, and model 3 2528) selected based on the user requirements described in or required or desirable based on the prescription 2518, the design time model variables data 2529, and the run time model variables data 2530. Once configured and then loaded, the S-MMS controller 110B is ready for testing and verification and release to the user. In an embodiment, the steps of the S-MMS controller operations 2506 described above may be automated and executed by one or more functions of the SAC 302B on the S-MMS controller 110B.

Figure 26:
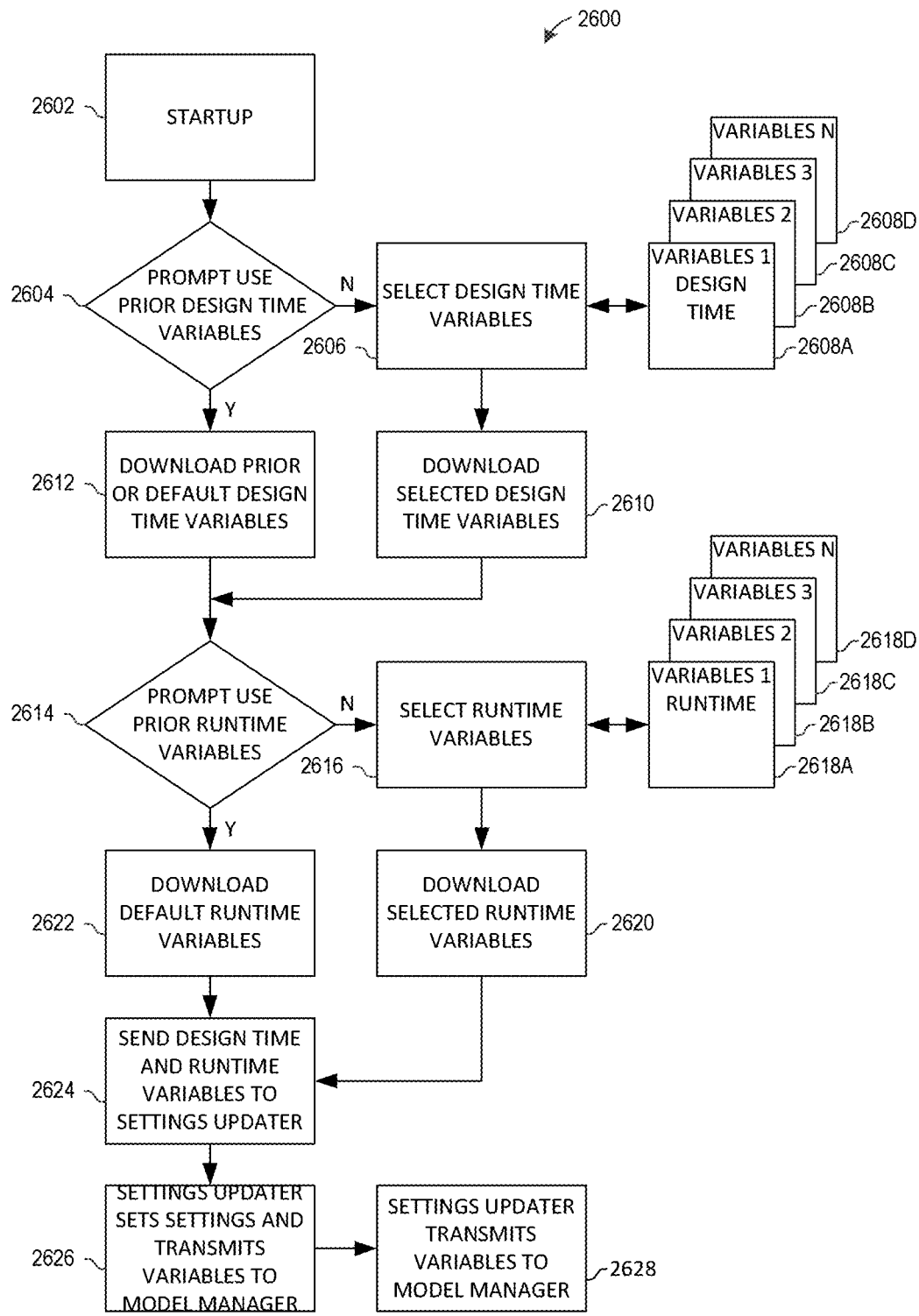
FIG. 26 depicts an embodiment of an S-MMS controller startup process.

FIG. 26 depicts a flow chart of an embodiment of an S-MMS controller 110B startup process 2600 executed by the STF 500 for the selection of startup variables, including design time variables and runtime variables, both of which have values. On startup 2602 of the S-MMS controller startup process 2600, a prompt is displayed at 2604 via an app on a connected device (as controlled and caused by the connected device, e.g. 902, 932, or 942 FIG. 9) of a user, caregiver, or technician or on the HMI 352 of the S-MMS 18 (as controlled and caused by the S-MMS controller 110B). The prompt asks if the user, caregiver, or technician wants to use the design time variables used in the prior startup process, or if there has been no prior startup process, stored in memory. This step allows users to select design time variables or a specific design time variable set, which is/are used by the STF 500 to configure one or more filters running on the S-MMS controller 110B.

If the answer is no at 2604, a select design time variables step 2606 allows the user to choose one or more design time variables 2608A-D. The design time variables may, for example, be selected from a list of available design time variables or entered. In one example, the design time variables are selected as one or more sets from a list of available sets of design time variables. In an example, the design time variables may include one or more models which are pre-configured design time models that each include one of more model switching probabilities used by a model of a filter, one or more models of an IMM estimator instance, or one or more models of a DSIMM estimator instance for dynamic model switching when executed by one or more processes of the S-MMS controller 110B (e.g. the STF 500), as previously disclosed. After the design time variables are selected, the process 2600 downloads the selected design time variables at 2610.

If the answer is yes at 2604, the process 2602 downloads the design time variables used in the prior startup process at 2612. If there has been no prior startup process, the process 2602 downloads the design time variables stored in memory at 2612.

After step 2610 or step 2612, a second prompt is displayed at 2614 (by the app of the connected device or by the S-MMS controller 110B on the HMI 352) that asks if the user, caregiver, or technician wants to use the runtime variables used in the prior startup process, or if there has been no prior startup process, stored in memory. This step allows users to select runtime variables or a specific runtime variable set, which is/are used by the STF 500 to configure one or more filters running on the S-MMS controller 110B.

If the answer is no at 2614, a select runtime variables step 2616 allows the user to choose one or more runtime variables 2618A-D. The runtime variables may, for example, be selected from a list of available runtime variables or entered. In one example, the runtime variables are selected as one or more sets from a list of available sets of runtime variables. After the runtime variables are selected, the process 2600 downloads the selected runtime variables at 2620.

If the answer is yes at 2614, the S-MMS controller startup process 2600 loads the runtime variables used in the prior S-MMS controller startup process at 2622. If no prior S-MMS controller startup process was executed, the S-MMS controller startup process 2600 loads default runtime variables stored in memory at 2622.

The downloaded design time variables and downloaded runtime variables are sent to the settings updater 2534A at 2624. At 2626, the settings updater 2534A sets the appropriate settings which connect the one or more models of a filter, IMM estimator instance, or DSIMM estimator instance with the correct variables. At 2628, the settings updater 2534A sends the one or more runtime variables and/or design time variables to the model manager 2220D for execution by a filter, an IMM estimator instance, or a DSIMM estimator instance, as the case may be, of the SAC 302B.

Figure 27:
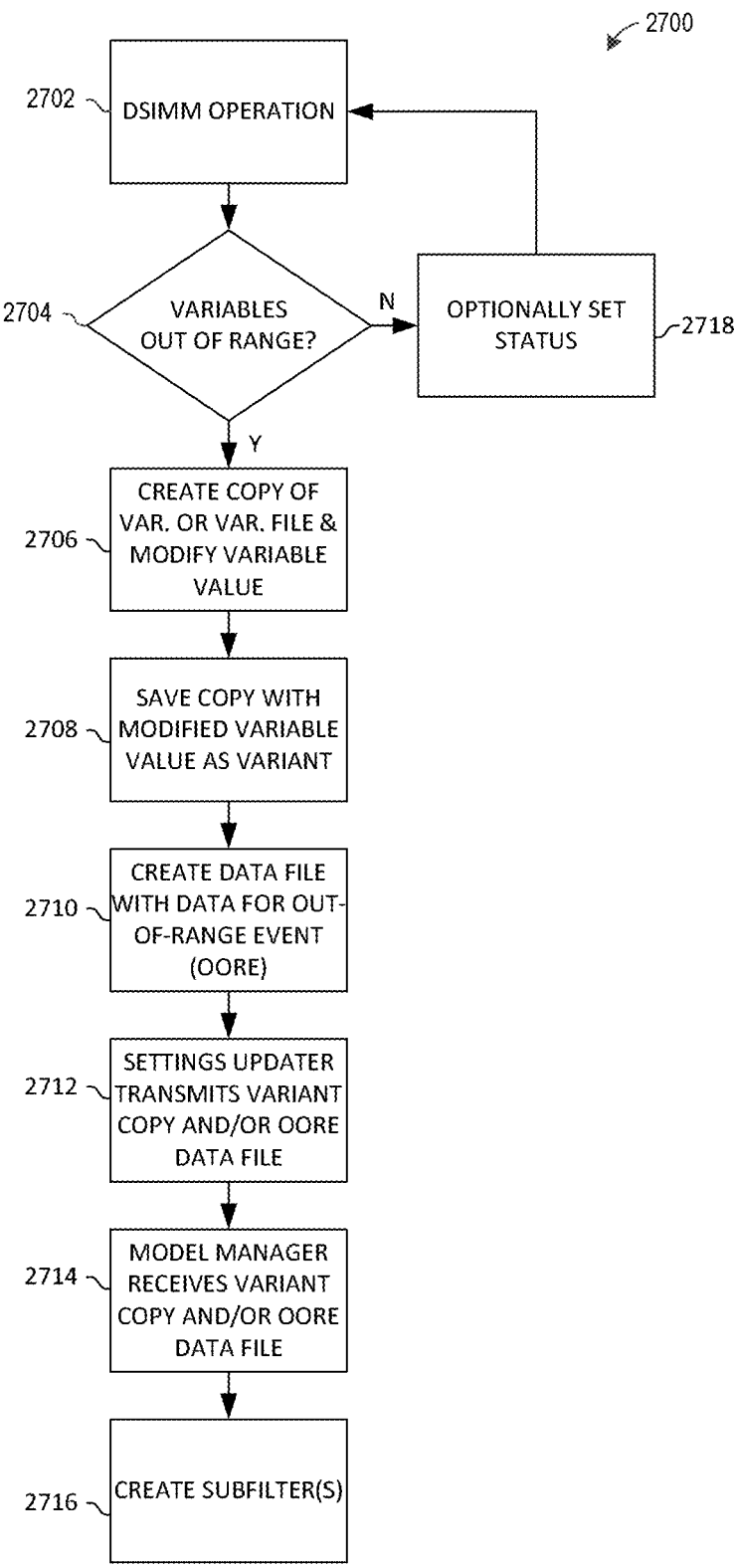
FIG. 27 depicts a process flow for automated detection of the need for new sub-filters and/or variables.

FIG. 27 depicts a process executed by a DSIMM estimator instance of STF 500 for automated detection of the need for modification of one or more variables and creation of one or more sub-filter instances in the DSIMM estimator instance. After startup, a DSIMM estimator instance (e.g. FIG. 22) is operating on the S-MMS controller 110B at 2702. At 2704, one or more rules of a rules engine of the DSIMM estimator instance determine if one or more runtime variables are out of acceptable range, where the acceptable range is retrieved from memory 120. For example, the rules engine compares the current value of one or more runtime variables to an acceptable range of values for the one or more runtime variables that are retrieved from memory (e.g. from Tables 3-5 in an example). The acceptable range of values for each variable may be stored in memory, for example, at design time or otherwise. Out of range may include above a particular threshold, below a particular threshold, our above or below a particular range, based on the variable.

At 2704, if a value for a runtime variable is determined to be out of range (out-of-range event) by the rules engine of the DSIMM estimator instance, then at 2706 a copy of the affected variable or file which contains the affected variable data in memory 120 (e.g. Table 4 in the previous example) is created, and the value of the variable is modified in the copy. In one example, the modified variable value is an increase to the range of the variable by a predetermined (e.g. retrieved from memory) step size or is otherwise based on the current value of the variable that is out of range (e.g. by setting the new data value to 110-percent of the current value of the variable). At 2708, the copy of the affected variable or file with the modified variable value is saved as a variant of the original variable or file to memory 120.

At 2710, the DSIMM estimator instance then creates a data file with the data describing the out-of-range event (e.g. a .csv or .txt file with the date of the out-of-range event, the time of the out-of-range event, an identification of the variable having the out-of-range value, the acceptable range of values for the variable, and the actual value for the variable, and/or the modified variable value in the copy in an example) which may be stored in memory 120, published to a remote server (e.g. 910 FIG. 9), or sent to one or more users, caregivers, or technicians as an alert.

At 2712, the settings updater 2534B of the DSIMM estimator instance transmits the variant copy of the affected variable or file and/or data describing the out-of-range event to the model manager 2220D. At 2714, the model manager 2220D of the DSIMM estimator instance receives the variant copy of the affected variable or file and/or data describing the out-of-range event. In response to receiving the variant copy of the affected variable or file and/or data describing the out-of-range event, the model manager 2220D creates a sub-filter of one or more models (e.g. 2528-2532 FIG. 25) at 2716 which use the one or more variant variables or files. The new sub-filter(s) may now be used instead of the original filters by the DSIMM estimator instance for operation.

If no variables are out of range at 2704, then the DSIMM estimator instance operations will continue as before at 2702, and the settings updater 2534B will take no action (e.g. send a null input or no inputs to the model manager 2220D). In one optional example, if no variables are out of range at 2704, the settings updater 2534B sets a status at 2718 which allows the model manager 2220D to know that there are no runtime variables out of range, and the DSIMM estimator instance operations will continue as before at 2702.

In an example, a sensor of the S-MMS 18 has been damaged and is returning sensor reports with extremely high variability, where the values received by the DSIMM estimator instance from the sensor for a static target varies over a wide range of values. This sensor damage may cause the filter likelihood values (e.g. 1914 FIG. 19) of one or more models of a DSIMM estimator instance (of STF 500) to fall outside starting positive and/or negative model confidence values retrieved from memory (e.g. 61 Table 4).

In this example, a copy of Table 4 (e.g. Table 4a) is created at 2706 and the value of element 61 (e.g. a model confidence value) of Table 4a is modified by the DSIMM estimator instance to a new value which encompasses the model likelihood values such that the current model likelihood value(s) would fall inside the new positive and/or negative model confidence values. At 2708, Table 4a is saved as a variant of Table 4 in memory 120.

Figure 28:
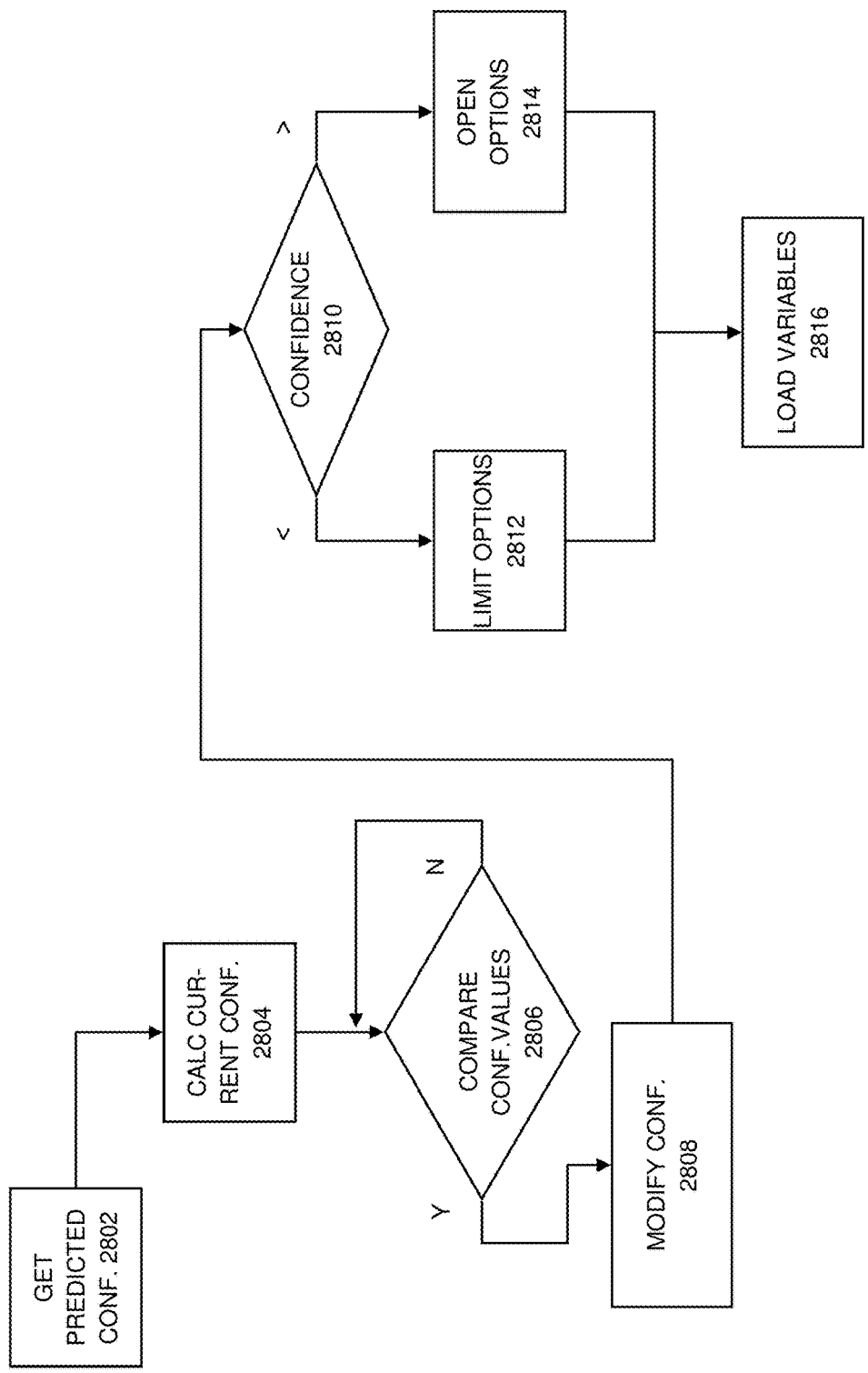
FIG. 28 depicts a process to modify design time variables.

FIG. 28 depicts a process for modification of one or more design time variables of a filter, an IMM estimator instance, or a DSIMM estimator instance executed by the STF 500. The process permanently modifies one or more design time variables in memory 120. At 2802, STF 500 retrieves a predicted confidence value from memory 120 where a predicted confidence value is a design time variable and may be an error, uncertainty, or noise parameter (e.g. an expected error/uncertainty of a sensor from Table 1 or a filter noise value from Table 2) used to initiate a filter, an IMM estimator instance, or a DSIMM estimator instance at startup. At 2804, a current confidence value is calculated by STF 500 based on sensor reports or filter output logs stored in memory 120 by STF 500. In an example, the last fifty sensor reports from a given sensor are stored in memory 120 while the S-MMS is stationary, and STF 500 uses one or more calculations to estimate the range error as a percentage of range measured for the sensor. In another example, the process noise ($w_m$) or measurement noise ($v_n$) are estimated based on statistical analysis of two or more filter uncertainty estimates ($P_{k|k}$) of a DSIMM estimator stored in memory 120.

At 2806, the calculated, current confidence value is compared to the predicted confidence value by STF 500. In an example of step 2806, the sensor or filter performance has not degraded, and the current confidence value is less than or equal to the predicted confidence value. In this case, the process starts back at 2802. It is expected, during normal operation, that the current confidence value will be less than or equal to the predicted confidence value set at design time. Otherwise, calculation errors may occur in one or more filter instances, IMM instances, or DSIMM instances. If, however, the sensor or filter performance has degraded over time, such that the current confidence value is greater than the predicted confidence value, then the process continues to step 2808 where the value for the predicted confidence is modified in memory 120. In an embodiment, at 2808, a copy of the affected design time variable or file which contains the variable data in memory 120 (e.g. an expected error/uncertainty of a sensor from Table 1 or a filter noise value from Table 2) is created, the value of the variable is modified in the copy, and the copy is saved. The new value of the variable is an increase to the expected confidence value by a predetermined (e.g. retrieved from memory) step size or is based on the current confidence value (e.g. a percentage or factor of the current confidence value, where the percentage can be less than or greater than 100% and the factor can be less than or greater than 1). The new design time variable value may be loaded for use by the system at the next reboot (e.g. per the process of FIG. 26). In one example, the process may end after step 2808 is complete.

In another example of step 2806, the current confidence value is compared to the predicted confidence value by STF 500. If the current confidence value is outside a defined limit (e.g. the absolute value of the current confidence value is greater than 110-percent of the predicted confidence value), then the process continues to step 2808 where the value for the predicted confidence may be modified (e.g. per the process of FIG. 27). In one example, the process continues to 2810. Step 2808 is an optional step of the process in some instances.

In some embodiments, the process of FIG. 28 may end after step 2808. In other instances, the process continues to step 2810.

At 2810, the STF 500 determines, e.g. with a logical comparison, whether the current confidence value is less than the predicted confidence value or greater than the predicted confidence value retrieved from memory 120. Confidence is a positive, preferred thing and opposite of error or uncertainty. A larger value for error or uncertainty indicates a lower confidence. At 2810, if it is determined that the current confidence value is less than the predicted confidence value, the STF 500 may limit one or more options or take one or more actions to address the decreasing confidence value in the output of one or more filters, IMM estimator instances, or DSIMM estimator instances at 2812.

In an example, the STF 500 may cause the HMI 352 or an application on a connected device to indicate a course of action (e.g. by transmitting a message containing instructions to generate the display indicating the course of action, and, in some instances requesting input for one or more optional courses of action, which are then processed by the STF or other process of the S-MMS controller).

In one example, the course of action might be an instruction to return the S-MMS 18 to the dealer for service, to repair or replace a loose or faulty sensor, or update the software or firmware of the S-MMS controller. In another example, the course of action may be an instruction for the user, a caregiver, or a technician to login to web interface (e.g. 942 FIG. 9) accessed through an internet connected device where a series of questions can be asked, resulting in the creation of an altered set of design time variables based on the answers to the series of questions. In an embodiment, the answers to the series of questions are used to create a prescription 2518, and the altered set of design time variables (e.g. 2527, 2528, 2529) are created by a configuration setup process 2504 of FIG. 25 along with any required runtime model variable data 2526 and models (e.g. 2530, 2531, 2532) necessary to implement the altered design time variables on the STF 500 of the S-MMS controller 110B. The altered set of design time variables are stored in memory on a remote server (e.g. 910 FIG. 9) by a technician in this example, or in some cases by a compute engine 914 of the remote server and transmitted (e.g. via output queue 918) wirelessly 908 to the S-MMS 18C. In an embodiment, each individual S-MMS 18C or user may have a unique channel in the output queue 918 so that transmissions may be targeted to the unique ID and/or IP address of an individual S-MMS 18C. In an example, the input queue 912 of a remote server 910 may accept the output of the configuration setup process 2504, a compute engine 914 may then validate the output of the configuration process and combine it with one or more unique IDs or IP addresses of an individual S-MMS and, if validated, send the output of the configuration process to a unique channel of the output queue 918 to be transmitted to the S-MMS 18C. The transmitted data is received via the internet or other external sources using one or more onboard communication processors (e.g. 216 FIG. 2). In an embodiment, the transmitted data may include identification, control instruction, and authentication information, in addition to the design time variables, which is checked by a process of the communication processor 216 and/or a security processor 212 before storing the received data to memory 120.

At 2810, if it is determined that the current confidence is greater than the predicted confidence, the STF 500 may remove limits of one or more options or take one or more actions to address the increasing confidence in the output of one or more filters, IMM estimator instances, or DSIMM estimator instances at 2814. In an example, the STF 500 may cause the HMI 352 or an application on a connected device to indicate a course of action (e.g. by transmitting a message containing instructions to generate the display indicating the course of action, and, in some instances requesting input for one or more optional courses of action, which are then processed by the STF or other process of the S-MMS controller). In one example, the course of action may be an instruction to return the S-MMS 18 to the dealer for service, to remove a previously displayed instruction, or update the software or firmware of the S-MMS controller. In another example, the course of action may be an instruction for the user, a caregiver, or a technician to login to web interface (e.g. 942 FIG. 9) accessed through an internet connected device where a series of questions can be asked, resulting in the creation of an altered set of design time variables based on the answers to the series of questions as previously disclosed for step 2812.

At 2816, the new design time variables are presented as available variables or an available variable set (e.g. 2608) of the next S-MMS controller startup process executed by the STF 500 (ref FIG. 26) and may be loaded for use by one or more filters, IMM estimator instances, or DSIMM estimator instances of the STF or another process of the SAC 302B.

Assessing User State

In an embodiment, with the above disclosure in mind, a characteristic of the user of an S-MMS (e.g. physical or cognitive state) changes over time where the change can be for the better or the worse. The changes in this example result in either an improvement or degradation of how the user operates the S-MMS 18. These changes may be tracked by a UHM 510 of the SAC 302B. Table 5 represents a non-limiting example of a number of user parameters that are indicative of the medical condition of the user. These user parameters represent a physiological state of the user.

The state of a user at any given time may be assessed in multiple ways. Data from memory 120 (e.g. associated with a user profile) provides a baseline for S-MMS 18 behavior. The user data stored in memory 120 consists of one or more stores of user data available for later retrieval by one or more processes of the S-MMS controller 110B. However, user capabilities change over time on large and small timescales. To make the processes of the S-MMS controller 110B truly responsive, one or more user inputs from the HMI 352 (FIG. 3), user sensor reports 375, reports from remote sources via CNI 371, outputs from other processes of the SAC 302B, and/or stored user data (e.g. from memory 120) may be used by the user health manager (UHM 510 FIG. 5) to assess the state of the user, modify settings of the S-MMS controller 110B, and/or update one or more elements of a user profile in memory.

Figure 29:
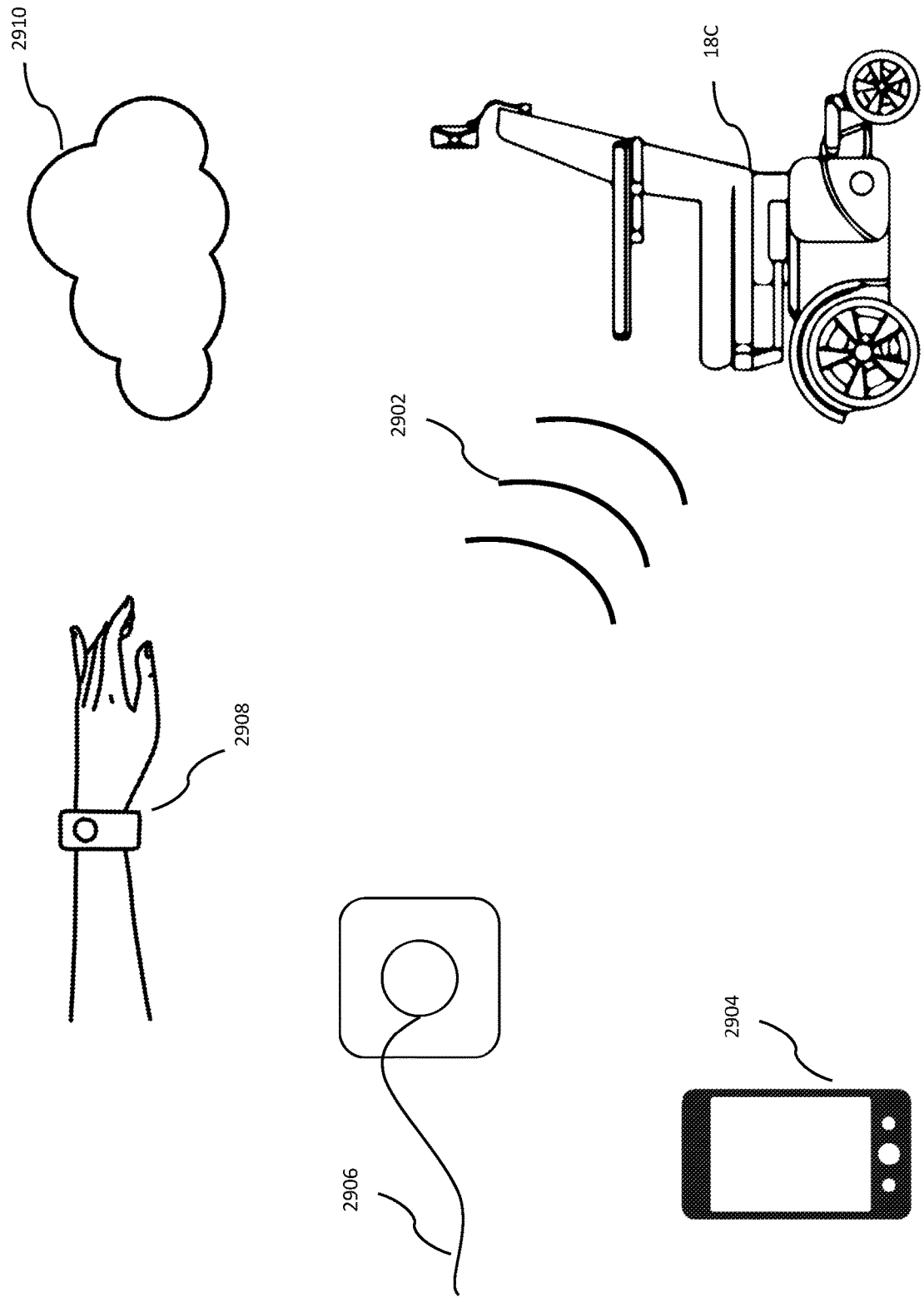
FIG. 29 depicts multiple sources of user health data.

FIG. 29 depicts user health data received wirelessly 2902 via CNI 371 from one or more sources including but not limited to sensors onboard the S-MMS 18C, paired smart devices 2904, off-board or remote sensors 2906, wearables 2908, and/or from one or more remote server cloud services 2910 (each referred to as an agent or source agent). In an embodiment, user health data is received via a secure Bluetooth connection. Additionally or alternatively, the user health data may be received using one or more of cellular communications, 802.11 communications, Wi-Fi communications, 802.15 communications, Bluetooth communications, Bluetooth Low Energy communications, 802.16 communications, WiMAX communications, near field communications, and 18092 communications.

As part of the pairing process between the CNI 371 manager (e.g. via a communication processor 216) and the source agent, configuration information is exchanged which allows the new user health data to be recognized and utilized by the UHM 510. In an embodiment, the pairing process and information exchange may be compliant with the IEEE 11073:20601 family of health informatics standards incorporated herein by reference. The data that is received from the source agent varies in both quality and time scale and may be processed or made actionable to the S-MMS controller 110B by the UHM 510.

Figure 30:
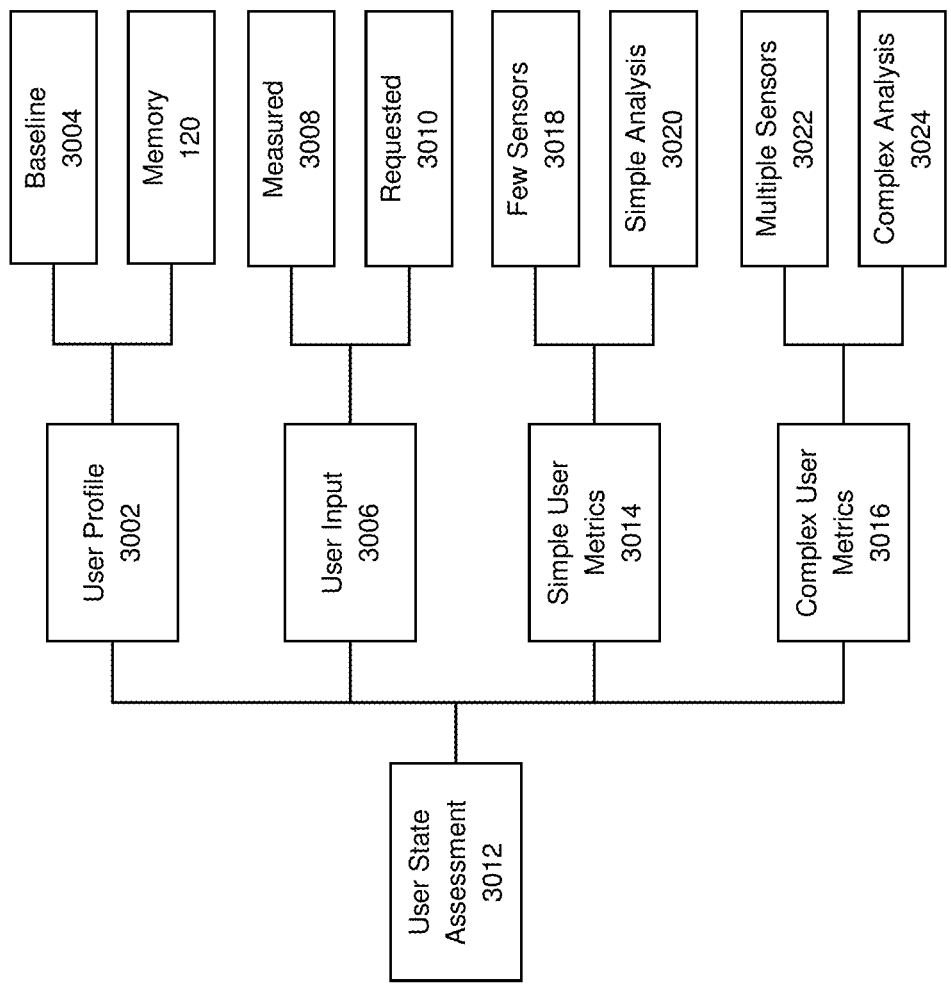
FIG. 30 depicts multiple ways to assess one or more states of a user.

In an embodiment, the state of a user at any given time is used by the S-MMS controller 110B and assessed by the UHM 510 in multiple ways as illustrated in FIG. 30. A user profile 3002 (stored in memory 120) provides a baseline 3004 for S-MMS controller 110B behaviors and associates stored user data in memory 120 with a user profile for later retrieval. In an embodiment, the user profile 3002 may contain all or part of the user parameters and associated values listed in Table 5. Additionally or alternatively, the user profile 3002 may be a header file, a portion of a header file, or another file that contains the user parameters and their associated values (e.g. Table 5) as previously disclosed. The user profile allows unique applications, causes or results in system behaviors and/or changes thereto based on user parameters in the user profile that are processed by the UHM 510, and causes or results in the activation or deactivation of features to follow the user between S-MMS units based on user parameters in the user profile that are processed by the UHM. However, user capabilities change over time on large and small timescales. To make the S-MMS controller 110B more responsive, user inputs, simple user metrics, and complex user metrics may also be assessed by the UHM 510.

The UHM 510 further integrates the user into the control system by using user inputs 3006, both measured 3008 and requested 3010 per FIG. 30, to adjust S-MMS controller 110B behavior in real time. In an example of measured user input 3008, HMI 352 inputs by the user may be compared to the threat assessment map of the SAC 302B and user reaction time may be inferred. In an example of requested user input 3010, input may be directly requested of the user via the HMI 352 and/or a connected device (e.g. smart device 902 FIG. 9). In an embodiment, the user may be prompted via a paired smart device 902 to "Rate your pain level on a scale of 1-10." Input values may be used to tune the S-MMS 18 behavior. For example, if an input value indicates the user's pain level is high (for example, as discussed above with respect to scalar inputs), the STF 500 or other process of the S-MMS controller 100B processes the input and instructs the drive path manager 529 of the SAC 302B or other S-MMS controller process to suggest navigation routes based on their smoothness even if they are longer. Another example of measured user input 3008 via the HMI 352 is an interactive game, displayed via the HMI or a paired smart device 902, where game interaction is used to infer user status, such as current reaction time, responsiveness to audio cues, and/or visual cues. In an embodiment, user input opportunities for user state assessment 3012 may be offered via HMI 352 based on one or more of a schedule, a need for information by one or more processes of the UHM 510, and/or a request received from a caregiver or technician and processed as discussed above with respect to scaler inputs and user, caregiver, or technician inputs.

Measured or calculated user metrics may also be used by UHM 510 to modify S-MMS controller 110B behavior. For simplicity, user metrics are discussed as either simple user metrics 3014 or complex user metrics 3016.

A simple user metric 3014 is one that can be determined from sensor reports from a small number of user sensors 3018 (in some instances, one sensor) and/or using a simple analysis 3020. Often simple user metrics can be assessed as binary (e.g. wet versus dry), as thresholds (e.g. temperature lower/higher than a given value), based on variation from an expected baseline (e.g. heart rate outside of expected range or standard deviation larger than expected based on analysis of historic data from memory 120), and/or based on trend analysis (e.g. rate of change or future estimates based on a least-squares fit to collected sensor data from memory).

Complex user metrics 3016 are values that are determined from sensor reports from multiple sensors 3022 (or multiple sensor reports, collectively, from one or more sensors) and/or using a complex analysis 3024. Examples of complex user metrics 3016 include conditions like overall user status, exhaustion, pain and/or emotional state that often require more than one means of assessment, one or more states that may require tracking multiple simple user metrics 3014 simultaneously, and one or more states that may require a custom algorithm or complex analysis 3024 to accurately infer the one or more states. Complex user metrics 3016 may also be tracked by utilizing two dis-similar sensors to track the same user condition and employing dual mode variance to increase confidence in the metric measurement. User metrics throughout the range from simple user metrics 3014 to complex user metrics 3016 are tracked, analyzed, and/or calculated by UHM 510 based on one or more received sensor reports (e.g. 371-376 FIG. 3), which are used to bias or modify S-MMS controller 110B behavior (e.g. by modifying the behavior of one or more process of the S-MMS controller such as the SAC 302B and/or modifying one or more file in memory 120 used by one or more process of the S-MMS controller).

The expectations of how a user operates the S-MMS will be unique for any user, especially after 1-year of use and practice. What is needed is a way to assess the user's skill levels and record data for those assessed skill levels in such a way that the S-MMS controller 110B can use the assessed skill level data to modify a basic S-MMS system to match the skills of the user and update certain parameters and/or variables and their values for the S-MMS (e.g. Tables 1-5) permanently and other parameters and/or variables and their values for the S-MMS (e.g. Tables 1-5) temporarily based on the assessed skill level data. As one example, the updated parameters and/or variables and their values are saved in a date-stamped file, and each date-stamped file is saved uniquely by date of creation or change.

User Health Manager

The S-MMS controller 110B is designed to collect and securely handle user health data as previously disclosed. User health data may come from a multitude of sources, including but not limited to sensors onboard the S-MMS, paired smart devices, off-board or remote sensors, wearables, and data services over the internet via the cloud. The data that is received varies in both quality and time scale. This data is made actionable by the UHM 510 of the SAC 302B for use by the S-MMS controller 110B. Additionally or alternatively, the functions of the UHM 510, in combination with wireless communications and processing on a connected device or via a remote server as previously disclosed, may be used for non-motorized mobile systems such as manual wheelchairs, gurneys, or hospital beds as a way to better monitor patient status.

Figure 31:
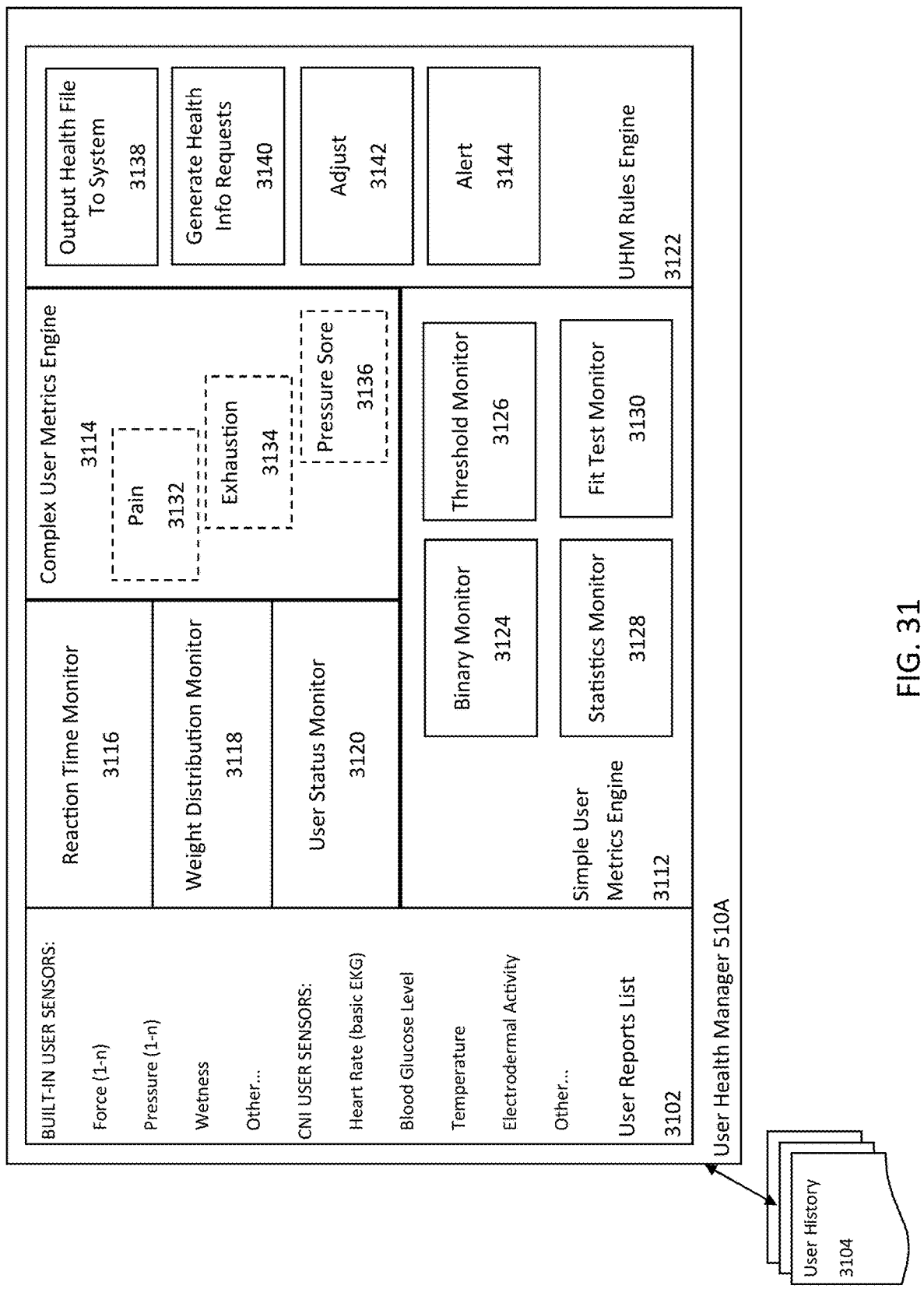
FIG. 31 depicts an embodiment of a user health manager.

FIG. 31 depicts an embodiment of a user health manager 510A consistent with the UHM 510 described above. Sensor reports (e.g. via CNI 371 and/or user sensor reports 375) are accepted by UHM 510A and assigned to data categories and index locations in a user reports list 3102. Data from the user reports list 3102 may be supplemented by historical user data retrieved from one or more user history files 3104 stored in a secure memory 120.

User history files 3104 may contain electronic personal health information (ePHI), historical sensor data from one or more built in or remote sensors, a historical user reports list 3102 values, and/or historical outputs of one or more process of the UHM 510A in an example. Additionally, other reports may be received from one or more other sources and incorporated in the user reports list 3102, such as data from one or more remote servers 910, navigation 363, non-contact sensor reports 372, image sensor reports 374, or reports from one or more motor controllers 351 and/or HMI 352.

Data from the user reports list 3102, user history files 3104, and other reports are used by five main processes of the UHM 510A. Those processes are a simple user metrics engine 3112, a complex user metrics engine 3114, a reaction time monitor 3116, a weight distribution monitor 3118, and a user status monitor 3120. The outputs of one or more of these five UHM 510A processes are then used by a UHM rules engine 3122 to generate one or more control instructions. The one or more control instructions are received by the S-MMS controller 110B and cause actions or modification of S-MMS controller 110B behavior.

In an embodiment, the UHM rules engine 3122 generates a control instruction which contains one or more numerical values (e.g. scalar biasing values) which the S-MMS controller 110B uses to update one or more model switching probabilities of the probability matrix, stored in memory 120, of the model probability matrix of an IMM estimator. In another example, the UHM rules engine 3122 generates a control instruction that is used as an input 2222 (FIG. 22) by the model manager 2220 of one or more DSIMM estimator instances as previously disclosed. In this example, the generated control instruction may cause modification of one or more model setup values, creation of one or more sub-filters, and/or modification of one or more model probabilities. One or more user metrics may be used to automate S-MMS 18 features and modes.

The user reports list 3102 may be structured data or unstructured data. In an embodiment, the user reports list 3102 is a table or embedded database in secure memory 120 of the S-MMS 18 associated with a user profile that is maintained by the UHM 510A. In an example, the user reports list 3102 is a relational database (e.g. within a relational database management structure) keyed by a device or user ID with data stored for that device or user ID. In another example, the user reports list 3102 is a table or string of data containers keyed by device or user ID.

The user reports list 3102 is a report of the user data available to the UHM 510A at a given point in time. The user reports 3102 list includes one or more built-in user sensor data elements (i.e. defined locations in a table or database structure for which sensor values or data related to a sensor is stored or located) that are set at design time or updated with a software update installed by a technician if one or more sensors are added to the S-MMS 18. For example, an S-MMS 18 may include one or more force sensors that monitor the weight of the user, a pressure sensor that monitors the weight distribution of the user on their seat, and a wetness sensor that monitors wetness of the seat or one or more of those sensors may be added to the S-MMS. A data element is data at a defined location in a table or database structure.

Additionally, the user reports list 3102 includes one or more CNI user sensor data elements, where a CNI user sensor is a remote sensor providing data on the state of the user. In order to accommodate multiple different aftermarket, wireless health informatics data sources via CNI 371, the user reports list 3102 may include an identification of one or more sensors or other data providing devices.

When the UHM 510A receives a sensor report or other communication via CNI 371 or otherwise, the UHM compares the identification of the sensor or other data providing device in the sensor report or other communication to the identifications of devices in the user reports list 3102 to determine if the identification of the sensor or other data providing device in the sensor report or other communication matches an identification of a sensor or other data providing device in the user reports list 3102. If the UHM 510A determines the identification of the sensor or other data providing device in the sensor report or other communication matches an identification of a sensor or other data providing device in the user reports list 3102, the UHM associates the data from the received sensor report or other communication device with the identification of the sensor or other data providing device, including in any record for that sensor or other data providing device. If the UHM 510A determines the identification of the sensor or other data providing device in the sensor report or other communication does not match an identification of a sensor or other data providing device in the user reports list 3102, the UHM either creates a new record for that identification or, alternately, disregards the sensor report or other communication.

In an embodiment, sensor reports received via CNI 371 that are compliant with the IEEE 11073:20601 family of health informatics communications standards are recognized by the UHM 510A, and an identification of one or more sensors that transmitted the sensor reports and data from those sensor reports is placed in the user reports list 3102. Additionally or alternatively, user health data received via Bluetooth HDP standards or Bluetooth Low Energy (BLE) GATT standards as defined in the Bluetooth core specification, incorporated herein by reference, may be recognized by the UHM 510A, and the user health data is placed in the user reports list 3102. In an embodiment, predefined data elements are available for heart rate values from a basic EKG, blood glucose level, temperature, and electro dermal activity values, among others.

Each element of the user reports list 3102 for a sensor or sensor report may have an associated timestamp for when the reading was taken, when the reading was received, the source, and/or an uncertainty value in the reading value that was received. Data in different user sensor reports may vary greatly both in the time between readings and in the quality of those readings. In an embodiment, the UHM 510A deletes user report list data past a certain, predefined expiration date or after each predefined period of time (e.g. a certain number of days, weeks, months, etc.) from a specified event or action, such as startup of the S-MMS controller 110B or another action or event. One or more processes of the UHM 510A may use one or more received time or uncertainty values in their calculations. Uncertainty values may be received with sensor reports (e.g. via user sensor reports 375 or CNI 371) or may be retrieved from memory 120.

The reaction time monitor 3116 is tasked with estimating the current user reaction time based on user parameters (e.g. u1, reaction rate Table 5), historical data 3104, HMI 352 inputs, and SAC 302B interventions. In an embodiment, one or more filters of the STF 500 provide the collision manager 526 with information necessary to calculate the estimated time to impact with an obstacle. The SAC 302B may determine, based on this estimated time to impact and the output of the reaction time monitor 3116 (e.g. estimated user reaction time), whether S-MMS controller 110B overrides of user input via the HMI 352 are necessary. In one example, the user's measured or calculated (actual) user reaction time is 0.8 seconds, which is greater than the expected user reaction time of 0.6-seconds retrieved from Table 5. If, in this example, the estimated time to impact to the nearest collision threat calculated by the collision manager 526 of the SAC is 4 seconds, then the S-MMS controller 110B may allow the user HMI inputs to be used. If however, in this example, the difference between the estimated time to impact and the actual user reaction time is small (e.g. if the estimated time to impact with the nearest collision threat is 1 second or less), then the S-MMS controller 110B may override user HMI input to avoid the collision (e.g. stop the S-MMS, slow down the S-MMS, and/or alter course of the S-MMS, etc.).

Further, by calculating estimated user reaction times from user inputs via the HMI 352 and storing them in user history 3104 over time, the reaction time monitor 3116 may determine changes in reaction time over time. In an embodiment, user reaction times are compared to an expected user reaction time (e.g. as stored in memory at system setup e.g. u1, reaction rate Table 5) to determine whether or not an actual user reaction time (e.g. as measured or calculated) is shorter than, the same as, or longer than the expected user reaction time. The reaction time monitor 3116 optionally may be configured to store a measured or calculated actual or expected user reaction time value in memory 120 that is shorter than or longer than the expected user reaction time that was previously stored in memory. This enables the reaction time monitor 3116 to dynamically update the values for user parameters to enable the UHM 510A or other process of the S-MMS controller 110B to better control navigation, overriding control, or other actions based on the current state of the user.

In an embodiment, a statistical analysis of the sample standard deviation of the differences between expected user reaction time and actual user reaction times over a period of time is completed by the reaction time monitor 3116 of the UHM 510A and an actual user reaction time value for a confidence level of 99-percent is calculated by the reaction time monitor. In an example, this statistical analysis of user history 3104 data yields a 0.8-second actual user reaction time to the detection of a threat. The reaction time monitor 3116 optionally may be configured to store this new actual user reaction time value in memory 120 in place of the previously stored expected user reaction time value.

In an embodiment, a predetermined expected user reaction time value (e.g. 0.8-second) is set and stored in memory 120. The reaction time monitor 3116 compares each new actual user reaction time value (as calculated or measured) to the expected user reaction time value. When the reaction time monitor 3116 determines the actual user reaction time value (as calculated or measured) is greater than 10% of the expected user reaction time value, the reaction time monitor 3116 saves the new actual user reaction time value as the expected user reaction time value in memory 120 (e.g. to Table 5).

In one example, the reaction time monitor 3116 saves the new user reaction time value (as calculated or measured) as the expected user reaction time value in memory 120 as part of an altered set of runtime variables for use by one or more DSIMM instances of STF 500. Storing the altered set of runtime variables by the reaction time monitor 3116 may cause the UHM rules engine 3122 to send a control instruction to STF 500 (as previously disclosed) which is used by one or more DSIMM instances of STF as an input (e.g. 2222 FIG. 22) and may cause the model manager 2220 to dynamically load the altered set of runtime variables from memory 120 for use with one or more models or sub-filters of the DSIMM. For example, a DSIMM may start with three models (e.g. 2205, 2210, and 2215 of FIG. 22). The UHM 510 sends one or more control instructions (received as an input by a DSIMM) which causes a model manager 2220 of a DSIMM instance to save the values for the altered set of runtime variables dynamically as a new sub-filter that is a variant of the original model.

The weight distribution monitor 3118 calculates total user weight and/or weight distribution on the S-MMS 18 based on one or more force and/or pressure readings from one or more force and/or pressure sensors that optionally may be retrieved from the user reports list 3102, one or more position and/or orientation reports from the seating system (e.g. as received from a seating system motor controller 351 and/or application processor 210) that optionally may be retrieved from the user reports list 3102, and/or a user weight retrieved from memory 120 (e.g. u2. Table 5).

In an embodiment, one or more strain and/or force sensors may be used in the connection between a seating assembly of the S-MMS 18 and the chassis of the S-MMS. User sensor reports 375 from these one or more sensors allow the weight distribution monitor 3118 to determine the weight of the occupant by subtracting the reported force and/or weight from the known force and/or weight of the seating assembly retrieved from memory 120. Alternately, the weight distribution monitor 3118 may convert a reported force from a sensor report (or from the user reports list 3102) to weight and subtract that converted weight from the known weight of the seating assembly retrieved from memory 120.

In an embodiment, one or more force sensors may be built into the seat mechanism(s) of an S-MMS and communicatively connected to the S-MMS controller 110B. In some embodiments, force sensors may be added to the mounting mechanisms of a seat system to gain weight distribution data. In one embodiment, force sensors may be added to the mounting mechanisms of seat system actuators to gain weight distribution data. In other embodiments, force sensors may be added to the mounting mechanisms of a seat to gain weight distribution data. Additionally or alternatively, measurement of the weight or weight distribution between the seat back, seat bottom, arm rests, and foot supports may be read directly by the S-MMS controller 110B from one or more force feedback sensors on one or more actuators used to position each of these mechanical systems or from other sensor mechanisms.

This weight or weight distribution data from the force feedback sensor(s), in combination connection with data identifying the mechanical position of the seat (e.g. received from a motor controller 351) allows the weight distribution monitor 3118 to accurately calculate the weight and/or weight distribution of the user any point in time where weight distribution is the apportioning of weight within an area, often written in the form x/y, where x is the percentage of weight in the front, and y is the percentage of weight in the back or where x is the percentage of weight on the left, and y is the percentage of weight on the right.

In another embodiment, a weight distribution or pressure map from one or more seat cushions with embedded sensors may be received via CNI 371 and added to the user reports list 3102 as a CNI user sensor for use by the weight distribution monitor 3118. Additionally or alternatively, the pressure map from one or more seat cushions with embedded sensors may be received as a user sensor report 375. Alternately, the weight distribution monitor 3118 may receive one or more sensor reports from each sensor embedding in a seat cushion and determined a weight or weight distribution of the user based on the one or more sensor reports.

The calculated weight and/or weight distribution may be sent to by the weight distribution monitor 3118 (or other SAC/S-MMS controller process) to the stability manager 525 of the SAC 302B to be used to better estimate the current stability condition of the S-MMS 18. In addition, the calculated weight and/or weight distribution may be saved to memory 120 by the weight distribution monitor 3118 (or other SAC/S-MMS controller process) and/or may be used by one or more simple or complex user metrics engines in combination with the UHM rules engine 3122 as disclosed below.

The user status monitor 3120 calculates one or more scalar user status values based on outputs from one or more UHM 510A processes, including the reaction time monitor 3116, the weight distribution monitor 3118, the simple user metrics engine 3112, and/or the complex user metrics engine 3114. The user status monitor 3120 outputs the one or more scalar user status values, which may be stored and/or used by one or more processes of the S-MMS controller 110B to determine a confidence level in user input. This confidence level can then be used to dynamically scale system autonomy and user assistance. As a non-limiting example, the confidence level may be used for scalar biasing of the S-MMS controller 110B functions at startup. The user status monitor 3120 may store the output(s) in the user reports list 3102 and/or user history 3104.

The output(s) of the user status monitor 3120 may be used to quantify how much the input from the user may be weighted versus input from other S-MMS controller 110B functions. In an embodiment, the user status monitor 3120 calculates a single scalar value (U) using a weight function, such as a weighted average function, of the UHM process outputs as depicted in Equation 25, where n is the number of UHM process outputs utilized, w(i) is the weighting factor for each function, and f(i) is a mathematic function calculated using one or more UHM process outputs.

$$U = \frac{\sum_{i=0}^{n} w(i) * f(i)}{\sum_{i=o}^{n} w(i)} = \frac{w(\text{weight})f(\text{weight}) + w(\text{reaction})f(\text{reaction}) + w(\text{simple})f(\text{simple}) + w(\text{complex})f(\text{complex})}{w(\text{weight}) + w(\text{reaction}) + w(\text{simple}) + w(\text{complex})}$$

Eq. 25

In a non-limiting example, the user status (U) is calculated using the weighted function of Equation 26.

$$U = \frac{(.25)f(\text{weight}) + (.25)f(\text{reaction}) + (.10)f(\text{simple}) + (.40)f(\text{complex})}{1.0} \quad \text{Eq. 26}$$

Each function returns a value between zero and one:
f(weight)=(16-number of continuous hours user weight has been sensed)/16;
f(reaction)=if: current user reaction=<baseline user reaction, then 1;
  else: absolute value[1−(current user reaction−baseline user reaction)];
f(simple)=1−(number of simple user metrics outside defined range/number of simple user metrics)
f(complex)=if: no complex metrics outside of defined range, then 1;
  else if: 1 complex metric outside of defined range, then 0.75;
  else if: 2 complex metrics outside of defined range, then 0.25;
  else: 0;

In other embodiments, the user status monitor 3120 may include predictive estimation and filtering capabilities.

The simple user metrics engine 3112 calculates one or more user metrics based on data from the user reports list 3102 and/or one or more user history files 3104 from memory 120. The simple user metrics engine may calculate metrics based on calculations preconfigured on the S-MMS controller 110B at design time or may be calculated based on user metrics defined by users, caregivers, and/or technicians via an API. Metrics are calculated using a predefined monitor such as a binary monitor 3124, a threshold monitor 3126, a statistics monitor 3128, and/or a fit test monitor 3130. In another embodiment, a mobile chair S-MMS user is living away from their family. Simple user health metrics may be configured around the user's weight, pressure sore avoidance activities, and general activity levels.

A binary monitor 3124 monitors a selected sensor report from the user reports list 3102 for presence or lack of presence of a specific report (e.g. a value from a sensor or other device within or outside of a range, a value from a sensor or other device below or above a threshold, a binary number 0 or 1 from a sensor or other device indicative of a state being true or false, or another reading or other data from a sensor or other device, for example for a design time and/or runtime variable). In an embodiment, a moisture sensor placed in the seat of the S-MMS detects wetness and transmits a sensor report 375 with a binary number value indicating the presence of wetness or a value indicative of a wetness level. This user sensor report 375 is received by the UHM 510 and added to the user reports list 3102. A binary monitor 3124 of the simple user metrics engine 3112 is configured to monitor the user reports list 3102, identify the existence or presence of the user sensor report 375 from the moisture sensor on the user reports list, identify the binary number value indicating the presence of wetness or the value indicative of a wetness level, and set a wetness status (e.g. the status is 1 when set and 0 when reset or not set) based on the presence of wetness or a configured level of wetness. The UHM rules engine 3122 of UHM 510A checks the wetness status and, upon determining the wetness status is set (e.g. the status is 1 when set and 0 when reset or not set), sends a control signal (via the S-MMS controller 110B) to the HMI 352 suggesting a trip to the bathroom to the user. Additionally or alternatively, upon the UHM rules engine 3122 determining the wetness status is set, one or more caregivers may be alerted to assist the user as previously disclosed. The binary monitor 3124 takes similar action for each sensor report or other data on the user reports list 3102.

A threshold monitor 3126 monitors a selected sensor report from the user reports list 3102 for a deviation outside of one or more defined threshold values or ranges, including over or under a threshold value or over or higher than a first (e.g. upper) threshold value and/or under or lower than a second (e.g. lower) threshold value. In an embodiment, a threshold monitor 3126 instance of the simple user metrics engine 3112 may monitor data received by the UHM 510 via CNI 371 from a paired wearable (e.g. 2908 FIG. 29) capable of tracking electro dermal activity. The threshold monitor 3126 monitors the user reports list 3102, identifies the existence or presence of data from the paired wearable on the user reports list, and compares the data from the paired wearable to a user baseline upper and/or lower threshold values for an electro dermal variable stored in memory 120. When the threshold monitor 3126 detects a variation of electro dermal data outside of one or more defined threshold value (e.g. over an upper threshold and/or under a lower threshold), the threshold monitor sets a status (e.g. by setting an electro dermal status) which is read by the UHM rules engine 3122. The UHM rules engine 3122 (e.g. of S-MMS controller 110B) checks the electro dermal status and, upon determining the electro dermal status is set (e.g. the status is 1 when set and 0 when reset or not set) sends a control signal to the HMI 352 or a paired smart device 902 causing the HMI or the paired device to prompt the user with a question such as "How are you feeling?" or "Should we head home?" or "Do you need help?". Additionally or alternatively, the UHM rules engine 3122, upon determining the electro dermal status is set (e.g. the status is 1) may be configured to send one or more control signals which causes a motor controller 351 to take a predefined action, such as changing the seating position.

The statistics monitor 3128 monitors a select sensor report from the user reports list 3102 to identify or determine a defined (e.g. stored in memory 120) statistical deviation based on analysis of more than one historical value for data retrieved from user history 3104. For example, the statistics monitor 3128 calculates the historical mean ($\mu$) and sample standard deviation ($\sigma_s$) (or other statistical value) from two or more data points (e.g. one or more historical values from user history) of a variable, compares the calculated historical mean and sample standard deviation (or other statistical value) to a sensor report have a value for the same variable, and takes one or more actions based on the comparison. The statistics monitor 3128 sets a status for the variable or leaves the status for the variable unset or reset based on the comparison. Either the statistics monitor 3128 or the UHM rules engine 3122 checks or determines the status of the variable and optionally takes one or more actions based on the variable status. In one example, the statistics monitor 3128 or the UHM rules engine 3122 checks or determines the status of the variable and takes one or more actions then the variable status is set and takes no action when the variable is not set or reset.

In an embodiment, user heart rate and respiration rate measurements from an electrocardiogram may be received by the S-MMS controller 110B wirelessly over a secure Bluetooth connection via CNI 371 (and subsequently by the UHM 510) and added to the user reports list 3102 by the UHM. Additionally, a history of previous heart rate and respiration values has been stored to memory 120 in user history 3104 by the UHM rules engine 3122 of the UHM 510A. The statistics monitor 3128 calculates the historical mean (μ) and sample standard deviation ($\sigma_s$) from two or more data points (e.g. one or more historical values from user history). In the current example, the previous (e.g. from user history 3104) heart rate and respiration values are used. The standard deviation of two or more data points may be calculated by the statistics monitor 3128 based on an assumption of known probability distributions (e.g. assuming Gaussian or normal error distribution) or may be calculated using the maximum-likelihood method. The statistics monitor 3128 calculates the statistical mean and standard deviation using the two or more data points and compares the current sensor report, for example respiration rate retrieved from the user reports list 3102, to the calculated statistical mean and standard deviation. The statistics monitor 3128 sets a status for the variable or leaves the status for the variable unset or reset based on the comparison.

In one example, the statistics monitor 3128 retrieves a confidence value (e.g. 2-sigma) from memory 120. The statistics monitor 3128 logically compares the confidence value and the historical population (e.g. the calculated statistical mean and standard deviation) of that variable against the current sensor report and sets a status for the variable or leaves the status for the variable unset or reset based on the comparison. For example, the confidence value may be 2-sigmas. Therefore, the statistics monitor 3128 logically compares the historical mean (μ) plus two standard deviations ($2\sigma_s$) from two or more data points to the current sensor report and sets a status for the variable or leaves the status for the variable unset or reset based on the comparison. Equation 27 discloses an exemplary logical comparison.

$$\text{if: current report} <= \mu + 2\sigma_s \text{ and} \\ \text{current report} >= \mu - 2\sigma_s \text{ then 0;} \\ \text{else: 1.} \qquad \text{Eq. 27}$$

Either the statistics monitor 3128 or the UHM rules engine 3122 (e.g. of S-MMS controller 110B) checks the logical comparison status and, upon determining the heart rate or respiratory rate status is set (e.g. the status is 1 when set and 0 when reset or not set), sends a control signal to the HMI 352 or a paired smart device 902 causing the HMI or the paired device to prompt the user with a question such as "How are you feeling?" or "Should we head home?" or "Do you need help?". Additionally or alternatively, the statistics monitor 3128 or the UHM rules engine 3122, upon determining the heart rate or respiratory rate status is set (e.g. the status is 1), may be configured to send one or more control signal which causes a motor controller 351 to take a predefined action, such as changing the seating position. In another example, a control signal may be sent by the statistics monitor 3128 or the UHM rules engine 3122 to one or more communication processors (e.g. 216 FIG. 2) which causes the communication processor to take a predefined action, such as sending a communication signal to a remote device or remote server. The statistical monitor 3128 may take similar action for any sensor report or other data on the user reports list 3102.

The fit test monitor 3130 uses a current sensor report from the user reports list 3102 and historical values of sensor data retrieved from memory 120 as part of the user history 3104 to test the trend, trajectory, and/or fit of the sensor report to a calculated function. Fit test monitor 3130, in an embodiment, may calculate a function, fit the function to historical sensor data retrieved from memory 120, or use a least-squares fit method, maximum likelihood method, or the Marquart method for fitting a function to data. Fit testing may be performed by fit test monitor 3130 using a chi-squared goodness of fit test, linear-correlation coefficient calculations, or F-Test methods in an embodiment.

In an example, a continuous glucometer is worn by an S-MMS user which detects user blood glucose level and transmits a sensor report 375 with a numerical value indicating the measured glucose level in the user's blood. This user sensor report 375 is received wirelessly by the UHM 510 over a secure Bluetooth connection via CNI 371, and the UHM adds the sensor report to the user reports list 3102. Additionally, a history of previous blood glucose values has been stored over time to secure memory 120 as user history 3104 by the rules engine 3122 of the UHM 510A. A fit test monitor 3130 instance is configured to apply the method of least squares to blood glucose measurements received in the last hour (e.g. as retrieved from user history 3104) and calculate the slope of the line of best fit. Additionally, the error in the fit is calculated by the fit test monitor 3130 as part of the least-squares fit process. The fit test monitor 3130 may be configured to monitor the trend (e.g. increasing or decreasing slope), the offset (e.g. changes in the zero intercept of the linear equation), or fit error of one or more values of a variable, for example to determine if the one or more values deviate from a defined value or range (e.g. are above a defined value, below a defined value, and/or above and/or below a defined range). The fit test monitor 3130 may set a status (e.g. to 1) when one or more monitored values deviates from a defined value or range or optionally do not set or reset the status (e.g. to or at 0) when the one or more monitored values do not deviate from the defined value or range.

In a continuation of the example, the slope of the line of best fit to blood glucose data is trending downward, optionally within some predefined error threshold, which causes the fit test monitor 3130 to set an alert blood glucose status (e.g. to 1). The UHM rules engine 3122 of UHM 510A checks or determines the alert blood glucose status and, upon determining the alert blood glucose status is set (e.g. the status is 1 when set and 0 when reset or not set), sends a control signal (via the S-MMS controller 110B) to the HMI 352 suggesting that their blood sugar level should be addressed. In an embodiment, the UHM rules engine 3122 may transmit a control signal to one or more communication processors (e.g. 216 FIG. 2) upon determining the alert blood glucose status is set, which causes the communication processor to take a predefined action, such as sending a communication signal containing control instructions to a remote device configured to take a predefined action based on the control instructions, such as communicating with an insulin pump. Additionally or alternatively, the UHM rules engine 3122 may alert one or more caregivers to assist the user as previously disclosed. The fit test monitor 3130 may take similar action for any sensor report or other data on the user reports list 3102.

The complex user metrics engine 3114 calculates one or more user metrics based on data from the user reports list 3102 and/or one or more user history files 3104 from memory 120. The complex user metrics engine may calculate user metrics based on calculations preconfigured on the S-MMS controller 110B for the UHM 510 at design time or may be calculated based on equations defined by users, caregivers, and/or technicians via an API. Complex user metrics are calculated by complex user metrics engine 3114 based on one or more reports received (e.g. user sensor reports 375 or CNI 371) by the S-MMS controller 110B and used to alter S-MMS controller behavior. Examples of complex user metrics include programs to detect pain 3132, user exhaustion 3134, and/or manage or avoid pressure sores 3136. Non-limiting examples of additional or alternative complex user metrics include programs which determine or estimate emotional state, psychological state, pain status, exhaustion status, and/or pressure sore risk or mitigation, among others.

In an embodiment, an emotional state program is loaded into memory 120 for use by the complex user metrics engine 3114. As an example, the emotional state program may consist of one or more algorithms which use current electrodermal sensor readings (e.g. from the user reports list 3102) compared to historical electrodermal sensor readings (e.g. from user history 3104), current temperature readings, and the current time to estimate whether the current user emotional state is positive or negative. The complex user metrics engine 3114 may take the output of the emotional state program and convert the positive or negative values into an emotional state status (e.g. the status is 1 for a negative emotional state and 0 for a positive emotional state) for use by the UHM rules engine 3122. In a continuation of the example, the UHM rules engine 3122 of UHM 510A checks the emotional state status and, upon determining the emotional state status is set (e.g. the status is 1 when set and 0 when reset or not set), the UHM rules engine 3122 may:

bias the optimization preferences of the drive path manager 529 (of SAC 302B) so that navigation routes to locations chosen by the user may be calculated by the drive path manager 529 based on proximity to known friends or social locations rather than the shortest route, send (via the S-MMS controller 110B) one or more control signals, containing one or more control instructions, that adjust one or more settings for connected devices (e.g. 2906 FIG. 29), such as home automation devices, in an example, to increase light levels and air circulation by transmitting one or more signals (e.g. via CNI 371) based on preconfigured settings retrieved from memory 120, or, send one or more control signals to the HMI 352 or a paired smart device 902 causing the HMI or the paired device to prompt the user with a question such as, "Hey, it's been a while since you called _____, would you like to call them?"

The complex user metrics engine 3114 may take similar action for any program being executed by the engine.

A continuous link from the UHM 510A (of the S-MMS controller 110B) to the cloud via WiFi and cellular technologies, like 5G, allows one or more programs of the complex user metrics engine 3114 to link to remote services (e.g. 910 FIG. 9) for access to remote data and/or to transmit data for analysis to the remote services. For example, facial diagnostics can be run by a remote service against large, cloud databases to track health or emotional state of a user by processing onboard camera data from the S-MMS 18 (e.g. from memory 120 of the S-MMS) with the cloud analytics software (e.g. by a machine learning engine 1010 FIG. 10). Advanced analyses may be initiated by a program run in the complex user metrics engine 3114 of the UHM 510A on the S-MMS controller 110B.

In an example, a pain program 3132 is executed by the user metrics engine 3114 which creates a data file which is transmitted (e.g. via CNI 371) to a remote server 910. The remote server 910 accepts the transmitted data file, processes the data from the data file using one or more algorithms or machine learning engines, determines a result, and transmits the result back to the S-MMS 18. The result of the analysis is received via CNI 371 and used by the pain program 3132 to set, reset, or leave unset a status which is used as previously disclosed by the rules engine 3122 of the UHM 510A.

The UHM rules engine 3122 executes one or more predefined rules as part of UHM 510A. In an embodiment, the UHM rules engine 3122 takes one or more actions, including outputting a health file to memory 3132, generating one or more health information requests 3134 to the sensor tasker 520 or via CNI 371, adjusting one or more settings of the S-MMS controller 110B, motor controller 351, HMI 352, or other component, and/or sending one or more alerts 3138. These actions are taken based on the rules engine 3122 processing the output of one or more UHM 510A processes, processing rules and data, or performing calculations with data as previously disclosed.

All or part of the user reports list 3102 and/or outputs from one or more calculations of the UHM may be saved to user history 3104 by the UHM rules engine 3122. Alternatively or additionally, the rules engine 3122 may transmit data to a remote database or server (e.g. 910 FIG. 9). Areas of concern identified by the UHM rules engine 3122 may be used by the UHM 510A to prioritize future analysis steps, generate health information requests, and/or flag identified threats. In an embodiment, the UHM rules engine 3122 may modify one or more configuration file values in order to bias the operation of STF 500 towards a particular model as previously disclosed. Additionally or alternatively, the rules engine 3122 may set, modify, or update one or more values of Table 5 such that calculations of SAC 302B functions which depend on the table data, such as the stability manager 525 (e.g. which uses weight) and/or collision manager 526 (e.g. which uses user reaction time), are impacted.

Figure 32:
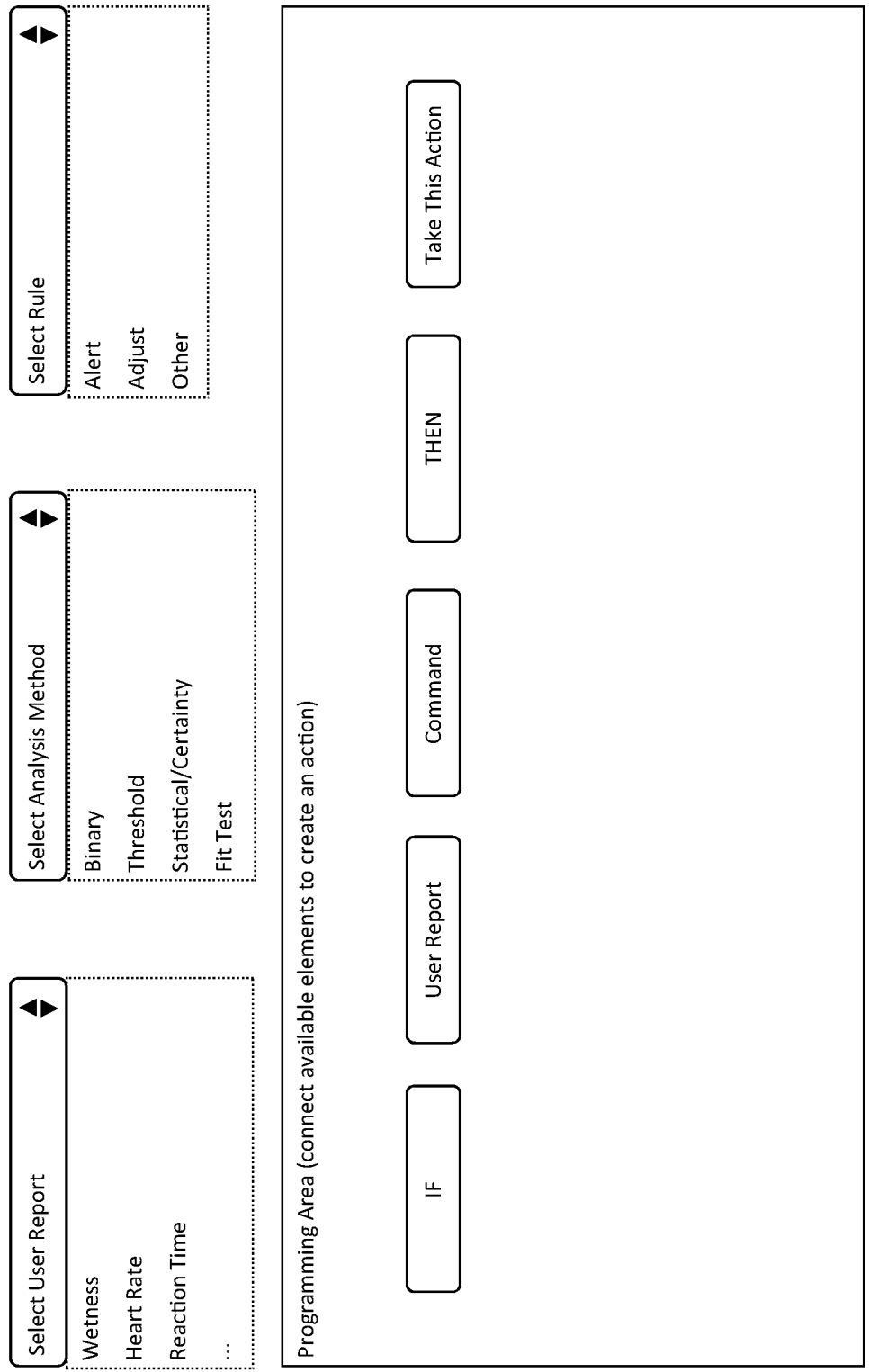
FIG. 32 depicts an embodiment of a user metrics programming interface.

An application programming interface (API) is a set of routines, protocols, and tools for building software applications. In an embodiment, simple user metrics may be programmed or configured for the simple user metrics engine 3112 via a simple application or web interface as depicted in FIG. 32. The application or web interface allows a user, caregiver, and/or technician to select a user report, an analysis method (e.g. 3124, 3126, 3128, or 3130), configure the parameters or variables of the analysis method, and define one or more rules for the UHM rules engine 3122 which cause one or more actions.

For the complex user metrics engine 3114, a more advanced API may be used which expresses a software component in terms of its operations, inputs, outputs, and underlying types. A technician or programmer may access one or more inputs, such as data on the user reports list 3102, data from user history 3104, outputs of one or more simple user metrics calculated by the simple user metrics engine 3112, and/or data from select other controllers (e.g. motor controller 351 or HMI 352). The technician or programmer may define one or more outputs of UHM 510A available via the UHM rules engine 3122. These inputs and outputs may be used for one or more operations of the complex user metrics engine 3114 programmed by the technician or programmer in a programming language.

In an embodiment, a technician may program a custom pressure sore program 3136 for the complex user metrics engine 3114 in a programming language such as C, which takes force readings, pressure readings, time-in-seat readings, wetness readings, and/or a temperature reading from the user reports list 3102 to calculate the need for user repositioning to avoid pressure sores. The pressure sore program 3136 is executed by the complex user metrics engine 3114 and its output triggers the UHM rules engine 3122 to cause an adjustment to the seating system motor controller 351 such that the user is automatically repositioned by a control signal sent from the S-MMS controller 110B to the seating system motor controller. In this example, the UHM rules engine 3122 causes the S-MMS controller 110B to transmit a signal to the seating system motor controller 351 instructing the seating system motor controller to reposition the seating system to a specified position.

Exemplary Embodiments

Each of the exemplary embodiments disclosed illustrate how the combined features of the S-MMS controller enable various capabilities for S-MMSs. While each exemplary embodiment is discussed separately, it should be clear that any one or more aspects of each exemplary embodiment may be combined with any one or more aspects of one or more of the other exemplary embodiments.
Predicting Stability Tipping and collision are serious concerns for wheelchair users. Some estimates lump up to 80% of all wheelchair injuries in the category of tipping and falling. The systems and methods for stability management (i.e. tipping avoidance) disclosed herein may make decisions based on estimates of future states rather than on historical sensor readings.

Figure 33:
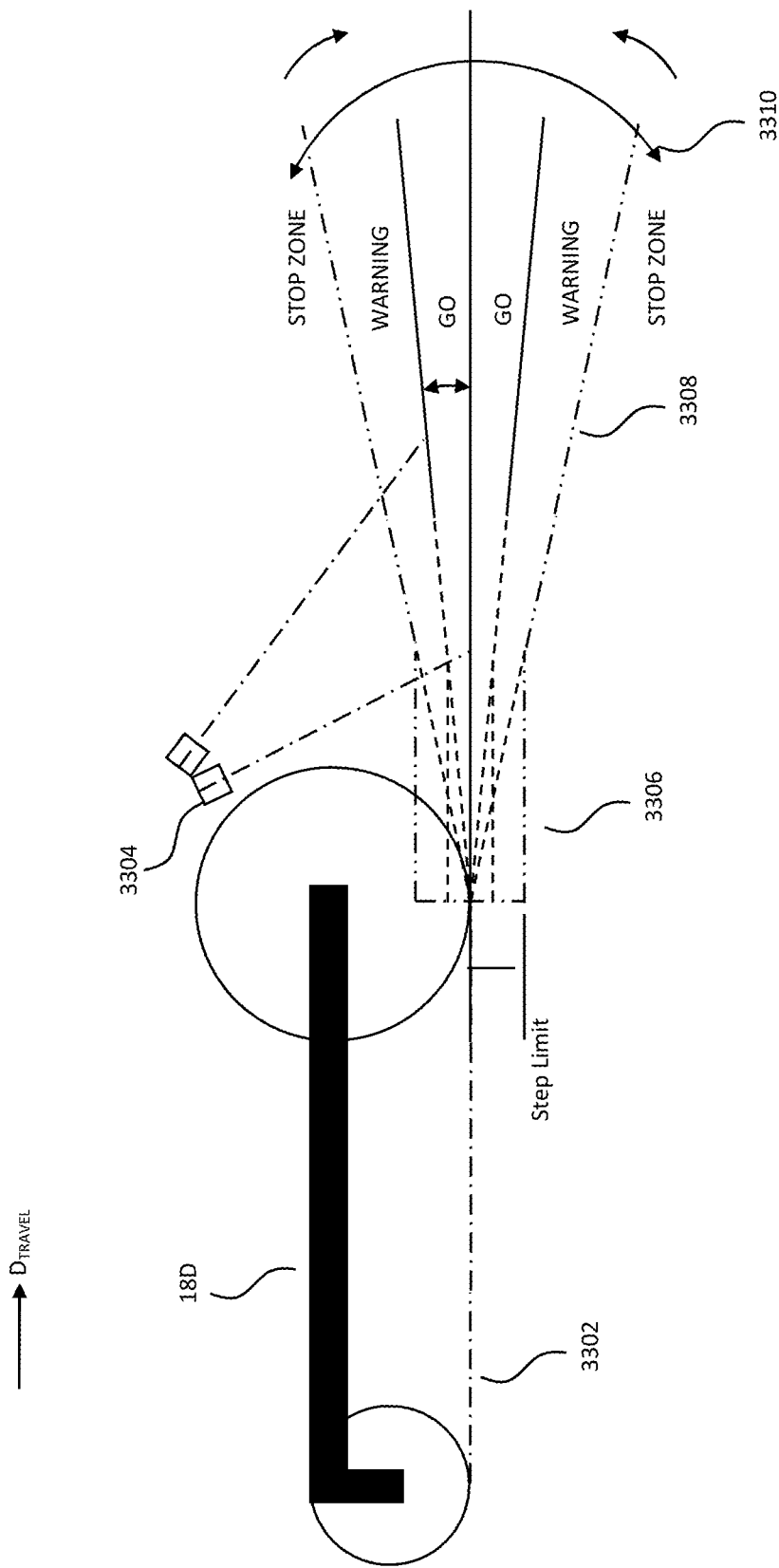
FIG. 33 depicts an S-MMS traveling on an arbitrary surface.

FIG. 33 depicts an S-MMS 18D traveling on a surface 3302. In an embodiment, one or more sensors 3304 of the S-MMS 18D are oriented to monitor upcoming terrain, such as the surface 3302, and characterize the upcoming terrain (e.g. by providing sensor reports of the upcoming terrain). The stability manager 525 then processes the sensor reports from the sensors 3304 optionally with one or more other sensor reports (e.g. weight distribution sensor reports and/or orientation sensor reports) and/or data and/or control instructions from other SAC processes (e.g. from STF 500, weight distribution monitor 3118, and/or navigation 363) and/or data from memory 120 to determine if the upcoming terrain is within or outside of the bounds of step limits 3306 and/or angle/slope limits 3308 to avoid tipping of the S-MMS. The step limits 3306 and/or angle limits 3308 may be static (e.g. retrieved from memory 120 by the stability manager 525 of the SAC 302B) or calculated by the stability manager 525 of the SAC 302B based on current S-MMS orientation (as provided by navigation 363 based on one or more orientation sensor reports 376) and/or the user weight or user weight distribution (as retrieved from the weight distribution monitor 3118 of UHM 510A). The use of recursive filtering and estimation as previously disclosed allows enhanced stability management by one or more of 1) basing one or more stability calculations of the stability manager 525 on predictions of the future state of the ground received from STF 500, 2) the stability manager 525 calculating one or more adjusted 3310 step limits 3306 or angle limits 3308 using one or more predicted uncertainty estimates (e.g. $P_{k|k-1}$) of one or more tracks received from STF 500, and/or 3) implementing a recursive filter instance (e.g. as depicted in FIG. 16) as part of the stability manager 525 which predicts the dynamic state of the S-MMS (e.g. pitch and roll) based on track information received from STF 500 and S-MMS 18D orientation reports (i.e. pitch, roll, and/or yaw) received from navigation 363.

Figure 34:
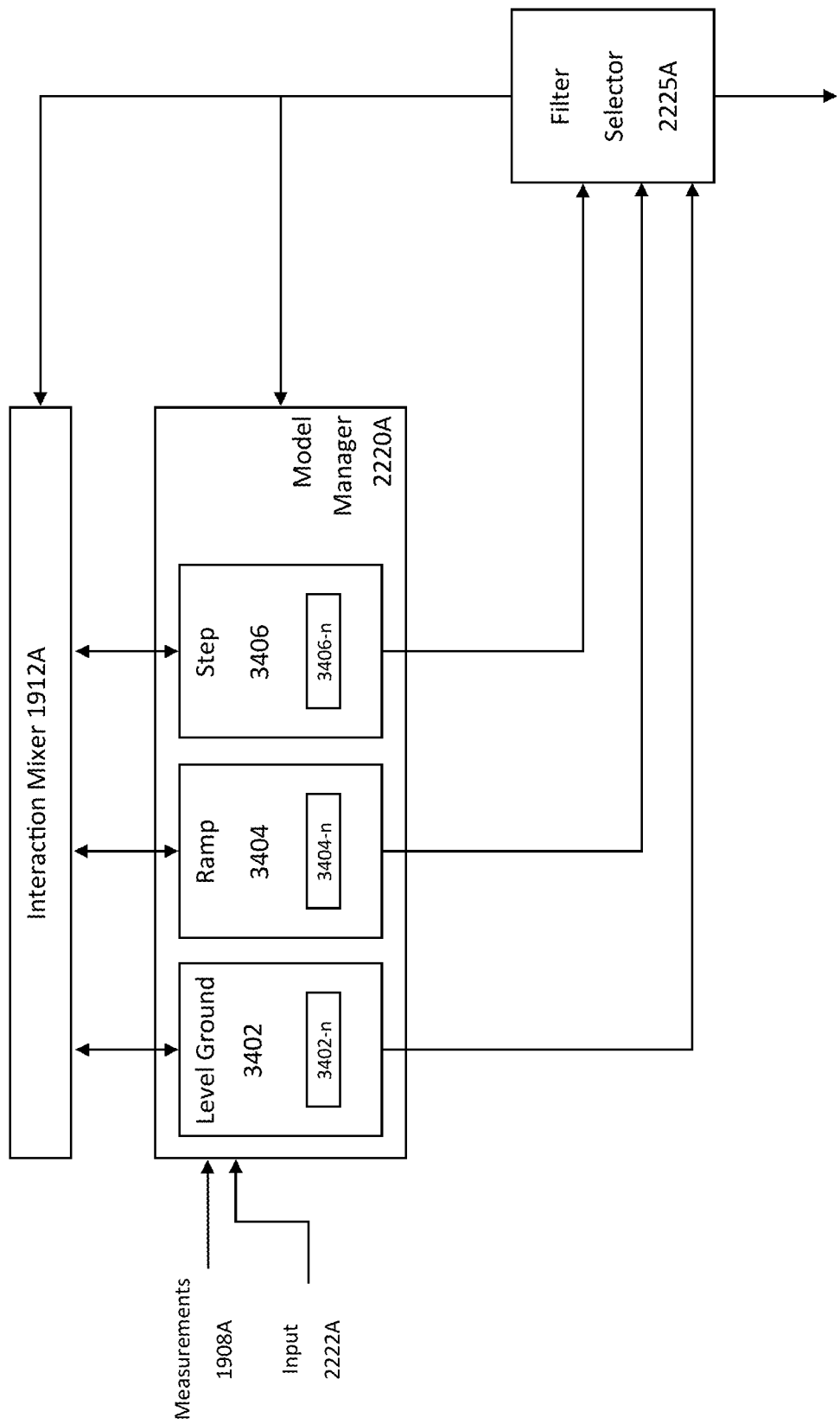
FIG. 34 depicts an embodiment of a 3-model estimator to track and estimate terrain conditions proximate to an S-MMS.

While the previously disclosed examples of data association, track management, filtering, and estimating were focused on collision avoidance, the same systems and methods may be used for tracking and estimating terrain features or conditions proximate to an S-MMS. FIG. 34 depicts an embodiment of a 3-model DSIMM estimator executed by the STF 500 to track and estimate terrain conditions proximate to an S-MMS. In the depicted embodiment, models are present for level ground 3402, ramps 3404, and steps 3406. The level ground model 3402 may estimate the next sensor reading assuming that the S-MMS is traveling on relatively level or "safe" ground. In some embodiments, this may simply mean estimating that the next sensor reading will match the last sensor reading within some confidence interval. The ramp 3404 and step 3406 models may use one or more algorithms to estimate the sensor reading which would be expected if a typical (e.g. per ADA) ramp or typical (e.g. per building code) step were detected. In an embodiment, these models may be mathematically simple compared to those used for collision avoidance. The models are used by the DSIMM estimator consistent with the system behavior described previously with respect to FIG. 22.

While the mathematical models described for characterizing one or more ground targets of the STF 500 may be simple in some embodiments, the application of estimation and filtering as inputs to stability management 525 of the S-MMS controller 110B leads to improved user safety by allowing the S-MMS controller 110B to make decisions ahead of events by some interval. In an embodiment, sensor reports from one or more sensors (e.g. 371-376 FIG. 3) are received by the S-MMS controller 110B which contain information about the ground proximate to the S-MMS, the weight distribution of the user, and the orientation of the S-MMS. Based on one or more sensor reports received by the UHM 510A and seating system position data received by the UHM 510A from the motor controller 351, the weight distribution monitor 3118 (FIG. 31) of UHM 510A uses one or more algorithms to calculate the user center of mass and total weight of the user. Additionally, the current orientation of the S-MMS is determined by navigation 363 based on one or more inertial measurement unit (IMU) readings from the GPS & inertial manager 376.

The stability manager 525 of the SAC 302B uses the user center of mass, weight information, and S-MMS orientation information to calculate the current tipping thresholds (e.g. step limits 3306 and angle/slope limits 3308) for the S-MMS based on standard tipping equations. The stability manager 525 receives the predicted estimate of state (e.g. $\hat{X}_{k|k-1}$) of one or more ground tracks from STF 500 (e.g. flat terrain or the angle of the terrain, whether or not a step exists and if so the step vertical distance, and/or other terrain characteristics) and compares the predicted estimate of state to the calculated tipping thresholds optionally with one or more rules of the stability manager. For example, the stability manager 525 may compare the predicted estimate of state to the calculated tipping thresholds and determine the S-MMS 18D is in danger of tipping when the predicted estimate of state is a predicted estimate of state for a terrain angle value greater than a calculated warning tipping value or a calculated stop tipping value or is a predicted estimate of state for a terrain step value greater than a calculated warning step value or a calculated stop step value.

Based on the results of the comparison of the predicted estimate of state, the calculated tipping thresholds, and the optional one or more rules of the stability manager 525, the stability manager either transmits a control signal to the tactical manager 527 indicating there are no stability conditions or transmits a control signal to the tactical manager in which it provides a list of stability conditions and their location relative to the S-MMS 18D for integration into the master threat assessment map. In some instances, the stability manager 525 may be configured to not transmit a signal to the tactical manager 527 when there are no stability conditions.

Additionally, the appropriate timeline for any necessary S-MMS controller 110B actions to minimize instability accidents may be computed by the stability manager 525. In this way, one or more stability calculations, based on predictions of the future state of the ground received from STF 500, may cause the S-MMS controller 110B to generate a control signal based, at least in part, on the one or more control instructions received from the stability manager 525.

In an embodiment, one or more IMM or DSIMM estimators may be biased by a scalar value (as previously disclosed) where the scalar value represents a weather condition or surface condition of the ground proximate to the S-MMS 18D. For example, an S-MMS 18D may be used primarily in outdoor environments, and the initial model bias may be set by a user, caregiver, or technician (e.g. via a connected device 902 FIG. 9) based on a received scalar value such that the DSIMM estimator assumes all tracks are steps (e.g. 3406) initially until proven otherwise by the recursive filtering and estimation process of the DSIMM as previously described. Additionally or alternatively, a DSIMM instance may use a scalar biasing value based on the weather at startup. In an embodiment, the STF 500 of the S-MMS controller 110B may receive a weather report via CNI 371 (e.g. from a remote service or server 910) and convert that to a numerical code which is used for scalar biasing one or more DSIMM instances of STF 500. For example, in the event that rain is expected, the DSIMM instance of FIG. 34 may be biased such that it starts with the assumption that all ground tracks are ramps (i.e. model 3404).

The ability to create and act on sub-filters with a DSIMM estimator (e.g. FIG. 34) as previously disclosed leads to new and unique S-MMS controller 110B capabilities. In a non-limiting example, the S-MMS controller 110B may be configured with one or more rules (e.g. in memory 120) so that upon entering a new location (e.g. based on navigation 363), encountering a new weather condition (e.g. as received from a remote service via CNI 371), and/or encountering a new type of terrain (e.g. as identified either by user input 2222A or based on difficulty of filter operations as identified by the model manager 2220A), the model manager 2220A of the DSIMM estimator may create one or more sub-filter instances (e.g. 3402-$n$, 3404-$n$, 3406-$n$) which better match the received measurements 1908A. In this way, sub-filters may be created for different locations (e.g. school versus home) or conditions (e.g. snow versus dry weather). These sub-filter instances may be prescribed (reference FIG. 25) and/or learned (reference FIG. 26-28) as previously disclosed. Furthermore, the sub-filter instances may be selected as part of the scalar biasing startup process via the HMI 352 or a connected device 902.

The one or more DSIMM estimator instances of STF 500 (e.g. as depicted in FIG. 34) are constantly calculating model probabilities and outputting predicted estimates of state (e.g. $\hat{X}_{k|k-1}$) with an associated predicted uncertainty estimate (e.g. $P_{k|k-1}$) of one or more tracks which are used to enhance S-MMS controller 110B operations. The stability manager 525 of the SAC 502 receives a predicted uncertainty estimate ($P_{k|k-1}$) along with the predicted estimate of state ($\hat{X}_{k|k-1}$) from one or more IMM or DSIMM estimators of STF 500 where each predicted state estimate and predicted uncertainty estimate are associated with a track (e.g. of a ground target).

The stability manager 525 may process one or more rules (e.g. from memory 120) such that if the value of a predicted uncertainty estimate ($P_{k|k-1}$) of one or more tracks falls over or under a predefined threshold or outside a predefined range (e.g. from memory 120), the stability manager transmits one or more control instructions to the S-MMS controller 110B that causes the S-MMS controller to generate a control signal based, at least in part, on one or more control instructions received from the stability manager, wherein the generated control signal causes a component of the S-MMS to respond with a response. Additionally or alternatively, the stability manager 525 may perform one or more calculations (e.g. using one or more algorithms from memory 120) using one or more received, predicted uncertainty estimates from STF 500 to determine one or more step limits 3306 or angle limits 3308 used by the stability manger to generate one or more outputs to the tactical manager 527 of the SAC 302B and/or to generate one or more control instructions which cause the S-MMS controller 110B to generate a control signal.

In an embodiment, the stability manager 525 may adjust 3310 one or more step limits 3306 or angle/slope limits 3308 based on a predicted uncertainty estimate received from STF 500 (e.g. by performing one or more calculations and determining one or more adjusted step limits and/or angle/slope limits). This effectively makes the S-MMS controller 110B more cautious when traveling on a poorly characterized surface (e.g. when uncertainty estimates are large) and less cautious when traveling on a well characterized surface (e.g. when uncertainty estimates are small).

As a non-limiting example, an S-MMS traveling up a ramp may use a ramp model 3404 of a DSIMM instance (e.g. of STF 500) for a ground track. As the DSIMM confidence in the ramp model increases (e.g. as the model probability for the ramp model increases), the predicted uncertainty estimate ($P_{k|k-1}$) of the output estimate (e.g. 1924 FIG. 19) of the estimator decreases.

The stability condition of the one or more tracks is calculated by the stability manager 525 based on the track information (e.g. $\hat{X}_{k|k-1}$ and $P_{k|k-1}$) received from STF 500 and orientation readings (e.g. pitch and/or roll) received from navigation 363 in combination with a mathematical tipping model for the S-MMS retrieved from memory 120. In an example, the stability manager 525 add or subtracts the predicted uncertainty estimate to the predicted estimate of state and uses the result to estimate the stability condition risk to the S-MMS. In another example, as the received, uncertainty estimate decreases, one or more rules of the stability manager 525 decrease a calculated stability condition risk value by a predetermined amount (e.g. a risk factor from 0-1 retrieved from memory) based on the uncertainty estimate. The stability condition and its location relative to the S-MMS 18 are provided to the tactical manager 527 for integration into the master threat assessment map. Additionally or alternatively, a maximum velocity may be computed by the stability manager 525 based on one or more rules (from memory 120) or stability conditions calculated by the stability manager which cause the SAC 302B to modify one or more control signals sent by the S-MMS controller 110B to the motor controller 351 of the S-MMS.

In a continuation of the example, in the event that the end of the ramp is detected, and sensor readings received by STF 500 for the track fall outside the expectations of the ramp model 3404, the model confidence in the ramp model 3404 will decrease, causing a temporary increase in the predicted uncertainty estimate for the track received by the stability manager 525. In this case, the stability manager 525 may calculate an increased risk for the stability condition and may create a control instruction which results in a lower maximum allowable velocity and therefore causes the S-MMS 18 to behave more cautiously until a new model (e.g. level ground 3402) is selected by the DSIMM (e.g. of STF 500) and confidence in that new model is established.

Based on one or more of a current S-MMS orientation (e.g. pitch and/or roll) received from navigation 363, an estimate of state (either predicted or updated) received from the STF 500, and data (e.g. from memory 120), the stability manager 525 may estimate one or more future orientations (e.g. pitch and/or roll) of the S-MMS. In an embodiment, the stability manager 525 of the SAC 302B may include a recursive filter instance (e.g. as depicted in FIG. 16) wherein a current S-MMS 18D orientation (e.g. pitch and/or roll received from navigation 363) is used as a measurement ($Y_k$) for the measurement step 1402 of the recursive filter instance. A stability model (e.g. from memory 120) is then used by the stability manager 525 as a state estimator for predicting one or more orientations (e.g. pitch and/or roll) of the S-MMS 18D.

The recursive filter instance of stability manager 525 of the SAC 302B is configured to use a current orientation of the S-MMS at time $T_{k-1}$ with the stability model (e.g. from memory) to predict a second orientation of the S-MMS at time $T_k$, wherein time $T_{k-1}$ is less than time $T_k$. The recursive filter instances use the predicted second orientation at time $T_k$ for an output (e.g. a predicted orientation for the S-MMS), where the output is used by the S-MMS controller 110B for stability management. In an example, the stability manager 525 executes a recursive filter instance that calculates a predicted second orientation value (e.g. pitch in an example). The predicted second orientation is a step orientation and/or angle orientation. The stability manager 525 compares the predicted second orientation to a threshold (e.g. retrieved by the stability manager from memory 120), where the threshold is one or more of a step limit 3306 and/or an angle limit 3308. If the predicted second orientation value is less than the threshold (e.g. from memory), then the stability manager 525 takes no action. If however, the predicted second orientation value is greater than the threshold, then the stability manger 525 may generate one or more outputs to the tactical manager 527 of the SAC 302B and/or one or more control instructions which causes the S-MMS controller 110B to send, or modify, one or more control signals which cause one or more motor controllers 351 and/or an HMI 352 to take one or more actions based on the received one or more control signals.

Predicting People, Animals and Other Moving Things

S-MMSs enable their users to navigate the world. But, they navigate and move in a distinct way, at a different speed, and occupy a very different footprint from the people or animals walking around them. This unique behavior, combined with the power and weight of the S-MMS, makes awareness and avoidance of people, animals, and other things that move on their own important to the safety of both the S-MMS user and those moving around them. As opposed to simply avoiding collisions with other vehicles like an autonomous vehicle, these S-MMSs need to watch for and avoid toes and tails.

Figure 35:
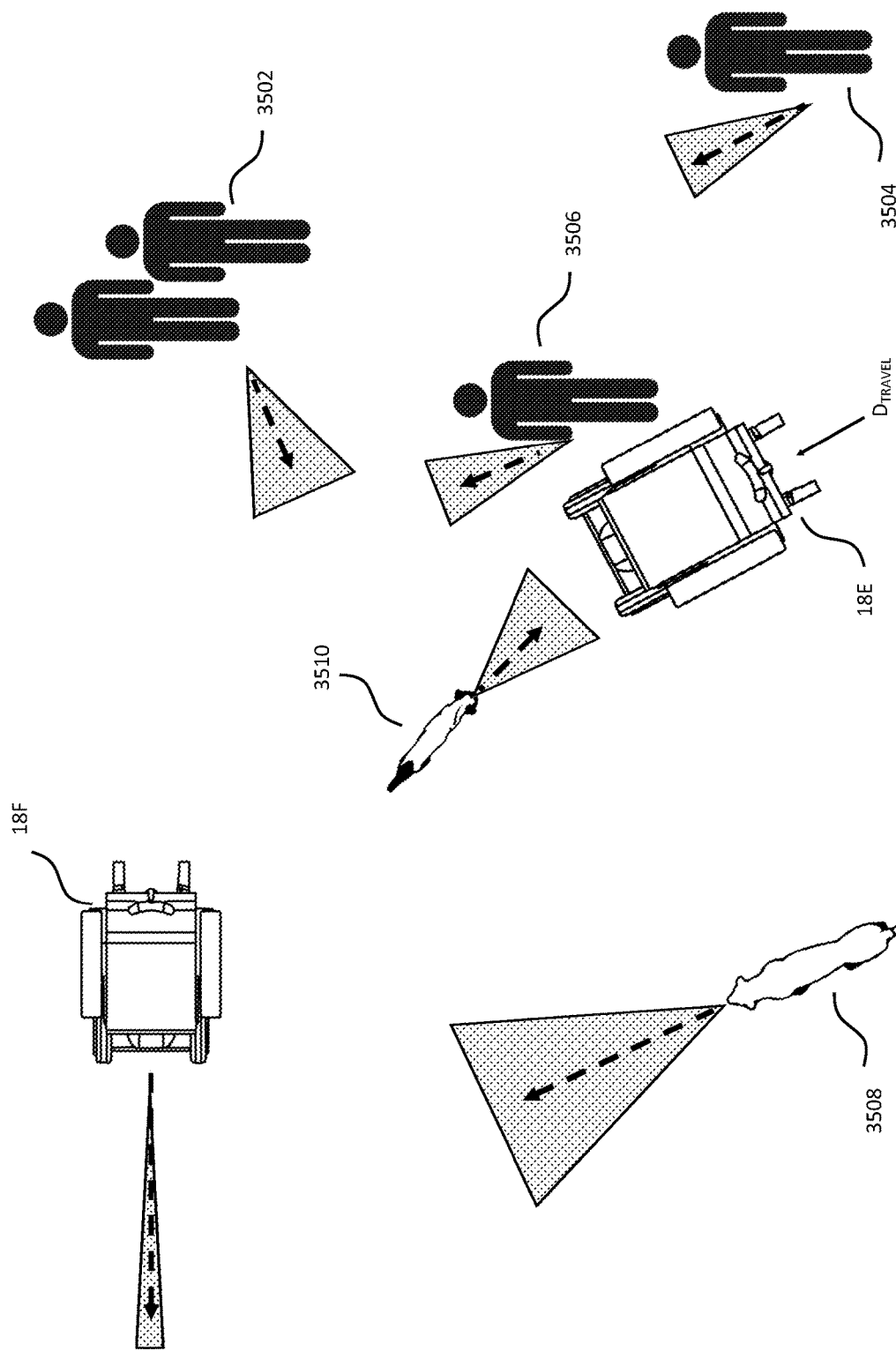
FIG. 35 depicts a map of tracks of an S-MMS controller in an arbitrary situation.

The S-MMS controller 110B as disclosed herein uses the previously disclosed processes of the SAC 302B to track individual actors, predict their future motion, and react to that predicted movement of a track with a predefined reaction. Movement of tracks (e.g. people, animals, or objects) is constantly evaluated by the SAC 302B so that actions by the S-MMS controller 110B or the user (e.g. via HMI 352 inputs) does not cause unwanted, unnecessary, or unsafe movement of the S-MMS. FIG. 35 illustrates an embodiment of a situational awareness map of tracks as maintained by the tactical manager 528 (FIG. 5) of the SAC 302B in an arbitrary situation. S-MMS controller 110B predefined reactions to tracks may include sending one or more control signals which cause slowing, stopping, altering direction, signaling the user or people around the S-MMS, or activating any other S-MMS component.

Referring again to FIG. 35, the first S-MMS 18E is traveling in direction $D_{TRAVEL}$ in an environment with multiple tracks. These tracks include a second S-MMS 18F, two people 3502 walking together in conversation, a random person 3504 walking in roughly the same direction the first S-MMS is traveling, a caregiver 3506 walking beside the first S-MMS, a dog 3508, and the first S-MMS user's cat 3510. Each of these tracks has been identified from one or more sensor reports (e.g. 371-374 FIG. 3) by data association of STF 500. Moreover, one or more IMM or DSIMM estimator instances, using estimation and filtering, of STF 500 has determined a predicted estimation of future state for each track (depicted in FIG. 35 by a vector arrow showing the direction of travel with length being speed) and uncertainty for each track (depicted in FIG. 35 by a grey triangle zone of uncertainty) for use in collision avoidance.

FIG. 35 may be thought of as a visualization, at a moment in time, of the S-MMS situational awareness map previously disclosed. In its simplest form, all tracks would be simply characterized as moving or non-moving by the STF 500 of the S-MMS controller 110B. In this embodiment, tracks 3502 thru 3510 would be monitored for state and uncertainty by STF 500, the state and/or uncertainty of each track is then processed by a collision manager 526 and/or stability manager 525, and the tactical manager 527 combines the outputs of the one or more SAC 302B processes into a situational awareness map (e.g. of FIG. 35). The drive path manager 529, as previously disclosed, sends control instructions for use by the S-MMS controller 110B to maintain safe distances from the tracks predicted future states at some time k. A more robust embodiment of the 3-model DSIMM previously disclosed (e.g. FIG. 22) may include additional models and the ability to match different types of tracks to different mathematical models for both their behavior and/or unique rules for S-MMS controller 110B reactions. As a non-limiting example, furniture, humans, vehicles, other S-MMSs, and animals all behave very differently. It is logical that they should be identified and their movement predicted accordingly using unique models or sub-filter instances where the uncertainty, turn radius, expected velocity, and/or number of outliers allowed, as a non-limiting example, may vary.

Moreover, certain tracks may behave differently than an average "person" or an average "animal". As a non-limiting example, consider the caregiver 3506 walking beside the first S-MMS 18E in FIG. 35. While the caregiver 3506 is walking at roughly the same pace and with roughly the same state uncertainty zone as another random individual 3504, treating the caregiver the same as the random individual might cause problems. For example, if the safe distance enforced for a "typical person" by the S-MMS controller 110B of the first S-MMS 18E means that the caregiver 3506 causes the chair to stop every time the caregiver assists the user of the S-MMS (e.g. getting close enough to hold their hand or brush hair off their forehead), the user may choose to disable the functionality of the S-MMS controller that causes the stopping or hesitate to interact with the user. Neither of these outcomes are positive.

The caregiver 3506 should be given the benefit of the doubt that they are used to working around the user of the first S-MMS 18E, and the SAC 302B of the first S-MMS should also allow the caregiver in closer proximity to the S-MMS than a "typical person." Also, the first S-MMS 18E should move out of the way of the caregiver 3506 instead of avoiding the caregiver by stopping.

Even more than people, the movement of animals can be erratic and difficult to predict. This is shown by the relatively large uncertainty zones for both the dog 3508 and cat 3510 in FIG. 35. In addition, animals can be small, sleep on the floor, or may not vocalize or perceive a threat of collision with the first S-MMS 18E. Pets may lean on or leap onto the S-MMS 18E itself.

Some animals qualify as pets or service animals and may exhibit unique behavior. As a non-limiting example, consider the first S-MMS 18E user with a pet cat named Wesley 3510. As Wesley approaches the first S-MMS 18E on a direct collision course, a typical collision avoidance system might take evasive actions, including turning, stopping, or otherwise avoiding the cat. This is another example of where the disclosed S-MMS controller 110B may go further, and be more intelligent, than other situationally aware systems. Wesley is used to living around the user of the S-MMS 18E and intends to jump on their lap for a ride. By recognizing Wesley 3510 as a pet, not just a random cat or animal, the S-MMS controller 110B of the S-MMS 18E may know to trust Wesley up to a certain extent around the S-MMS and therefore the S-MMS controller does not send control signals which cause evasive maneuvers unless Wesley fails to jump in time.

These unique tracks (e.g. animals, people, objects etc.) may be recognized by the S-MMS controller 110B in many ways including:

In an embodiment, a process of the SAC 302B (e.g. feature extraction 530) may be configured to use facial recognition or other image-based identification methods to recognize predefined individuals, animals, or objects and associate an identification to a recognized individual, animal, or object for a track.

In an embodiment, feature extraction 530 of the SAC 302B may be configured to automatically detect and uniquely identify people, animals, or objects encountered based on analysis of one or more image sensor reports 374 using one or more techniques currently used for facial recognition, including geometric, photometric, or 3D recognition and associate an identification to an identified person, animal, or object for a track. In some embodiments, feature extraction 530 on the SAC 302B may utilize algorithms, including principal component analysis using Eigen faces, linear discriminant analysis, elastic bunch graph matching using the Fisher face algorithm, and the hidden Markov model to identify individuals.

In an embodiment, sensor track fusion 500 may combine feature extraction 530 outputs with information from one or more non-contact sensor reports 372 and S&T sensor reports 373 for 3D recognition of individuals, animals, or objects and associate an identification to a recognized individual, animal, or object for a track.

In an embodiment, one or more machine learning engines onboard the S-MMS controller 110B or remotely (e.g. 1010, FIG. 10) may be used to identify people, animals, or other objects based on published approaches, such as multilinear subspace learning or dynamic link matching, and associate an identification to an identified person, animal, or object for a track.

Additionally or alternatively, objects, animals and/or individuals may be recognized by S-MMS controller 110B based on the presence of a unique graphic, symbol, or code as read by one or more imagers of the S-MMS 18 (e.g. image sensor reports 374) and recognized by feature extraction 530, and feature extraction associates an identification to a recognized individual, animal, or object for a track.

Additionally or alternatively, objects, animals and/or individuals may be recognized by the S-MMS controller 110B based on the S-MMS controller (e.g. the STF 500) receiving one or more codes received via CNI 371, determining if the one or more received codes match one or more known codes (e.g. from memory 120), and causing one or more actions (e.g. by transmitting a control signal) if the one or more received codes match the one or more known codes, where the one or more received codes are transmitted by an RF beacon, Bluetooth beacon, BLE beacons, and/or other wireless transceiver or transponder. A process of the S-MMS controller 110B associates an identification to a recognized individual, animal, or object for a track.

In an embodiment, a graphic version of the situational awareness map (e.g. FIG. 35) or similar visualization may be presented to the S-MMS user via HMI 352 or a paired smart device 902, so that they may select specific tracks from the graphic interface and associate unique S-MMS controller 110B behavior to them. A process of the S-MMS controller 110B associates an identification to a selected track.

Animal Cooperation

It is common for S-MMS users to work around specially trained service animals. As non-limiting examples, ranchers may work cooperatively with cattle dogs while using ATV S-MMSs or mobile chair S-MMS users may work with the assistance of a service dog. As previously disclosed, service animals can be identified uniquely by an S-MMS controller 110B using one or more methods.

In an embodiment, an S-MMS user works with a specially trained service dog. Service animals must complete training that equips them to accomplish many things for their partner. These things include picking up objects for the user when pointed at, retrieving objects from another room or location for the user, assisting the user when transferring from their S-MMS or changing positions, and identifying safe pathways as some examples. Traditionally, these service animals work in partnership with the S-MMS user. But, the disclosed S-MMS controller 110B has the capability to work in concert with both the user and service animal to complete tasks.

Figure 36:
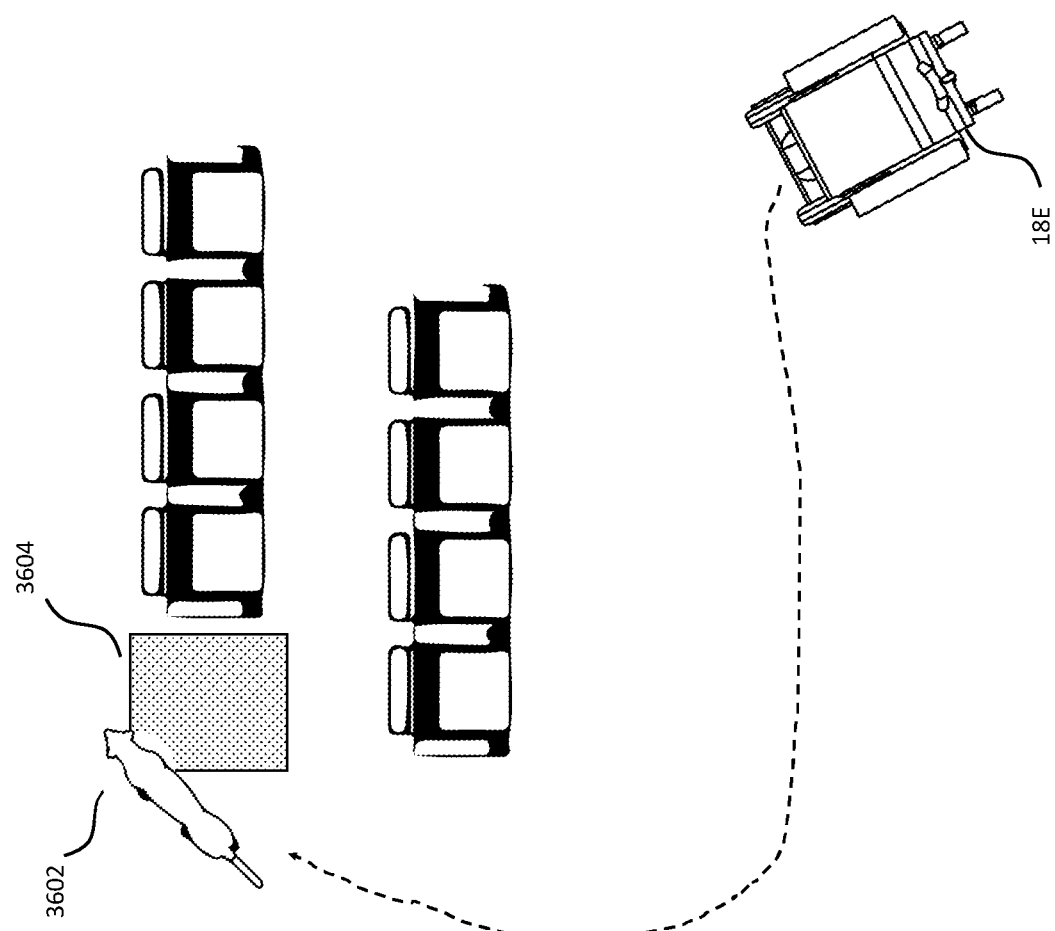
FIG. 36 depicts an S-MMS entering a theater for a show.

FIG. 36 illustrates an S-MMS 18E entering a theater for a show. A common task for a service animal is to scout ahead in a new setting and find open seats or appropriate, accessible locations for the S-MMS 18E user. In an example of service animal cooperation, the user's service animal 3602 has found an accessible parking spot 3604 for the S-MMS 18E in the theater. In this embodiment, the service animal 3602 is wearing a collar has been fitted with an active RF or BLE beacon transceiver.

The S-MMS controller 110B for the S-MMS 18E may initially recognize the service animal (e.g. on startup) as a track like any other based on one or more sensor reports (e.g. 372-374 FIG. 3) received and processed by STF 500 of the SAC 302B. In an embodiment, STF 500 is alerted to the presence of the service animal based on one or more codes received via CNI 371 from the beacon on the collar of the service animal 3602 and processed by the STF or another process of the S-MMS controller 110B. In this example, the STF 500 of the S-MMS controller 110B receives one or more codes that are transmitted from the beacon on the collar of the service animal 3602, compares the one or more received codes to one or more known codes in memory 120, and determines the one or more received codes matches the one or more known codes. The STF 500 associates a track identification to the track for the service animal 3602 which indicates the track is the service animal. Alternately, the STF 500 associates a track identification to track for the service animal 3602 and sets a status (e.g. 1 is set and 0 is reset or not set) or indicator for the track that indicates that track is the service animal. The STF 500, collision manager 526, tactical manager 527, threat assessor 528, drive path manager 529, or other process of the SAC 302B can then read the status or other indicator for the track, determine the track is the service animal, and implement one or more rules for an exception to standard navigation or collision, tactical, threat management. The STF 500 similarly may set a status or other indicator for a track for a caregiver, technician, other special and/or known animal, or other special and/or known object, and the STF, collision manager 526, tactical manager 527, threat assessor 528, drive path manager 529, or other process of the SAC 302B can then read the status or other indicator for the track, determine the track is special and/or known, and implement one or more rules for an exception to standard navigation or collision, tactical, threat management.

In an alternate embodiment, the UHM 510 is alerted to the presence of the service animal based on one or more codes received via CNI 371 from the beacon on the collar of the service animal 3602 and processed by the UHM or another process of the S-MMS controller 110B. In this example, the UHM 510 of the S-MMS controller 110B receives one or more codes that are transmitted from the beacon on the collar of the service animal 3602, compares the one or more received codes to one or more known codes in memory 120, and determines the one or more received codes matches the one or more known codes. The UHM 510 transmits a signal to the STF 500 identifying the presence of the service animal and that the service animal is known (for example, by identifying the received code, the matching code, ad optionally that the received code matches the known code). The UHM 510 or the STF 500 associates a track identification to track for the service animal 3602 which indicates the track is the service animal. Alternately, the UHM 510 or the STF 500 associates a track identification to the track for the service animal 3602 and sets a status (e.g. 1 is set and 0 is reset or not set) or indicator for the track that indicates that track is the service animal.

In another example, the CNI 371 may report a signal strength and code of a received beacon signal to the STF 500. The STF 500 associates a track with the unique service animal, in some embodiments, by comparing known tracks with animal behavior (e.g. based on model probabilities of IMM or DSIMM estimators), to the signal strength of the beacon signal, as received by CNI 371, determining an identifier in the received beacon signal is a known identifier by comparing the identifier in the received beacon signal to stored beacon identifiers, and associating that received beacon signal with its identifier and/or signal strength to the known track, where signal strength is used as a proxy for distance from the S-MMS 18E.

Once the service animal 3604 track has been identified by STF 500, the movement history (e.g. as mapped on a polar or Cartesian grid over time) of that track may be stored to memory 120 for a predetermined amount of time. In an example, the last five minutes of movement of a service animal track 3604 are stored in memory 120 by the STF 500. This track movement history may be accessed by the drive path manager 529 of the SAC 302B which may cause the S-MMS to move by sending one or more control signals from the S-MMS controller 110B to the motor controller 351 of the S-MMS which causes one or more actions, including driving and/or steering.

In the example of FIG. 36, the user of the S-MMS 18E may indicate their desire to travel to the location indicated by the service animal 3604 via one or more inputs to the HMI 352. The one or more HMI 352 inputs are received by the S-MMS controller 110B. The S-MMS controller 110B receives and processes the one or more HMI inputs and, in response, causes the drive path manager 529 of the SAC 302B to access the current location of the service animal 3602 from the situational awareness map (e.g. of the tactical manager 528), calculate a path to the service animal, and travel along the calculated path to the current location of the service animal. Additionally or alternatively, the S-MMS controller 110B receives and processes the one or more HMI inputs and, in response, causes the drive path manager 529 to access all or part of the movement history for the track from memory 120. The drive path manager 529 then calculates a path to the nearest intersect point of the movement history line (e.g. from memory 120) and travels along the calculated path to the current location of the service animal 3602. In another alternate embodiment, the drive path manager 529 of the SAC 302B may calculate the path to the service animal 3602 as the most direct route to the service animal track on the situational awareness map as maintained by the tactical manager 527 and travel along the calculated path to the current location of the service animal.

The drive path manager 529 of the SAC 302B travels along the calculated path by sending one or more control signals from the S-MMS controller 110B to the motor controller 351 of the S-MMS, which causes one or more actions, including driving and/or steering. In any embodiment referenced above, the actual drive path is calculated by the drive path manager 529 as previously disclosed and is navigated safely (e.g. avoiding obstacles) due to the SAC 302B processes, such as the stability manager 525 and the collision manager 526.

Many service animals respond to voice commands, hand signals, or combinations thereof. In an embodiment, an S-MMS 18E may include an imager and/or microphone for monitoring user movement and/or commands. The SAC 302B of the S-MMS controller 110B may be alerted to record the service animal track's movement on the situational awareness map and wait until they have selected a location (e.g. stopped moving) by the same voice and/or hand commands used to signal the service animal 3602. In an embodiment, a speech engine on the S-MMS controller 110B (e.g. of alert manager 540) or a remote machine learning engine (e.g. 1010 of 910A FIG. 10) may analyze received audio (e.g. from non-contact sensor reports 372) for the presence of one or more key words and, when key words are detected, create a control instruction which causes recording of the track behavior to memory 120 until the track is stationary for a predefined amount of time (e.g. from memory 120), additional key words are recognized, or user input (e.g. via HMI 352) is received. In this way, the service animal and S-MMS controller 110B work closely together to accomplish tasks.

Similar partnering behavior may be used in other scenarios for which service animals are trained. In an embodiment, the user may select a mode (e.g. via HMI 352) so that the drive path manager 529 of the S-MMS controller 110B may cause the S-MMS 18E to follow a service animal, respond to predefined motions of the service animal with a preconfigured response, or respond to the blocking of pathways by the service animal with a preconfigured response.

Walk Along

Common situations such as "going for a walk" or maneuvering through a hallway with a friend are often difficult in an S-MMS. It is complicated by the fact that the S-MMS user is often sitting; but it can also be a struggle to match speed and direction of the walking partner using an HMI 352, such as a joystick. This may be all the more difficult with alternate HMI 352 systems, such as a sip and puff systems (which may be binary or on/off in each direction only). The S-MMS user, who may already have limited muscle control and/or sensory impairment, is placed in a difficult situation—trying to control pace, direction, and consistency to match a partner.

Currently, an "attendant control" can be installed on some S-MMSs to help with this concern. As an example, FIG. 37A depicts an S-MMS 18E having a rear-mounted HMI 3702 (e.g. joystick) for caregiver control. This current configuration has a surprising downside; it is difficult for a person who does not normally travel through joystick controls to drive an S-MMS. Their lack of practice may put the S-MMS user in danger. Jerking side to side and whiplash acceleration and deceleration occur more often than the intended motion. Additionally, walking behind someone in a row is not the same as walking with someone. Conversations are a practical impossibility between the concentration required by the attendant joystick and the lack of visual and physical proximity.

Figure 37B:
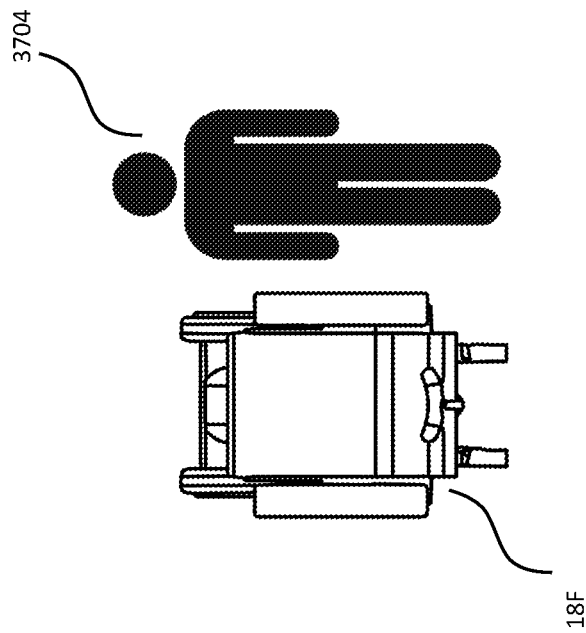
FIG. 37B depicts an embodiment of a walk along feature of an S-MMS.
Figure 37A:
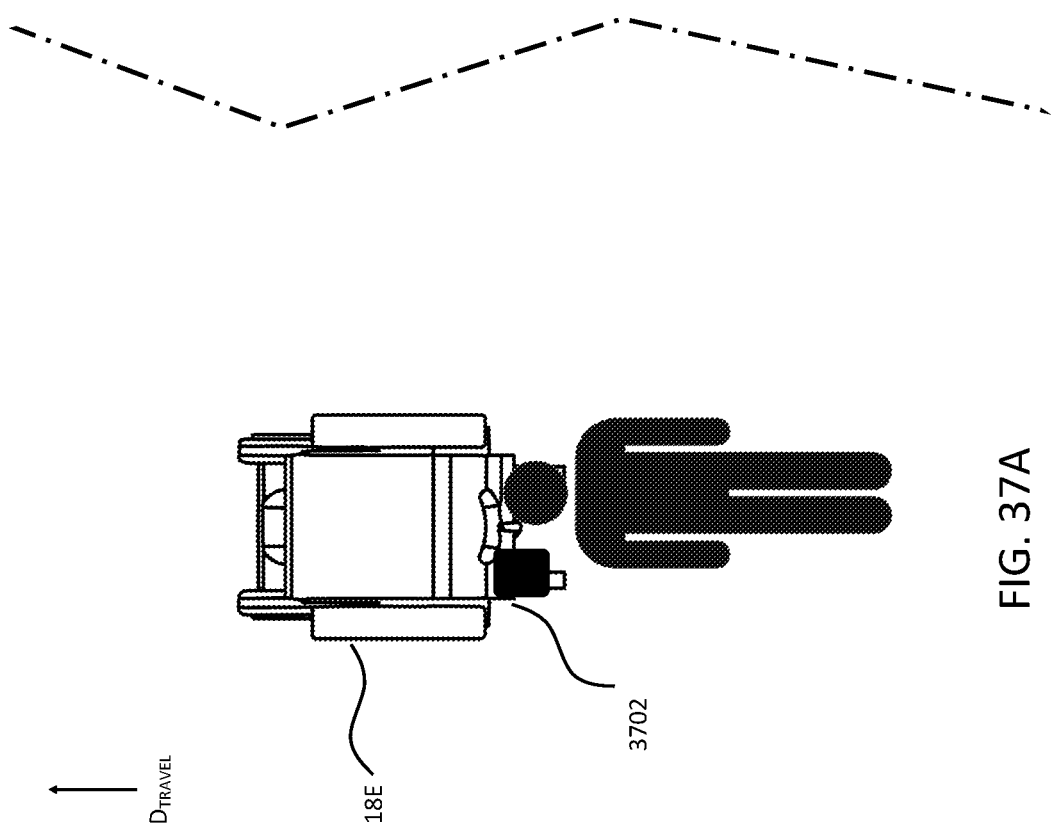
FIG. 37A depicts an embodiment of an S-MMS with a rear-mounted HMI for caregiver control.

The S-MMS controller 110B, in an embodiment, includes a walk along feature that allows an S-MMS 18F to "lock on" to an individual 3704 and maintain speed and distance with that chosen individual as depicted in FIG. 37B. The STF 500 of the SAC 302B uses one or more sensor reports (e.g. 371-376 FIG. 3) to identify tracks. The tactical manager 527 receives one or more track ID along with a predicted state estimate and predicted uncertainty estimate for each track from STF 500 and maintains a situational awareness map of known tracks, their predicted state estimate, and their predicted uncertainty estimate.

In an example, a graphical representation of the situational awareness map of the tactical manager 527 (e.g. as depicted in FIG. 35) is displayed via the HMI 352 of the S-MMS 18F or a connected device 902 (FIG. 9). The user selects a track from the situational awareness map using the HMI 352 of the S-MMS 18F or a connected device 902 as an individual 3704 they would like to "walk along" with, which results in the HMI or connected device generating a walk along process control signal. When the S-MMS controller 110B receives the walk along process control signal from the HMI 352, or connected device 902, the drive path manager 529 of the SAC 302B causes the S-MMS controller 110B to transmit one or more control signals to match the heading and speed (e.g. predicted state estimate) of the track.

In another example, an individual 3704 has a device that emits a code. The device may be, for example, a wearable, a phone, a beacon, or other device that emits a code via Bluetooth, BLE, radio frequency, cellular, or otherwise. For example, a code may be transmitted by an RF beacon, Bluetooth beacon, BLE beacon, and/or other wireless transceiver or transponder.

The S-MMS controller 110B for the S-MMS 18E recognizes the individual 3704 as a track based on one or more sensor reports (e.g. 372-374 FIG. 3) received and processed by the STF 500 of the SAC 302B. In an embodiment, the STF 500 receives a code via CNI 371 from the beacon or other device of the individual 3704, compares the received code to one or more known codes in memory 120, and determines the received code matches a known code for the individual 3704. The STF 500 associates a track identification to the track for the individual 3704 which indicates the track is the caregiver, technician, friend, spouse, family member, or other known person. For example, one code may match a caregiver, and another code may match a spouse or family member. Alternately, the STF 500 associates a track identification to track for the individual 3704 and sets a status (e.g. 1 is set and 0 is reset or not set) or first indicator for the track that indicates that track is a caregiver, technician, friend, spouse, family member, or other known person and sets a second indicator indicating the particular caregiver, technician, friend, spouse, family member, or other known person.

The STF 500, collision manager 526, tactical manager 527, threat assessor 528, drive path manager 529, or other process of the SAC 302B can then read the status or other indicator for the track, determine the track is the caregiver, technician, friend, spouse, family member, or other known person, and implement one or more rules for an exception to standard navigation or collision, tactical, threat management which, in this case, implements the "walk along" feature. The STF 500, collision manager 526, tactical manager 527, threat assessor 528, drive path manager 529, or other process of the SAC 302B may further implement rules stored in memory with one or more other rules for a base speed, distance from the particular individual 3704, or other navigation operation based on the particular identification/indicator of that individual (e.g. as identified by the second indicator). For example, the base speed, distance from the particular individual 3704, or other navigation operation based on the particular identification/indicator of that individual may be stored in memory 120, and the STF 500, collision manager 526, tactical manager 527, threat assessor 528, drive path manager 529, or other process of the SAC 302B retrieves and implements the base speed, distance from the particular individual 3704, or other navigation operation based on the particular identification/indicator of that individual and one or more other rules or data of the user (e.g. data and rules from UHM 510).

In this example, the S-MMS controller 110B may be configured to cause a message to be generated via the HMI 352 or a connected device 902 when the received code is matched to the known code. The message may, for example, ask the user or individual 3704 if "walk along" mode is to be implemented. The user or individual 3704 confirms they would like to implement the "walk along" mode feature, which results in the HMI 352 or connected device 902 generating a walk along process control signal to the S-MMS controller 110B. When the S-MMS controller 110B receives the walk along process control signal from the HMI 352 or connected device 902, the drive path manager 529 of the SAC 302B causes the S-MMS controller 110B to transmit one or more control signals to match the heading and speed (e.g. predicted state estimate) of the track for the individual 3704 and optionally consider the above-referenced base speed, distance from the particular individual, or other navigation operation based on the particular identification/indicator of that individual and one or more other rules or data of the user (e.g. data and rules from UHM 510).

In another example, the S-MMS controller 110B may be configured to automatically enter the "walk along" mode based on one or more rules of the rules engine when the received code is matched to the known code.

Upon initiating the walk along process, retrieved from memory 120, the drive path manager 529 of S-MMS 18F reads the predicted estimate of state of the selected track (e.g. of target 3704) and the predicted uncertainty estimate of the selected track. In an embodiment, the predicted estimate of state of the track includes a position, a velocity vector, and an acceleration vector. The drive path manager 529 then calculates a course which matches one or more of the velocity and acceleration vector of the track. Additionally or alternatively, the drive path manager 529 may calculate a course which may enforce a predefined (e.g. retrieved from memory 120) or selected (e.g. via HMI 352) distance and direction to maintain from the position of the predicted estimate of state of the track (e.g. 1 foot to the right). In one embodiment, the calculation of the drive path manager 529 may include the predicted uncertainty estimate of the selected track such that a larger distance is maintained from the position of the predicted estimate of state of the track if one or more elements of the predicted uncertainty estimate are larger, and a smaller distance is maintained from the position of the predicted estimate of state of the track if one or more elements of the predicted uncertainty estimate are smaller. The drive path manager 529 (of the S-MMS controller 110B) transmits control signals to the motor controller 351 of the S-MMS 18F which cause the S-MMS to travel along the calculated course where the calculated course matches the heading and speed (e.g. predicted state estimate) of the track.

Walk along mode allows a friend, family member, caregiver, or other individual 3704 to walk alongside the S-MMS 18F, creating an opportunity for conversation while traveling, or to stay within a given distance of the individual. When the SAC 302B senses an unsafe condition while in the walk along mode (e.g. such as when the chosen partner walks down a set of stairs), the S-MMS controller 110B may send one or more control signals which cause one or more components of the S-MMS 18F to stop or pause walk along mode and/or request further input from the user via HMI 352 before continuing.

In an embodiment, one or more rules of a rules engine on the S-MMS controller 110B may be configured to search for tracks (e.g. of the SAC 302B situational awareness map) that maintain a consistent proximity to the S-MMS 18F for a predefined amount of time, in a predefined location proximate to the S-MMS, and/or within a predefined proximity to the S-MMS. When a track meets one or more of the predefined rules (e.g. from memory 120), then the S-MMS user is prompted (e.g. via HMI 352 or a paired smart device 902) "would you like to engage walk-along mode?". If the user selects yes, then the S-MMS controller 110B may send one or more control signals which cause the motor controller 351 of the S-MMS 18F to respond in a predefined manner as previously disclosed for walk along mode. As previously disclosed, STF 500 of the SAC 302B combines multiple received sensor reports and identifies unique tracks. Once the track is selected, the drive path manager 529 calculates a safe path which maintains an approximate distance to the track. Based on the output of the drive path manager 529, one or more control instructions is created.

In an embodiment, the S-MMS controller 110B may combine autonomous navigational capabilities (e.g. of drive path manager 529) with walk along mode as previously disclosed to allow an S-MMS user to follow an individual while preventing accidents. In such embodiments, walk along mode may be the primary driver of control instructions created by the drive path manager 529 until an obstacle or unsafe path is detected (e.g. either from sensor reports 371-375 FIG. 3 or from map data received from memory 120 or a remote server 910 via CNI 371) at which point the drive path manager 529 may temporarily modify one or more rules of walk along mode until the S-MMS has been rerouted and can safely reestablish the desired proximity to the track.

Figure 38:
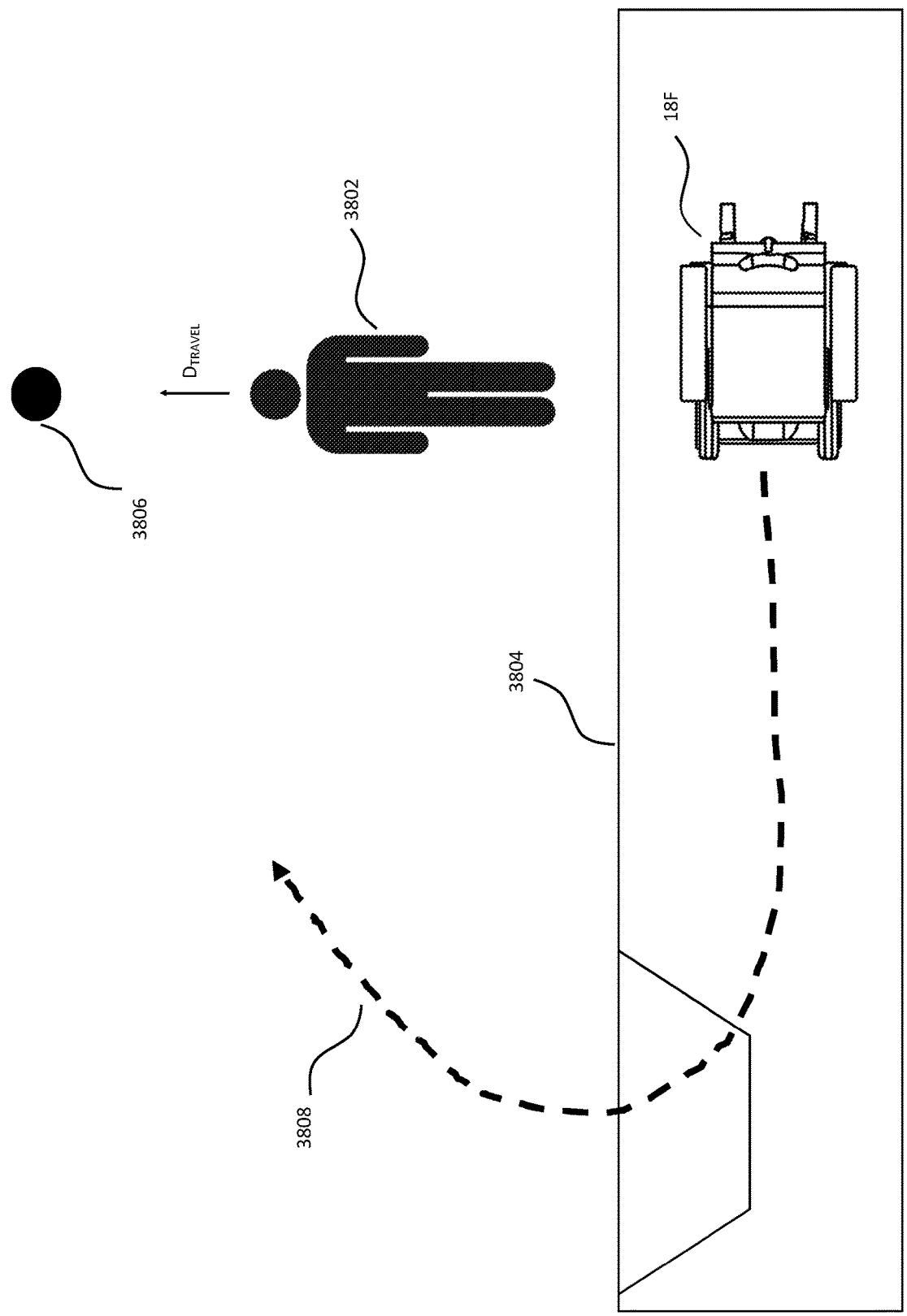
FIG. 38 depicts an S-MMS controller predicting a track of a walking partner and plotting an accessible intercept route.

FIG. 38 depicts an S-MMS 18F traveling an accessible intercept route to reengage walk along mode. In FIG. 38, a walking partner 3802 has stepped off the edge of a curb 3804 as the walking partner and the S-MMS user travel to the destination point 3806. In an embodiment, the stability manager 525 of the SAC 302B has identified that the curb 3804 is too high for the S-MMS 18F to safely traverse based on one or more sensor reports received by the SAC (e.g. 371-374 FIG. 3). The tactical manager 527 (e.g. in cooperation with the threat assessor 528) marks the track (e.g. the location of the curb 3804) as unsafe on the situational awareness map based on input from the stability manager 525. The drive path manager 529, which is operating in walk along mode in this example, includes one or more rules (e.g. in memory 120) which cause the SAC 302B to create a control instruction which pauses walk along mode when an unsafe condition is encountered. The $D_{TRAVEL}$ of walking partner 3802 and their predicted future location 3806 is known by the SAC 302B based on one or more outputs of STF 500.

Based on one or more of the current situational awareness map of the SAC 302B, navigation 363, map data retrieved from memory 120, map data retrieved from a remote server (e.g. 1004 FIG. 10), and the predicted future location of the walking partner 3806, the drive path manager 529 analyzes the predicted track of the walking partner and calculates an accessible intercept route 3808 to close the gap to that track. Based on this, the drive path manager 529 of the SAC 302B creates one or more control instructions for the S-MMS controller 110B which cause the S-MMS controller to send one or more control signals to the motor controller 351 of the S-MMS 18F so that it travels along the accessible intercept route 3808.

In an example, the drive path manager 529 calculates a predicted future location of the walking partner 3806 and uses a wall following algorithm to find an accessible intercept route 3808. The drive path manager 529 may calculate the predicted future location of the walking partner 3806 by using the predicted state estimate of the walking partner 3802 and calculating the predicted future location assuming a constant trajectory for a predetermined amount of time (e.g. retrieved from memory 120) such as one-minute. Alternatively, the drive path manager 529 may use the position of the predicted estimate of state for the track (e.g. calculated by STF 500). The drive path manager 529 may then attempt to move to the predicted future location of the walking partner 3806 in a straight line. If an obstacle (e.g. curb 3804) is encountered, then the drive path manager 529 may utilize a wall following algorithm, following the wall closest to the predicted future location 3806, to find an accessible path around the obstacle 3804.

Once the S-MMS 18F is able to travel safely in the direction of the predicted future location 3806, as determined by the drive path manager 529 based on the situation awareness map of the tactical manager 527, then the drive path manager 529 may calculate the most direct path to the 3808 to the predicted future location 3806 of the walking partner and continue along that most direct path until the S-MMS 18F is within a predefined (e.g. in memory 120)

range of the walking partner's track 3802 on the situational awareness map of the tactical manager 527.

In an embodiment, when the walking partner 3802 experiences an acceleration/deceleration that is above or below a predetermined value (e.g. from memory 120), respectively, such as if they are pushed, fall, or have to jump out of the way and/or experience a sudden change in direction, the SAC 302B of the S-MMS controller 110B may recognize the acceleration/deceleration or sudden change in direction based on one or more sensor reports and pause or cease walk along mode as described above. Additionally or alternatively, if the distance between the S-MMS user and walking partner should exceed a predetermined range (4-feet, for example) based on one or more sensor reports, the SAC 302B may automatically cease or pause walk along mode. In some instances, if the walking partner resumes a pace within an acceptable predetermined range, within a predetermined time frame, after experiencing the sudden acceleration and/or change in direction, (based on one or more sensor reports), the SAC 302B of the S-MMS controller 110B may resume walk along mode automatically.

The walking partner for walk along mode may have a smart device or wearable device which includes a transceiver capable of communicating with a communications processor onboard the S-MMS. The addition of a paired wearable device or smart device SAC 302B tracking capabilities, as previously disclosed, may be particularly useful when navigating crowded environments.

Figure 39:
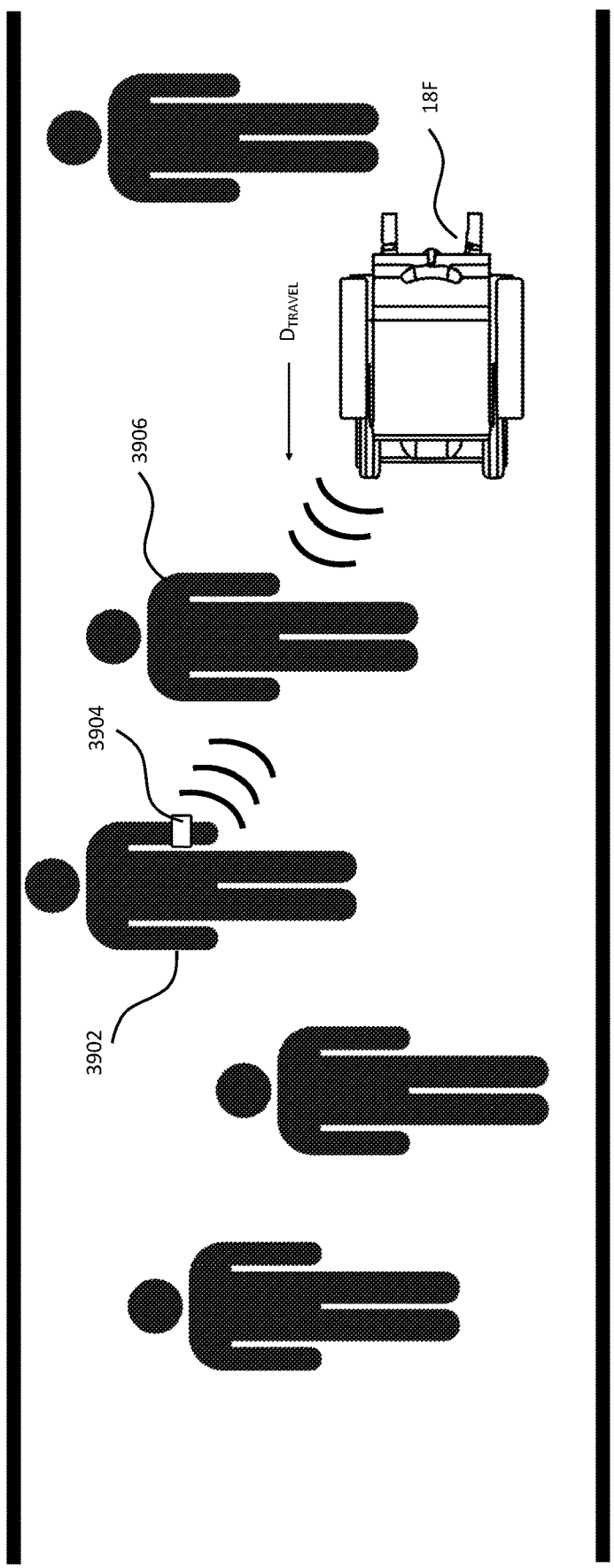
FIG. 39 depicts use of a wireless signal to enhance an S-MMS controller's ability to follow a particular track.

Use of RF, Bluetooth, BLE, or other wireless signals to enhance the S-MMS controller's ability to follow a particular track (e.g. of the SAC 302B) in a "high threat" environment is illustrated in FIG. 39. In the scenario depicted in FIG. 39, an S-MMS 18F is navigating a hallway, traveling in the direction $D_{TRAVEL}$. Many people are walking through the hallway in various directions. Walk along mode, as previously described, is engaged and the S-MMS controller 110B is attempting to follow a walking partner 3902 who is wearing a wearable 3904 that is communicating with the S-MMS controller 110B wirelessly. The number of people in close proximity may make it difficult for S-MMS 18F onboard sensors (e.g. FIG. 6) to keep track of the chosen walking partner 3902 at all times, particularly when another person 3906 is walking directly between the S-MMS 18F and the chosen walking partner 3902 or another obstacle blocks sensor line-of-site to the track.

The signal and/or code wirelessly transmitted from a paired wearable 3904 and received by a communication processor 216 of the S-MMS 18F, once accepted via CNI 371 (e.g. as described above as matching a known code), may assist the STF 500, tactical manager 527 and/or drive path manager 529 of the SAC 302B in one or more of the following ways:

When the walking partner 3902 presence is no longer sensed by one or more S-MMS sensors that send sensor reports 372-374 (e.g. the track is lost), but the signal and/or code wirelessly transmitted from the wearable 3904 is still received by STF 500, via CNI 371, then the STF 500 may not delete the track based on one or more rules from memory 120. In an embodiment, the STF 500 may continue to make predicted estimates of state for the track (e.g. of the walking partner 3902) while the signal and/or code is received. As long as STF 500 continues to send predicted estimates of state and uncertainty estimates for the track, it remains on the situational awareness map of the tactical manager 527. Based on this, the drive path manager 529 of the SAC 302B may continue walk along mode as described using the walking partner's last prediction of kinematic state (e.g. heading and velocity) as the direction of travel while the signal from the paired device 3904 is still present (e.g. received via CNI 371) until the track can be reacquired by one or more onboard sensors. The STF 500 may delete the track if both the signal and sensor reports for the track are no longer available. Additionally, the STF 500 may delete the track after a predefined number of cycles or period of time from memory 120.

The STF 500 or the drive path manager 529 of the S-MMS controller 110B uses the received strength of a wireless signal (e.g. as determined by one or more calculations of a communication processor 216 of the S-MMS 18F) to calculate an estimate of the distance or proximity from the S-MMS 18F to the paired device 3904. This estimate of distance may then be used by STF 500 of the SAC 302B as a sensor report to update the state estimate of one or more tracks of the fusion engine.

The S-MMS controller 110B may use multiple onboard antennas, paired to one or more communication processors 216, to process received communications (e.g. via CNI 371) and triangulate a position (i.e. calculate an approximate position) of the paired device 3904 transceiver. This calculated position may be used by the STF 500 and/or drive path manager 529 as the position of the paired device 3904 (and therefore the track for the walking partner 3902) in the absence of other data.

The S-MMS controller 110B may request (e.g. via CNI 371 by action of the sensor tasker 520 in an embodiment) and receive one or more pieces of location data wirelessly from the walking partners' device 3904. In an embodiment, location data (e.g. a position) is received by the S-MMS controller 110B from the walking partner's device 3904 with their current location. The location data (via CNI 371) may be used, instead of one or more sensor reports, by STF 500 to calculate the predicted estimate of state for the walking partner 3902. Alternatively, the location data may be passed by STF 500 to the tactical manager 527 where the location data is associated with a track and may be added to the situational awareness map as maintained by the tactical manager 527 to be used by the drive path manager 529.

In embodiments where the S-MMS controller 110B is communicating (e.g. via CNI 371) with a connected device or wearable device, the user of the connected device may indicate stops and pauses using the HMI of their device when they anticipate situations where the S-MMS user should not continue following them, for instance when the user of the connected device is moving ahead to open a door. In an alternate embodiment, walk along mode does not require a paired device and instead uses track identification (e.g. selection or confirmation from an HMI 352 or connected device 902) to select a specific track on the situational awareness map to follow. Additionally or alternatively, when traveling with a partner, the S-MMS controller 110B may respond to verbal commands such as "let me get the door for you" so that the S-MMS 18F pauses with sufficient clearance until the door is opened by the walking partner.

Safety of the S-MMS user is key for walk along mode. Should the connection to a walking partner be lost for longer than a predetermined (e.g. in memory 120) time range (5-10 seconds, as a non-limiting example), walk along mode may be automatically paused by a rules engine of the drive path manager 529 until a connection can be reestablished. Walk along mode may be automatically engaged by the drive path manager 529 when a connection is reestablished within a predetermined time range (0-60 seconds, for example) and may require user input to reengage (e.g. selection or confirmation from an HMI 352 or connected device 902 as described above) if connection is reestablished outside of the predetermined time range to prevent unintended, potentially unsafe situations. Additionally or alternatively, the S-MMS controller 110B may switch automatically from autonomous following to manual control (e.g. via HMI 352) based on user actions such as steering input received. The predetermined ranges referred to herein may be adjusted by the user or other operator and may be dependent, at least in part, on the user's ability and preferences as retrieved from memory 120. In some embodiments, limits may be hard coded (e.g. in memory 120) such that these ranges may not be adjusted outside of safe zones.

Crowd Navigation

Figure 40:
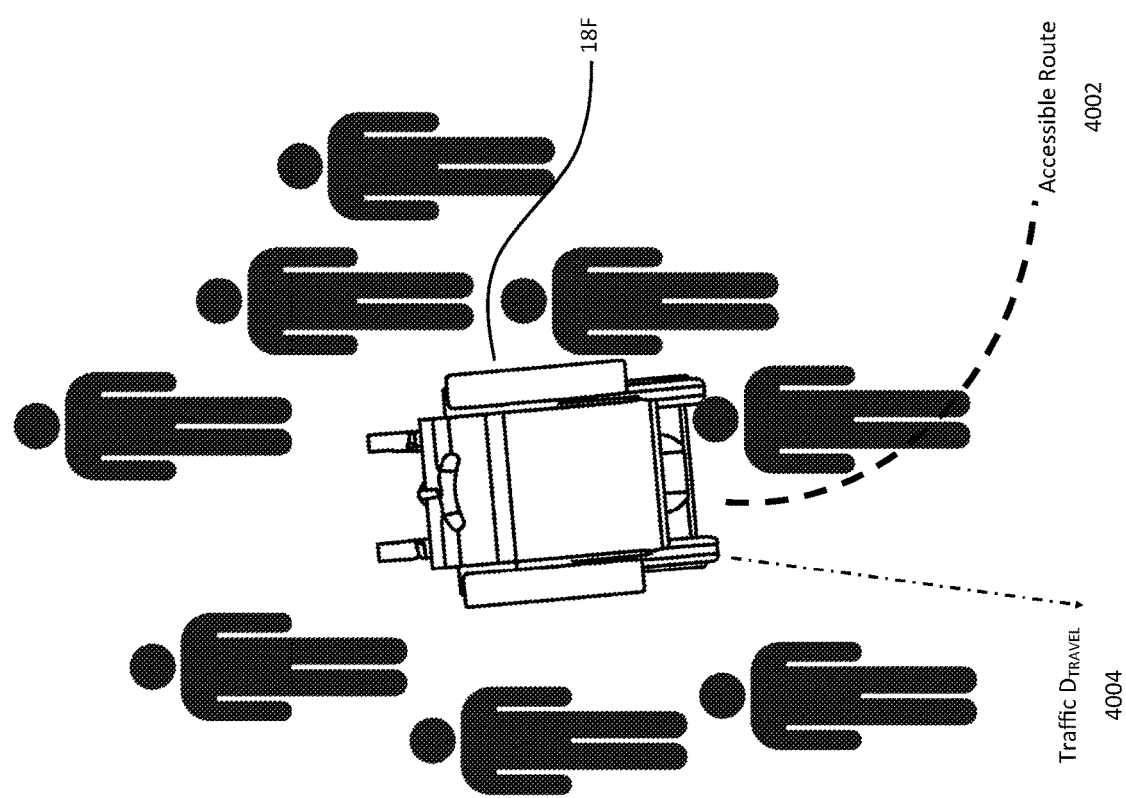
FIG. 40 depicts an S-MMS user attempting to travel an accessible route.

Navigating crowds in an S-MMS is particularly challenging due to a combination of lack of visibility from a seated position, the closeness of other individuals that may be injured by S-MMS movements, and the fact that other individuals in the crowd may perceive the location of an S-MMS as a "hole" in the crowd. FIG. 40 depicts an S-MMS 18F attempting to travel an accessible route 4002 which deviates from the direction of travel 4004 of the crowd in which the user is embedded. The previously disclosed systems and methods assist crowd navigation by using one or more filter instances of STF 500 to predict the future motion of the crowd and react faster to changes in crowd behavior.

In an embodiment, a rules engine of the SAC 302B (e.g. threat assessor 528) associates multiple, individual tracks that meet predefined rules (e.g. retrieved from memory 120) as a crowd. The threat assessor 528 then calculates the mean, mode, or median direction of travel and velocity of the crowd. This calculated crowd behavior may then be added to the situational awareness map of the SAC 302B as a unique track and/or used by the drive path manager 529 to determine one or more control instructions to be used by the SAC 302B of the S-MMS controller 110B. In an exemplary embodiment, one or more control instructions of the SAC 302B (e.g. from drive path manager 529) may cause the S-MMS controller 110B to send one or more control signals which cause the motor controller 351 of the S-MMS 18F to move such that it travels along with the crowd along $D_{TRAVEL}$ 4004 without user input.

The drive path manager 529 may calculate an accessible route 4002 to a destination selected by an S-MMS user (e.g. via HMI 352). The drive path manager 529 may then send one or more control instructions which cause the S-MMS controller 110B to send one or more control signals to the motor controller 351 of the S-MMS 18F which cause the S-MMS 18F to navigate autonomously to the selected destination via the calculated accessible route 4002. In an embodiment, the S-MMS 18F is navigating a crowd (as depicted in FIG. 40) with a known direction of travel $D_{TRAVEL}$ 4004. Based on this known direction of travel $D_{TRAVEL}$ 4004, drive path manager 529 may calculate a new, modified route to the selected destination based on the crowd $D_{TRAVEL}$ 4004, the most direct accessible route 4002, and the ability of the S-MMS 18F to move across the crowd without collision (e.g. based on the output of the collision manager 526). If the crowd allows travel along the accessible route 4002, the S-MMS controller 110B will continue to navigate along the accessible route. Alternatively, if the crowd does not allow cross-crowd navigation easily, the drive path manager 529 may recalculate an alternative route that requires less cross-cutting of the crowd or it may choose a different set of drive parameters, either increasing or decreasing the perceived aggression of the drive maneuvers.

Group Navigation

S-MMSs are capable of coordinated efforts and navigation. Schools, ranches, and nursing homes are examples of facilities and institutions with high S-MMS user populations. These locations are faced with a unique set of challenges when managing the movements of S-MMS users. Within any population is a wide variety of user abilities, which impacts the skill of the user to navigate their S-MMS. Some users require assistance navigating from a person who may or may not be familiar with operating an S-MMS or with the particular control mechanisms on different S-MMSs. Locations with high populations of S-MMSs are often communal and have group activities and meals which are attended by everyone within the community. These locations can be challenged by the logistics of moving a large number of S-MMS users into a common space in an efficient and timely manner. S-MMS users can sometimes be the last to join a function because of the challenge of gathering many users into one location and are often placed at the back of a room, which negatively impacts the user's ability to participate as part of the community. In addition, unskilled operation of S-MMSs in these locations, by the user or assistant, can lead to the restriction of use of these S-MMSs altogether, which has a broad negative impact on the users' freedom and ability to participate in the community. The S-MMS controller 110B is capable of operating in a coupled or group mode. Group mode allows the S-MMS controller 110B to be managed wirelessly by a remote device like an off-board computer, smart device, wearable, or a second like-equipped S-MMS.

Figure 41:
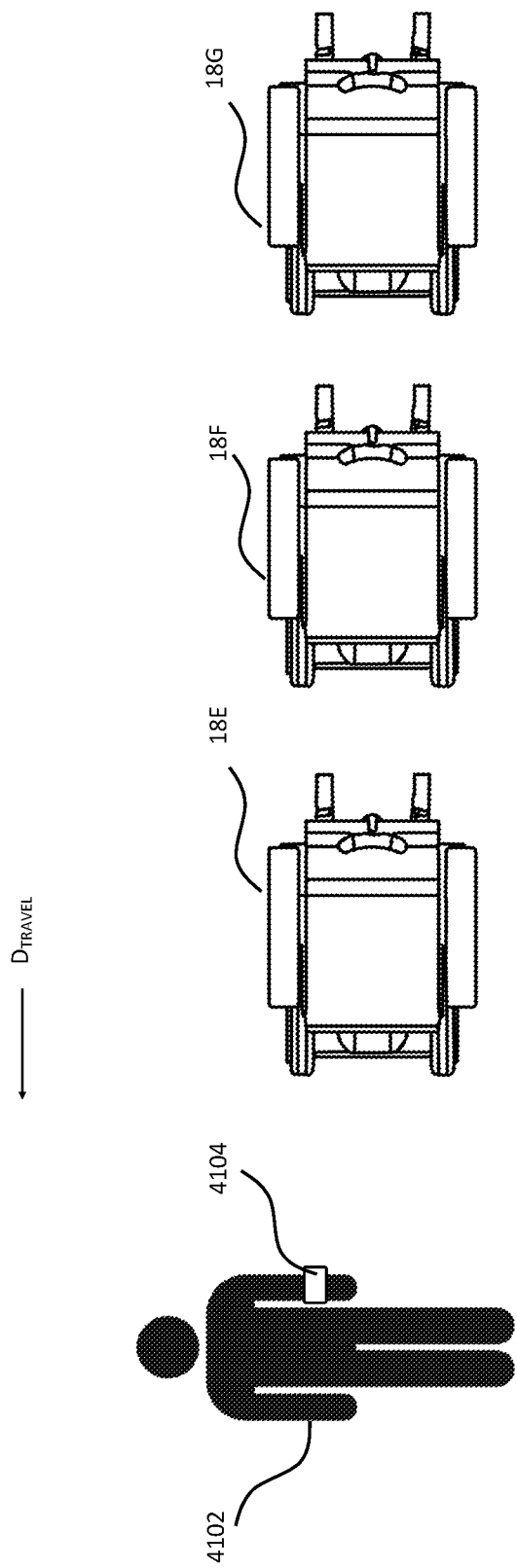
FIG. 41 depicts an embodiment of follow-the-leader navigation to a location.

FIG. 41 depicts an embodiment of multiple S-MMSs engaged in follow-the-leader navigation to a location. Follow the leader navigation enables more than one wheelchair to navigate to a destination, efficiently and safely. In an embodiment, an assistant 4102 is leading a line of one or more S-MMSs (18E-G) configured for group mode. Group mode of the S-MMS controller 110B allows one or more S-MMSs to follow another S-MMS or to follow a separate device which, in an example, may be carried by a caregiver 4104.

In an embodiment, the S-MMS controller 110B of S-MMS 18E may pair with an attendant device 4104 as previously disclosed for walk along mode. If each S-MMS (e.g. 18E-G) independently paired with and followed the attendant 4102, the goal of group navigation is achieved. This navigation may be effective, though rather unorganized. However, in an embodiment, the S-MMS controllers 110B of each of the paired S-MMSs communicate via CNI 371 over an adhoc network (e.g. 802.11p in an embodiment).

One of the S-MMS controllers 110B (e.g. of 18E) is assigned or takes the role of primary controller. The primary controller role may be determined based on a transmission received from the caregiver device 4104, based on a first to transmit protocol, or based on a value retrieved from memory 120. The primary controller (e.g. S-MMS controller 110B of S-MMS 18E) maintains a predefined distance from the assistant 4102 and transmits one or more control instructions to the group (18F-G) over the adhoc network. The control instructions received, via CNI 371, by the following S-MMS controllers 110B are used by the drive path managers 529 to plot a course which adheres to the one or more control instructions received.

In an embodiment, the caregiver device 4104 is a smart device with a touch screen HMI. The assistant can select from multiple pre-programmed flocking configurations, such as a single line or a two-by-two line. A flocking configuration, as used herein, means a configuration for a coordinated movement of two or more S-MMS units with a distance and direction of offset from one S-MMS to another S-MMS. The selected flocking configuration is transmitted wirelessly from the smart device to the S-MMS controller 110B of the primary controller (e.g. onboard 18E) where they are processed by the S-MMS controller of the primary controller and used by drive path manager 529 to calculate one or more control instructions for the following S-MMSs (e.g. 18F-G). In an example, the primary controller drive path manager 529 calculates a walk along mode trajectory for itself (e.g. 18E) to maintain a close following distance to the smart device 4104 (e.g. as previously disclosed) and then transmits a control instruction to the following S-MMSs (e.g. 18F-G) which includes the same trajectory and a unique offset target (e.g. distance and direction) from the position of the primary S-MMS (18E) for each of the following S-MMSs (e.g. 18F and 18G). The S-MMS controller 110B of each of the following S-MMSs (e.g. 18F-G) receives the one or more control instructions over the adhoc network, via CNI 371, and the drive path manager 529 of each receiving S-MMS may then transmit one or more control instructions which cause the transmitting drive path manager's S-MMS controller 110B to send one or more control signals to the motor controller 351 of the same S-MMS which cause that same S-MMS to navigate per the one or more control instructions received from the primary S-MMS (18E). Additionally, the drive path manager 529 of the primary S-MMS (18E) may send one or more control instructions which cause the S-MMS controller 110B of the primary S-MMS to send one or more control signals to the motor controller 351 of the primary S-MMS which cause the primary S-MMS to navigate per the calculated walk along trajectory.

The primary controller drive path manager 529 may also implement (as described above) a custom flocking configuration where custom flocking configurations can be created. In an embodiment, there is no need for the assistant to use HMI controls at all and instead the flock of S-MMSs simply follow in a predefined (e.g. from memory 120) flocking configuration.

Additionally or alternatively, group navigation control signals may be created and transmitted to one or more S-MMSs (e.g. 18E-G) by a remote master controller which, in a non-limiting example, may be implemented on a remote computer or server (e.g. 910 FIG. 9) and allow for the wireless coordination of multiple S-MMS controllers 110B from one interface. In an embodiment, depicted in FIG. 42, multiple S-MMSs 18E-F are called to a location such that they travel from one or more first locations (e.g. indicated by a 1 on FIG. 42) to one or more second locations (e.g. indicated by a 2 on FIG. 42). The S-MMSs 18E-F may safely navigate autonomously between the locations using the previously disclosed processes of the S-MMS controller 110B or the master controller (e.g. remote server 910) may assist the user's navigation between the two points by providing one or more control instructions for use by the drive path manager 529 of the SAC 302B. In an example, the alert manager 540 of the SAC 302B may create one or more control instructions for the HMI 352 and/or an application (app) on a connected device (e.g. 902 FIG. 9) so that the HMI and/or the application (app) display guidance instructions for the user to drive the S-MMS 18E to the destination using the HMI.

The master controller may schedule the transmission of one or more control instructions such that multiple S-MMSs 18E-F arrive to, or depart from, a particular location at a set time. In an example, to assist with room changes at schools or other care facilities, one or more control instructions are transmitted wirelessly (e.g. via WiFi or cellular communication) from a remote server (e.g. 910 FIG. 9) to one or more S-MMS controllers 110B of one or more S-MMSs (e.g. 18E-G of FIG. 42). The transmitted control instructions may include instructions which cause an S-MMS to move from one room to another in an example. Each of the S-MMS controllers 110B receives the one or more control instructions over the wireless network, via CNI 371, and the drive path manager 529 of each S-MMS may then send one or more control instructions which cause its S-MMS controller 110B to send one or more control signals to its motor controller 351 of the S-MMS which causes the S-MMS to navigate per the one or more control instructions received from the remote server. The SAC 302B stability manager 525 and collision manager 526 processes allow the safe and timely navigation of S-MMSs to the destination with no need for assistance as previously disclosed.

Figure 42:
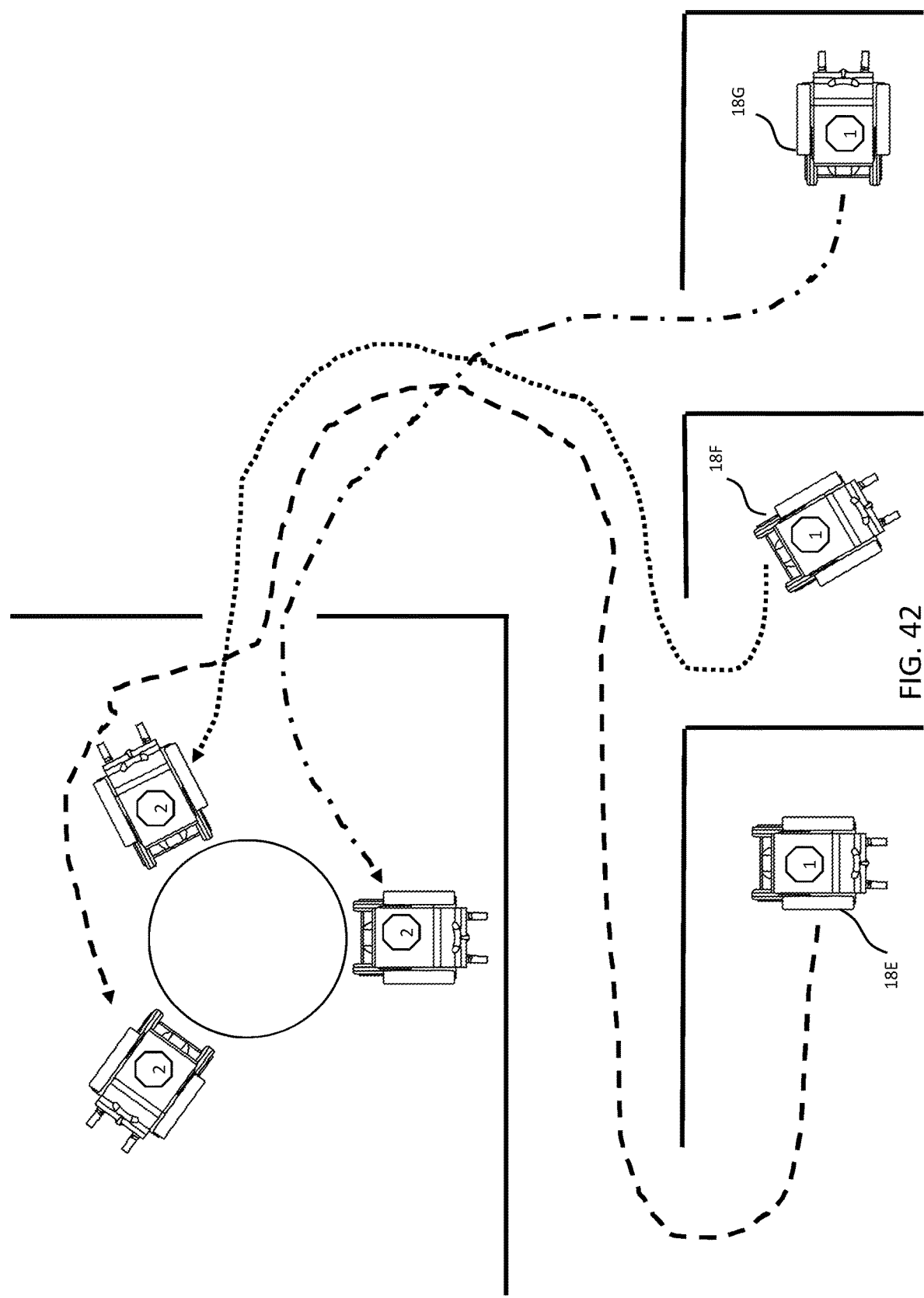
FIG. 42 depicts an embodiment of coordinated group navigation to a location.

Scheduled navigation enables users to safely arrive at activities with the rest of a community, reinforcing their inclusion in that community. Another non-limiting example is the ability to call users to dinner at an assisted care facility. An administrator of the facility may select a dinner time on the HMI of a remote master controller. The master controller transmits communications to users in S-MMSs (e.g. via the HMI or an application on a connected device) asking if they would like to join the rest of their friends for dinner (e.g. via HMI 352). When a user confirms via the HMI, or an application on a connected device, the drive path manager 529 of the S-MMS controller 110B is notified of the confirmation (e.g. by the receipt of one or more control signals from the HMI 352 or connected device 902) and, in response, may calculate a path from its location to the proper table or dining area and send one or more control signals which causes the S-MMS 18 to automatically travel down the hall to dinner and be arranged at the proper tables or a gathering area per settings. In this example, the location of the table or gathering area may be retrieved from memory by the S-MMS controller 110B (e.g. by the drive path manager 529) or transmitted by the master controller to the S-MMS controller 110B and passed by the S-MMS controller to the drive path manager. FIG. 42 depicts this embodiment.

In an embodiment of group mode, a teacher may use a smart device and custom application to select which S-MMSs to include in a group and how they would like the group to behave. In an embodiment, the application of the smart device would send a pairing request (e.g. via Bluetooth) to each S-MMS controller 110B. Each user may accept or decline the pairing request, received via CNI 371, using their HMI 352. If the pairing request is accepted, then the S-MMS controller 110B may respond to control instructions received via CNI 371 from transmissions from the teacher's smart device. Certain users or devices, such as trusted teachers or service providers, may be given special permissions that allow non-optional pairing to an S-MMS controller 110B under certain, predefined conditions. Additionally, individual S-MMS users may give or take control of a group mode session to facilitate activities.

Figure 43:
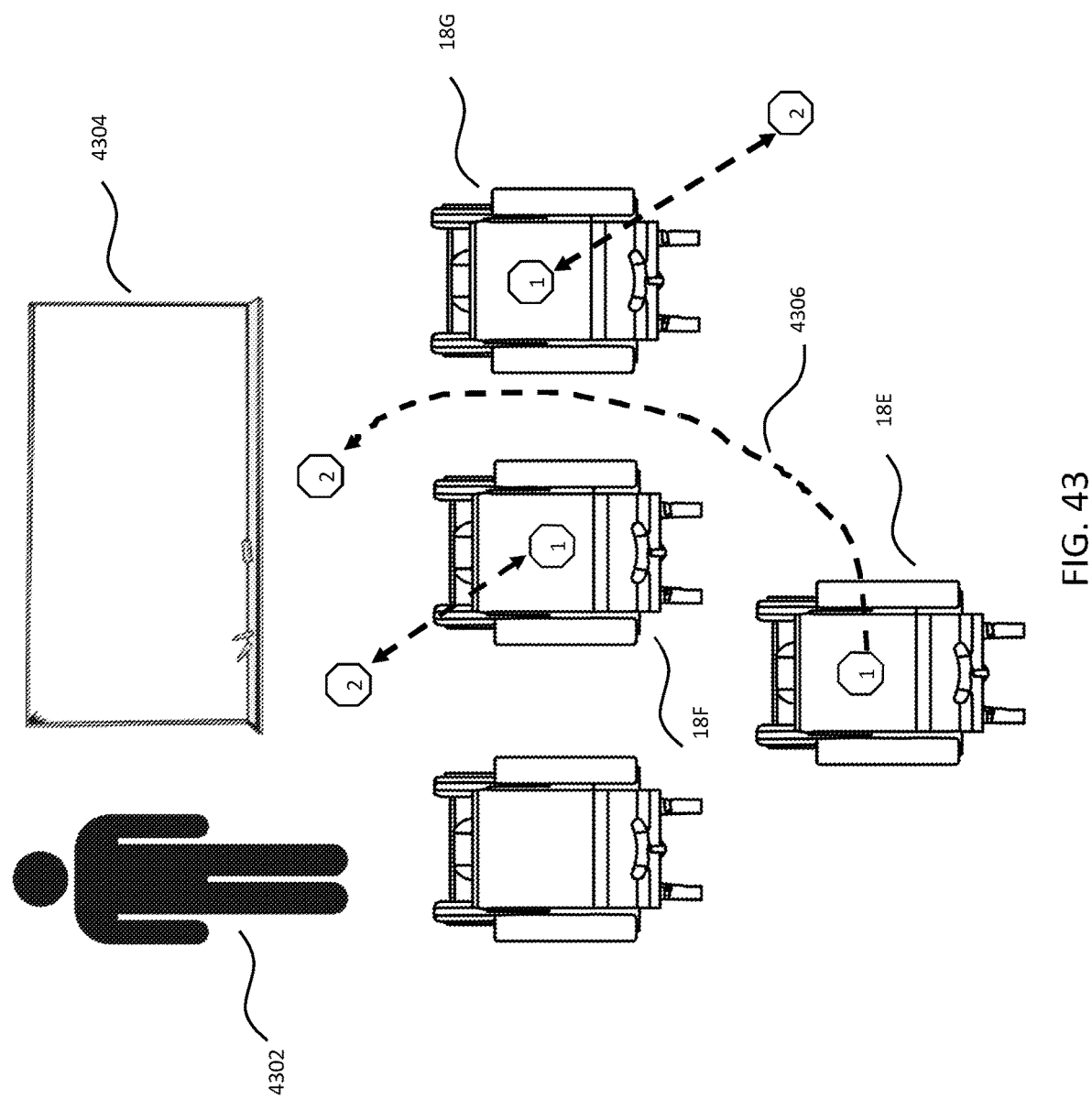
FIG. 43 depicts an embodiment of group mode enabling interaction for S-MMS users in a group setting.

FIG. 43 depicts a non-limiting example of this group mode behavior. A teacher 4302 in a classroom setting with multiple S-MMSs (18E-G) might ask a question and select a student to approach the front of the room 4304 using their smart device. After selecting a student, the teacher 4302 may choose that student's S-MMS 18E to come to the front of the room 4304 so they can present the answer. The teacher's tablet transmits one or more control instructions (e.g. the location of the front of the room and a request to drive to that location) wirelessly to the S-MMS controller 110B which is received and processed by the S-MMS controller and causes the S-MMS controller to transmit one or more control signals to the motor controller 351 as previously described. For example, the S-MMS controller 110B of the student's S-MMS processes the wireless signal to identify the request and the location of the front of the room and, in response to the wireless signal and/or confirming the wireless signal has a request from an authorized person (e.g. via a code in the wireless signal, via pairing, or otherwise as described above), passes that location to the drive path manager 529 with an instruction to drive to that location. The drive path manager 529 of the student's S-MMS controller 110B calculates a path to the location of the front of the room and transmits one or more control instructions to the motor controller 351 of its S-MMS, which causes the student's S-MMS to navigate per the one or more control instructions to the location of the front of the room.

Additionally, the S-MMS controller 110B of the selected student's S-MMS 18E may transmit one or more signals to the other S-MMS controllers (e.g. of S-MMS 18F and 18G) wirelessly. In an embodiment, S-MMS 18F and 18G are blocking the route of S-MMS 18E to the front of the room. The drive path manager 529 of the SAC 302B registers the blockage. Based on this, the S-MMS controller 110B of the student's S-MMS 18E transmits one or more control instructions (e.g. over 802.11p) using one or more communication processors 202 of the S-MMS where the control instructions request that the other S-MMSs move to clear a path. For example, the control instruction may request a particular movement (e.g. move three feet northwest/front-left) or identify the route or destination of the S-MMS 18E. Based on the control instruction received via CNI and processed by the S-MMS controllers 110B of S-MMS 18F and 18G, the S-MMS controllers 110B of S-MMS 18F and 18G determine a path to move out of the way of the S-MMS 18E route and move from point 1 to point 2 on FIG. 43. For example, the control instruction is transmitted from the S-MMS 18E as a wireless signal having a request to move and the route or destination of the S-MMS 18E. The S-MMS controller 110B of each other S-MMS 18F and 18G processes the wireless signal having the request to move and the route or destination of the S-MMS 18E, determines it should move based on the request, and instructs its drive path manager 529 to calculate a route to move out of the way of the route or path to the destination of the S-MMS 18E. The drive path manager 529 calculates its own route to obtain clearance for the S-MMS 18E (e.g. by retrieving dimensions of a general S-MMS from memory and adding a clearance distance from the route or destination of the S-MMS 18E, by evaluating location of the S-MMS 18E, its destination, and other targets on the situational awareness map of its SAC 302B, or otherwise as described herein) and transmits one or more control instructions to the motor controller 351 of its S-MMS, which causes its S-MMS to navigate per the one or more control instructions out of the way of the -MMS 18E. With this move, all three S-MMSs 18E-G can transition from position 1 to position 2 and back as illustrated. All this interaction is facilitated automatically by group mode.

Additionally or alternatively, one or more wireless beacons or visual cues recognized by the S-MMS controller 110B may be used to assist group routing. Teachers, caregivers, users, or facilities personnel may place these beacons so that S-MMSs recognize them and perform one or more standard behaviors in their presence.

Complex User Metric Embodiment

A system of sensors may provide a wealth of data to an S-MMS controller 110B that can be used to assess the true health and trajectory of an S-MMS user. In an embodiment, one or more user sensor reports 375 (FIG. 3) and/or one or more wireless health informatics data sources, received by the S-MMS controller 110B via CNI 371, may provide information to the S-MMS controller of an S-MMS. User health manager 510A (FIG. 31) of the SAC 302B receives, processes, stores, and uses a rules engine to create one or more control instructions based on received data. Whether one is a mobile chair S-MMS user attempting to maintain health or a competitive ATV S-MMS rider attempting to improve race times, the systems and methods disclosed can assist in meeting one's goals.

The metrics tracked may be combinations of simple, single measurements into a more complex user metric. As a non-limiting example, a physical therapist might wish to track a combination of weight change, time in standing position, and load placed on the foot plate during standing as an indicator of bone density health for an S-MMS user in a wheelchair with a standing feature. Using an API on a connected device as previously disclosed, the therapist may create a custom program and transmit a "Bone Density Training" program to the memory 120 of a user's S-MMS. These custom programs may be exportable so that they can be shared between users allowing rapid deployment of new technologies by practitioners and users across multiple S-MMS controllers 110B. The complex user metrics engine 3114 of UHM 510A then executes the program on the S-MMS controller 110B. In an embodiment, the program is configured to:

retrieve total user weight and pressure distribution values for the user either directly from a user reports list 3102 or as received from the weight distribution monitor 3118 of the UHM 510A, retrieve the current seat position from a motor controller 351 of the S-MMS 18 and determine whether the seating system is in standing mode or not, write total user weight, pressure distribution, current seat position, and standing mode status values, with a time stamp (e.g. from RTOS services 362), to a file in memory 120 as user history 3104, and, retrieve one or more total user weight, pressure distribution, current seat position, and standing mode status values from user history 3104 and calculate a bone density metric, developed by the therapist, with one or more algorithms where the result of this calculation is saved to memory 120 and/or transmitted to a remote memory (e.g. 910).

The bone density metric may be displayed to the user of the S-MMS via HMI 352 in an embodiment. Additionally or alternatively, the user history file may be transmitted via a secure, wireless connection to a remote server 910 (FIG. 9) where a compute engine 914 may be used to calculate the bone density metric and/or store the data to a database 916 for access by the physical therapist who wishes to track this bone density health indicator and use it as the basis of medical interventions and/or interactions with the user to aid in therapy. Users, trainers, doctors, caregivers, family members, or any other individual working with a user may wish to have access to select user metrics in this way as a way to assist an S-MMS user.

In an embodiment, each user or linked trainer or caregiver may create a custom dashboard showing the metrics that are of most concern to them. FIG. 44 depicts an embodiment of a dashboard for a bone density training monitor. A history of measured and calculated data versus time 4402 is included for analysis by the therapist. In addition, current key performance indicator values are displayed 4404, including how recent the data is ("DATA"), whether standing time targets have been met for the day ("STANDING"), the amount of load placed on the foot plates of the S-MMS during the last standing session ("LOAD"), and the current weight of the user ("WEIGHT"). Additionally or alternatively, an overall bone density metric score may be displayed 4406 graphically and/or numerically. The values for the dashboard are retrieved from a secure database 916 on a remote server 910 and accessed via an internet connection 940/930 via either a secure web portal 942 or smart device 932 of the therapist 944 in an embodiment.

Custom notifications may be created by users related to outputs of the custom dashboard or program. In an embodiment, these notifications may be triggered by a compute engine 914 or rules engine 1006 on a remote server 910 based on analysis of private data 1002 retrieved from a secure database 916 against one or more rules defined by a user, caregiver or technician. The compute engine or rules engine may send a control instruction to the output queue 918 of the remote server 910, which causes the remote server to transmit a message (e.g. via SMS) to one or more connected devices 932. In an embodiment, an S-MMS user would have to give permission to any individual who wanted to view data from their health file via one or more HMI 352 or connected device 902 input.

API Software Embodiment & Event Triggering

There are situations and locations in which an S-MMS user's caregivers would appreciate knowledge about things that are about to happen. Software may be deployed in the hosted application space 125 (FIG. 1) or complex application space 130 of the S-MMS 18 which accesses via a secure abstraction layer 135 one or more variables or outputs of navigation 363, RTOS services 362, outputs of one or more processes of the SAC 302B (e.g. UHM 510A, the situational awareness map of the tactical manager 527, or drive path manager 529 for example), data from memory 120, and/or the motor controller 351 or HMI 352. Access to these S-MMS locations and processes are moderated via an API 135 as previously disclosed, in an embodiment. As a non-limiting example, an assisted living facility has found that a majority of injuries in their facility occur in the bathroom. For this reason, a custom program has been developed to send caregivers an alert when their S-MMS user is headed towards the bathroom. This would allow caregivers to reach the bathroom to assist at an appropriate time.

Figure 45:
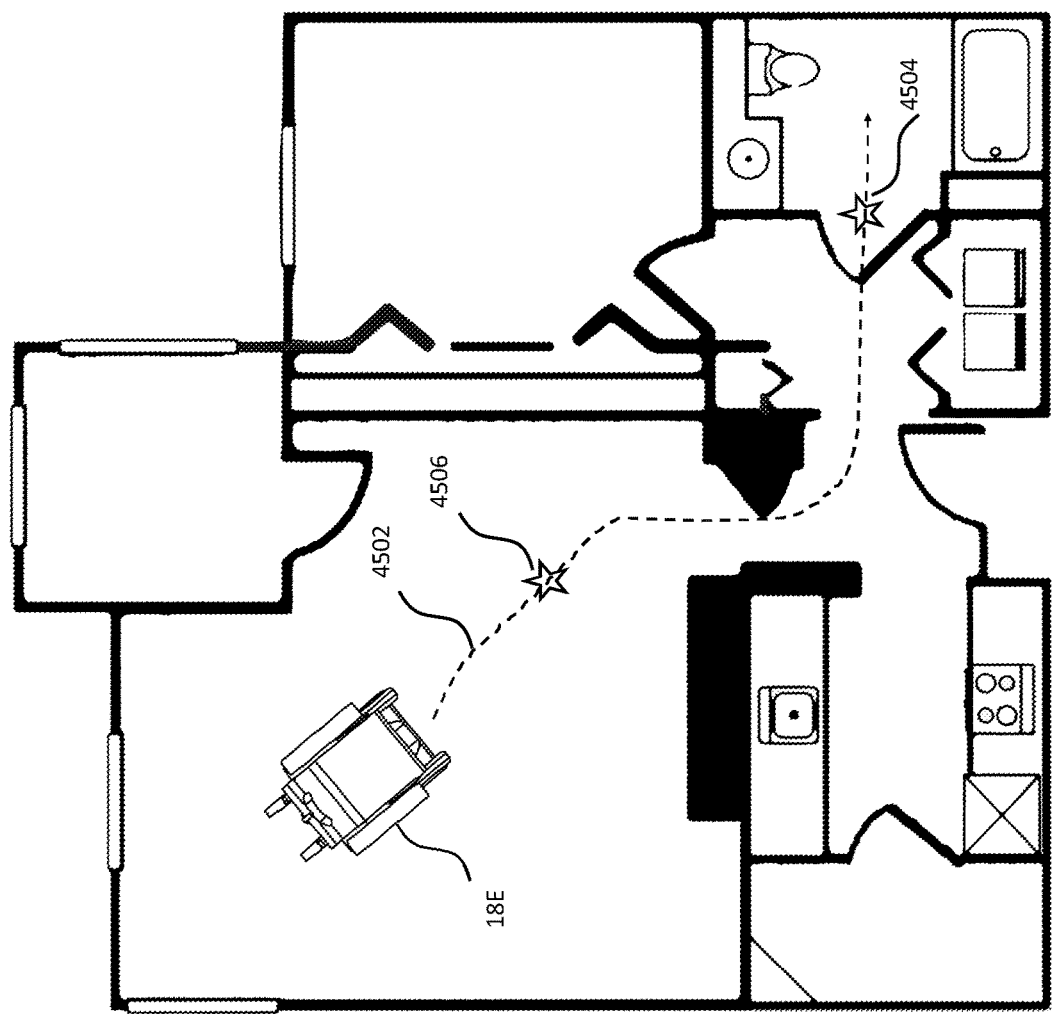
FIG. 45 depicts an S-MMS traveling a path to a restroom in a living suite.

FIG. 45 depicts an S-MMS 18E traveling along a path 4502 to the restroom in a living suite. A program is loaded to memory 120 of the S-MMS 18E and executed by the S-MMS controller 110B from the hosted application space 125. In an embodiment, a wireless beacon is placed at a location 4504 and transmits one or more codes or data over a short range wireless signal (e.g. BLE). The loaded program processes data from received signals, including beacon identifiers in the received signals, and determines if a received beacon identifier in a received signal is a known beacon identifier, for example by comparing the received beacon identifier to one or more known beacon identifiers stored in memory (e.g. memory 120 or memory of a connected device). If the loaded program determines the received beacon identifier is a known beacon identifier, the loaded program may transmit one or more instructions to the S-MMS controller 18E to cause the S-MMS controller to take one or more actions. If the loaded program determines the received beacon identifier is not a known beacon identifier, the loaded program may take no action or a predefined action for signals received from unknown beacons.

When the S-MMS 18E travels within range of the short range wireless signal, the loaded program is configured to recognize the received signal, for example as described above, and cause the S-MMS controller 110B to send a control signal which causes one or more alerts or notifications to be transmitted to a caregiver. In this way, the caregiver is alerted when the S-MMS goes through the bathroom doorway. Additionally or alternatively, the loaded program may cause the S-MMS controller 110B to send one or more control signals that block motion of the S-MMS 18E at the defined location 4504 until further motion is approved by a caregiver (e.g. via a remote device 902 FIG. 9). This may allow the caregiver enough time to come and assist. In this way, one or more codes or signals received wirelessly via one or more communication processors 202 of the S-MMS 18E may be processed by one or more processes of the S-MMS controller 110B, compared to known codes or signals in memory 120, and cause the S-MMS controller to take one or more actions, including sending one or more control signals, ceasing to send one or more control signals, changing one or more settings (e.g. in memory 120), and/or executing one or more processes, programs, or algorithms.

In an alternate embodiment, instead of responding to data, codes, or signals received (e.g. via CNI 371) at the S-MMS controller 110B, a program running on the S-MMS controller may monitor S-MMS 18E locations as maintained by navigation 363 and execute one or more behaviors or send one or more control signals based on proximity to a predefined (e.g. from memory 120) set of coordinates or location. In an embodiment, with reference to FIG. 45, a program may compare the current location of the S-MMS 18E (e.g. latitude and longitude) to a list of "pinned" coordinates in memory 120. In an example, if the S-MMS 18E travels within a predefined radius of a location 4504, then the program may cause the S-MMS controller 110B to execute one or more other programs (e.g. from memory 120) and take one or more actions based on one or more control instructions received from the one or more other programs.

In an alternative embodiment, the S-MMS 18E travels near a predefined location 4506 which causes a program executed by the S-MMS controller 110B to compare the current trajectory of the S-MMS (as retrieved from navigation 363 or as estimated by drive path manager 529 of the SAC 302B) to the direction or location of the bathroom. The layout of the living suite in this example, including directions and locations of each room in comparison to each other room, is preconfigured data for the program. If the program determines the S-MMS 18E is heading in the direction of the bathroom, then the program may instruct the S-MMS controller 110B to send one or more control signals which cause a signal (e.g. alert signal) to be transmitted via a communications processor 202 of the S-MMS 18E to a caregiver device or to another device which causes a caregiver to be alerted. It is useful to caregivers because it may be used to alert them when there is a high probability that the user's end location is the restroom. Advanced warning allows the caregiver to get to the bathroom in time to effectively assist the user. Similar advanced warnings can be created based on tactical manager, user health manager, or S-MMS controller capabilities.

The previously disclosed methods for triggering unique S-MMS controller 110B behaviors based on one or more received signals (e.g. from a beacon) or known coordinates are not limited to the previous examples. The ability to trigger unique behaviors may be used in a wide variety of instances including to trigger behaviors of S-MMSs (e.g. by the S-MMS controller) at amusement parks, public facilities, in homes, and other situations.

Smart Seat

As a non-limiting example of an S-MMS controller 110B monitoring and taking action on a complex user metric, consider pressure sore avoidance for wheelchair users. Pressure sores, also known as pressure ulcers, are caused by a variety of intrinsic and extrinsic factors. Some of these factors, such as poor nutrition, use of steroids, and aging, may be difficult to track with sensors but may be included as part of a user profile (e.g. in memory 120). Other factors, such as pressure, temperature, humidity, and friction/shear force on an area of the body may be assessed using one or more sensors in a smart seat cushion or seat cushion cover. For purposes of explanation, assume that the probability of developing a pressure ulcer is some function of the above variables described by:

$$P_S = K * f(\text{age, steroid use, pressure, temperature, humidity, shear, and/or time}) \quad \text{Eq. 28}$$

where $P_S$ is the probability of a pressure ulcer and K represents a constant.

In an embodiment, a pressure sore 3136 function (FIG. 31) of the complex user metrics engine 3114 of the UHM 510A may be configured such that it executes a version of Eq. 28 and outputs a prediction of pressure sore danger based on one or more inputs. In this embodiment, all or most of the necessary inputs for this complex function are provided by a smart cushion or smart cushion cover mounted to an S-MMS.

Figure 46:
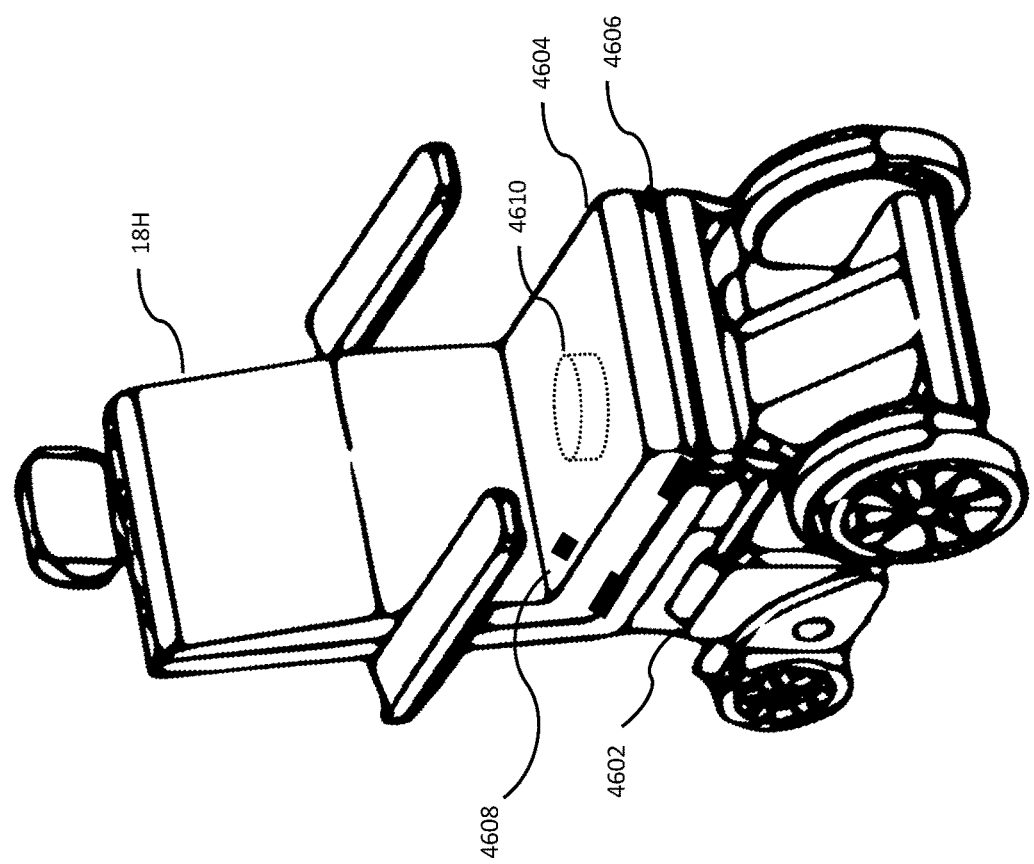
FIG. 46 depicts an exemplary S-MMS equipped with actuators capable of moving a seat in an automated fashion and a smart cushion.

FIG. 46 illustrates an exemplary S-MMS 18H equipped with actuators 4602 capable of moving the seat in an automated fashion and a smart cushion 4604. The smart cushion 4604 includes one or more force and/or pressure sensors 4606 capable of measuring weight distribution and/or force on the cushion, one or more sensors 4608 capable of measuring temperature and/or humidity, one or more moisture sensors 4610, and/or a smart fabric capable of measuring shear force, stretch, and/or friction. In an example, the smart cushion may use one or more patches of pressure-sensitive conductive sheets (e.g. velostat or linqstat) to sense weight distribution, temperature, humidity, and moisture sensors on a chip, and one or more variable resistance sensor fabrics (e.g. EEonTex) to approximate friction and shear. Additionally, the smart seat may include a flex sensor or presence sensor that confirms user presence in the seat to help track the time-in-seat variable. Additionally, the smart seat may include one or more processors to monitor sensor reports and communicate with other devices, such as the S-MMS controller 110B. These smart seat sensors may be wired or wirelessly communicatively coupled to one or more processors and/or communication processors such that the values are received, processed, and transmitted (e.g. via Bluetooth) to a communication processor of the S-MMS 18H. The values are received via CNI 371 and processed by the pressure sore 3130 function along with values for age and steroid use retrieved from memory 120. The smart seat as disclosed may be used on other devices such as manual wheelchairs with a connected communication device in an embodiment.

In an example, a wheelchair user transfers into a wheelchair with a smart seat. The deflection of the seat due to the weight of the user deforms a flex sensor which causes a change in the resistance across the sensor. In an alternative embodiment, user presence is determined based on one or more force or pressure readings. The change in resistance is read by a processor of the smart seat (e.g. as a change in voltage across a voltage divider circuit) and the change causes the processor to begin taking measurements from the one or more sensors of the smart seat. The sensor reports are transmitted to the S-MMS controller (e.g. via serial over USB) where they are received as user sensor reports 375, added to the user reports list 3102 of the UHM 510A, and used by one or more process of the UHM, such as a pressure sore program 3136 of the complex user metrics engine 3114. When the wheelchair user transfers out of the wheelchair with the smart seat, the absence of deformation (e.g. for the flex sensor) or the absence of pressure or weight (e.g. in an alternative embodiment) causes a change in resistance that is read by the processor of the smart seat and causes the processor to stop taking measurements from the one or more other sensors of the smart seat.

Based on one or more outputs of the pressure sore program 3136 of the complex user metrics engine 3114, the UHM rules engine 3122 may be configured to send one or more control signals which cause a motor controller 351 to take a predefined action. In an example, the S-MMS controller 110B transmits one or more control instructions to a motor controller 351 which controls one or more actuators (e.g. of a seating system). In response to one or more readings received from the smart seat, the S-MMS controller 110B may send a control signal to one or more motor controllers 351 associated with the seating assembly of the S-MMS 18 to cause the seat position to move responsive to the calculations of the SAC 302B.

For example, the S-MMS controller 110B may send a control signal to one or more motor controllers 351 to cause one or more motors or actuators controlled by the motor controller(s) to raise or lower a level of the back, front, left, or right side of the seat, or combinations thereof (i.e. one of the front or back in combination with one of the left or right), while maintaining the level of the opposite side(s) of the seat. Additionally or alternatively, therapists and users may be alerted to the risk or other suggestions may be made to the user as previously disclosed.

Maneuvering Confidence

In an exemplary discussion of dynamically structured S-MMS controller 110B operation, a user has operated an S-MMS 18 successfully for one year. The UHM 510A of the SAC 302B has logged data to memory 120 regarding user behavior and status over time. Additionally, the stability manager 525 and collision manager 526 of the SAC 302B have logged crash event data, including collision and instability event data, to memory 120. The data (e.g. collision history and user history) is essentially a report card of the user behavior and status over some period of time. The data logged in memory 120 can be analyzed and acted upon by the S-MMS controller 110B to improve one or more models (i.e. one or more models of one or more IMM or DSIMM instances of the SAC 302B) by creating a new or modified set of model setup or runtime variables.

In a non-limiting example, the collision manager 526 may be configured to log both every successful doorway transition event (e.g. as defined by sensor readings showing a narrowed passageway) and every collision event with the speed of the S-MMS at the collision event to memory 120. Based on stored data, at a beginning point in time, the user of the S-MMS 18 can maneuver their S-MMS through a 48-inch door safely without a collision event, or action by the S-MMS controller 110B to block a collision event, 68-percent of the time at top S-MMS speed, but 99-percent of the time at a slow speed. Wider doorways lead to better results in both cases. These values may be calculated by a sample standard deviation analysis run by the S-MMS controller 110B on data logged in memory 120 where logged data is flagged for analysis by the UHM 510 under certain conditions, such as system collision interventions, proximity conditions, a predefined amount of time, or specific user inputs.

The data stored for the successful doorway transition events and the collision events of the 48-inch door may be used when the user is maneuvering the S-MMS down a crowed street. If there are people and objects on the street that are spaced at 48-inches, the S-MMS controller 110B processes the prior event data described above and, based on that event data, allows the S-MMS to pass through the 48-inch space between people and objects, based on user inputs via the HMI 352, but at a slower speed than may be indicated by the user inputs to ensure nobody is bumped into.

After a year of use, the event data stored by the S-MMS controller 110B demonstrates the user has improved well enough to be able to maneuver through a 36-inch door with ease 99-percent of the time at top speed. The S-MMS controller 110B updates one or more rules based on analysis of this updated data by the UHM 510 of the SAC 302B. This translates now to the user maneuvering through a crowd at higher speeds safely. In an embodiment, the functionality and analysis described in this example is performed by a reaction time monitor (e.g. 3116 of FIG. 31) of the UHM 510.

Going to the Park

As a non-limiting example to illustrate how one embodiment of a predictive, learning situational awareness control SAC 302B as disclosed may behave, consider an S-MMS user that wishes to travel from their current location to the park on a hot summer day. If the user indicates to the S-MMS controller 110B that they would like to travel to the park (e.g. by a voice command or another input to the HMI 352 or by an input to a connected device 902), then the drive path manager 529 of the SAC 302B may evaluate the received request against the current state and location of the S-MMS (e.g. signals received from one or more motor controller reports 351 and location data received from navigation 363), the situational awareness map of the surroundings (e.g. of tactical manager 527), and/or the current condition of the user (e.g. from the user status monitor 3120 of the user health manager 510A).

In an example, the S-MMS controller 110B receives a GPS coordinate set for a desired end location (e.g. the longitude and latitude of the park) as part of a control signal from a user input (e.g. HMI 352). The drive path manager 529 of the SAC 302B then calculates an accessible route from the current S-MMS location (e.g. the longitude and latitude of the S-MMS from navigation 363) to the received GPS coordinate set. Drive path manager 529 may calculate an accessible route to the park using one or more of map data from memory 120 and/or map data retrieved from remote memory (e.g. public data 1004 FIG. 10) in an embodiment. In addition, drive path manager 529 computes the distance to and from the park.

If there is no known accessible route to the selected park (e.g. no map data available from memory 120), alternative nearby parks may be offered by drive path manager 529 for which there is available map data (e.g. from memory 120), or the user may be asked (e.g. via the HMI 352, based on one or more control signal sent by the S-MMS controller 110B) if they would like to contact an aide or assistant to accompany them. Additionally or alternatively, the drive path manager 529 may cause the S-MMS controller 110B to send one or more control signals to the HMI 352 of the S-MMS which causes the HMI 352 to notify the user using a graphic or display that no known fully accessible routes are available but the drive path manager 529 may provide the most accessible route available and advise the user (e.g. via the HMI 352) to proceed with caution.

In an embodiment, the drive path manager 529 may operate without map data by calculating, and causing the S-MMS to travel, the most direct route to the end location and then maneuvering around non-accessible features (identified by the SAC 302B as described for walk along mode e.g. ref FIG. 38). In this way, the S-MMS controller 110B is effectively handing off responsibility for navigation safety in some areas of the route to the safety processes of the SAC 302B.

In an embodiment, the tactical manager 527 may explicitly be made aware of these areas along the route by the drive path manager 529 which may cause one or more DSIMM instances of STF 500 to use one or more alternative sets of runtime variables by sending an input (e.g. 2222 FIG. 22) to STF where the alternative set of runtime variables may cause the STF 500 to assume all new tracks are accelerating towards the S-MMS, thus changing SAC 302B behavior to more aggressively assist the user at these locations. Additionally or alternatively, the tactical manager 529 may enforce one or more reduced maximum speed settings in areas of the route with limited or no map data.

Assuming a route is determined, the S-MMS battery status received from the motor controller 351 is compared to a calculated, expected trip battery usage by the drive path manager 529. In an embodiment, the drive path manager 529 calculates the expected trip battery usage based on data from memory 120, such as the distance, elevation change, and/or surfaces expected to and from the park. If the battery level received from the motor controller 351 is less than or equal to the calculated, expected trip battery usage, then the drive path manager 529 of the S-MMS controller 110B may suggest to the user via the HMI 352 or a connected device that they charge the battery for a specified time prior to leaving or may suggest via the HMI or a connected device public charging options available along the route to the park, if available.

As electric vehicles gain in popularity, it is expected that S-MMSs may use the automotive industry standard J1772 and/or IEC 61851 charge port interface and compatible charge controllers so that S-MMS users may quickly (due to the small size of their onboard batteries) charge at any public charging facility. Additionally or alternatively, S-MMS specific charging stations may be available and mapped (e.g. and accessible as public data 1004 FIG. 10) or the locations may simply be publicly available standard power outlets.

If the drive path manager 529 determines, via one or more calculations using one or more predefined algorithms, that the battery level is sufficient for the determined route, the drive path manager 529 may check the UHM 510 to determine, based on a user status monitor 3120 FIG. 31, if the determined route is advisable for the user. As a simple example, if a moisture sensor in the seat shows that the user may have had an accident and needs to change, the S-MMS controller 110B may suggest via the HMI 352 or a connected device to them or a caregiver that they visit the restroom prior to leaving their current location.

However, in an embodiment, an exhaustion estimator 3134 on the complex user metrics engine 3114 allows a much more robust predictive analysis of the determined route. As a non-limiting example, a user with cerebral palsy is known to be sensitive to temperature extremes. The reaction time monitor 3116 shows user reaction times are within expected ranges and current user sensor reports 375 and wireless reports received via CNI 371 generally indicate variables are within expected ranges (as monitored by one or more processes of UHM 510A). However, the exhaustion estimator 3134 is aware of current user temperature (perhaps based on readings from a wearable device received via CNI), outdoor temperature, the estimated trip parameters (e.g. trip duration), and models of user core temperature variation over time. Using these pieces of data and algorithms, the exhaustion estimator 3134 may predict a state measurement of user health at points along a determined route and determine that the determined route as planned may be dangerous or harmful to the user.

At that point, the user status monitor 3120 may recommend via the HMI 352 or a connected device delaying the trip (e.g. via a message delivered through the HMI 352), activate one or more S-MMS components such as a seat cooling system, coordinate the determined route with another user or caregiver who can offer assistance, or simply add waypoints for air conditioning into the determined route. As the user departs on their determined route to the park, the drive path manager 529 has ensured that the determined route will be as safe and successful as possible. During the determined route, the user health manager 510A and tactical manager 527 will actively monitor the user's health and safety and assist the user.

As a non-limiting example of coordinated S-MMS behavior, if an S-MMS user is traveling to the park using best route functionality, a second S-MMS user that is nearby (e.g. within range of an 801.11p WAVE adhoc signal sent from the first S-MMS) may be notified that a nearby S-MMS is going to the park. The second user may be asked, via the HMI, if they would like to join the first user at the park. If they select to join, their S-MMS may communicate with the first S-MMS and coordinate a travel path and destination. All of this is coordinated by the drive path manager 529 of the SAC 302B on the S-MMS controller 110B on each S-MMS, as described herein.

Remote Assistance

In an embodiment, an S-MMS controller 110B may use onboard or paired communication capabilities, as previously disclosed, to request remote assistance in situations where confidence in one or more processes of the SAC 302B is degraded. As a non-limiting example, in the event that autonomous navigation is engaged, and the drive path manager 529 fails to find a good route to a destination (perhaps due to missing map data, current conditions, or other challenges), a remote driver may be contacted. This remote driver, with access to one or more onboard sensor reports, the situational awareness map, and/or other S-MMS controller 110B data streams, may provide real-time assistance to the S-MMS user. Additionally or alternatively, the remote driver may actually drive the S-MMS until the S-MMS controller 110B can take over with a predefined level of confidence.

Routine Monitoring

The simple user metrics engine 3112 of UHM 510A (FIG. 31) may be used to monitor and assist with an S-MMS user's daily routing. In an embodiment, one or more of the binary monitor 3124, the threshold monitor 3126, or other monitor may be set to cause the S-MMS controller 110B to respond to specific data with a preconfigured response. For instance, if every day the user navigates to the kitchen to take medication, a binary monitor 3124 may be configured to remind the user via the HMI 352 or a connected device when they move to a given location as monitored by navigation 363. The S-MMS controller 110B may provide notification and or assistance based on user preferences, settings, and/or ability.

FIG. 47 illustrates an example of the routine deviation alert capabilities of an S-MMS controller 110B. Assuming the S-MMS 18E user is awake and out of bed every morning by 9:00 am but stays in bed 4702 on a particular morning past expectations (e.g. 9:00 am), the S-MMS controller 110B may alert a caregiver 4704 that something is unusual. The alert trigger may be a binary alert set in UHM 510A such that if the binary monitor 3124 determines a user presence sensor (e.g. from a smart seat on the S-MMS 18E) is not triggered by a predefined time (e.g. from memory 120) each day, then the UHM (e.g. alert 3144) causes the S-MMS controller 110B to send one or more control signals to a communication processor 216 (FIG. 2) which transmits an alert message to a remote server 910.

In an embodiment, the remote server 910 receives the transmitted alert message (e.g. a JSON package which contains control instructions) in an input queue 912, reads the received alert message via a compute engine 914, and based on the contents of the received alert message takes one or more actions. For example, the compute engine of the remote server may send one or more alerts via an output queue 918 (e.g. SMS messages to a remote device 932). In an embodiment, the UHM 510 sends alerts along an escalation path of individuals, first simply prompting the user locally via the HMI 352 or a connected device if everything is ok, then escalating to transmitting an alert message to the remote server 910 to alert a second contact of no response is received from the user. Eventually this automatic issue escalation protocol may end in the UHM 510 causing the S-MMS controller 110B to send one or more signals which contacts emergency services (e.g. via the remote server 910 or an onboard communication processor 216) for help automatically after a predefined (from memory 120) amount of time has passed without any input to the HMI 352 of the S-MMS. As a non-limiting example, the UHM 510A may alert a caregiver when their user gets up out of their S-MMS in certain locations. This may allow the caregiver to know that their charge was taken to the bathroom or got into bed.

Physical Training Assistant

Training and therapy are common activities for S-MMS users. In the case of a mobile chair S-MMS user, the impairment that requires the use of the S-MMS may require observation, assessment, and therapies for short and long-term care. In addition, the long-term impacts of mobile chair S-MMS use must be monitored, and movement prescribed to ensure issues do not arise. In an embodiment, an S-MMS includes an actuated seating assembly where the one or more actuators of the seating assembly are controlled by a motor controller (e.g. 351 FIG. 3). The S-MMS controller 110B is capable of sending one or more control signals to the motor controller which causes adjustment/motion of one or more of the actuators of the seating assembly. This allows a user to be positioned based on the output of one or more S-MMS controller 110B processes and can significantly improve therapy and training outcomes.

One of the primary physical difficulties of mobile chair S-MMS users is disuse of muscles and inability to shift and stretch. Any stretching, movement, or changes to weight distribution can be beneficial to a user to provide exercise/physical therapy, improve blood flow and range of motion, to prevent pressure sores, and to provide better comfort. This capability is especially great in an S-MMS seating system that allows the legs to be positioned separately.

An S-MMS controller 110B may cause movement of a seating system (via motor controller 351) and assist with exercise for users to aid in physical therapy and/or training and/or to improve overall health. Powered movement and exercise routines may be custom developed by a user or caregiver or they may be prescribed by a medical professional (reference FIG. 25). Movements, resistance, and frequency could be prescribed as part of an application or software program to be deployed on the S-MMS 18 and executed by the S-MMS controller 110B for the user. These prescribed applications and/or software programs are referred to as therapy programs. In an embodiment, the therapy program is stored in memory 120, executed in the complex application space 130, and interfaces with the S-MMS controller 110B (and motor controller 351) via an API 135. The therapy program causes the S-MMS controller 110B to transmit one or more control instructions to one or more motor controllers 351 to move one or more actuators on the S-MMS 18 (e.g. seat actuators) to cause one or more movements of the user in the S-MMS and/or to cause the drive manager 529 to take one or more actions to move the S-MMS. The therapy program may provide reminders to the user or an operator via the HMI 352 or a connected device to perform the prescribed movements manually using the HMI. Reminders may also be sent to another device such as a caretaker's phone or a wearable device, among others. Additionally or alternatively, the therapy program may cause automated actions of the seating assembly or other components of the S-MMS 18.

Therapy programs may include therapy for both the long-term and short-term. In one embodiment, post-surgery movements to aid in recovery may be prescribed. A therapy program is created by a technician and loaded to S-MMS memory 120. The program is executed on the S-MMS processor 202 (which is hardware) as part of the complex application space 130 and communicates via an API 135 to the S-MMS controller 110B. The therapy program receives data (e.g. from memory) and/or inputs from one or more processes of the SAC 302B (e.g. sensor reports) via the API 135. The therapy program transmits one or more control instructions to the S-MMS controller 110B via the API 135. Only a limited set of data, inputs, or possible control instructions are available to the therapy program via the API 135.

In an embodiment, daily exercises to shift the user's weight or move them from a seated to standing position may be prescribed by the therapy program and executed via the API 135. The prescription could be associated to a user profile for a particular user, so the prescribed movements could be completed by any S-MMS occupied by the user. Prescribed activities may have an associated shelf-life or expiration date wherein a rules engine of the S-MMS controller 110B deletes the therapy program from memory 120 of the S-MMS on a predefined date. Additionally or alternatively, the therapy program may include information on filters, thresholds, events, or other conditions (e.g. user health metrics of the UHM 510A) that would trigger notification of an individual such as a therapist or doctor.

If the user has a screen or ability to be connected to a screen (such as a paired smart device 902 FIG. 9), the exercises can be displayed for them on that screen by the therapy program to follow, much like a workout video. Depending on the ability of the user and capabilities of the seating system, the therapy program may be adjustable via an input on the HMI 352 of the S-MMS, or a connected device, to provide varying amounts of assistance for one or more of the prescribed exercises (e.g. by causing a control signal to be transmitted from the HMI or connected device identifying an adjustment to the therapy, which is optionally processed by the S-MMS controller 110B, transmitted to the therapy program either by the S-MMS controller or directly from the communications processor of the S-MMS, and processed by the therapy program to effect the adjustment to the therapy). In some cases, the S-MMS controller 110B may provide a high amount of assistance at first which may automatically (or manually) decrease with time as the user gains strength and or ability. For users with low mobility, the therapy program may perform the prescribed motions with little to no interaction from the user. The speed of the therapy program may be adjusted to the individual, for example as described above. The prescription may be accessed, monitored, and modified by the medical professional, and the history of completed prescriptions and movements could be reviewed as well via a secure web portal 924. Depending on the situation, this may be carried out remotely or locally.

Song Encoding

A precedent exists for encoding information within files in many ways. Standards such as ID3 tags allow publishers and users to write relevant information to an audio file, such as track name, artist, and album. This information is appended to the file's code, which can then be retrieved by a music player, but not audibly played. Additional standards exist in order to more literally embed information into audio formats, such as SSTV (Slow Scan TV) in which an image is analyzed on a pixel by pixel basis, and those pixel's colors are conveyed by a specific frequency. A device used to decode SSTV images would listen for incoming sound and interpret different frequencies as different colored pixels as it works its way through a file. The result, in theory, should be the original picture.

In an example, song information, such as artist and track name, but more importantly in this situation, tempo and overall song structure, are transmitted via audio frequencies to a receiving microprocessor system.

Normal song frequencies take place within the range of human hearing (20 Hz to 20,000 Hz). However, most speakers are capable of outputting frequencies exceeding this range. Many speakers are more equipped than others to handle this job. For instance, a small mobile-phone speaker would be less capable than a high-end concert hall speaker.

A song begins to play, and the human listeners in the room begin to hear music. A small but powerful microphone of an S-MMS (e.g. a non-contact sensor) may pick up this input of sound and the STF 500 of the SAC 302B on the S-MMS controller 110B begins scanning the music received via a sensor report 372 (or alternately a program running on a sensor processor 214 can scan the music) for the embedded audio tags, which are a string of high pitched notes of varying frequencies above the range of human hearing. These notes include a start tag and stop tag in the same way that some electronic communications contain a start bit and stop bit. This prevents the decoding program from misinterpreting frequencies or receiving data in the wrong order.

The STF 500 optionally then instructs a decoder on the S-MMS controller 110B to decode the song information, indicates to a decoder a start bit was located which results in the decoder decoding the song information, or otherwise causes a decoder to decode the song information.

Alternately, a decoder on the S-MMS controller 110B or the sensor processor 214 identifies the start bit and stop bit and otherwise decodes the song information. In this example, a song is provided directly to the decoder by the S-MMS controller 110B or the sensor processor 214 for decoding. The decoder provides the decoded song information to the S-MMS controller 110B or the sensor processor 214.

A start tag is played in the music, and the decoder on the S-MMS controller 110B (e.g. via STF 500) or the sensor processor 214 interprets information for the song, for example as follows: START|Artist=Beck|Song=E-Pro|Meter=4/4|STOP. The S-MMS controller 110B (e.g. via STF 500) or the sensor processor 214 transmits the decoded song information (e.g. artist, song name, and/or other information) to the drive path manager 529 where the song information allows the drive path manager 529 to quickly search for premade dance programs (e.g. from memory 120) fitting this artist and song description, or automatically select a basic dance program based on the song's meter and overall waveform structure using a generic dance program (e.g. from memory 120), without that information requiring manual user input.

The dance program specifies one or more movements to be made by the S-MMS, such as a series of predefined movements that correspond to a song's meter and overall waveform structure. For example, the dance program is either a data file or an executable file that instructs the drive path manage the one or movements to be made by the S-MMS and optionally when those movements are to be made in time. Upon the drive path manager 529 locating a dance program matching the song description (e.g. artist, song name, and/or other information), or if no matching dance program selecting the basic dance program, the drive path manager executes or reads the matching or basic dance program (depending on whether the dance program is a data file or executable file), which results in the drive path manager transmitting one or more control instructions (e.g. to one or more motor controllers 351) to cause the one or more movements of the dance program to be made by the S-MMS, optionally in a sequence and at particular times and/or cadences.

In another example, the S-MMS controller 110B or the sensor processor 214 determines the song, but the song has already started. The S-MMS controller 110B or the sensor processor 214 determines a time at which the song is playing (e.g. 34 seconds into the song). The S-MMS controller 110B or the sensor processor 214 transmits data describing the song (e.g. artist, song name, and/or other information) and the time stamp for the current time location in which the song is playing. The drive path manager 529 locates a matching dance program or basic dance program and matches the current time location in which the song is playing to the instructions in the dance program so that the movements of the S-MMS match the current time of the song. For example, most songs have time stamps at various points in the song, and the dance program also has time stamps for which the drive path manager 529 can search. The drive path manager 529 transmits one or more control instructions (e.g. to one or more motor controllers 351) to cause one or more movements of the dance program to be made by the S-MMS, optionally in a sequence and at particular times and/or cadences, starting at the current time of the song.

The method by which the information is conveyed in the music resembles the SSTV encoding method, in which standardized alphanumeric and Unicode characters are assigned specific frequencies and modulations. Multiple frequencies may be paired up to represent a single character in order to allow for a larger alphabet; for instance frequency 22,300 followed by 22,350 might be the letter "c" whereas 22,300 followed by 22,400 might be "d" and so on. This would allow for a much larger alphabet, encompassing uppercase, lowercase, numbers, punctuation and symbols, and foreign characters. A standardized digital character set exists; it would simply need to be mapped to frequency pairs. An example of this character mapping is as follows:

|   |                       |                  |
|---|-----------------------|------------------|
|   | Digit Seven           | 22,100 + 22,350  |
| 8 | Digit Eight           | 22,100 + 22,400  |
| 9 | Digit Nine            | 22,100 + 22,450  |
| : | Colon                 | 22,200 + 22,050  |
| ; | Semicolon             | 22,200 + 22,100  |
| < | Less-than sign        | 22,200 + 22,150  |
| = | Equal sign            | 22,200 + 22,200  |
| > | Greater-than sign     | 22,200 + 22,250  |
| ? | Question mark         | 22,200 + 22,300  |
| @ | At sign               | 22,200 + 22,350  |
| A | Latin Capital letter A| 22,300 + 22,050  |
| B | Latin Capital letter B| 22,300 + 22,100  |
| C | Latin Capital letter C| 22,300 + 22,150  |

In this example, the first frequency in the sequence indicates the character library, and the second frequency indicates the symbol within that library. As stated above, 22,100+22,350 is different than 22,200+22,350.

By these rules, the above transmission would be encoded as follows:

| START|Beck|E-Pro|4/4|STOP |
|---|

| | | | | |
|---|---|---|---|---|
| [21,500 + 22,000] | [22,600 + 22,050] | [22,300 + 22,100] | [22,500 + 22,250] | [22,500 + 22,150] |
| [22,500 + 22,550] | [22,600 + 22,050] | [22,300 + 22,250] | [22,000 + 22,650] | [22,300 + 22,800] |
| [22,500 + 22,900] | [22,500 + 22,750] | [22,600 + 22,050] | [22,100 + 22,200] | [22,000 + 22,750] |
| [22,100 + 22,200] | [22,600 + 22,050] | [21,500 + 21,000] | | |

The STF 500 includes programming with data for decoding (e.g. in memory 120) which decodes the received transmission in an embodiment. Drive path manager 529 receives the decoded transmission and can then search for Beck's E-Pro and execute a stored dance program corresponding to Beck's E-Pro to generate a dance pattern based on its time signature.

Dancing

Wheelchair DanceSport is a partner dance competition and dance sport where at least one of the dancers is in a wheelchair. Wheelchair couple dances are for two wheelchair users or for one wheelchair user with a "standing" partner and includes standard dances such as waltz, tango, Viennese waltz, slow foxtrot, and quickstep and Latin American dances such as samba, cha-cha-cha, rumba, and jive. There are also formation dances for four, six, or eight dancers.

Wheelchair dancing started in Sweden in 1968, originally for recreation or rehabilitation, with the first competition held in 1975. The first international competition was held in Sweden in 1977. Several regional and international competitions followed, and the first World Championship was held in Japan in 1998. Since 1998, Wheelchair Dance Sport is governed by the International Paralympic Wheelchair Dance Sport Committee (IPWDSC), although it is not part of the Paralympic program. The sport incorporates the rules of the World DanceSport Federation (WDSF).

Wheelchair dancing is a popular social and recreational activity with participants in over forty countries. The physical benefits of wheelchair dancing can include the maintenance of physical balance, flexibility, range of motion, coordination, maintenance of bone density, and improved respiratory control. The psychological effects of wheelchair dancing are social interaction and the development of relationships. For social dancers, it is an opportunity to engage in a fun and a friendly event with others. For competitors, it assists in the development of fair play, sportsmanship, and communication skills.

With consideration now for recreational enjoyment and broadening of the sport for all S-MMS users, the S-MMS is designed to support and host applications through APIs as previously disclosed. These applications are expected to be available as options at initial purchase of an S-MMS or downloadable after-the-fact (e.g. to memory 120) to allow evergreen enhancement of the S-MMS.

A dance program running on one or more S-MMS processors (e.g. executed by S-MMS controller 110B on processor 202) enables users to dance with each other and non-S-MMS users. As a non-limiting example, the S-MMS user might manually drive to and ask to dance with a given partner. Assuming a positive response, the user can indicate to the S-MMS through various means (e.g. by pushing a button on the HMI 352, selecting from options on a paired smart device, or simply speaking a voice command like "let's dance" that can be recognized by the HMI and/or S-MMS controller 110B, among others) that the dance mode on the S-MMS controller 110B should be engaged, resulting in execution of the dance program.

Figure 48:
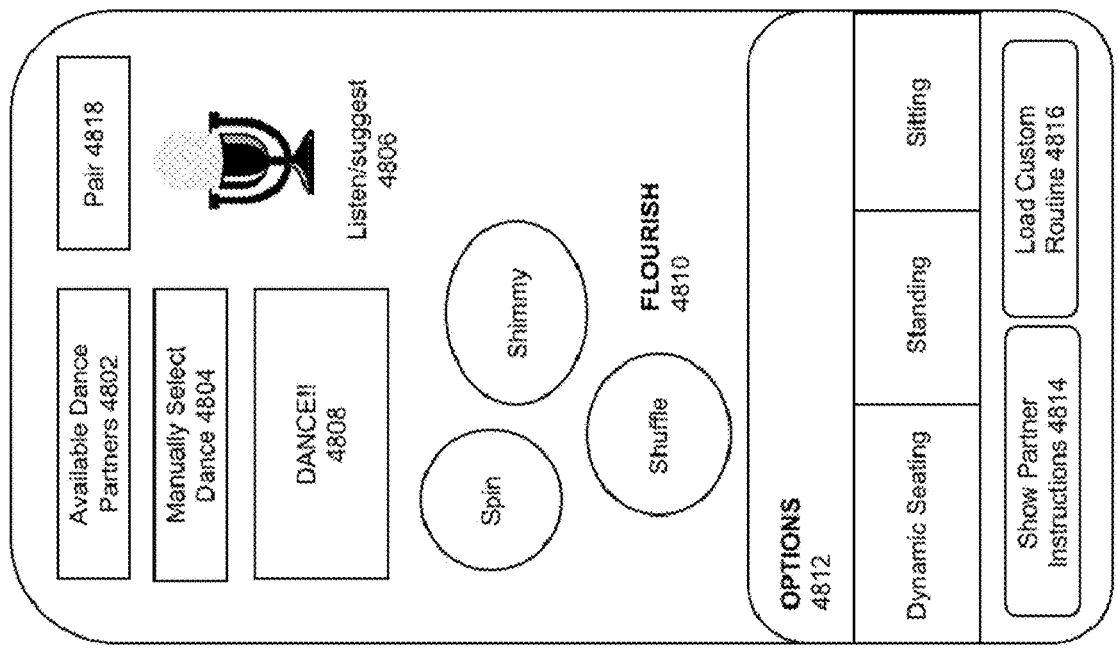
FIG. 48 depicts an embodiment of a graphical user interface (GUI) for an S-MMS user.

FIG. 48 shows an embodiment of a graphical user interface (GUI) configuration for the user which may be displayed on an HMI 352 of the S-MMS or on a connected smart device 902 running a dance application (APP). In an embodiment, the dance APP is selected by the user using their connected smart device 902. Once the dance APP is executed, the connected smart device 902 wirelessly transmits (e.g. via Bluetooth) one or more control signals to the S-MMS controller 110B which are received via CNI 371 and cause the tactical manager 527 to respond with a list of one or more tracks proximate to the S-MMS 18. The list of one or more tracks is then transmitted to the connected smart device by the S-MMS controller 110B and displayed as a list of available dance partners 4802 by the dance APP. In an embodiment, the S-MMS controller 110B may exclusively use onboard sensors to track the dance partner. Additionally or alternatively, in response to one or more control signals received from the connected smart device 902, the STF 500 of the SAC 302B on the S-MMS controller 110B may attempt to establish wireless communications with a compatible device located on a dance partner (e.g. via BLE) and associate the device with one or more tracks of the STF.

In an embodiment, the list of one or more tracks transmitted to the connected smart device may only include tracks that are associated (e.g. by STF 500 as previously disclosed) with a compatible device. Compatible devices may include a smart phone, wearable, or stand-alone "dance partner badge" that includes a wireless transceiver or beacon. The user then selects a dance partner from the list of available dance partners 4802 displayed on the dance APP. This selection is transmitted wirelessly to the S-MMS controller 110B and the track ID (e.g. of the tactical manager 527) is stored in memory 120 for later use by a dance program.

With a dance partner selected, a dance can now be selected. In an example, the user manually selects a dance 4804 from a list using the dance APP. The dance selection is transmitted wirelessly to the S-MMS controller 110B, the S-MMS controller searches for a dance program (e.g. from memory 120) that matches the dance selection of the user, the S-MMS controller identifies a matching dance program, and the S-MMS controller executes the matching dance program (e.g. in the complex application space 130). In this example, the dance program is executed to calculate a set of desired maneuvers or locations around the current track location (e.g. for the track ID from memory 120) which are transmitted to the drive path manager 529 of the SAC 302B in an embodiment. The SAC 302B, as previously disclosed, will track the dance partner's location and the drive path manager 529 may adjust the dance routine being executed appropriately. The drive path manager 529 causes the S-MMS controller 110B to send one or more control signals to one or more motor controllers 351 of the S-MMS, which causes the S-MMS to complete one or more movements of the dance routine.

In an alternate embodiment, the dance program is a data file that lists the movements of the dance routine. In this embodiment, the drive path manager 529 reads the data file, calculates the movements that are to be made by the S-MMS for the dance routine, and causes the S-MMS controller 110B to send one or more control signals to one or more motor controllers 351 of the S-MMS, which causes the S-MMS to complete one or more movements for the dance routine.

In an embodiment, a user of the dance APP on a coupled smart device (e.g. 902) or a program of the S-MMS HMI 352 may select a listen and suggest function 4806, which transmits one or more control instructions to the S-MMS controller 110B. In an example, STF 500 may use one or more microphones to listen for a start tag played in the music or provide the music to the decoder immediately when the music is identified by a sensor. The decoder on the S-MMS controller 110B or the sensor processor 214 decodes the song information, as previously disclosed. The decoded song information is sent from the decoder (or other process of the S-MMS controller 110B or the sensor processor 214) to the drive path manager 529 where the decoded song information allows drive path manager 529 to quickly search for premade dance programs (e.g. from memory 120) fitting this song information, or automatically generate a basic dance based on the song's meter and overall waveform structure using a generic dance program (e.g. from memory 120), without that information requiring manual user input.

The dance APP may include additional features in some embodiments. In an example, the dance APP allows the addition of preprogrammed "flourishes" 4810 to the dance routine. These flourishes could include spins, shimmies, or the like, and are software sub-routines that are activated (e.g. by a control signal sent to the S-MMS controller 110B) by the user HMI or an operator from the dance APP based on one or more user inputs. Other options 4812 may be available such as the ability to allow the seating assembly of the S-MMS (e.g. if powered) to stay in a stationary sitting position, stay in a stationary standing position, or allow dynamic changes in the seating position as part of a dance routine.

Additionally or alternatively, the dance APP may show dance partner instructions 4814 and/or allow the user to load custom dance routines 4816 to memory of the S-MMS. When the user wants to stop dancing they can indicate via the HMI or dance APP that they want to end the dance and the S-MMS controller 110B may use its autonomy to navigate to a safe location for the user or an operator to take over manual controls, in an embodiment.

The dance program running on the S-MMS processor 202 includes instructions for the S-MMS controller 110B to operate in multiple dance modes. As a non-limiting example, when two S-MMSs are interacting in dance mode, both S-MMSs host and execute a dance application configured for the dance (a waltz, for example), one S-MMS is set to lead, and the second S-MMS is set to follow. In an embodiment, the dance program (e.g. waltz program) contains subroutines for both leading and following that may be executed. One or more dance partners selects which subroutine of the dance program to execute by choosing a pair 4818 option on the dance APP 902 or on a paired smart device or HMI 352 and selecting lead or follow.

The lead S-MMS controller 110B transmits a control signal wirelessly (e.g. using an 802.11p adhoc network in an embodiment). The control signal, received by a second S-MMS controller 110B via CNI 371 contains one or more control instructions which causes the HMI 352 and/or a paired smart device 902 of the second S-MMS to request permission to pair and take the lead. If the user of the second S-MMS accepts the request, then the two S-MMS controllers 110B, synchronize their clocks via CNI 371 and execute synchronized instructions (e.g. mirrored control instructions) with one controller running the lead subroutine of the dance program and the other controller running the follow subroutine of the same dance program. Users with more advanced S-MMSs that offer options such as a standing mode may be prompted via the dance APP to choose a dancing position (e.g. sitting, standing, or dynamic seat positioning) and other options 4812. The two S-MMS controller 110B systems are now operating together and both are using data from onboard sensors to keep the S-MMS oriented, and self-aware of their surroundings to avoid collisions.

In another embodiment, the song encoding approach previously disclosed may be utilized. If the dance is a line dance for country western music, the users cooperatively operate the line dance application now side by side in a non-mirrored mode. The coupled smart device may again detect the music and the application may select the appropriate dance routine which may then control the S-MMSs cooperatively and autonomously with the other dancers.

Figure 49:
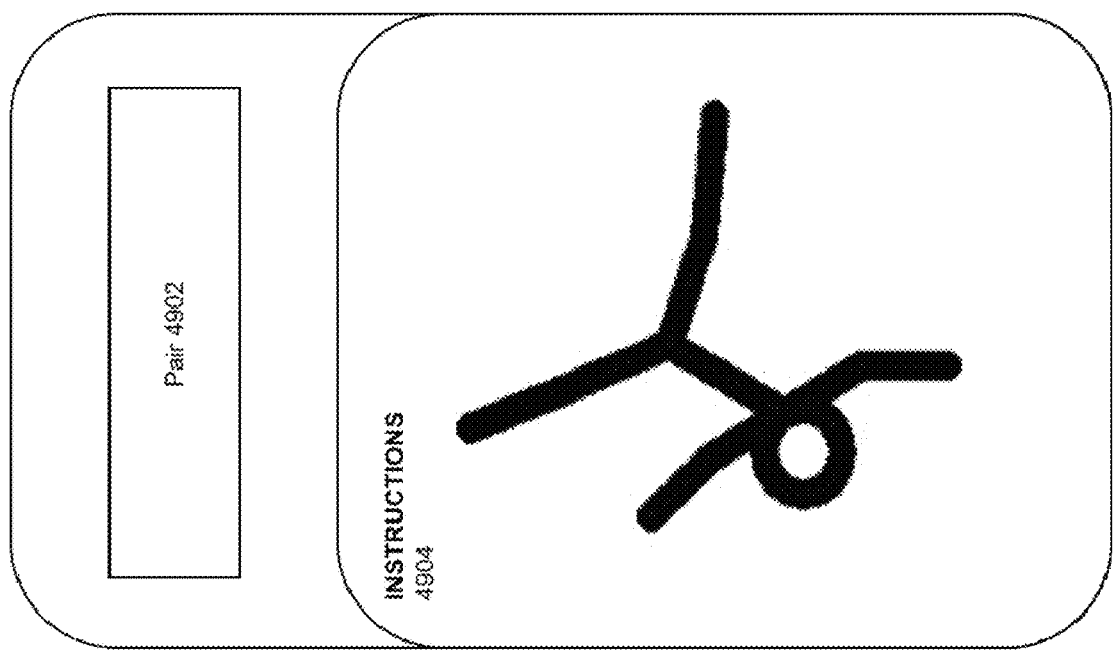
FIG. 49 depicts an embodiment of a graphical user interface (GUI) for an S-MMS partner.

In order to assist a non-S-MMS dance partner, real-time text of graphical dance instructions may be shown to the dance partner through an application GUI on either their HMI device and/or the S-MMS's user device. FIG. 49 shows a possible GUI configuration for the partner APP. In an embodiment, the partner APP first pairs 4902 with an S-MMS controller 110B via Bluetooth upon launching the partner APP. The S-MMS user may have to accept the Bluetooth pairing request on their dance APP (4818 FIG. 48). Once paired, the partner APP receives one or more transmitted pieces of data which contain instructions 4904 for the dance wirelessly from the dance program on the S-MMS controller 110B transmitted by one or more communication processors 216 of the S-MMS. Once the dance is complete, the S-MMS user indicates that it is time to exit dance mode. Alternatively, once the dance is ended, the system may automatically exit or pause dance mode according to user preferences or settings.

The API 135 allows for the creation and execution of custom dance routines in the complex application space 130. It is expected that advanced and competitive dancers will outgrow preprogrammed routines and desire to create custom choreography for songs of their choosing. Possible methods for creating these custom routines may include a computer application that allows users to select a series of maneuvers that can be stitched together under certain conditions (e.g. audio cues or light cues, both perceptible to humans or not), compiled and then saved to memory 120 of the S-MMS for use by the dance program. Another anticipated approach would be to integrate programming of dance instructions into existing or new audio tools such as Apples' Garage band software.

Figure 50:
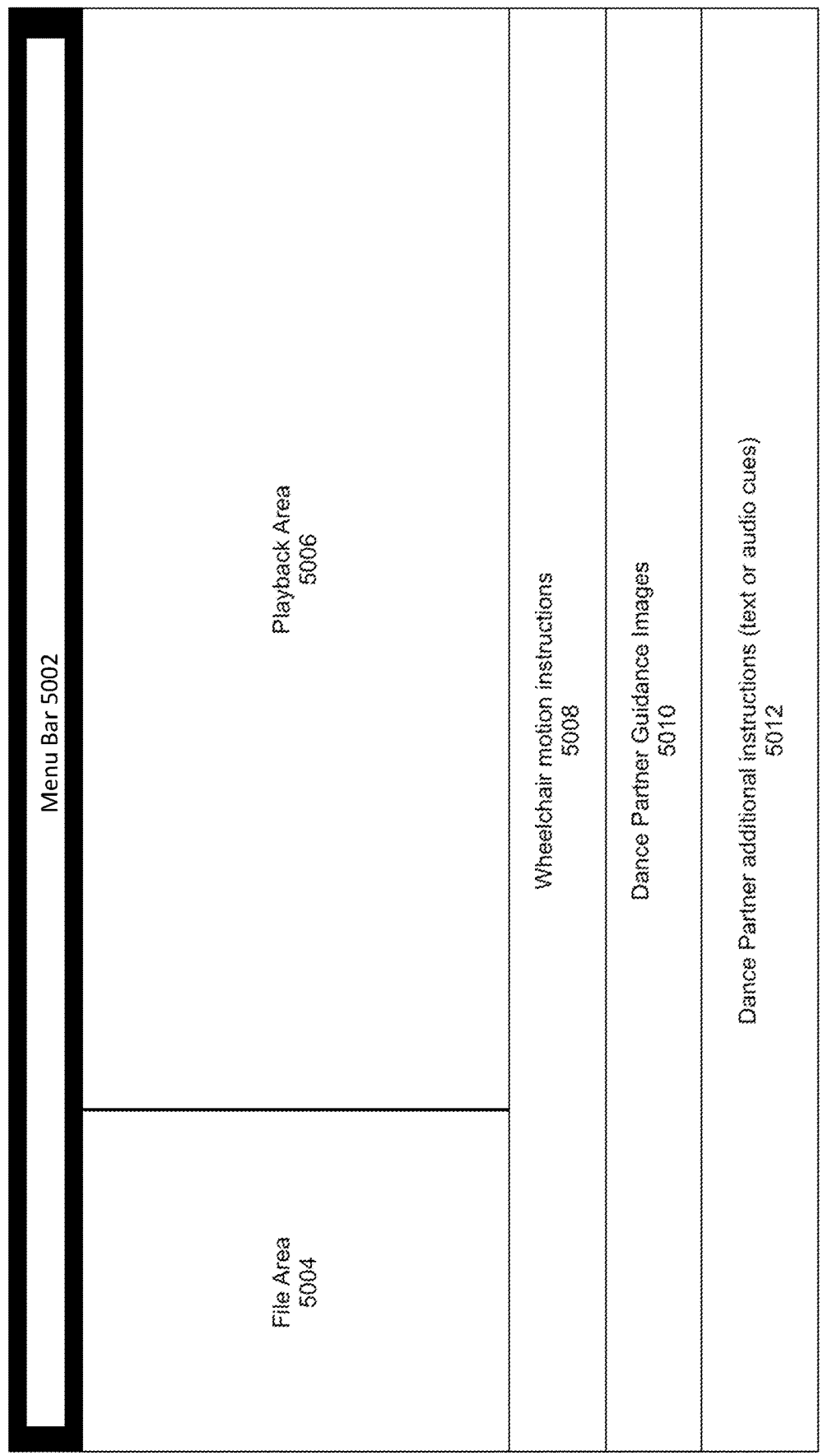
FIG. 50 depicts an embodiment of a tool for programming custom S-MMS routines.

FIG. 50 shows a routine creation tool for creating custom routines which consists of a menu bar 5002, a file area 5004, playback area 5006, and several areas 5008-5010 for creating one or more elements of a custom routine. This routine creation tool would allow embedding S-MMS dance instructions 5008, images illustrating the dance motion 5010, and/or audio queues for dance partners 5012 into a downloadable custom routine file. This downloadable custom routine file could be shared between S-MMS users and executed by S-MMS controllers and by any other compatible systems.

Additionally or alternatively, downloadable custom routine files could be used as a standard to allow for graphic display of dance instructions synced with music and to provide haptic instructions for wearables or other S-MMS user applications. The custom routine files can also be used to assist physical therapy sessions alone or in a group setting. Standing and changing positions regularly are both important to the health of mobile chair MMS users. It is expected that physical and occupational therapists, aides, and family members could use the same types of interfaces and capabilities disclosed for dancing to plan and execute therapy sessions. Individual users may use the functionality in a non-coupled way to dance on their own to music of their choosing.

Connecting to Gaming Systems

Arcade games with seats that vibrate, reposition, or move with the gaming action are extremely engaging to gamers. In recent years, several companies have released expensive simulator chairs and gaming pods for home use in an attempt to replicate this experience. An average mobile chair S-MMS user already has a highly articulated, motorized seat at their disposal. It is time to put this to use to support gaming, socialization, and enhanced employment opportunities.

The S-MMS controller 110B allows for third party applications to interact with the components and functions of an S-MMS 18 via a defined API 135 from one or more application spaces on the S-MMS processor 202 or application processor 210. In addition, the S-MMS controller 110B can share data and communicate with outside sources of information via CNI 371 using one or more onboard communication processors 216. This allows integration and cooperation with gaming systems.

In an embodiment, a game manager is deployed in the complex application space 130 which, when run by the S-MMS processor 202 or application processor 210, allows the system to wirelessly communicate with traditional gaming consoles, virtual reality (VR) systems, and augmented reality (AR) systems. In an embodiment the S-MMS processor 202 may receive one or more control signals from the HMI 352 of the S-MMS. In an example, when the game manager is activated (e.g. by one or more command received from the HMI 352) the S-MMS controller 110B may ignore inputs to the HMI 352 so that the S-MMS remains stationary.

The game manager may emulate the wireless communication of a $3^{rd}$ parting gaming seat or controller and cause the S-MMS processor 202 to send one or more control signal which causes a communication processor 216 of the S-MMS to transmit one or more signals. The signals transmitted by the S-MMS are received by a communication processor of a gaming console, VR system, or AR system and used by one or more processor of the gaming console, VR system, or AR system as if the received signals were a received wireless communication of a gaming seat or controller. Users may use the S-MMS controls (e.g. HMI 352) to control the game. Additionally or alternatively, the smart seat previously disclosed may be used as an input by the game manager which allows unique weight shift-based game control options for users where transferring pressure around the seat (e.g. as measured by a smart seat of FIG. 46) is registered as controller input. The gaming system is linked to the S-MMS controller 110B in such a way (e.g. via API) that the S-MMS controller receives the controller inputs from the seat and transmits the controller inputs to the game. In this way, game play is possible and enhanced by S-MMS capabilities while never overriding any safety critical functions such as stability.

Virtual Reality

Travel is particularly difficult for S-MMS users. In addition to the challenges of accessibility, it is common for the S-MMS to be damaged in transit. Virtual reality can provide an alternative to travel. In its simplest form, a user may choose to explore a new location simply by purchasing a VR game or recording that allows them to travel around the location virtually. In a more advanced form, the S-MMS controller 110B can be paired wirelessly with both a VR system and a remote telepresence robot.

FIG. 51 illustrates this pairing. In an embodiment, an S-MMS 18E user drives a robot 5102 (e.g. a Beam telepresence robot) using the S-MMS HMI 352 via a wireless connection (e.g. WiFi in an embodiment) from the S-MMS controller 110B to a remote service (e.g. of remote server 910). The robot 5102 is at a remote destination and responds to user inputs from the HMI 352 of the S-MMS 18E. The S-MMS motor controller 351 is disengaged by the S-MMS controller 110B so that HMI 352 inputs do not cause S-MMS movement. The robot 5102 streams back information (e.g. video) to a VR headset 5104 so that the user would be in full control and be able to explore a remote location almost as if they were there in person. As a non-limiting example, an S-MMS user in Kansas is connected with a telepresence robot at the Parthenon in Athens, Greece and is able to drive the robot around and, therefore, explore the site as if the user was actually there using VR. In other embodiments, this same functionality may be utilized to allow S-MMS users to control remote machinery, vehicles, or robots for work or pleasure.

In an embodiment, users may use S-MMS controls (e.g. HMI 352) to maneuver or manipulate a VR environment, via a wireless connection to a VR headset where the S-MMS controller emulates one or more input device as previously disclosed and have their S-MMS move too (e.g. based on one or more control signals sent to the motor controller 351). If they should choose to have the S-MMS physically move, the situational awareness map of the SAC 302B may be accessed by the gaming program and allow unique functionality. Since the SAC 302B knows how much room is available around the S-MMS and what obstacles surround the S-MMS, motion controls for the S-MMS can be scaled to fit the size of the room automatically.

Figure 52:
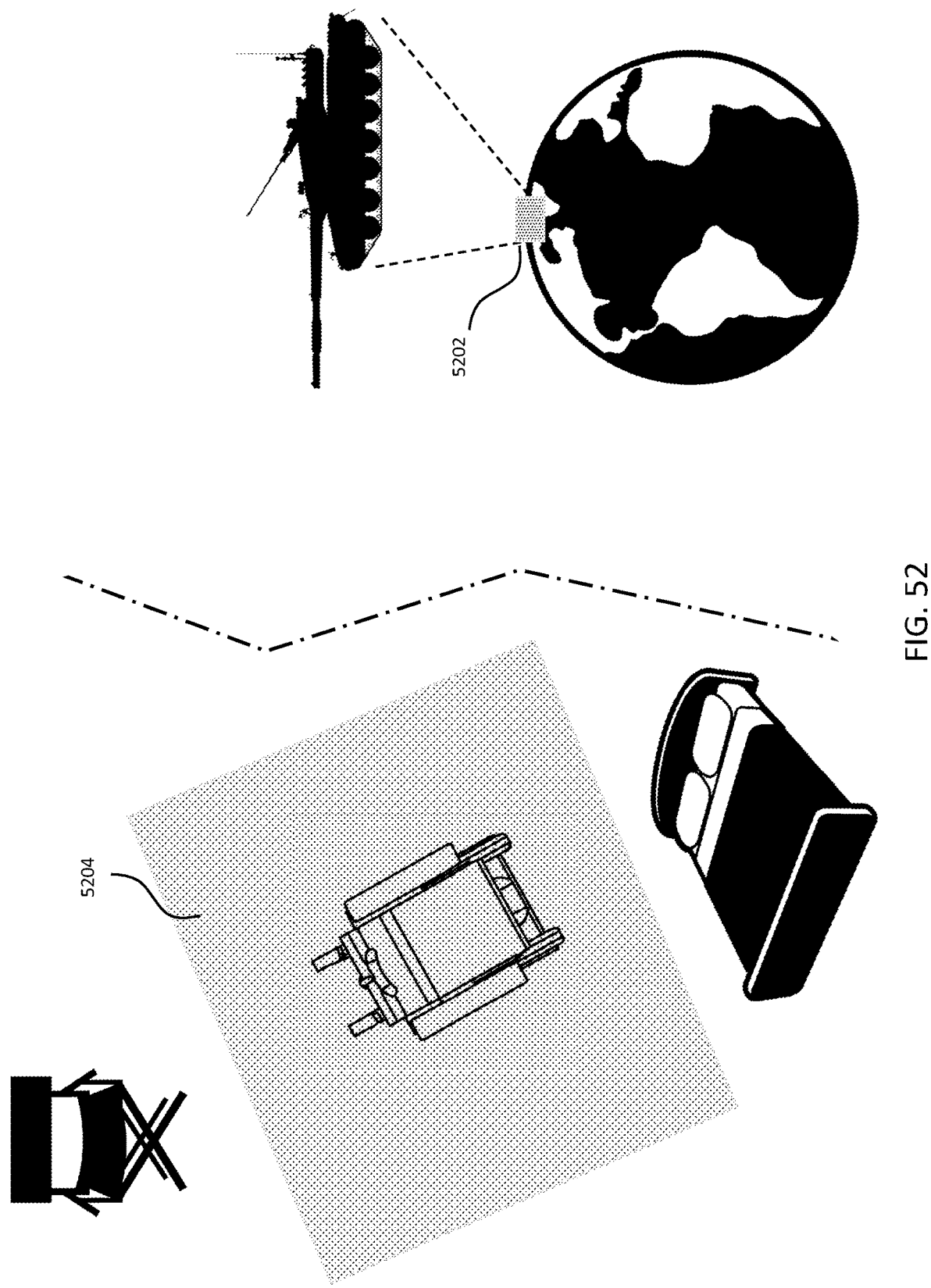
FIG. 52 depicts automatic scaling of a playing field of a virtual reality game.

FIG. 52 illustrates this automated motion control scaling function. In an embodiment, an S-MMS gamer is playing a tank game that has a field of play in North America 5202. The SAC 302B establishes an available actual field of movement 5204 within the gamer's environment. This field of movement 5204 within the gamer's environment may be updated by the SAC 302B based on obstacles in the room, game parameters, or some combination. Additionally or alternatively, a game may be configured to automatically put game-relevant virtual obstacles at the same location as real obstacles in the physical environment.

VR functionality described above may also allow new employment opportunities for wheelchair users. When paired with a robot, users could become site inspectors. In fact, the use of a telepresence robot would allow S-MMS users to call into work and inspect even dangerous environments from the safety of their accessible home or office.

Stand Alone UHM

One or more of the connectivity, user health monitoring, location tracking, stability management, and alert functions previously disclosed herein with regard to S-MMS systems may also be deployed as a stand-alone product for use in other applications. These alternate embodiments may include a subset of the disclosed S-MMS controller attributes for use with non-motorized mobile systems (NMMS) such as manual wheelchairs, with movable hospital equipment, and furniture, in hospital or assisted care facilities, for home health care, or for other user tracking applications where monitoring, data logging, and unique identification of users are important.

The architecture of FIG. 1 may be used in a stand-alone system for NMMS, such as for a manual mobile chair. Further, one or more processors (e.g. processors 202-212 and 216 and optionally processor 214 in embodiments in which one or more sensors are used for an NMMS) and the memory 220 identified in FIG. 2 also may be used in a stand-alone system, such as for an NMMS. Moreover, the architectures of FIGS. 3-56 may be used in a stand-alone system, such as for a NMMS.

Figure 53:
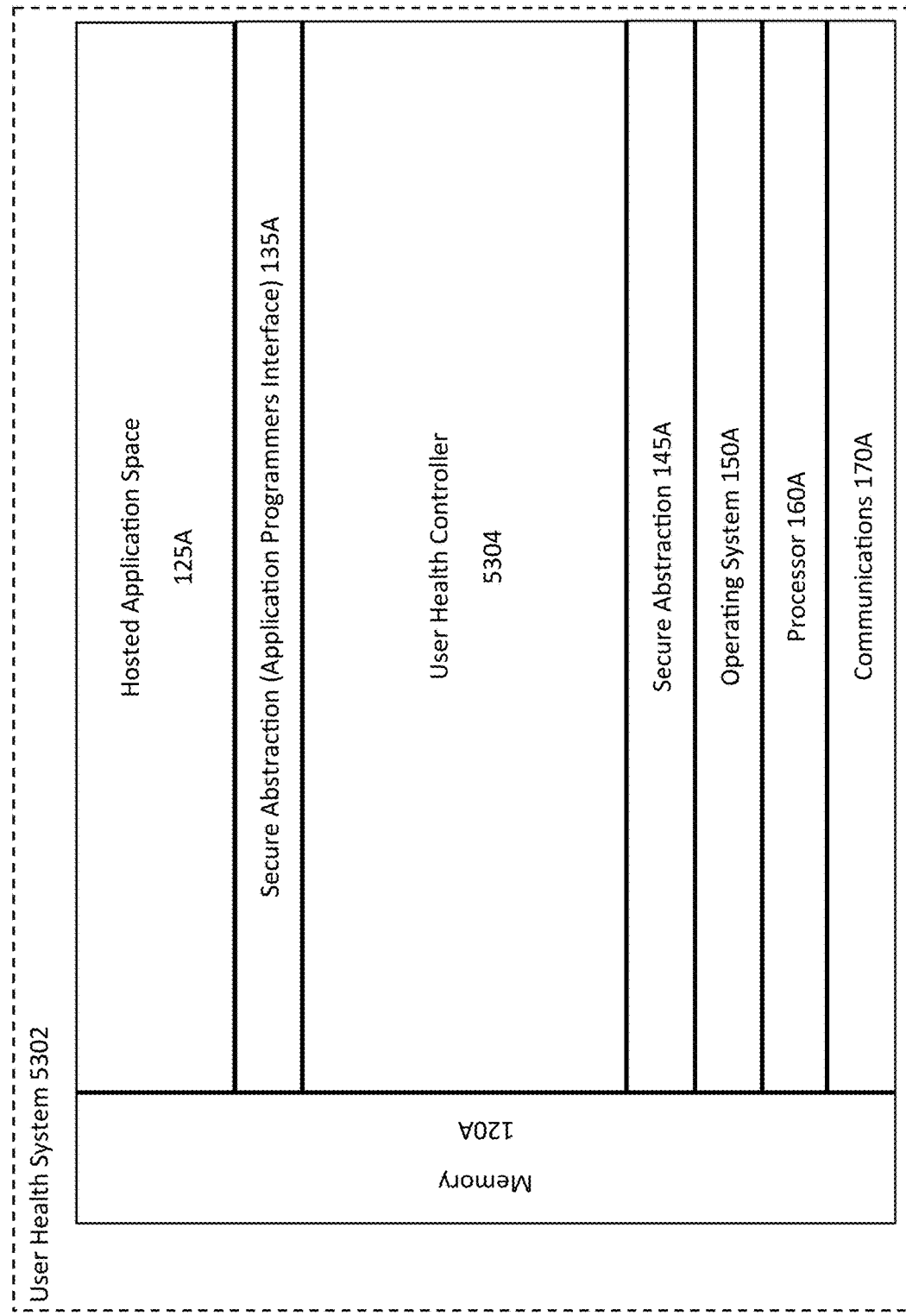
FIG. 53 depicts an embodiment of hardware and software components for use as a stand-alone user health monitoring system.

FIG. 53 depicts an embodiment of a variant of the S-MMS 18 control system of FIG. 1, composed of hardware and software components for use as a stand-alone user health monitoring system 5302. A user health controller 5304 (i.e. a variant of an S-MMS controller 110 as previously disclosed) lies between two secure abstraction layers 135A and 145A and performs functions substantially the same as the S-MMS controller 110B. The upper abstraction layer 135A abstracts through an Application Programmers Interface (API) to a hosted application space 125A. Below the user health controller 5304 and its secure abstraction 145A is a breakout of the operating system 150A, one or more processors 160A (which are hardware), and a communications layer 170A, which may include a hardware communications interface. Memory 120A, which is hardware, cross cuts all of the layers in the depicted embodiment and may include volatile and non-volatile non-transitory computer storage media for storing information. The user health controller 5304 is software that executes on one or more processors 160A and is stored in memory 120A.

Figure 54:
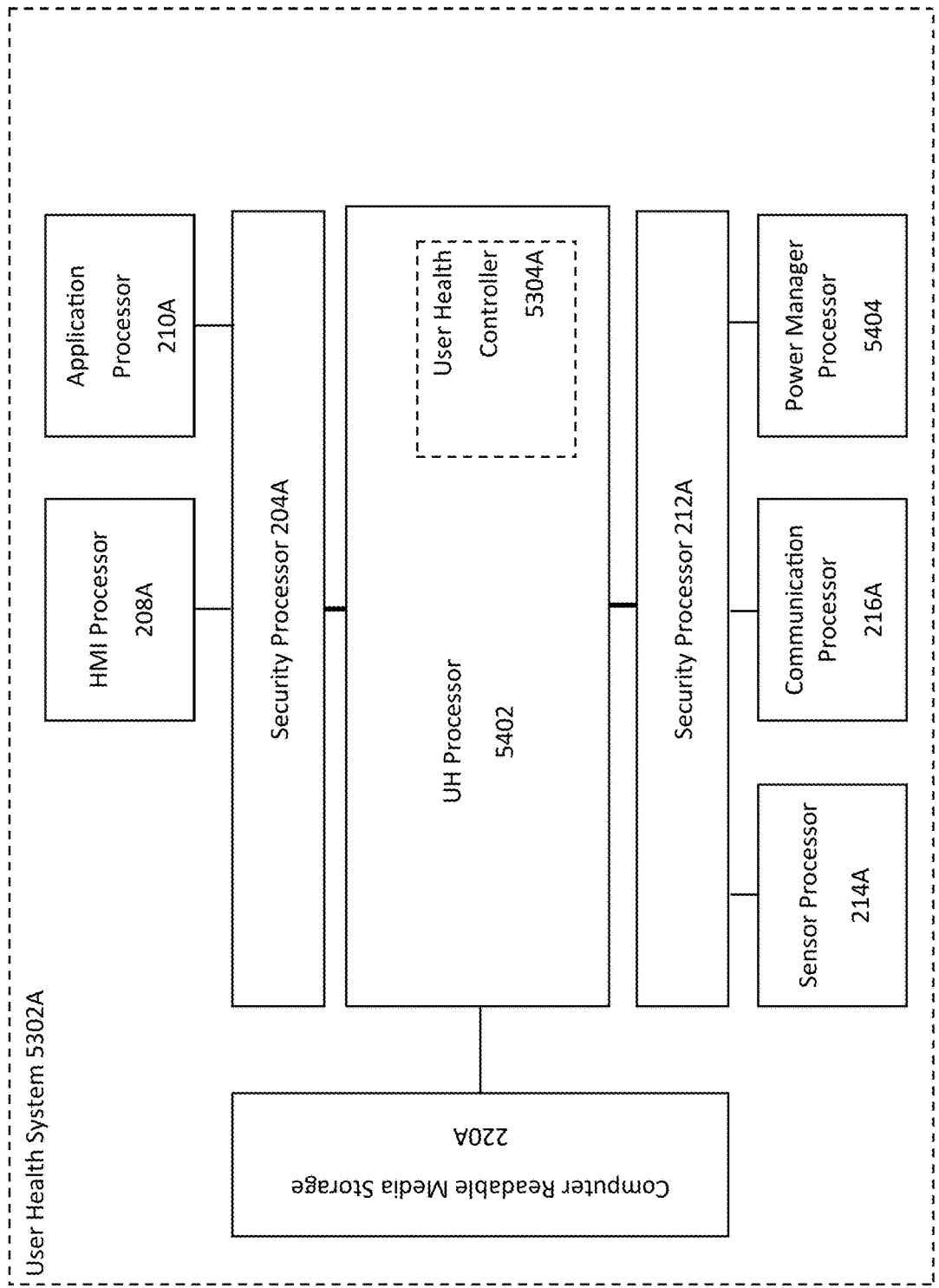
FIG. 54 depicts a hardware architecture for use as a stand-alone user health monitoring system.

With a focus now on the one or more hardware processors that the user health controller 5304A is executed on and interacts with, FIG. 54 depicts a hardware embodiment of a variation of an S-MMS 18A architecture of FIG. 2 for use as a stand-alone user health monitoring system 5302A (e.g. for use independent from a motorized mobile system). The variant of FIG. 54 excludes the caregiver processor, replaces the drive processor 218 with a power manager processor 5404, and replaces the S-MMS controller 110A with a user health controller 5304A. The depicted electrical architecture comprises a user health (UH) processor 5402 between two security processors 204A and 212A, each of which is hardware. The UH processor 5402 may be paired with a lock-step processor (not depicted) for critical life, health, and safety applications, in some embodiments. The security processors 204A and 212A may host (i.e. execute) modules and other software, such as the previously disclosed secure abstraction APIs 135A and 145A. Additionally or alternatively, the security processors may host services, such as watch-dog and data source authentication services. The user health controller 5304A is hosted on a UH processor 5402. The processors may comprise one or more of a processor, multiple processors, an application-specific integrated circuit, or a field-programmable gate array.

The user health controller 5304A utilizes computer readable storage media 220A, which includes the memory 120A, for data storage and retrieval during operation. Executable program instructions for the controller also may be stored in the memory 120A. The memory 120A is one or more of a volatile and non-volatile non-transitory computer storage medium for storing information and may be located onboard the user health system 5302A, may be remote storage available on a smart device or server, or some combination of the foregoing. One or more secure, encrypted memory partitions are used to store electronic protected health information (ePHI) and other secure health data. The data stored on the secure memory is only made available to one or more pre-authorized systems.

The user health system 5302A hardware system may comprise multiple additional processors beyond the core UH processor 5402. In the case of a manual wheelchair, these additional hardware processors may include one or more HMI processors 208A (e.g. for the UH controller 5304A), one or more application processors 210A, one or more sensor processors 214A, one or more communication processors 216A, and one or more power manager processors 5404, each of which is hardware. Each processor executes software and may produce control signals. The user health system 5302A includes one or more sensors and/or communicates with one or more sensors (not shown), as described herein.

In an embodiment, the user health system 5302A may be powered by an internal battery (not shown) which is charged at intervals from an external source, such as an alternating current (AC) power source (e.g. power from an AC wall socket). A power manager processor 5404 may include one or more processors used to manage power regulation (e.g. from an external power source, such as the wall power), charging of one or more internal batteries, and monitoring of battery status. Typically, these processors receive one or more control signals that causes them to respond with a preconfigured response, wherein the preconfigured response may include moving, measuring, changing a state, transmitting data, or taking operational control of the associated hardware (e.g. switching from onboard to off-board power sources, monitoring battery status and voltage, or managing voltage or amperage received from one or more source). A power manager processor 5404 may additionally or alternatively supply power and/or data about the user health system 5302A or use data generated from one or more sensors.

Figure 55:
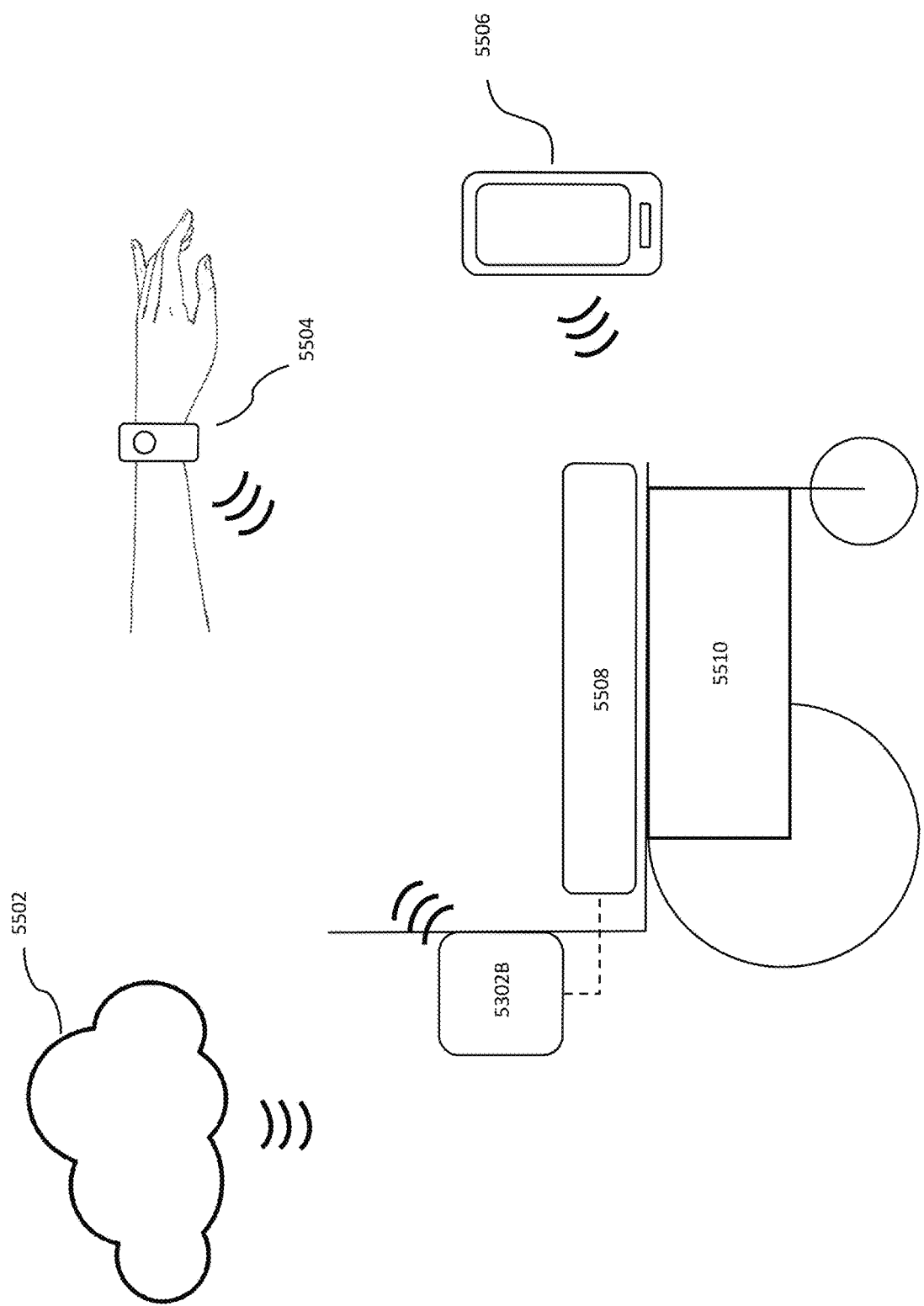
FIG. 55 depicts an embodiment of a user health system securely connected to multiple sources of user health data.

FIG. 55 depicts an embodiment of a user health system 5302B securely connected to a remote server 5502, connected wirelessly to a wearable 5504, connected wirelessly to a smart device 5506, and/or connected physically to one or more sensor or sensor systems 5508. The user health system 5302B and one or more sensor or sensor system 5508 may be mounted to a device such as the depicted manual wheelchair 5510, in an exemplary embodiment. These connections operate as previously disclosed herein from S-MMS 18 operations.

In an embodiment, a communication processor 216A onboard the user health system 5302B is operably coupled to a second wireless processor (e.g. via a secure wireless connection), wherein the second wireless processor is configured to operate on a public packet network, and the packet network comprises a data transmission network using packet switching, as previously described herein. The connection to the public packet network from the user health system 5302B allows the user health system access to one or more servers, or remote services, (e.g. as depicted in FIG. 9 and FIG. 10 and previously disclosed herein with reference to an S-MMS 18) configured to receive data from a secure memory on the user health system 5302B. The received data may then be stored in a secure memory on the remote server wherein the secured, stored data is accessible to pre-authorized systems or pre-authorized persons.

In an embodiment, an UH controller 5304A of the user health system 5302 retrieves a key (e.g. a code or security credential) from secure memory on a paired device (e.g. 5504 or 5506) over a wireless connection. This key may be processed by one or more processors of the user health system, stored on a secure memory on the user health system 5302B, and is then transmitted to a remote server 5502. The key, provided by the paired device (e.g. 5504 or 5506), is processed by the remote server 5502 (e.g. via a compute engine 914 or input queue service 912 FIG. 9) to authenticate the user health system 5302B on the remote server 5502 and identify the user health system with a unique, authorized user account.

When the user health system 5302B is authenticated by the remote server 5502, the remote server authorizes an input queue to receive further messages transmitted from the user health system 5302B to the remote server and associate those messages with the unique user account, authorizes a compute engine to utilize the data from the user health system, and/or authorizes a database to accept data from the user health system and store that data. Additionally or alternatively, when the user health system is authenticated, the remote server 5502 authorizes an output queue to send data to the user health system 5302B for use by the UH controller 5304A and/or paired device (e.g. 5504 or 5506). In an embodiment, the paired smart device may be replaced by an alternative device configured to transmit or receive wireless signals, such as an RF tag or BLE beacon.

FIG. 56 depicts an embodiment of a control system architecture for a user health controller 5304B hosting an integrated user awareness controller (UAC) 5602, wherein the UAC performs functions substantially the same as the SAC previously disclosed for use on an S-MMS, but simplified for use by a user health system. In the embodiment, the user health controller 5304B communicates with a motor controller 351A wherein the motor controller may control an automated seating system, automated bed system, or another automated system. Alternatively, no motor controller 351A may be present.

The depicted user health controller 5304B further comprises real-time operating system (RTOS) services 362A and navigation 363A. An arbitration Information Assurity Manager (IAM) 370A manages sensor reports from one or more sensors on or used by the user health system 5302 and may include communication, navigation, and identification (CNI) 371A processing capabilities. Sensor reports received and managed by the arbitration IAM 370A may include user sensor reports 375A. The depicted arbitration IAM 370A further comprises a global positioning system (GPS) and inertial manager 376A. In an embodiment, the user health system 5302B includes an inertial management unit which measures the orientation of the user health system. In addition to the functions described above, navigation 363A tracks user health system 5302A position and kinematic states in real time.

A user awareness controller 5602 may be deployed as logic on the user health controller 5304B. The embodiment comprises a user health manager 510B, a sensor tasker 520A, an alert manager 540A, and a tip alert 5604 process (which includes substantially the same functions as the stability manager 525 FIG. 5). These processes interact with the CNI 371A, user sensor reports 375A, and navigation 363A. The user health manager 510B, sensor tasker 520A, and alert manager 540A of the UAC 5602 operate as previously disclosed herein for S-MMS operations.

The tip alert 5604 may receive one or more sensor reports from GPS and inertial manager 376A from one or more sensors configured to monitor orientation of the user health system 5302, a selected device such as a bed or chair, or a user. Additionally, the tip alert 5604 may receive one or more user sensor reports 375A or CNI reports 371A indicating the presence or lack of presence of a user. In an embodiment, the tip alert 5604 calculates the current orientation of the system (e.g. 5302), user, or device (e.g. bed or chair in an example) based on one or more received sensor reports. The calculated current orientation may then be compared to one or more warning or danger tilt thresholds (e.g. as depicted in FIG. 33 for stability manager). In the event that a calculated current orientation is outside of the safe or "go" tilt threshold (e.g. the calculated current orientation is over or above a threshold step limit or threshold angle limit), then the tip alert 5604 may notify the alert manager 5604. Additionally, in an embodiment, no notification will be sent unless user presence is confirmed based on one or more received user presence sensor reports. The tip alert 5604 includes substantially the same functions as the stability manager 525 FIG. 5. Therefore, those functions and operations of the stability manager 525 are not reproduced here.

The alert manager 540A responds to inputs from the user health manager 510B and/or the tip alert 5604 to alert the user and/or caregivers to possible dangers, enabling a warning, caution, or advisory. For example, the alert manager 540A of the UAC 5602 generates one or more signals to one or more speakers, lights, indicators, haptic devices, elements of an HMI, or communication processors on or around the user health system 5302A causing the one or more speakers, lights, indicators, haptic devices, elements of an HMI, or communication processors to respond with a preconfigured response. The alert manager 540A operates as previously disclosed herein for S-MMS operations.

With reference again to FIG. 55, a user health system 5302B is depicted receiving user health data wirelessly via CNI 371A from one or more sources, including but not limited to one or more remote server cloud services 5502, off-board or remote sensors, wearables 5504, paired smart devices 5506, and/or one or more connected sensors 5508. Each of the user health system 5302B, one or more remote server cloud services 5502, off-board or remote sensors, wearables 5504, paired smart devices 5506, and/or one or more connected sensors 5508 have a transceiver to transmit and/or receive one or more wireless signals with user health data and/or other data and/or instructions. In an embodiment, user health data is received via a secure Bluetooth connection. Additionally or alternatively, the user health data may be received using one or more of cellular communications, 802.11 communications, Wi-Fi communications, 802.15 communications, Bluetooth communications, Bluetooth Low Energy communications, 802.16 communications, WiMAX communications, near field communications, and/or 18092 communications. As part of the pairing process between the CNI 371A manager (e.g. via a communication processor 216A) and the source agent (e.g. one or more remote server cloud services 5502, off-board or remote sensors, wearables 5504, paired smart devices 5506, and/or one or more connected sensors 5508), configuration information is exchanged between the CNI manager and source agent which allows sensor report data to be recognized and utilized by the UHM 510B. In an embodiment, the pairing process and information exchange may be compliant with the IEEE 11073:20601 family of health informatics standards incorporated herein by reference. The sensor report data that is received varies in both quality and time scale and may be processed or made actionable to the user health controller 5304A by the UHM 510B.

In an exemplary embodiment of a user health system 5302A, a manual wheelchair in an assisted care facility or hospital is fitted with a user health system with an integrated IMU and multiple user sensor reports 375A are received by the user health controller 5304B of the user health system via a connected smart seat as previously disclosed. A patient, being transported in the wheelchair, in the hospital is given a wearable wireless beacon (e.g. 5504 FIG. 55) which transmits a unique code or security credential which is received via CNI 371 by the user health controller 5304B. In addition, the user is wearing a wireless heart rate monitor which communicates a current user heart rate with the user health controller 5304B via CNI 371A. The wheelchair is fitted with a smart seat (as previously disclosed, ref FIG. 46) which monitors user wetness, presence, and other factors such as weight with one or more embedded sensors. The sensor reports from the smart seat are received as user sensor reports 375A by the user health controller 5304B.

The UAC 5602 uses the previously defined inputs along with orientation information, GPS, and inertial manager 376A (e.g. orientation data received from the integrated IMU) and the chairs current location as determined by navigation 363A. Based on these inputs, the current status of the user and wheelchair are determined by the UAC 5602 and communicated with a remote server (e.g. 5502 FIG. 55). In the event that the UHM 510B or tip alert 5604 processes detect an unsafe or predefined condition, the alert manager 540A may send one or more control instructions which cause the UH controller 5304B to send one or more control signals which cause an alert, data transmission, or action of one or more communication, application, or HMI processors of the user health system 5302A.

In this way, the disclosed user health system 5302A may be used by families and facilities to assess user state, integrate multiple user health reports into a single platform, and track user location. Anticipated embodiments may include automated call for help, tip over alerts, temperature, moisture, urine, and perspiration monitoring, user presence and heart rate monitoring, user weight monitoring, and use of received beacon signals to determine location of a user or user health system 5302.

The user health system may be used for manual chairs, power wheelchairs without an SAC sensor embodiment, beds, and in home hospital and care facilities. In an embodiment, each room and each transportation device (e.g. mobile bed, wheelchair, or cart) of a healthcare facility would include a user health system 5302A such that patient location and health could be continuously tracked and logged to a remote server throughout their stay at the facility. In an embodiment, the user health system and S-MMSs may both connect to patient management systems of these facilities and API's may be used to implement custom monitoring and alert schemes at a facility.

To facilitate the understanding of the embodiments described herein, a number of terms are defined below. The terms defined herein have meanings as commonly understood by a person of ordinary skill in the relevant art. Terms such as "a," "an," and "the" are not intended to refer to only a singular entity, but rather include the general class of which a specific example may be used for illustration. The terminology herein is used to describe specific embodiments, but their usage does not delimit the disclosure, except as set forth in the claims.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method, and/or process for physically transferring a signal from one point in a circuit to another. Also, unless indicated otherwise from the context of its use herein, the terms "known," "fixed," "given," "certain", and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment.

Communication between various systems and devices is disclosed herein. Communication may occur using wired and/or wireless communication methods and protocols including, but not limited to, cellular communications, 802.11 communications, RFID, Wi-Fi communications, 802.15 communications, Bluetooth communications, Bluetooth Low Energy communications, 802.16 communications, WiMAX communications, near field communications, and 18092 communications.

Non-Transitory Computer Readable Medium

The various operations of methods described above may be performed by any suitable means capable of performing the operations, such as various hardware and/or software component(s), circuits, and/or module(s).

The various illustrative logical blocks, modules, and circuits described in connection with the present disclosure may be implemented or performed with a hardware processor, a digital signal processor (DSP), an application specific integrated circuit (ASIC), a field programmable gate array signal (FPGA) or other programmable logic device (PLD), discrete gate or transistor logic, discrete hardware components, or combinations thereof designed to perform the functions described herein. A hardware processor may be a microprocessor, commercially available processor, controller, microcontroller, or state machine. A processor may also be implemented as a combination of two computing components, e.g., a combination of a DSP and a microprocessor, a plurality of microprocessors, one or more microprocessors in conjunction with a DSP core, or any other such configuration.

In one or more aspects, the functions described may be implemented in software, firmware, or any combination thereof executing on a hardware processor. If implemented in software, the functions may be stored as one or more executable instructions or code on a non-transitory computer-readable storage medium. A computer-readable storage media may be any available media that can be accessed by a processor. By way of example, and not limitation, such computer-readable storage media can comprise RAM, ROM, EEPROM, CD-ROM or other optical disk storage, magnetic disk storage or other magnetic storage devices, or any other medium that can be used to store executable instructions or other program code or data structures and that can be accessed by a processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. Processes or steps described in one implementation can be suitably combined with steps of other described implementations.

Certain aspects of the present disclosure may comprise a computer program product for performing the operations presented herein. For example, such a computer program product may comprise a computer readable storage medium having instructions stored (and/or encoded) thereon, the instructions being executable by one or more processors to perform the operations described herein.

Software or instructions may be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a terminal and/or base station can obtain the various methods upon coupling or providing the storage means to the device.

For the sake of convenience, the operations are described as various interconnected functional blocks or distinct software modules. This is not necessary, however, and there may be cases where these functional blocks or modules are equivalently aggregated into a single logic device, program, or operation with unclear boundaries. In any event, the functional blocks and software modules or described features can be implemented by themselves or in combination with other operations in either hardware or software.

Having described and illustrated the principles of the systems, methods, processes, and/or apparatuses disclosed herein in a preferred embodiment thereof, it should be apparent that the systems, methods, processes, and/or apparatuses may be modified in arrangement and detail without departing from such principles. Claim is made to all modifications and variation coming within the spirit and scope of the following claims.

What is claimed is:

1. A processing system for a motorized mobile system comprising:
    at least one sensor to measure one or more kinematic states of an object proximate to the motorized mobile system; and
    at least one processor to use at least one state estimation filter and at least one object kinematic model to:
        predict a first kinematic state estimate of the object during a prediction operation of the at least one state estimation filter based on a prior knowledge of state for the object;
        output, prior to an update operation of the at least one state estimation filter, the first predicted kinematic state estimate of the object from the state estimation filter for use by at least one first process of the motorized mobile system, wherein the at least one first process causes one or more actions to be taken by the motorized mobile system based on the first predicted kinematic state estimate of the object;
        receive a measured kinematic state of the object observed by the sensor;
        during the update operation of the at least one state estimation filter, use the first predicted kinematic state estimate of the object and the measured kinematic state of the object observed by the sensor to determine a second kinematic state estimate of the object; and
        use the second kinematic state estimate of the object as an input to the state estimation filter to predict another first kinematic state estimate of the object, wherein the other first predicted kinematic state estimate of the object is output from the state estimation filter for use by the at least one first process of the motorized mobile system, wherein the at least one first process causes one or more actions to be taken by the motorized mobile system based on the other first predicted kinematic state estimate of the object.

2. The processing system of claim 1 wherein the one or more kinematic states comprises at least one of a position, a distance, a heading, a trend, an altitude, a velocity, and an acceleration, each relative to a frame of reference of the motorized mobile system.

3. The processing system of claim 1 wherein the measured kinematic state of the object comprises at least one of a position measurement, a distance measurement, a heading measurement, a trend measurement, an altitude measurement, a velocity measurement, and an acceleration measurement.

4. The processing system of claim 1 wherein the at least one first process uses the first predicted kinematic state estimate of the object for at least one of collision avoidance, stability management, a navigation operation, and an alert operation.

5. The processing system of claim 1 wherein the first predicted kinematic state estimate of the object comprises at least one of an estimate of a location of the object, an estimate of a position of the object, an estimate of a velocity of the object, an estimate of a distance to the object, an estimate of a heading of the object, an estimate of a trend of the object, an estimate of an altitude of the object, and an estimate of an acceleration of the object.

6. The processing system of claim 1 wherein the prior knowledge of state comprises another kinematic state estimate.

7. The processing system of claim 1 wherein the prior knowledge of state comprises one or more setup values, and the processor retrieves the prior knowledge of state from memory.

8. The processing system of claim 1 wherein the processor averages the first predicted kinematic state estimate of the object and the measured kinematic state of the object observed by the sensor to result in the second kinematic state estimate of the object.

9. The processing system of claim 1 wherein the processor determines the second kinematic state estimate of the object based, at least in part, on the first predicted kinematic state estimate of the object, the measured kinematic state of the object observed by the sensor, and a Kalman gain for the motorized mobile system.

10. The processing system of claim 1 wherein the processor determines the second kinematic state estimate of the object by adding the first predicted kinematic state estimate of the object to a Kalman gain for the motorized mobile system multiplied by a quantity of the first predicted kinematic state estimate of the object times an output matrix subtracted from the measured kinematic state of the object observed by the sensor.

11. The processing system of claim 1 wherein the processor uses the state estimation filter and the object kinematic model to:
    predict a first uncertainty estimate of state based on a prior knowledge of uncertainty of state;
    output the first predicted uncertainty estimate of state from the state estimation filter for use by the at least one first process of the motorized mobile system, wherein the at least one first process causes one or more actions to be taken by the motorized mobile system based on the first predicted uncertainty estimate of state;

use the first predicted uncertainty estimate of state and the measured kinematic state of the object observed by the sensor to determine a second uncertainty estimate of state; and use the second uncertainty estimate of state or the prior knowledge of uncertainty of state as another input to the state estimation filter to predict another first uncertainty estimate of state, wherein the other first predicted uncertainty estimate of state is output from the state estimation filter for use by the at least one first process of the motorized mobile system, wherein the at least one first process causes one or more actions to be taken by the motorized mobile system based on the other first predicted uncertainty estimate of state.

12. The processing system of claim 11 wherein the first predicted uncertainty estimate of state comprises at least one of an uncertainty in an estimate of a location of the object, an uncertainty in an estimate of a position of the object, an uncertainty in an estimate of a velocity of the object, an uncertainty in an estimate of a distance to the object, an uncertainty in an estimate of a heading of the object, an uncertainty in an estimate of a trend of the object, an uncertainty in an estimate of an altitude of the object, and an uncertainty in an estimate of an acceleration of the object.

13. The processing system of claim 11 wherein the prior knowledge of uncertainty comprises another kinematic uncertainty estimate.

14. The processing system of claim 11 wherein the prior knowledge of uncertainty comprises one or more setup values, and the processor retrieves the prior knowledge of uncertainty from memory.

15. The processing system of claim 11 wherein the prior knowledge of uncertainty comprises a setup value based on averaging a plurality of sensor measurements to a target over time, calculating an average of the sensor measurements, and determining a deviation of the sensor measurements from the average for a standard distribution.

16. The processing system of claim 11 wherein the processor determines the second uncertainty estimate of state based, at least in part, on a difference between the measured kinematic state of the object observed by the sensor and the first predicted kinematic state estimate of the object.

17. The processing system of claim 11 wherein the processor determines the second uncertainty estimate of state based, at least in part, on the first predicted uncertainty estimate of state and a Kalman gain for the motorized mobile system.

18. The processing system of claim 11 wherein the processor defines a validation region for the object, wherein the first predicted kinematic state estimate of the object is a center of the validation region and a size of the validation region is equal to the first predicted uncertainty estimate of state and extends from the center of the validation region.

19. The processing system of claim 18 wherein the processor:
associates data for the object to an identification assigned by the processor for the object if the measured kinematic state of the object is within the validation region for the object; and
either associates the data for the object to a new identification assigned by the processor for the object or rejects the data for the object if the measured kinematic state of the object is outside of the validation region for the object.

20. The processing system of claim 19 wherein the data comprises data from the sensor.

21. The processing system of claim 19 wherein the data comprises measurement data from the sensor.

22. The processing system of claim 19 wherein the processor tracks at least one kinematic state for a plurality of objects using the state estimation filter and the at least one object kinematic model.

23. The processing system of claim 1 wherein the processor selects the at least one object kinematic model from a plurality of models to match a movement of the object.

24. The processing system of claim 1 wherein the processor calculates a filter residual as a function of a difference between the first predicted kinematic state estimate of the object and the measured kinematic state of the object observed by the sensor and outputs the filter residual for use by one or more processes of the processor.

25. The processing system of claim 1 wherein the processor determines a model confidence interval that the measured kinematic state of the object observed by the sensor is within a range of expected values for the measured kinematic state of the object.

26. The processing system of claim 1 wherein the processor:
compares a filter likelihood value to a model confidence interval, the model confidence interval defining a range of expected values for the filter likelihood value, the filter likelihood value representing a difference between the first predicted kinematic state estimate of the object and the measured kinematic state of the object;
if the processor determines the filter likelihood value is within the model confidence interval, the processor increases a model probability for the at least one object kinematic model; and
if the processor determines the filter likelihood value is outside the model confidence interval, the processor decreases the model probability for the at least one object kinematic model.

27. The processing system of claim 26 wherein the processor switches from the at least one object kinematic model to another object kinematic model when the model probability for the at least one object kinematic model is below a predetermined level.

28. The processing system of claim 26 wherein the range of expected values for the model confidence interval is based on one or more prior state measurements, one or more uncertainty values for a sensor, and/or one or more values stored in memory.

29. The processing system of claim 1 wherein the processor determines a filter likelihood value and disables, reduces, or modifies one or more operations or functionality of the motorized mobile system when the filter likelihood value is outside of a confidence interval of one or more models, the filter likelihood value representing a difference between the first predicted kinematic state estimate of the object and the measured kinematic state of the object.

30. The processing system of claim 1 wherein the processor determines a filter likelihood value and enables, increases, or modifies one or more operations or functionality of the motorized mobile system when the filter likelihood value is within a confidence interval of one or more models, the filter likelihood value representing a difference between the first predicted kinematic state estimate of the object and the measured kinematic state of the object.

31. The processing system of claim 1 wherein:
the processor uses the state estimation filter and a plurality of models each having a model probability;

each model:
  predicts a first kinematic state estimate of the object based on prior knowledge of state for the object;
  uses the first predicted kinematic state estimate of the object and a measured kinematic state of the object observed by the sensor to determine a second kinematic state estimate of the object; and
  uses the second kinematic state estimate of the object as an input to the state estimation filter using the model to predict another kinematic state estimate of the object; and the processor either:
  selects one of the plurality of models with a highest model probability and outputs the first predicted kinematic state estimate of the selected model as an output estimate for use by the at least one first process of the motorized mobile system, wherein the at least one first process causes one or more actions to be taken by the motorized mobile system based on the output estimate; or
  calculates for each model a product of the model probability for the model and the first predicted kinematic state estimate of state for the model and sums the product of each model together as the output estimate for use by the at least one first process of the motorized mobile system, wherein the at least one first process causes one or more actions to be taken by the motorized mobile system based on the output estimate.

32. The processing system of claim 1 wherein the processor executes the state estimation filter that uses the object kinematic model, and the state estimation filter comprises at least one of a recursive filter, a Kalman filter, and a joint probabilistic data association filter.

33. The processing system of claim 1 wherein the object kinematic model comprises one or more algorithms.

34. The processing system of claim 1 wherein the object kinematic model comprises at least one of a maneuver model of a target, a constant velocity model, a down range acceleration model, and a cross range acceleration model.

35. The processing system of claim 1 wherein the object kinematic model comprises at least one of an interacting multiple model and a dynamically structured interacting multiple model.

36. The processing system of claim 1 wherein the object comprises at least one of a thing, a person, an animal, a ground feature, and a surface condition.

37. The processing system of claim 1 wherein the sensor comprises at least one of an optical sensor, a sound sensor, a hall effect sensor, a proximity sensor, a radar sensor, a sonar sensor, an ultrasonic sensor, a LIDAR sensor, a stereo vision camera, a structured light camera, and a time of flight camera.

38. The processing system of claim 1 wherein the motorized mobile system consists of one or more of a mobility scooter, an electronic conveyance vehicle, a riding lawn mower, a grocery cart, an all-terrain vehicle, an off-road vehicle, and a golf cart.

39. A processing method for a motorized mobile system comprising:
  measuring one or more kinematic states of an object proximate to the motorized mobile system by at least one sensor; and
  using at least one state estimation filter and at least one object kinematic model by at least one processor to:
    predict a first kinematic state estimate of the object during a prediction operation of the at least one state estimation filter based on a prior knowledge of state for the object;
    output, prior to an update operation of the at least one state estimation filter, the first predicted kinematic state estimate of the object from the state estimation filter for use by at least one first process of the motorized mobile system, wherein the at least one first process causes one or more actions to be taken by the motorized mobile system based on the first predicted kinematic state estimate of the object;
    receive a measured kinematic state of the object observed by the sensor;
    during the update operation of the at least one state estimation filter, use the first predicted kinematic state estimate of the object and the measured kinematic state of the object observed by the sensor to determine a second kinematic state estimate of the object;
    use the second kinematic state estimate of the object as an input to the state estimation filter to predict another first kinematic state estimate of the object, wherein the other first predicted kinematic state estimate of the object is output from the state estimation filter for use by the at least one first process of the motorized mobile system, wherein the at least one first process causes one or more actions to be taken by the motorized mobile system based on the other first predicted kinematic state estimate of the object.

40. The processing method of claim 39 wherein the one or more kinematic states comprises at least one of a position, a distance, a heading, a trend, an altitude, a velocity, and an acceleration, each relative to a frame of reference of the motorized mobile system.

41. The processing method of claim 39 wherein the measured kinematic state of the object comprises at least one of a position measurement, a distance measurement, a heading measurement, a trend measurement, an altitude measurement, a velocity measurement, and an acceleration measurement.

42. The processing method of claim 39 wherein the processor uses the first predicted kinematic state estimate of the object for at least one of collision avoidance, stability management, a navigation operation, and an alert operation.

43. The processing method of claim 39 wherein the first predicted kinematic state estimate of the object comprises at least one of an estimate of a location of the object, an estimate of a position of the object, an estimate of a velocity of the object, an estimate of a distance to the object, an estimate of a heading of the object, an estimate of a trend of the object, an estimate of an altitude of the object, and an estimate of an acceleration of the object.

44. The processing method of claim 39 wherein the prior knowledge of state comprises another kinematic state estimate.

45. The processing method of claim 39 wherein the prior knowledge of state comprises one or more setup values, and the processor retrieves the prior knowledge of state from memory.

46. The processing method of claim 39 wherein the processor averages the first predicted kinematic state estimate of the object and the measured kinematic state of the object observed by the sensor to result in the second kinematic state estimate of the object.

47. The processing method of claim 39 wherein the processor determines the second kinematic state estimate of the object based, at least in part, on the first predicted kinematic state estimate of the object, the measured kinematic state of the object observed by the sensor, and a Kalman gain for the motorized mobile system.

48. The processing method of claim 39 wherein the processor determines the second kinematic state estimate of the object by adding the first predicted kinematic state estimate of the object to a Kalman gain for the motorized mobile system multiplied by a quantity of the first predicted kinematic state estimate of the object times an output matrix subtracted from the measured kinematic state of the object observed by the sensor.

49. The processing method of claim 39 wherein the processor uses the state estimation filter and the object kinematic model to:
 predict a first uncertainty estimate of state based on a prior knowledge of uncertainty of state;
 output the first predicted uncertainty estimate of state from the state estimation filter for use by the at least one first process of the motorized mobile system, wherein the at least one first process causes one or more actions to be taken by the motorized mobile system based on the first predicted uncertainty estimate of state;
 use the first predicted uncertainty estimate of state and the measured kinematic state of the object observed by the sensor to determine a second uncertainty estimate of state; and
 use the second uncertainty estimate of state or the prior knowledge of uncertainty of state as another input to the object kinematic model to predict another first uncertainty estimate of state, wherein the other first predicted uncertainty estimate of state is output from the state estimation filter for use by the at least one first process of the motorized mobile system, wherein the at least one first process causes one or more actions to be taken by the motorized mobile system based on the other first predicted uncertainty estimate of state.

50. The processing method of claim 49 wherein the first predicted uncertainty estimate of state comprises at least one of an uncertainty in an estimate of a location of the object, an uncertainty in an estimate of a position of the object, an uncertainty in an estimate of a velocity of the object, an uncertainty in an estimate of a distance to the object, an uncertainty in an estimate of a heading of the object, an uncertainty in an estimate of a trend of the object, an uncertainty in an estimate of an altitude of the object, and an uncertainty in an estimate of an acceleration of the object.

51. The processing method of claim 49 wherein the prior knowledge of uncertainty comprises another kinematic uncertainty estimate.

52. The processing method of claim 49 wherein the prior knowledge of uncertainty comprises one or more setup values, and the processor retrieves the prior knowledge of uncertainty from memory.

53. The processing method of claim 49 wherein the prior knowledge of uncertainty comprises a setup value based on averaging a plurality of sensor measurements to a target over time, calculating an average of the sensor measurements, and determining a deviation of the sensor measurements from the average for a standard distribution.

54. The processing method of claim 49 wherein the processor determines the second uncertainty estimate of state based, at least in part, on a difference between the measured kinematic state of the object observed by the sensor and the first predicted kinematic state estimate of the object.

55. The processing method of claim 49 wherein the processor determines the second uncertainty estimate of state based, at least in part, on the first predicted uncertainty estimate of state and a Kalman gain for the motorized mobile system.

56. The processing method of claim 49 wherein the processor defines a validation region for the object, wherein the first predicted kinematic state estimate of the object is a center of the validation region and a size of the validation region is equal to the first predicted uncertainty estimate of state and extends from the center of the validation region.

57. The processing method of claim 56 wherein the processor:
 associates data for the object to an identification assigned by the processor for the object if the measured kinematic state of the object is within the validation region for the object; and
 either associates the data for the object to a new identification assigned by the processor for the object or rejects the data for the object if the measured kinematic state of the object is outside of the validation region for the object.

58. The processing method of claim 57 wherein the data comprises data from the sensor.

59. The processing method of claim 57 wherein the data comprises measurement data from the sensor.

60. The processing method of claim 57 wherein the processor tracks at least one kinematic state for a plurality of objects using the state estimation filter and the at least one object kinematic model.

61. The processing method of claim 39 wherein the processor selects the at least one object kinematic model from a plurality of models to match a movement of the object.

62. The processing method of claim 39 wherein the processor calculates a filter residual as a function of a difference between the first predicted kinematic state estimate of the object and the measured kinematic state of the object observed by the sensor and outputs the filter residual for use by one or more processes of the processor.

63. The processing method of claim 39 wherein the processor determines a model confidence interval that the measured kinematic state of the object observed by the sensor is within a range of expected values for the measured kinematic state of the object.

64. The processing method of claim 39 wherein the processor:
 compares a filter likelihood value to a model confidence interval, the model confidence interval defining a range of expected values for the filter likelihood value, the filter likelihood value representing a difference between the first predicted kinematic state estimate of the object and the measured kinematic state of the object;
 if the processor determines the filter likelihood value is within the model confidence interval, the processor increases a model probability for the at least one object kinematic model; and
 if the processor determines the filter likelihood value is outside the model confidence interval, the processor decreases the model probability for the at least one object kinematic model.

65. The processing method of claim 64 wherein the processor switches from the at least one object kinematic model to another object kinematic model when the model probability for the at least one object kinematic model is below a predetermined level.

66. The processing method of claim 64 wherein the range of expected values for the model confidence interval is based on one or more prior state measurements, one or more uncertainty values for a sensor, and/or one or more values stored in memory.

67. The processing method of claim 39 wherein the processor determines a filter likelihood value and disables, reduces, or modifies one or more operations or functionality of the motorized mobile system when the filter likelihood value is outside of a confidence interval of one or more models, the filter likelihood value representing a difference between the first predicted kinematic state estimate of the object and the measured kinematic state of the object.

68. The processing method of claim 39 wherein the processor determines a filter likelihood value and enables, increases, or modifies one or more operations or functionality of the motorized mobile system when the filter likelihood value is within a confidence interval of one or more models, the filter likelihood value representing a difference between the first predicted kinematic state estimate of the object and the measured kinematic state of the object.

69. The processing method of claim 39 wherein:
the state estimation filter uses a plurality of models each having a model probability; each model:
predicts a first kinematic state estimate of the object based on prior knowledge of state for the object;
uses the first predicted kinematic state estimate of the object and a measured kinematic state of the object observed by the sensor to determine a second kinematic state estimate of the object; and
uses the second kinematic state estimate of the object as an input to the state estimation filter using the model to predict another kinematic state estimate of the object; and
the processor either:
selects one of the plurality of models with a highest model probability and outputs the first predicted kinematic state estimate of the selected model as an output estimate for use by the at least one first process of the motorized mobile system, wherein the at least one first process causes one or more actions to be taken by the motorized mobile system based on the output estimate; or
calculates for each model a product of the model probability for the model and the first predicted kinematic state estimate of state and sums the product of each model together as the output estimate for use by the at least one first process of the motorized mobile system, wherein the at least one first process causes one or more actions to be taken by the motorized mobile system based on the output estimate.

70. The processing method of claim 39 wherein the processor executes the state estimation filter that uses the object kinematic model, and the state estimation filter comprises at least one of a recursive filter, a Kalman filter, and a joint probabilistic data association filter.

71. The processing method of claim 39 wherein the object kinematic model comprises one or more algorithms.

72. The processing method of claim 39 wherein the object kinematic model is selected as at least one of a maneuver model of a target, a constant velocity model, a down range acceleration model, and a cross range acceleration model.

73. The processing method of claim 39 wherein the object kinematic model is selected as at least one of an interacting multiple model and a dynamically structured interacting multiple model.

74. The processing method of claim 39 wherein the object comprises at least one of a thing, a person, an animal, a ground feature, and a surface condition.

75. The processing method of claim 39 wherein the sensor comprises at least one of an optical sensor, a sound sensor, a hall effect sensor, a proximity sensor, a radar sensor, a sonar sensor, an ultrasonic sensor, a LIDAR sensor, a stereo vision camera, a structured light camera, and a time of flight camera.

76. The processing method of claim 39 wherein the motorized mobile system consists of one or more of a mobility scooter, an electronic conveyance vehicle, a riding lawn mower, a grocery cart, an all-terrain vehicle, an off-road vehicle, and a golf cart.

77. The processing system of claim 1 wherein the motorized mobile system is a mobile chair.

78. The processing method of claim 39 wherein the motorized mobile system is selected as a mobile chair.

* * * * *